(12) United States Patent
Novek

(10) Patent No.: US 12,365,597 B1
(45) Date of Patent: Jul. 22, 2025

(54) SYSTEMS AND METHODS FOR PRODUCING ALKALI HYDROXIDES AND SULFURIC ACID OR HYDROCHLORIC ACID

(71) Applicant: INNOVATOR ENERGY LLC, Houston, TX (US)

(72) Inventor: Ethan Novek, Houston, TX (US)

(73) Assignee: INNOVATOR ENERGY LLC, Houston, TX (US)

( * ) Notice: Subject to any disclaimer, the term of this patent is extended or adjusted under 35 U.S.C. 154(b) by 0 days.

(21) Appl. No.: 18/813,773

(22) Filed: Aug. 23, 2024

Related U.S. Application Data

(60) Provisional application No. 63/534,366, filed on Aug. 24, 2023, provisional application No. 63/537,356, (Continued)

(51) Int. Cl.
| | | |
|---|---|---|
| C01F 5/40 | (2006.01) |
| C01B 7/04 | (2006.01) |
| C01B 17/06 | (2006.01) |
| C01B 17/44 | (2006.01) |
| C01B 17/74 | (2006.01) |
| C01D 1/20 | (2006.01) |
| C01D 7/07 | (2006.01) |
| C01F 5/12 | (2006.01) |
| C01F 5/14 | (2006.01) |
| C01F 5/24 | (2006.01) |
| C01F 11/04 | (2006.01) |
| C01F 11/18 | (2006.01) |

(52) U.S. Cl.
CPC ............ *C01F 5/40* (2013.01); *C01B 7/04* (2013.01); *C01B 17/06* (2013.01); *C01B 17/44* (2013.01); *C01B 17/74* (2013.01); *C01D 1/20* (2013.01); *C01D 7/07* (2013.01); *C01F 5/12* (2013.01); *C01F 5/14* (2013.01); *C01F 5/24* (2013.01); *C01F 11/04* (2013.01); *C01F 11/181* (2013.01)

(58) Field of Classification Search
CPC ...... C01F 5/40; C01F 5/12; C01F 5/14; C01F 5/24; C01F 11/04; C01F 11/181; C01B 7/04; C01B 17/06; C01B 17/44; C01B 17/74; C01D 1/20; C01D 7/07
USPC ........................................................ 423/164
See application file for complete search history.

(56) References Cited

U.S. PATENT DOCUMENTS

2021/0261427 A1* 8/2021 Novek .................... C01C 1/026

* cited by examiner

*Primary Examiner* — Anita Nassiri-Motlagh
(74) *Attorney, Agent, or Firm* — HUNTON ANDREWS KURTH LLP

(57) ABSTRACT

In some embodiments the application pertains to processes comprising reacting a component comprising an alkaline earth weak acid with a component comprising an acid to form a component comprising an alkaline earth acid anion and a component comprising a weak acid derivative. At least a portion of the component comprising the alkaline earth acid anion is reacted with a component comprising an alkali sulfate to form a component comprising alkaline earth sulfate and a component comprising an alkali acid anion. At least a portion of the component comprising alkaline earth sulfate is decomposed to form a component comprising alkaline earth oxide, or alkaline earth hydroxide, or alkaline earth carbonate, or alkaline earth sulfide, or a derivative thereof, or any combination thereof, and a component comprising sulfur dioxide, or oxygen, or sulfur trioxide, or a derivative thereof, or any combination thereof.

10 Claims, 33 Drawing Sheets

Related U.S. Application Data filed on Sep. 8, 2023, provisional application No. 63/623,363, filed on Jan. 22, 2024, provisional application No. 63/623,897, filed on Jan. 23, 2024, provisional application No. 63/623,898, filed on Jan. 23, 2024, provisional application No. 63/624,370, filed on Jan. 24, 2024, provisional application No. 63/596,633, filed on Nov. 7, 2023, provisional application No. 63/621,006, filed on Jan. 15, 2024.

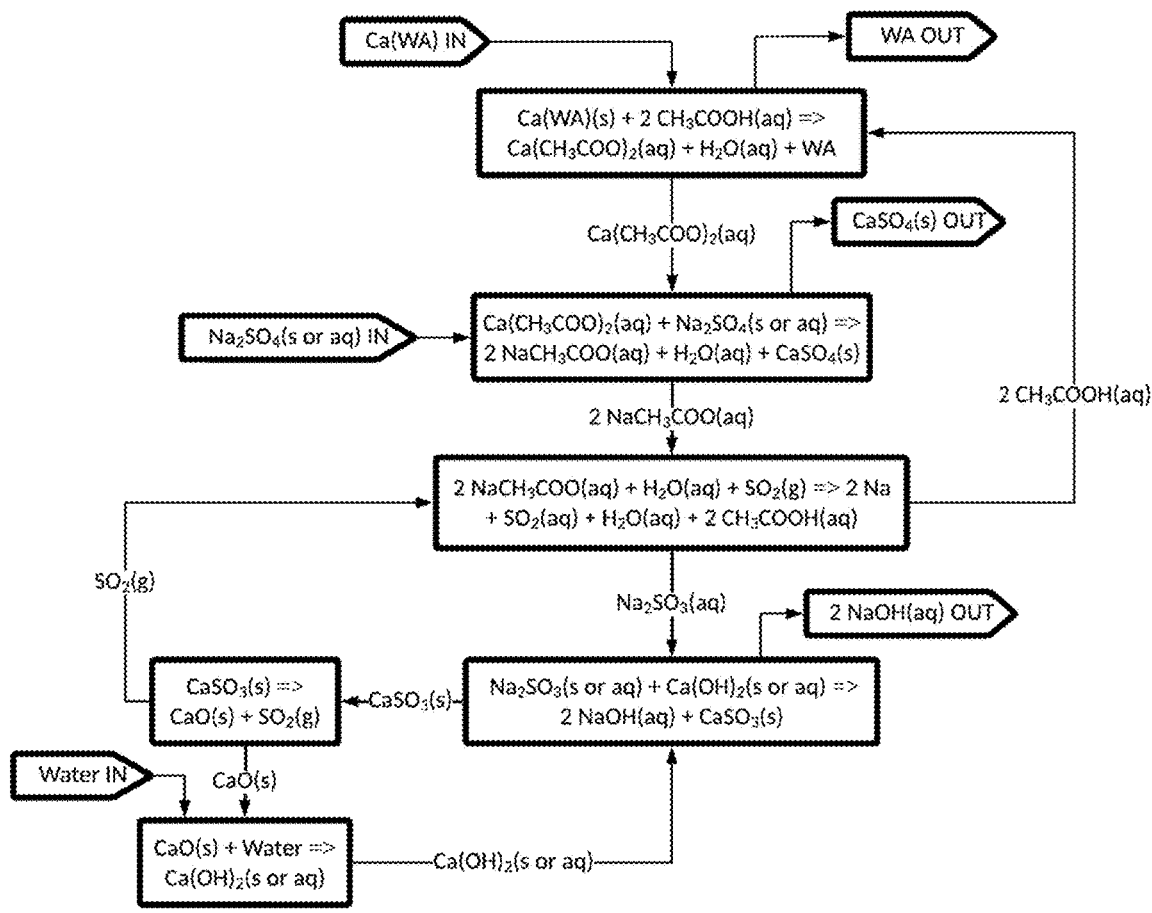
FIG. 1 (Above)

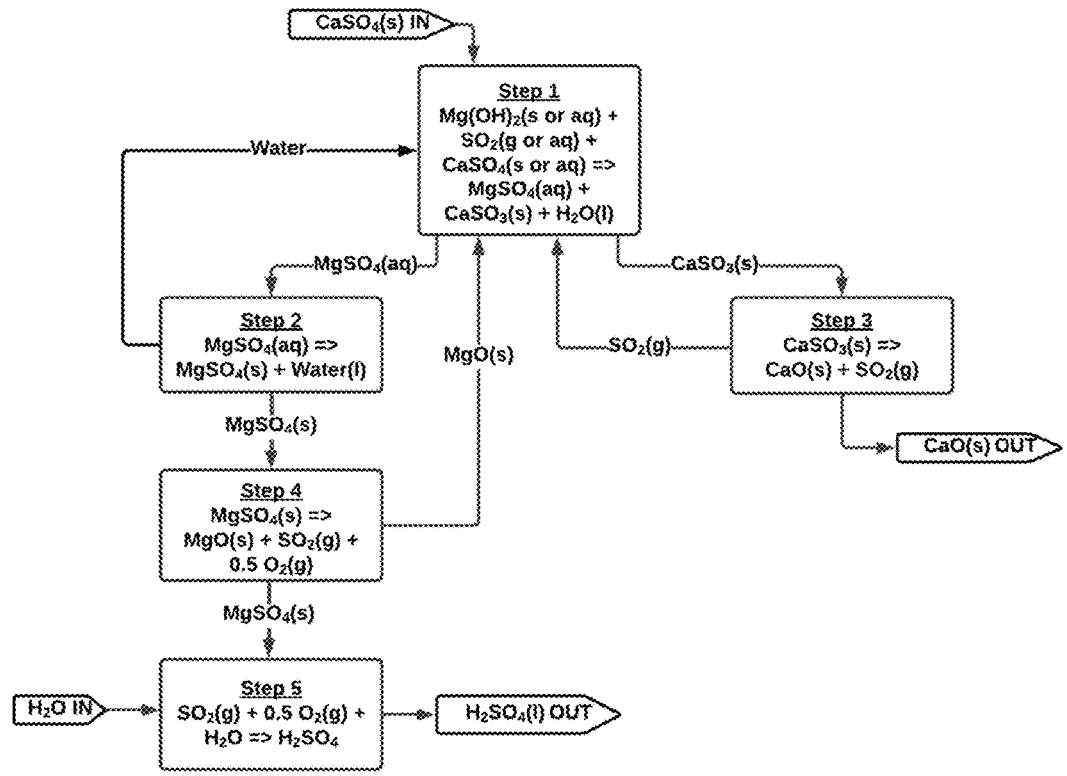
FIG. 2 (Above)
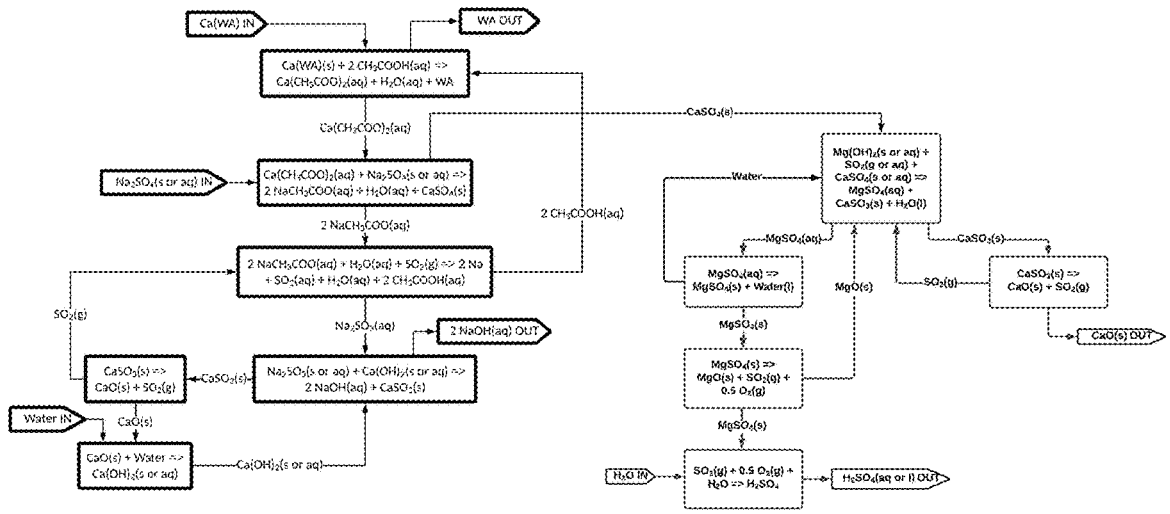
FIG. 3 (Above)

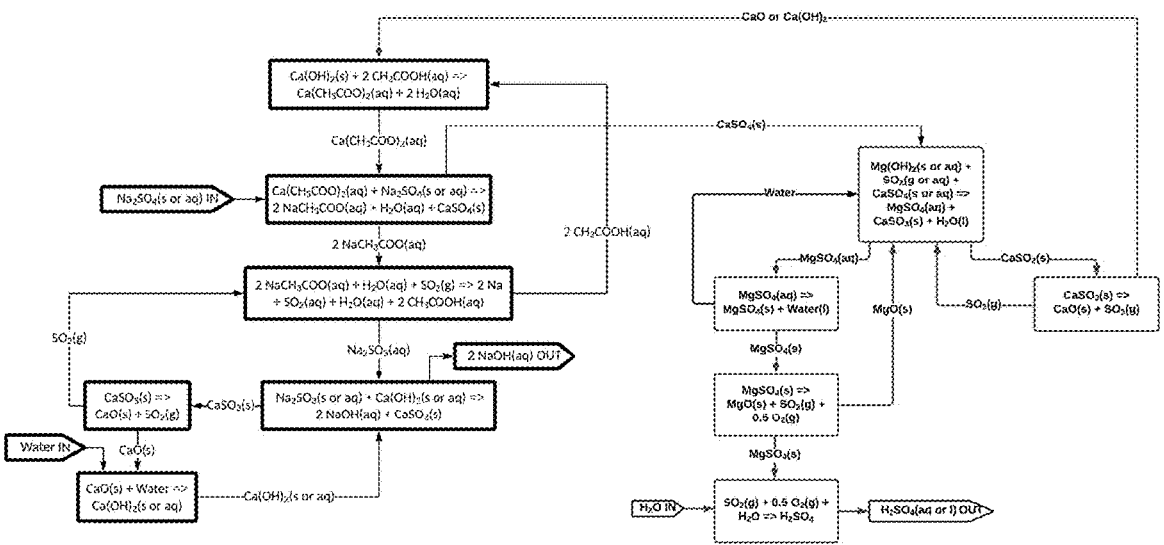
FIG. 4 (Above)
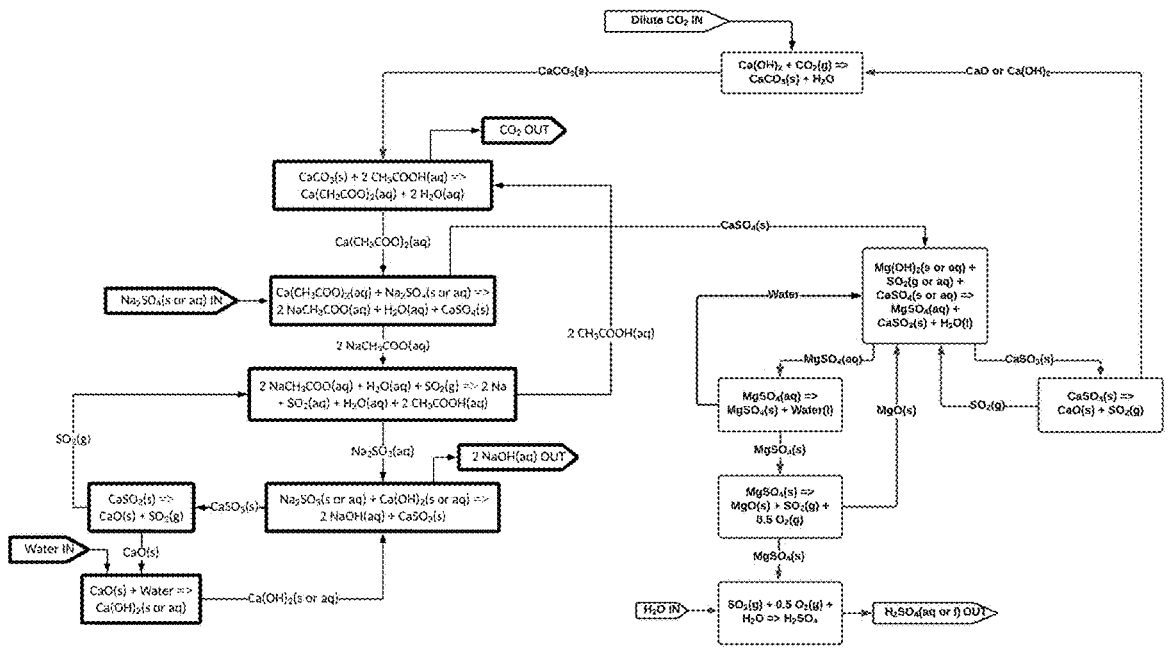
FIG. 5 (Above)

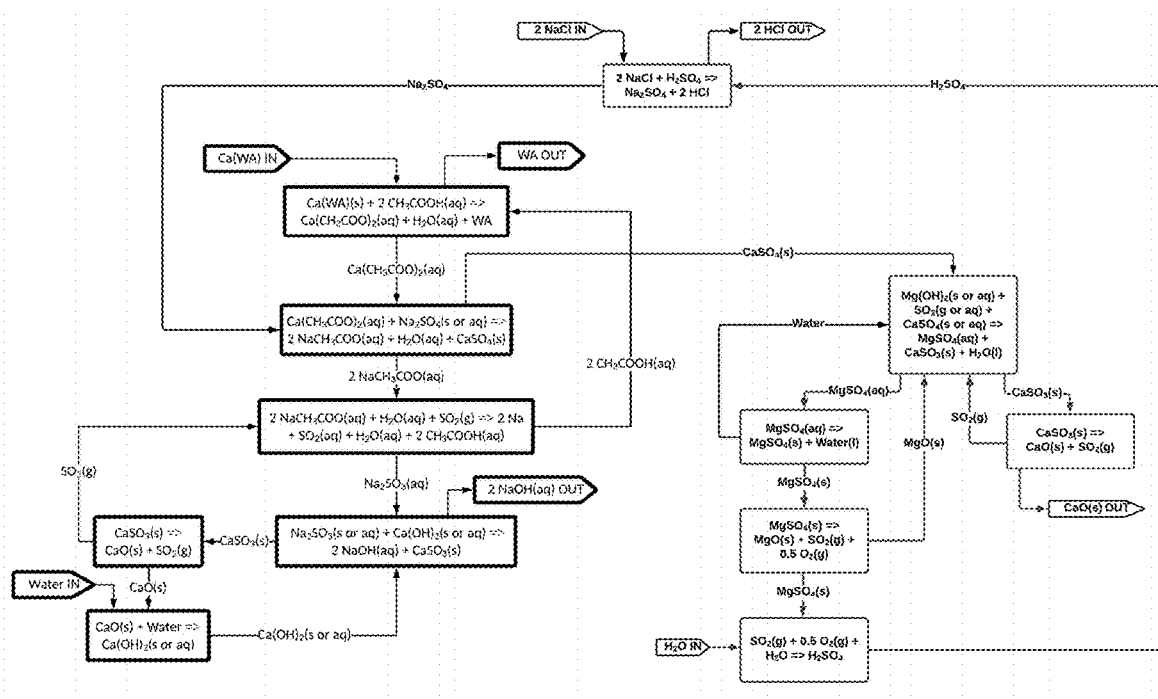
FIG. 6 (Above)
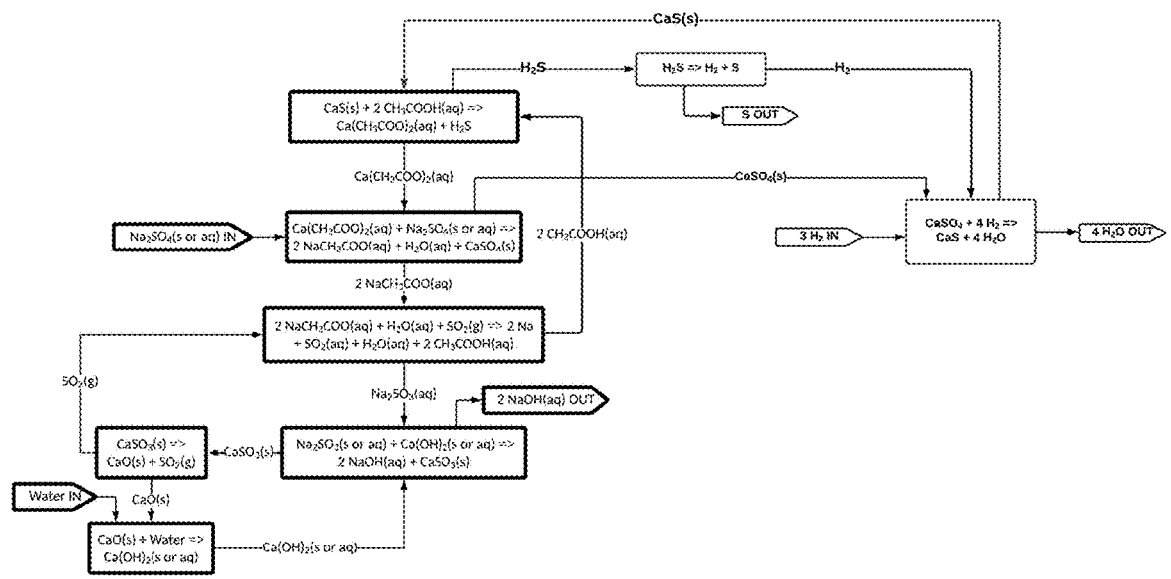
FIG. 7 (Above)

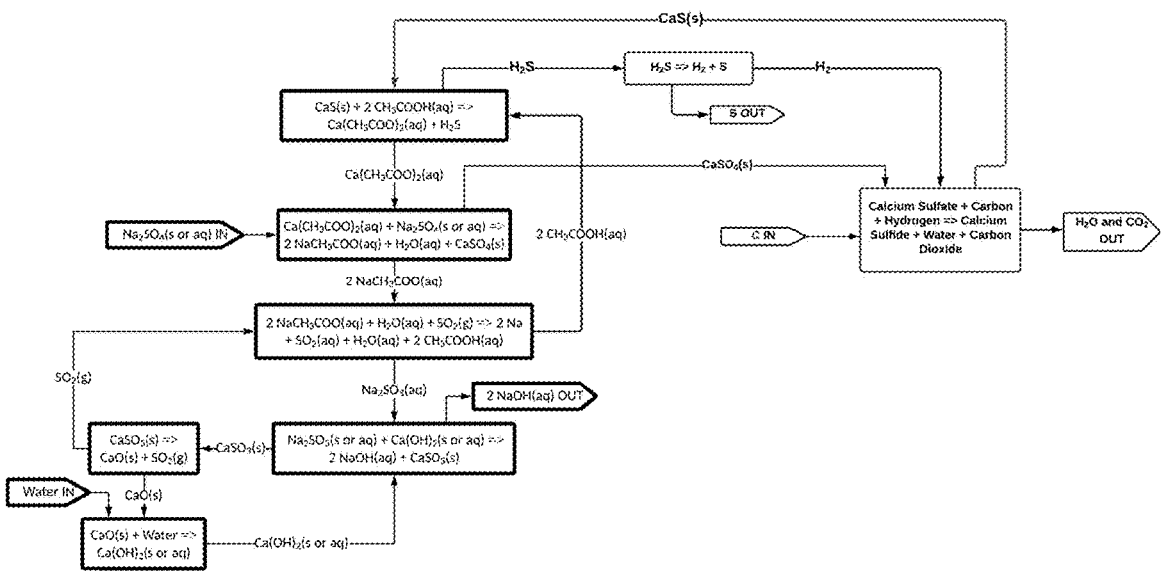
FIG. 8 (Above)
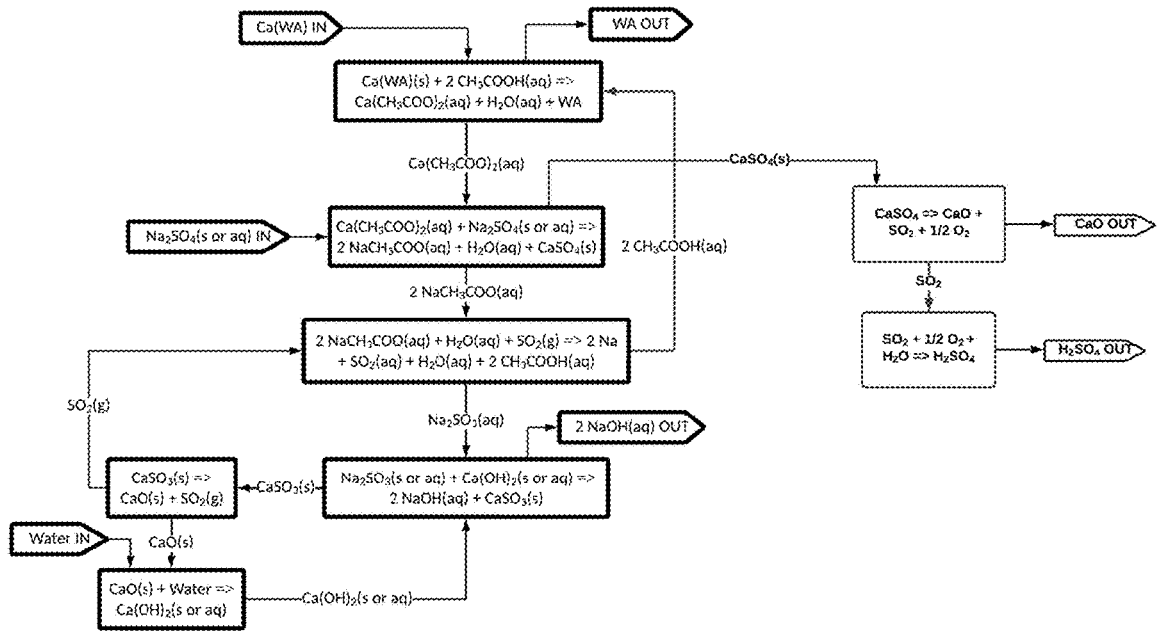
FIG. 9 (Above)

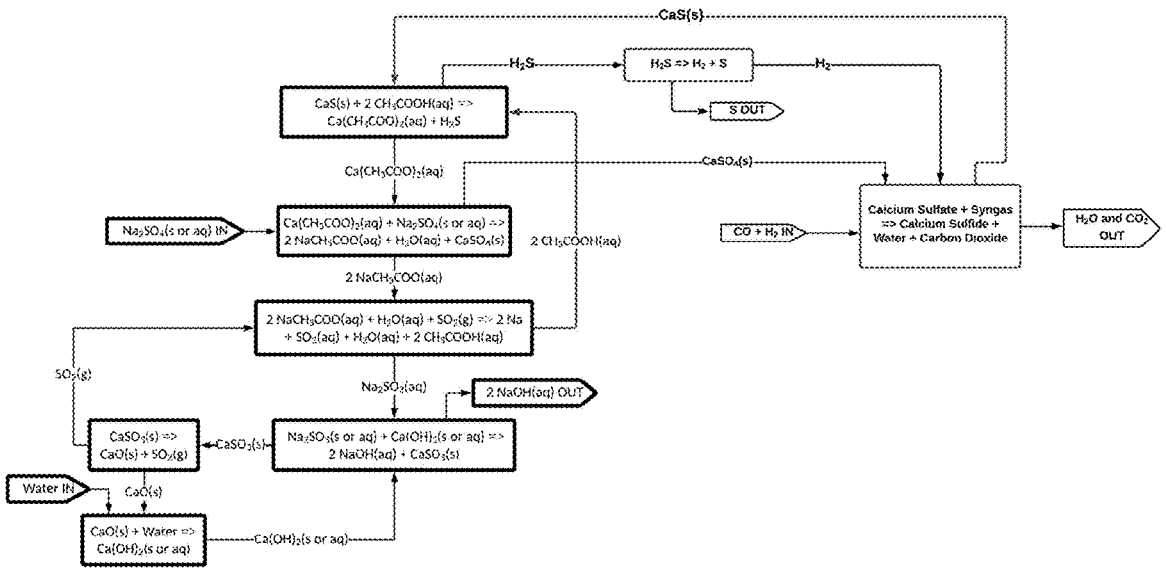
FIG. 10 (Above)
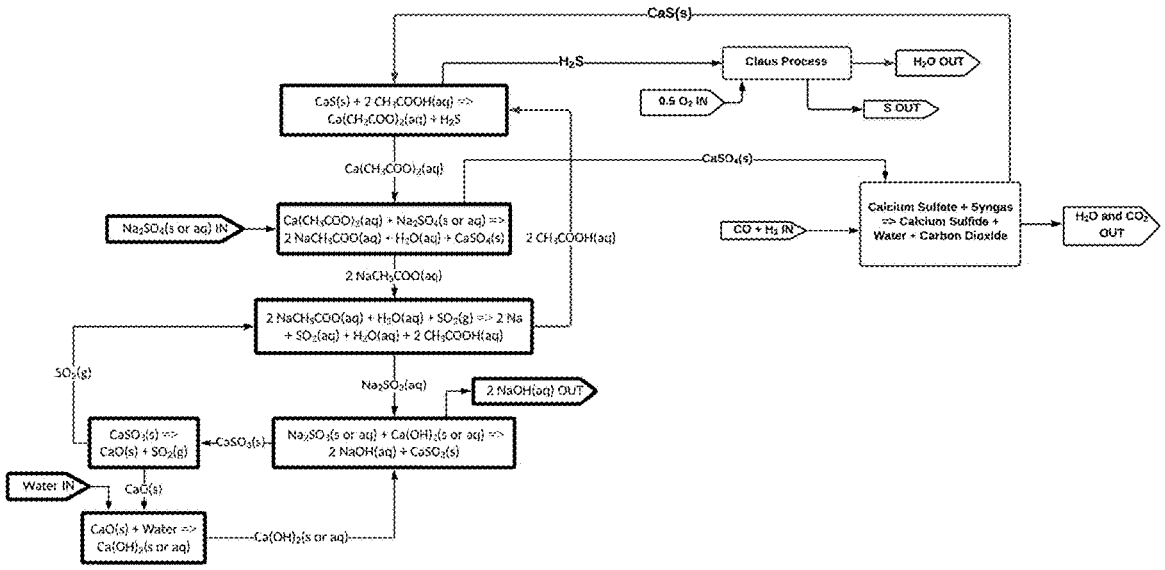
FIG. 11 (Above)

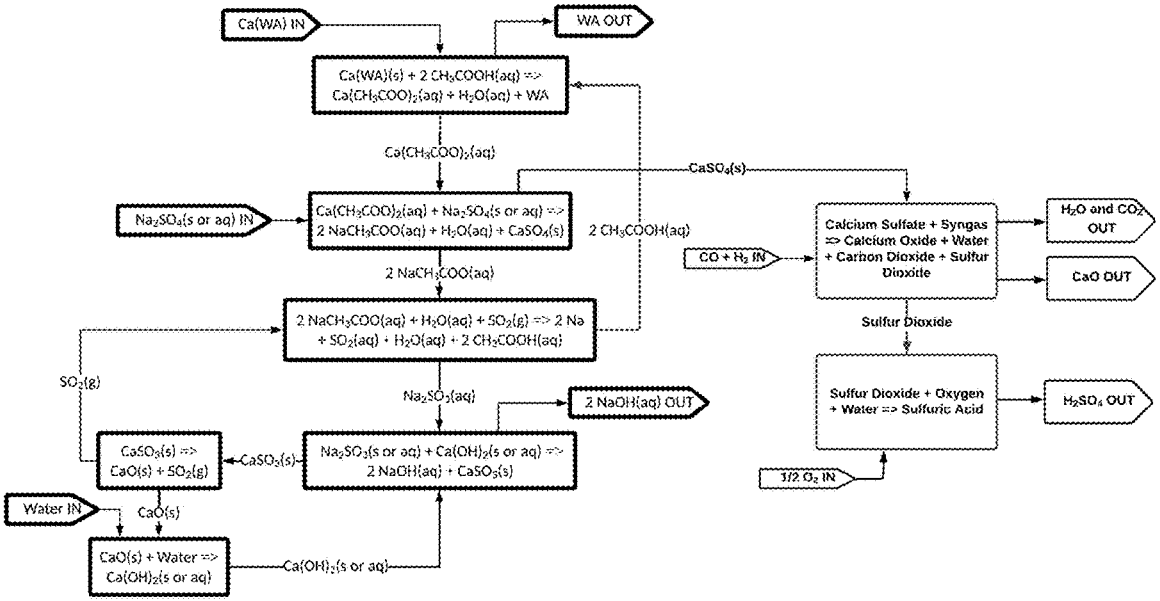
FIG. 12 (Above)
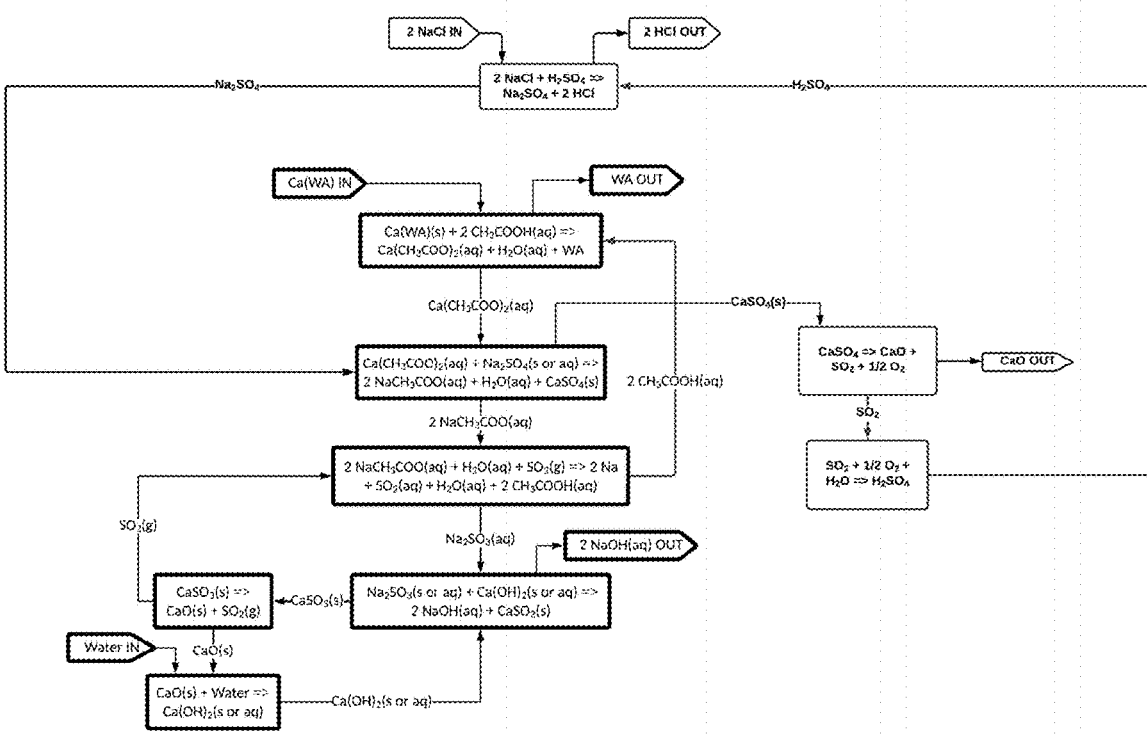
FIG. 13 (Above)

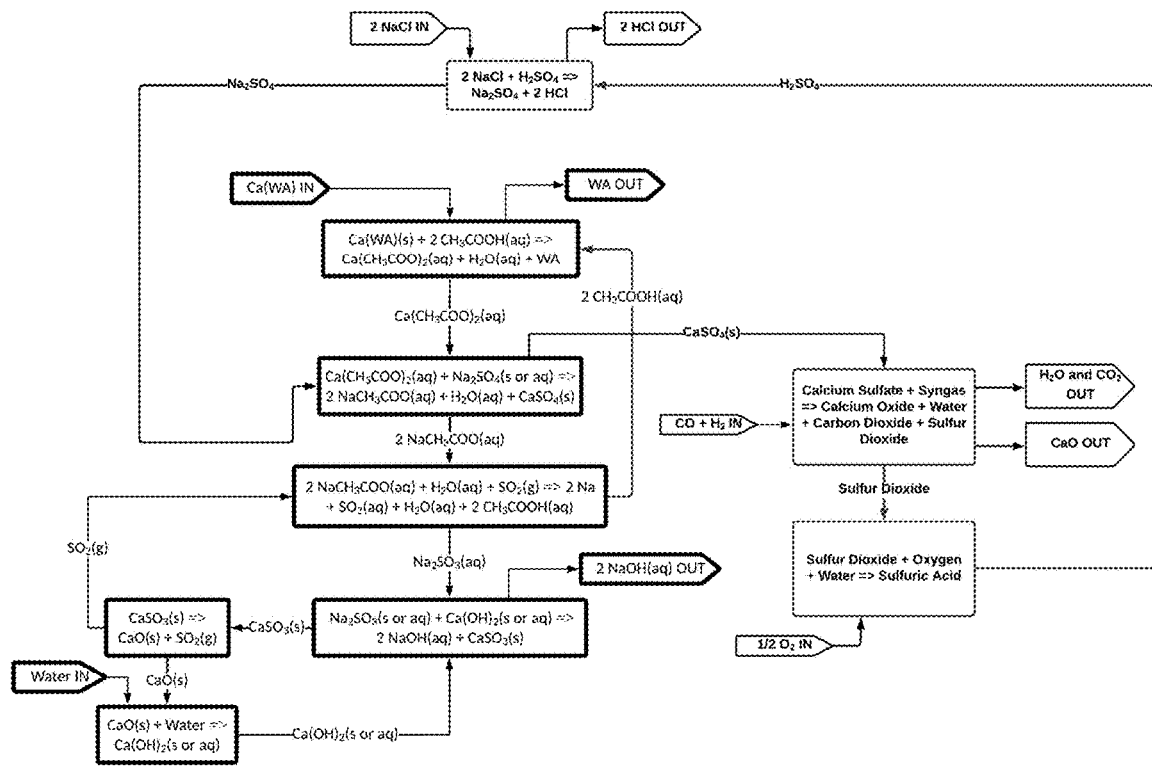
FIG. 14 (Above)
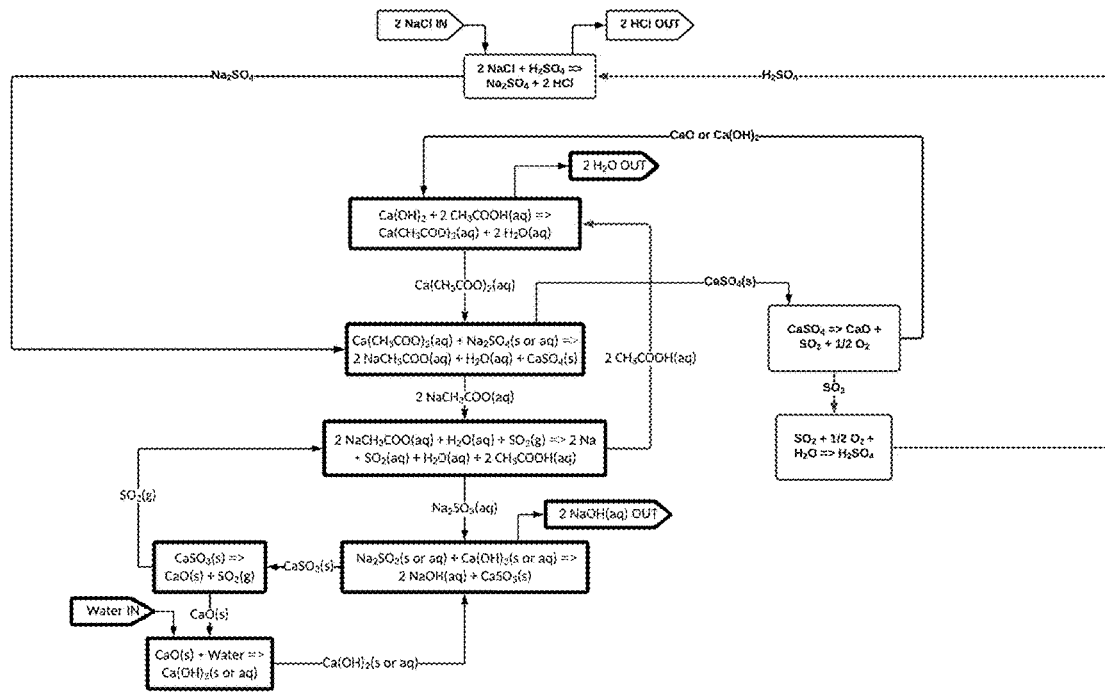
FIG. 15 (Above)

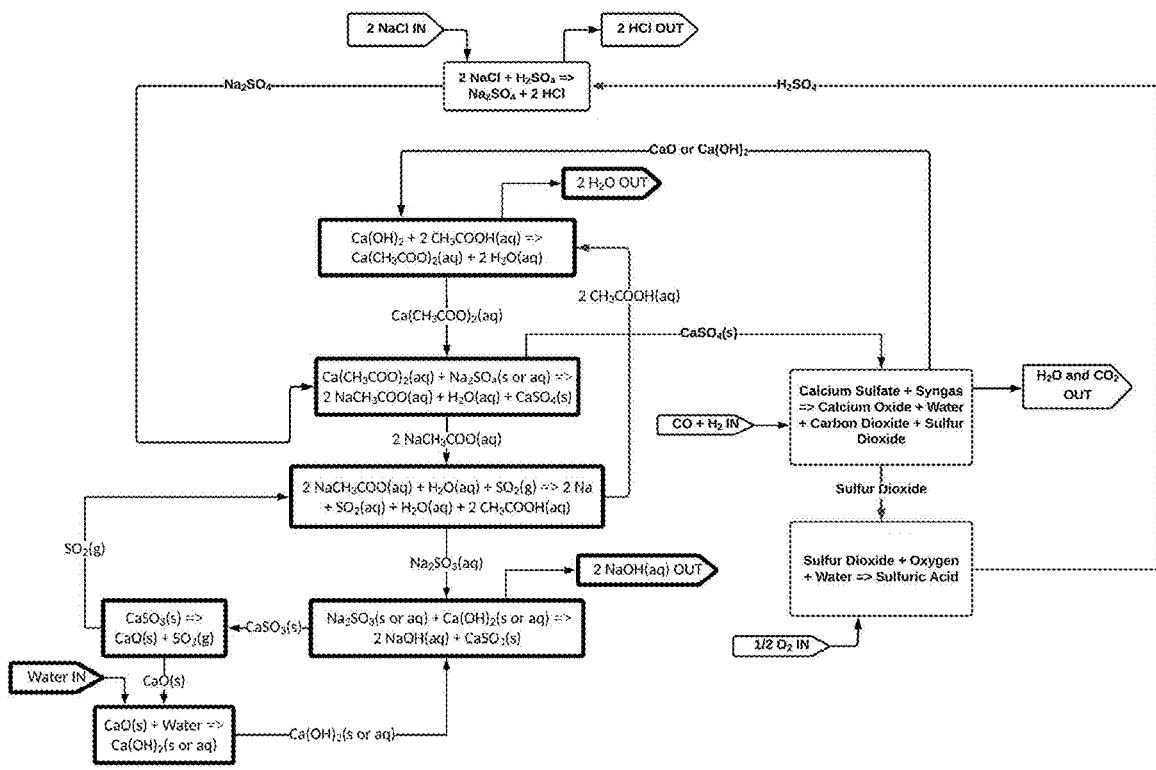
FIG. 16 (Above)

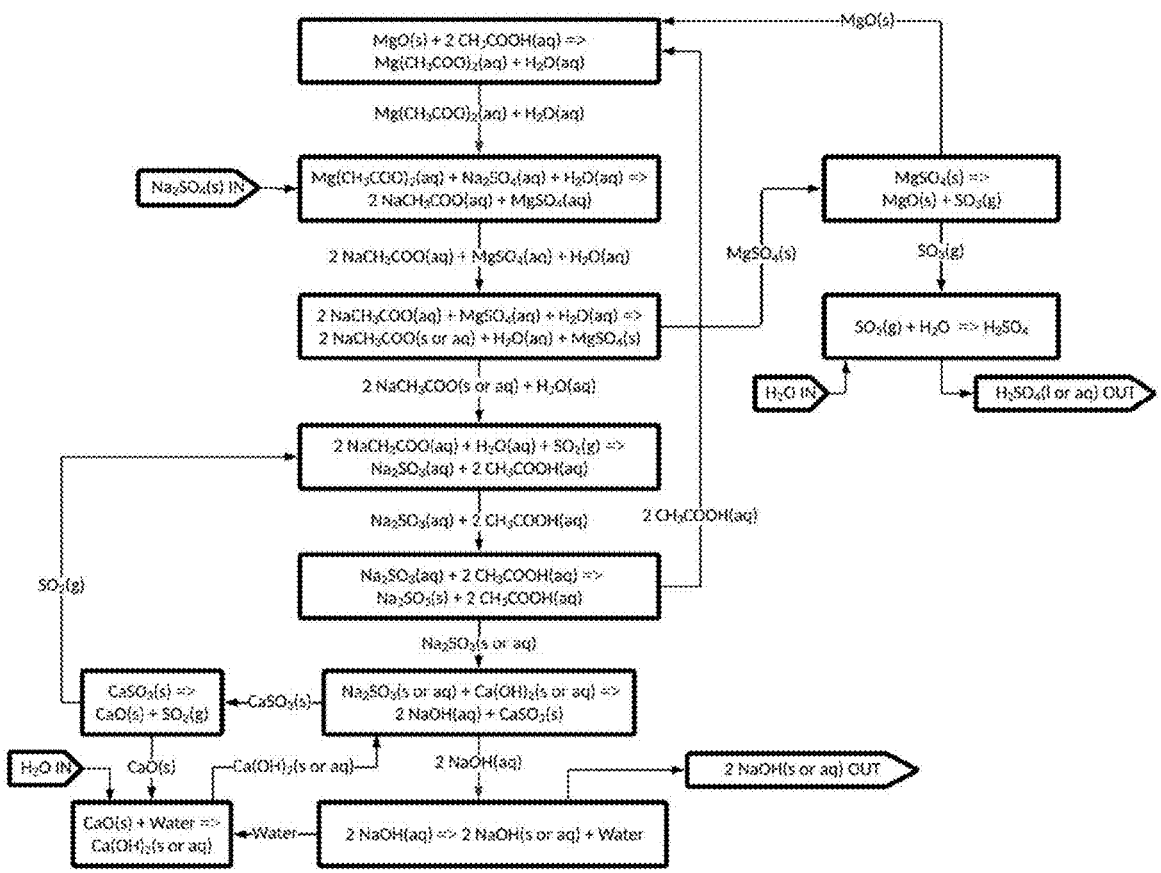
FIG. 17 (Above)

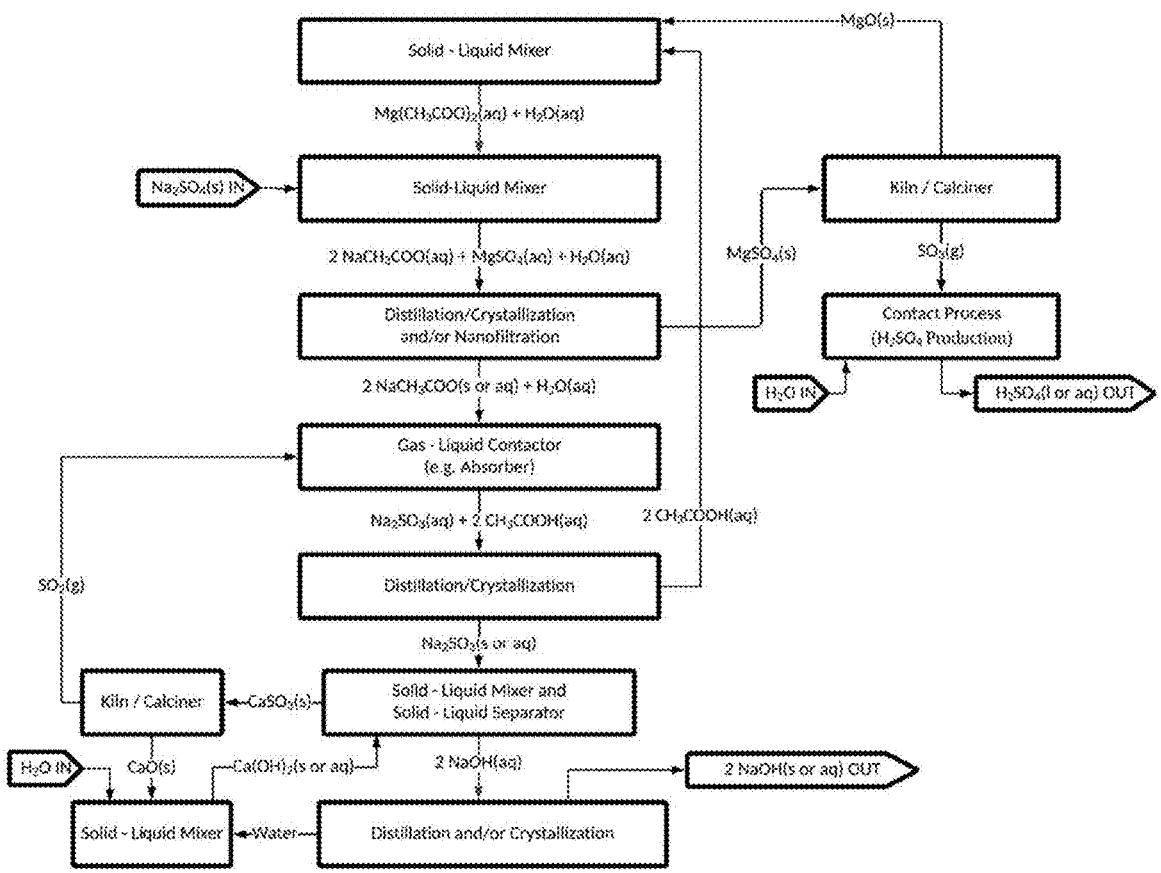
FIG. 18 (Above)

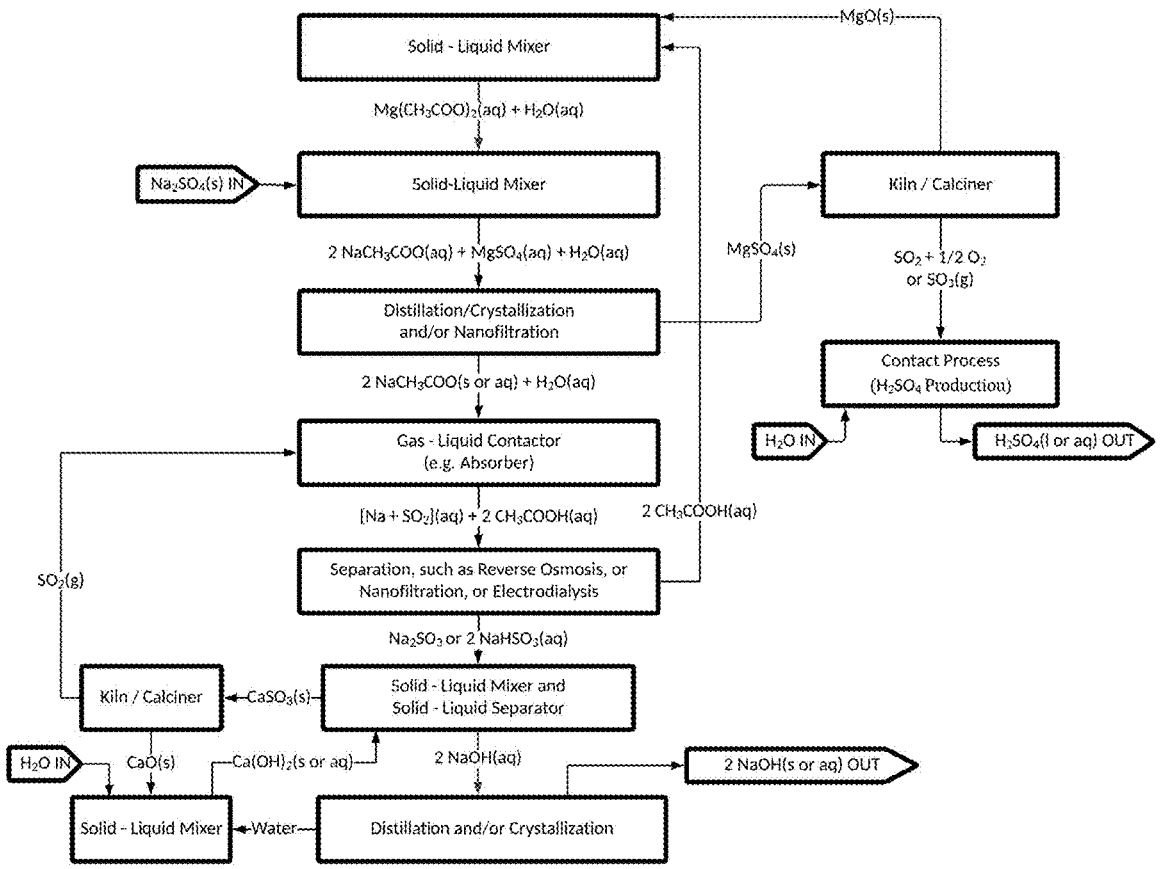
FIG. 19 (Above)

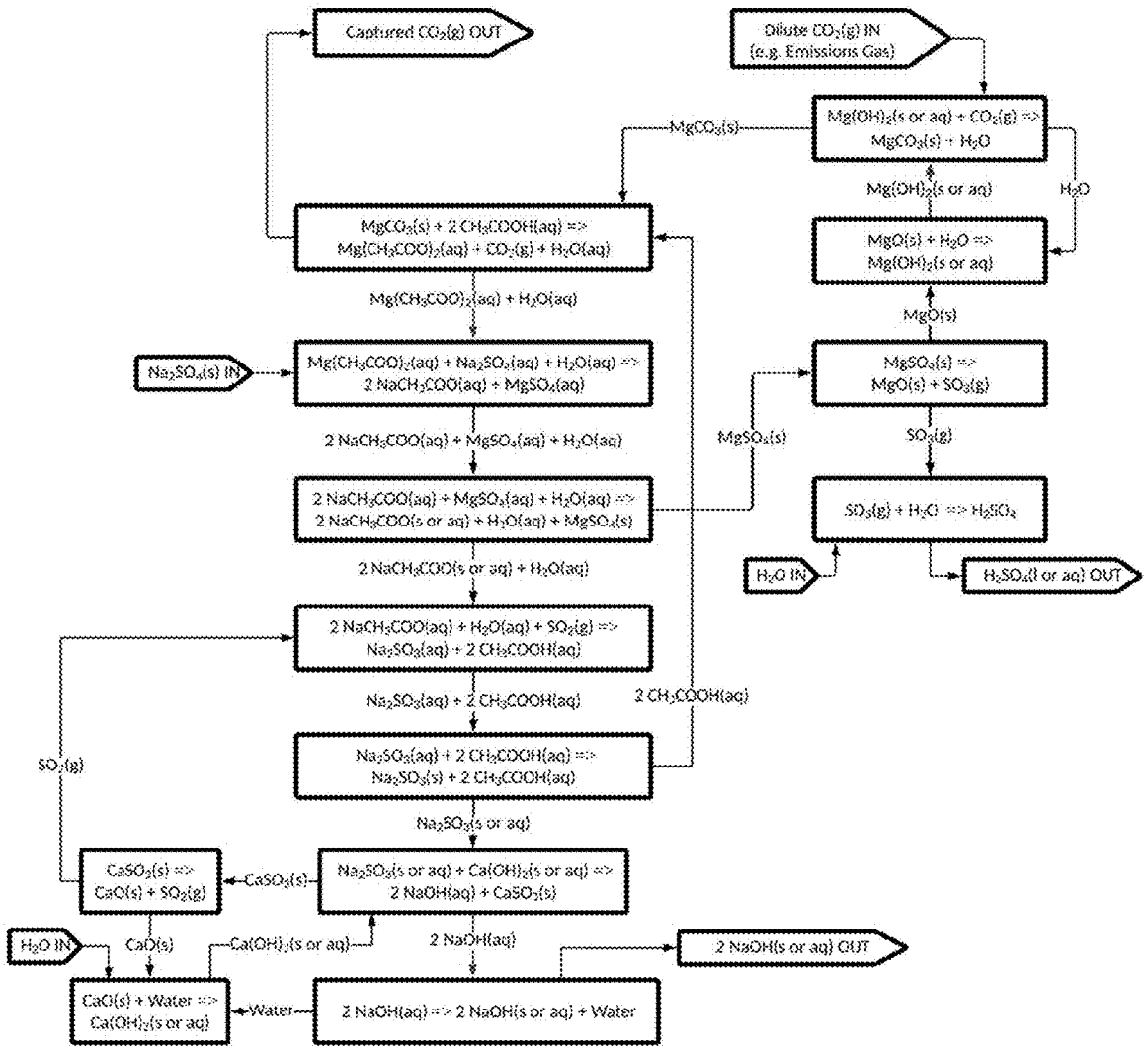
FIG. 20 (Above)

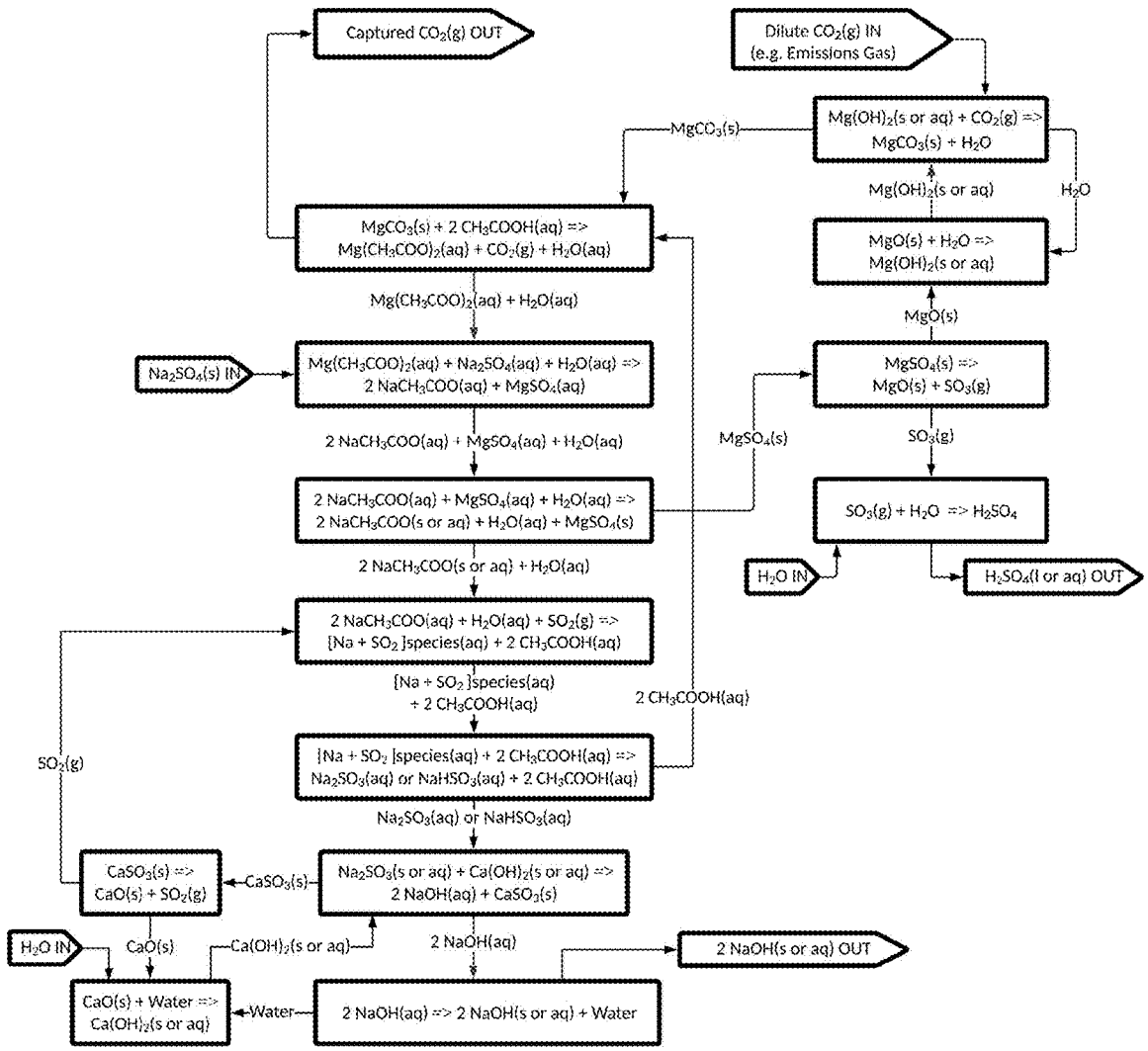
FIG. 21 (Above)

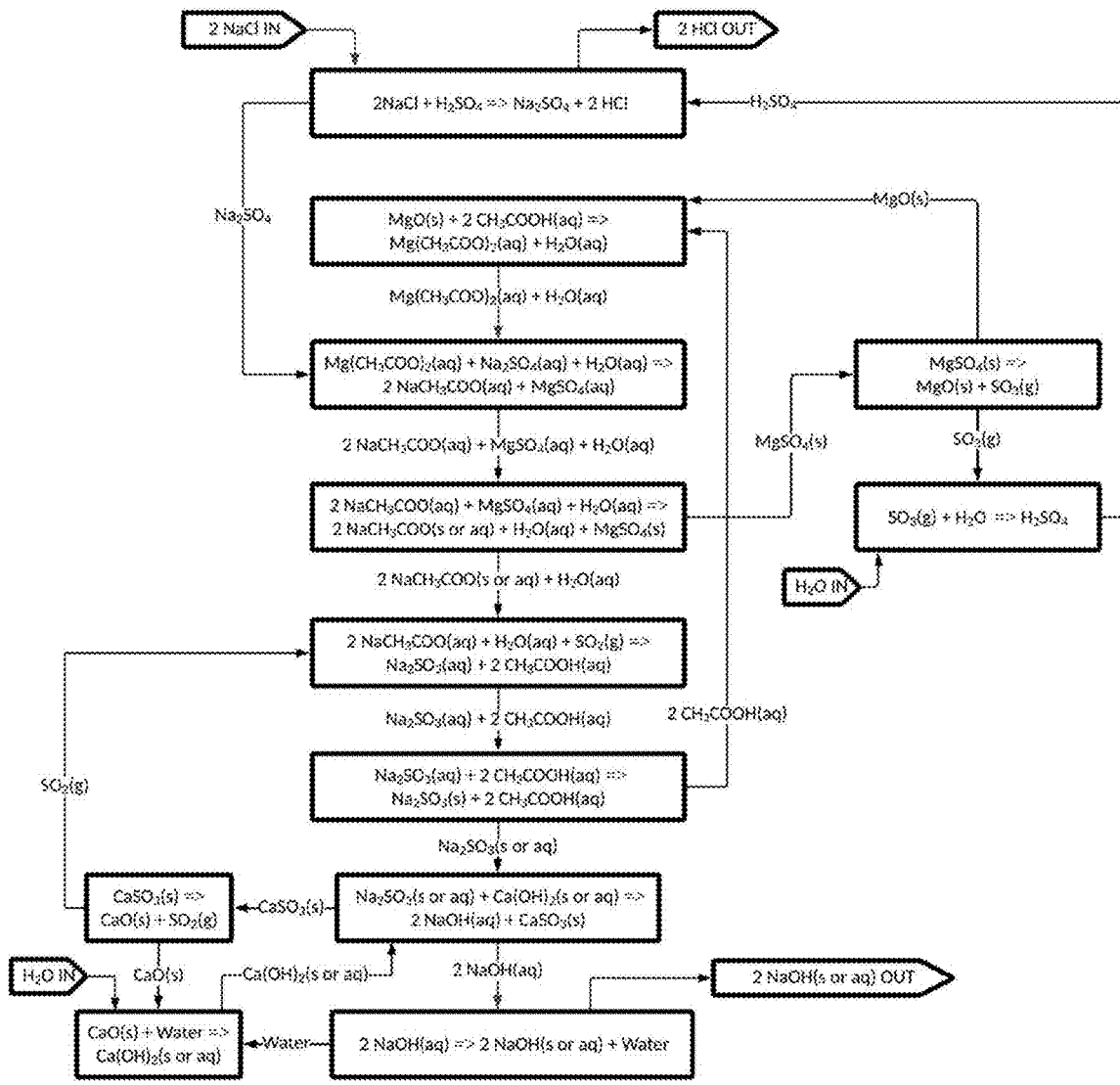
FIG. 22 (Above)

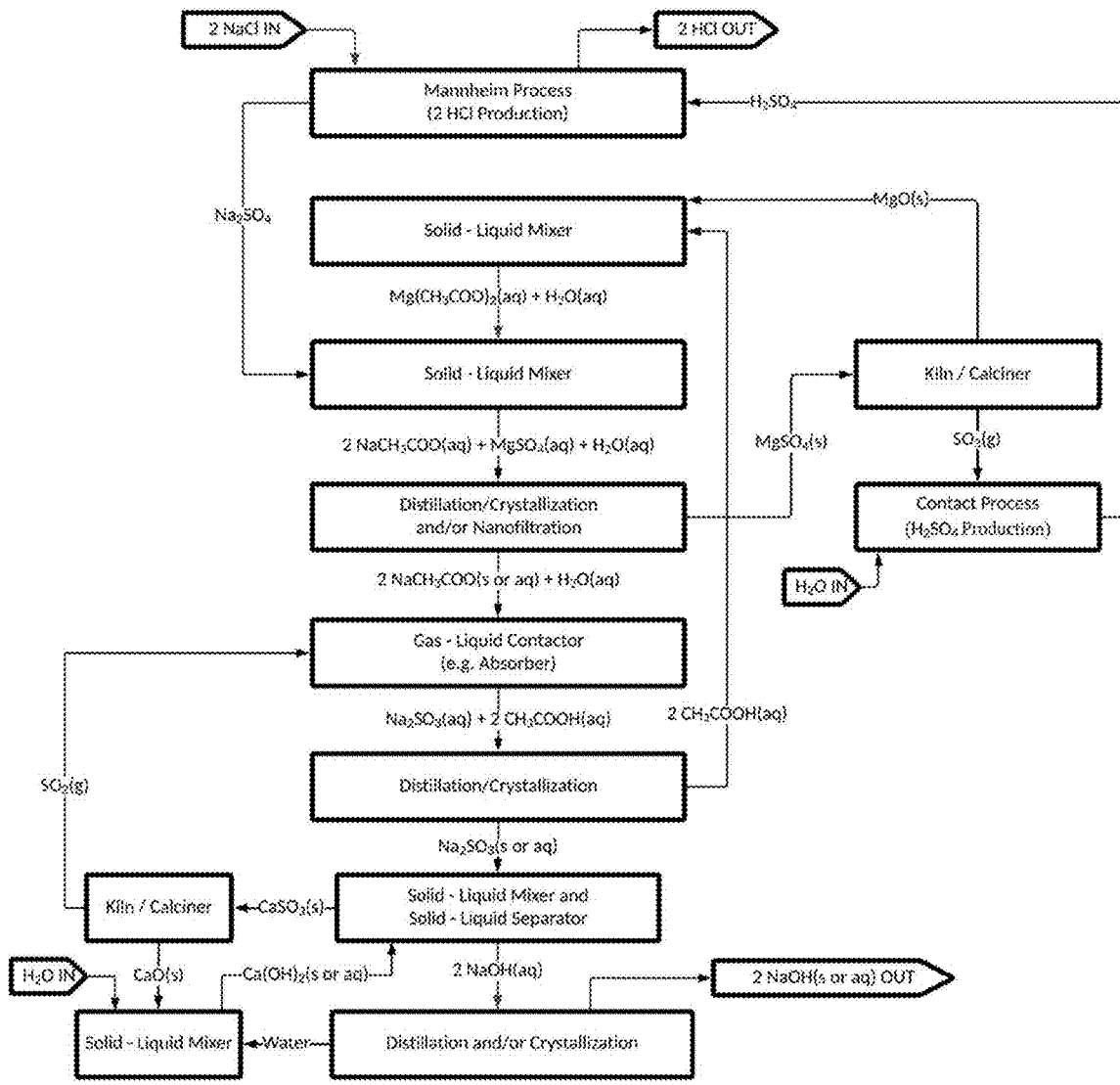
FIG. 23 (Above)

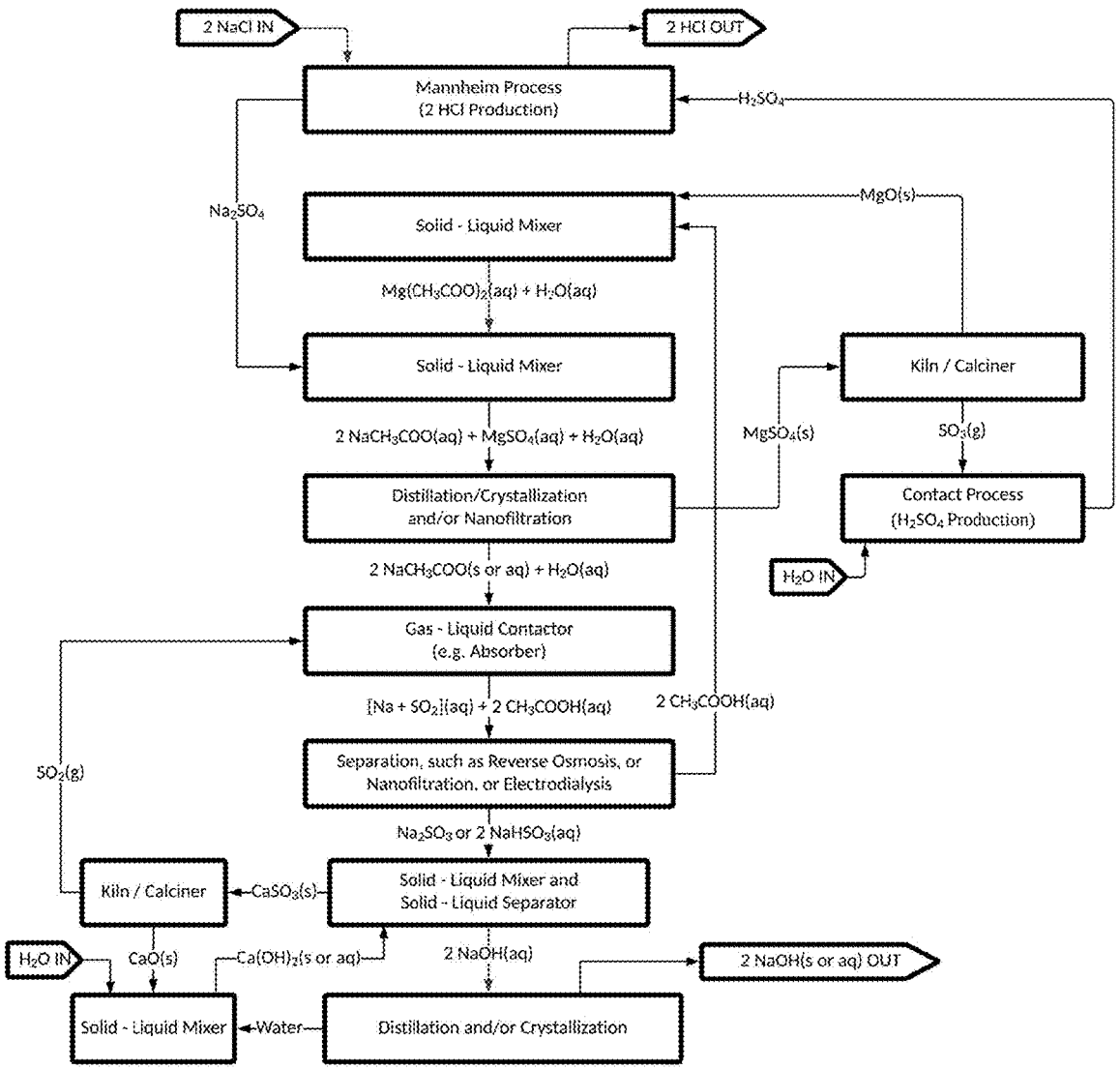
FIG. 24 (Above)

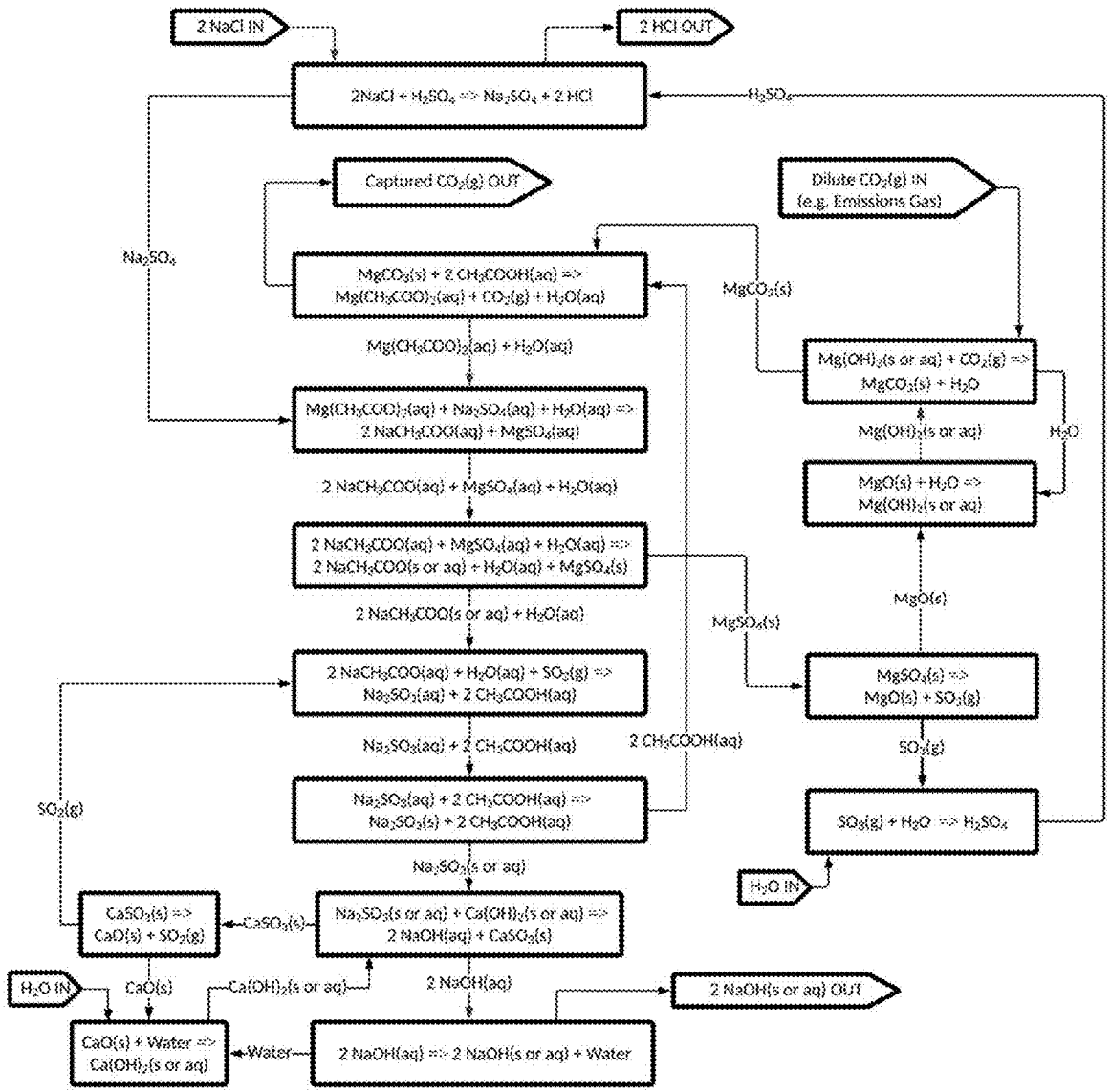
FIG. 25 (Above)

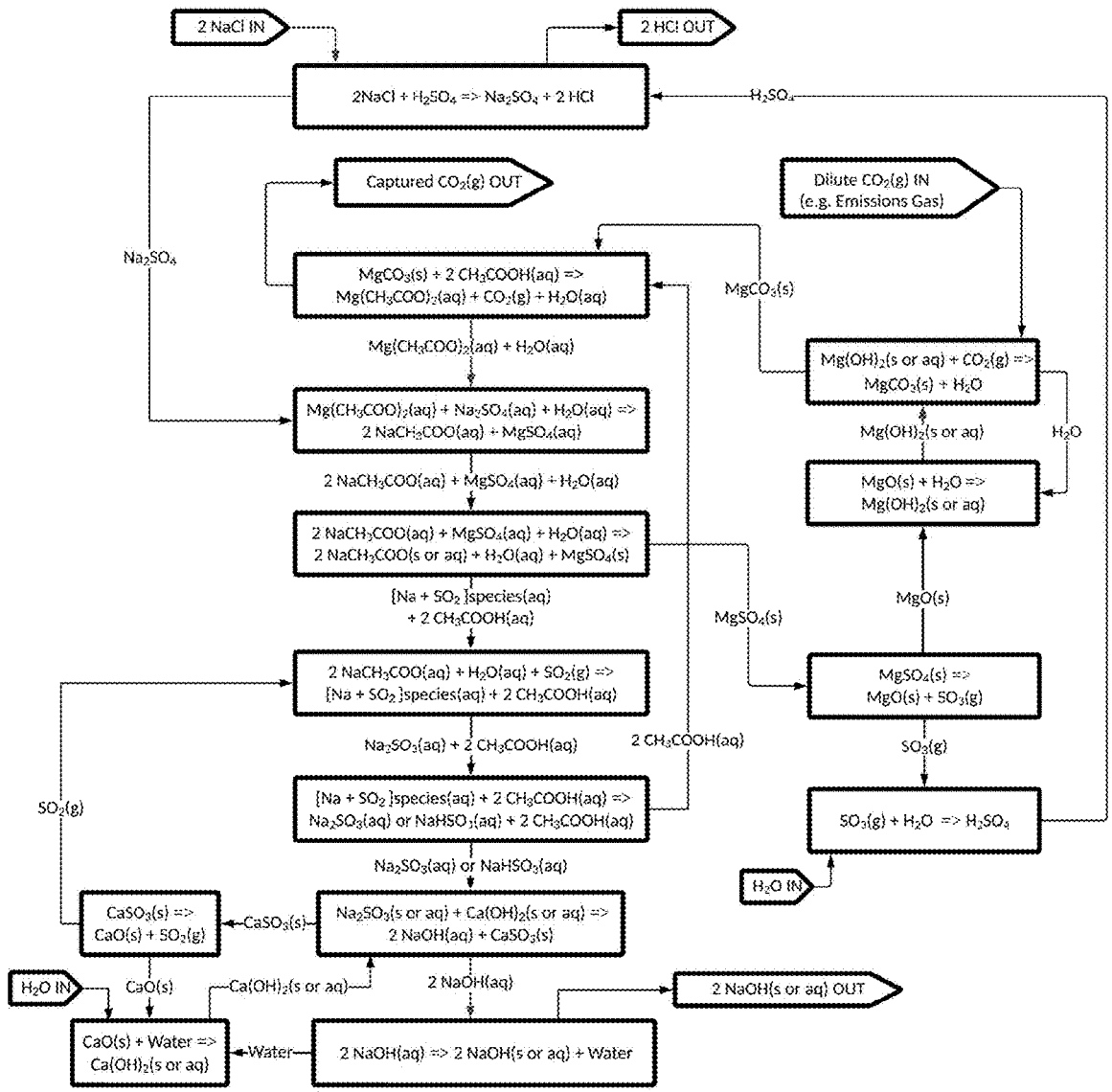
FIG. 26 (Above)

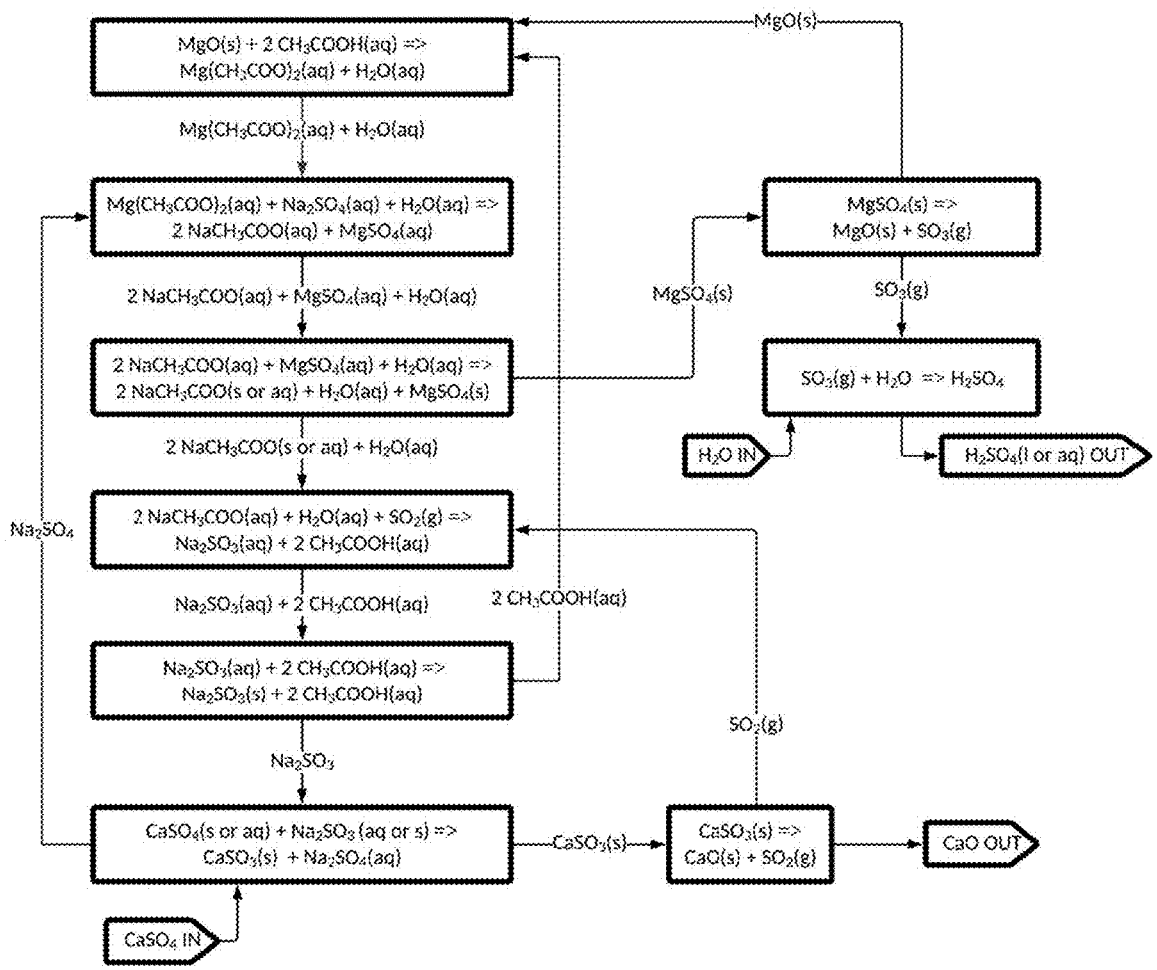
FIG. 27 (Above)

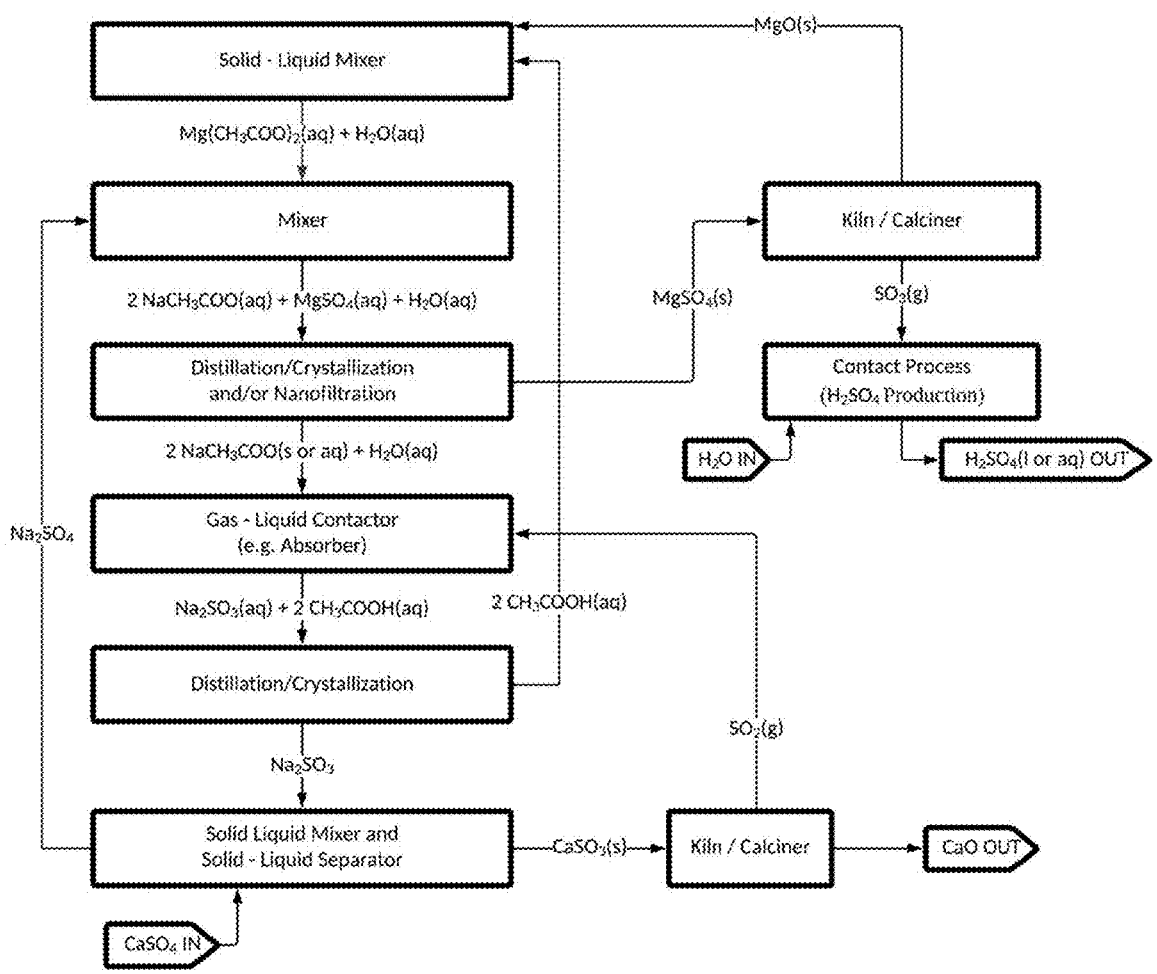
FIG. 28 (Above)

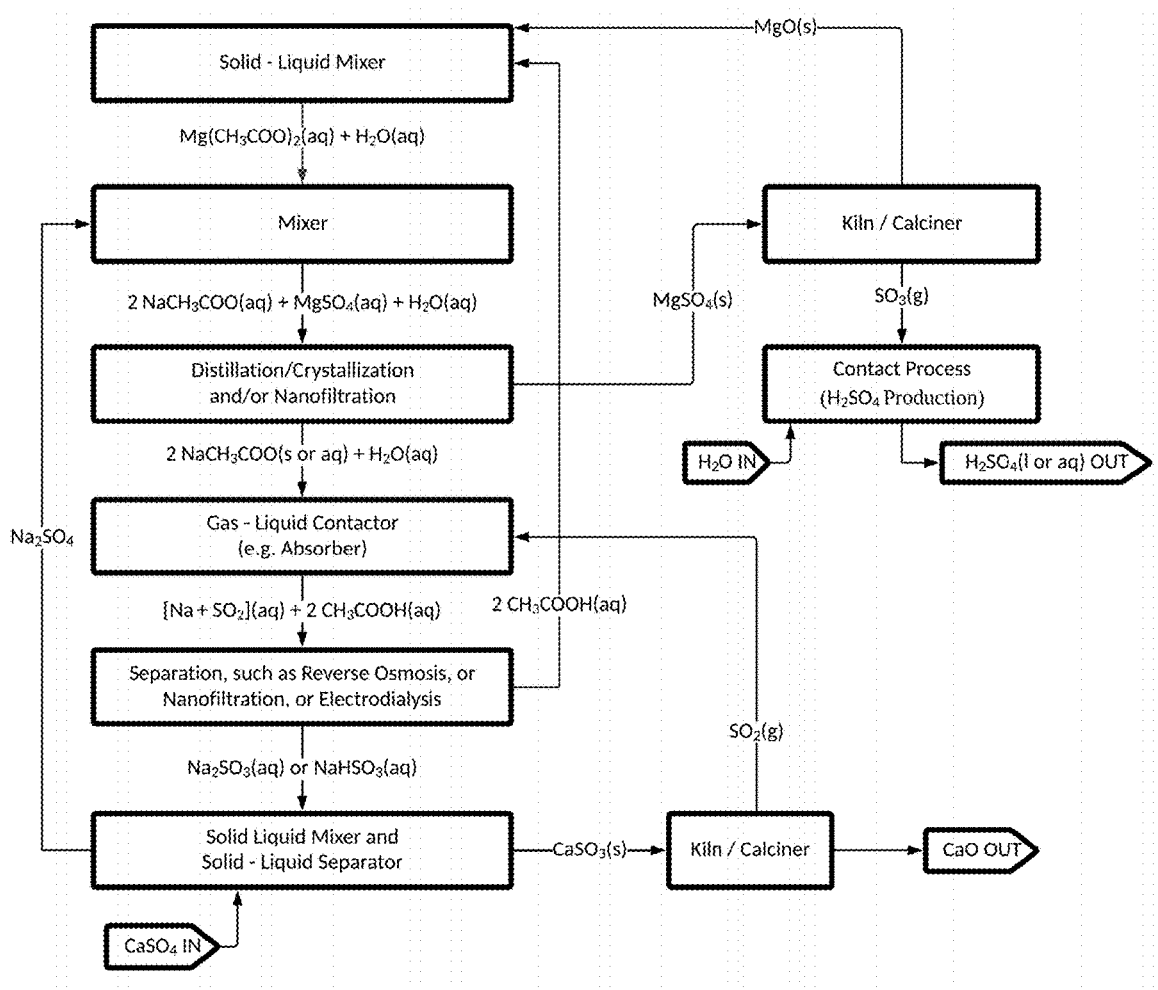
FIG. 29 (Above)

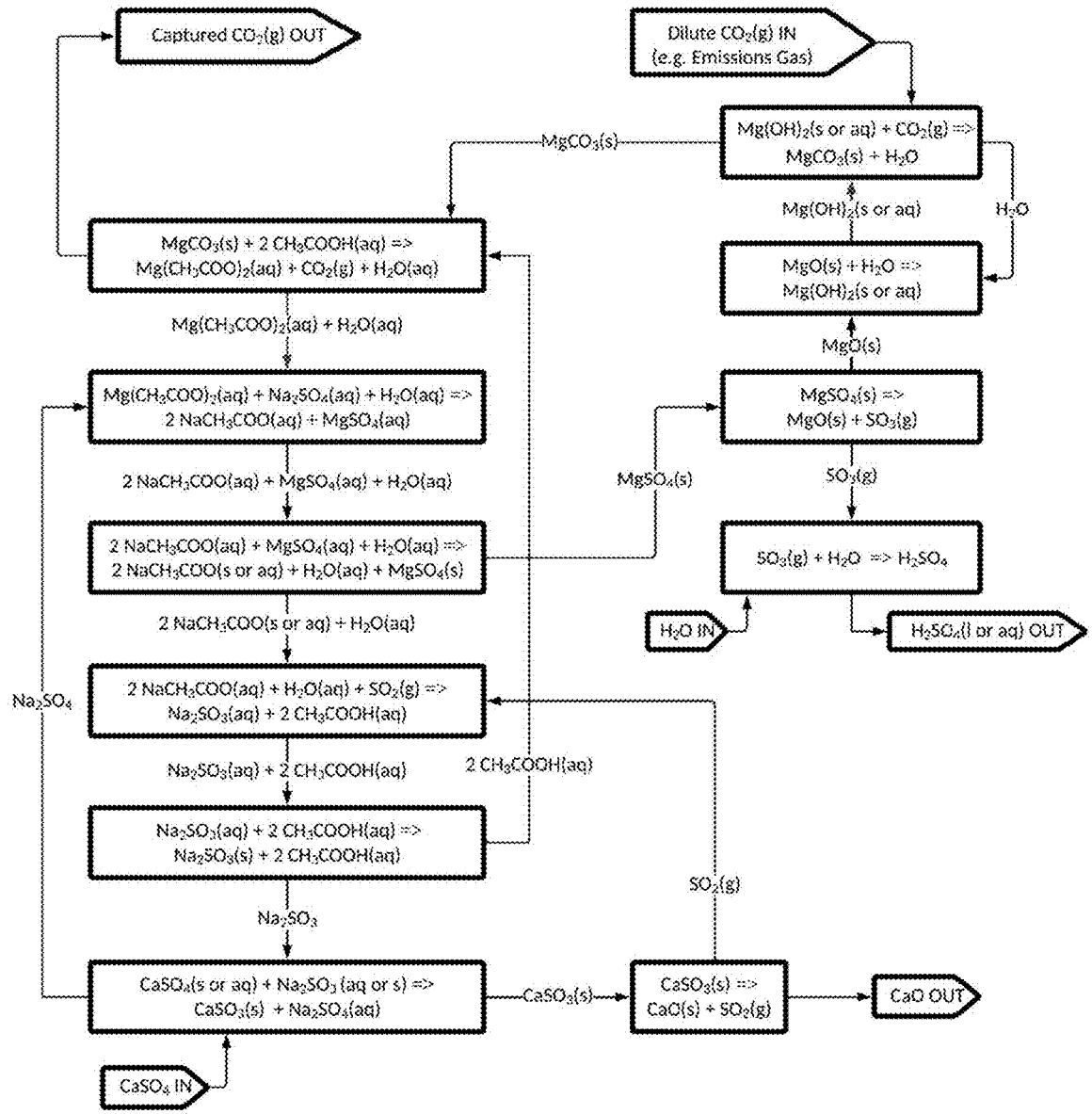
FIG. 30 (Above)

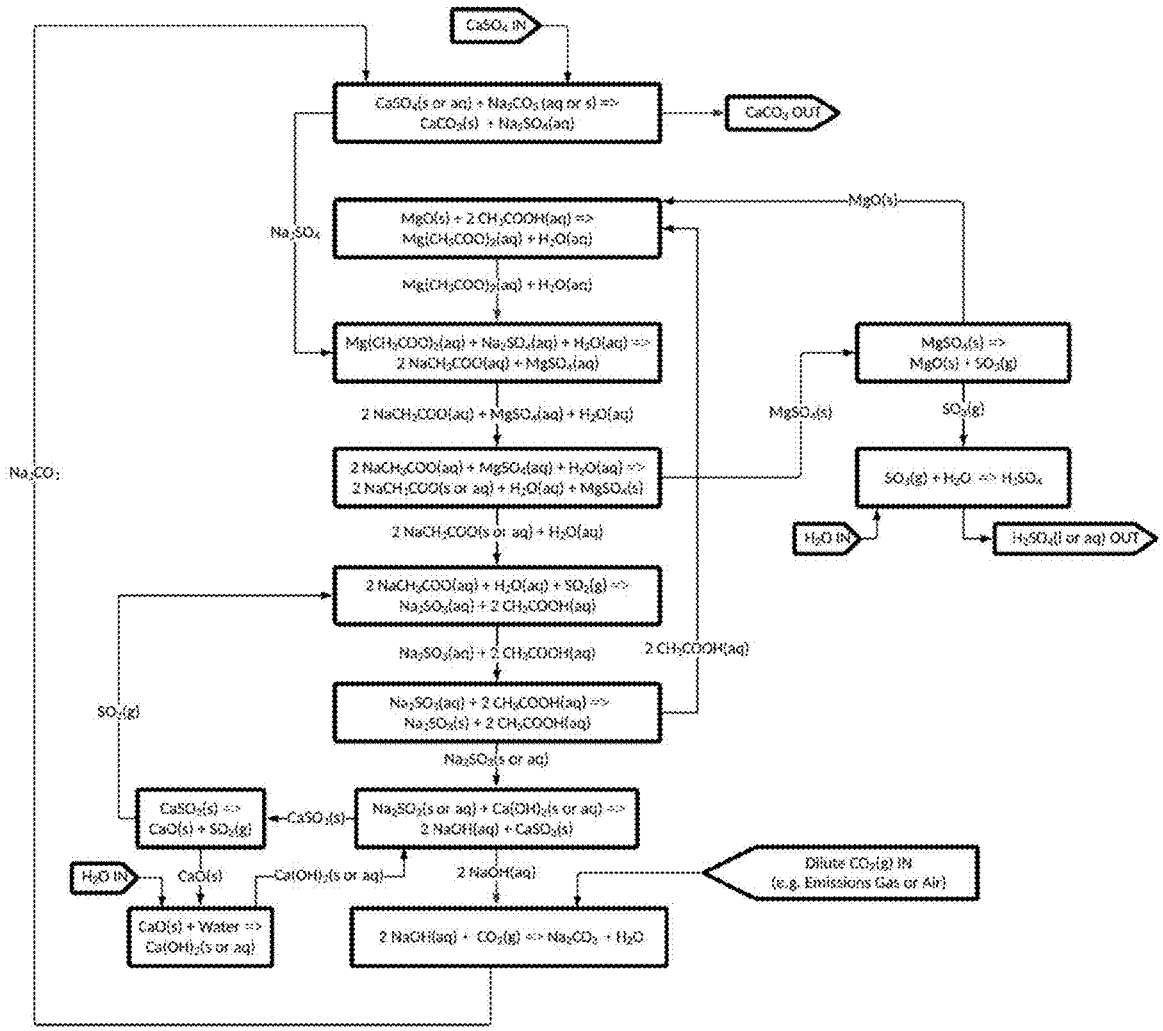
FIG. 31 (Above)

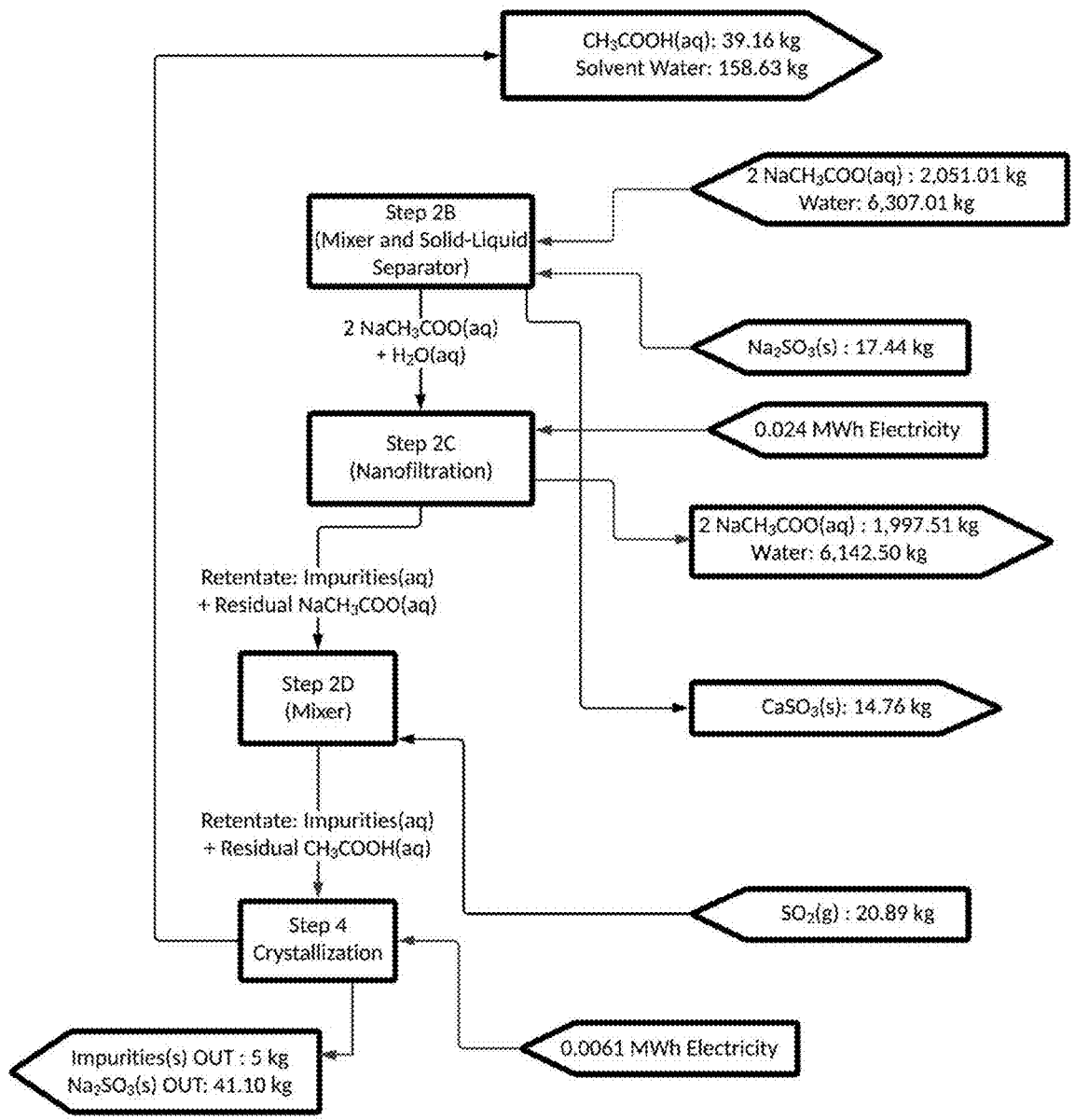
FIG. 32 (ABOVE)

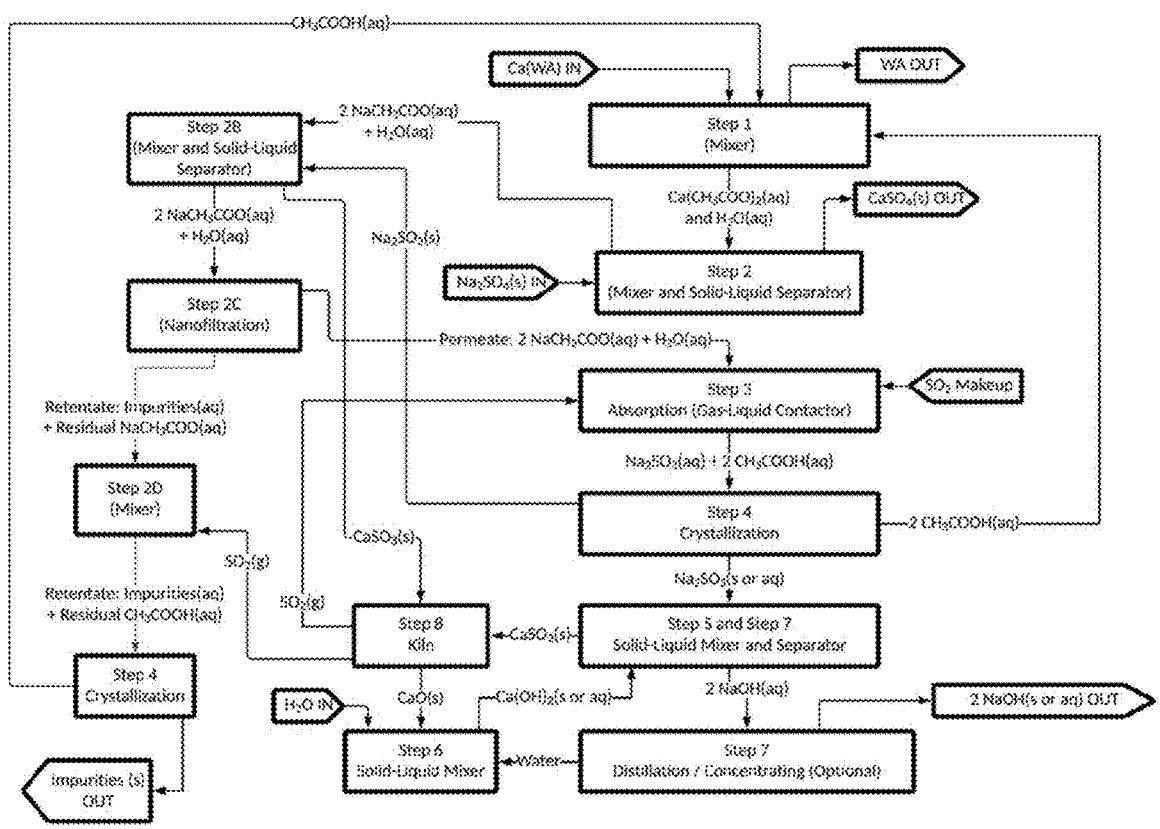
FIG. 33 (ABOVE)

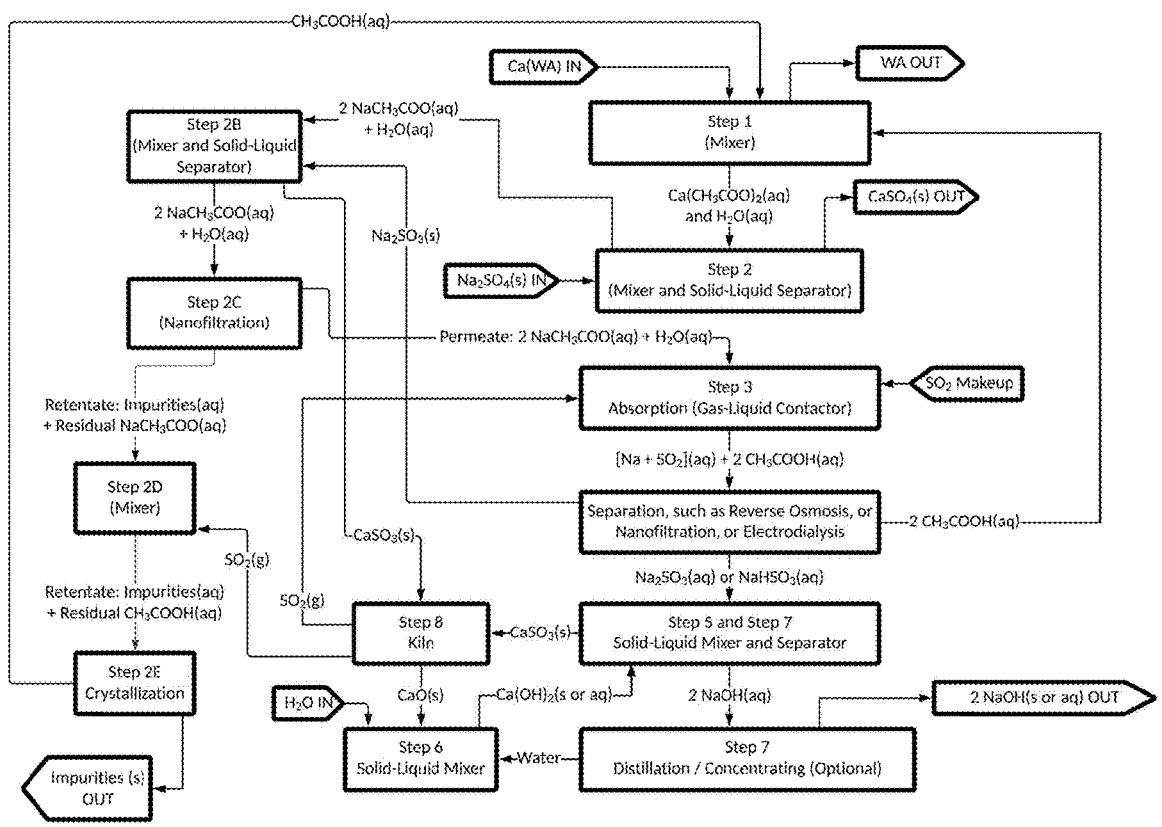
FIG. 34 (ABOVE)

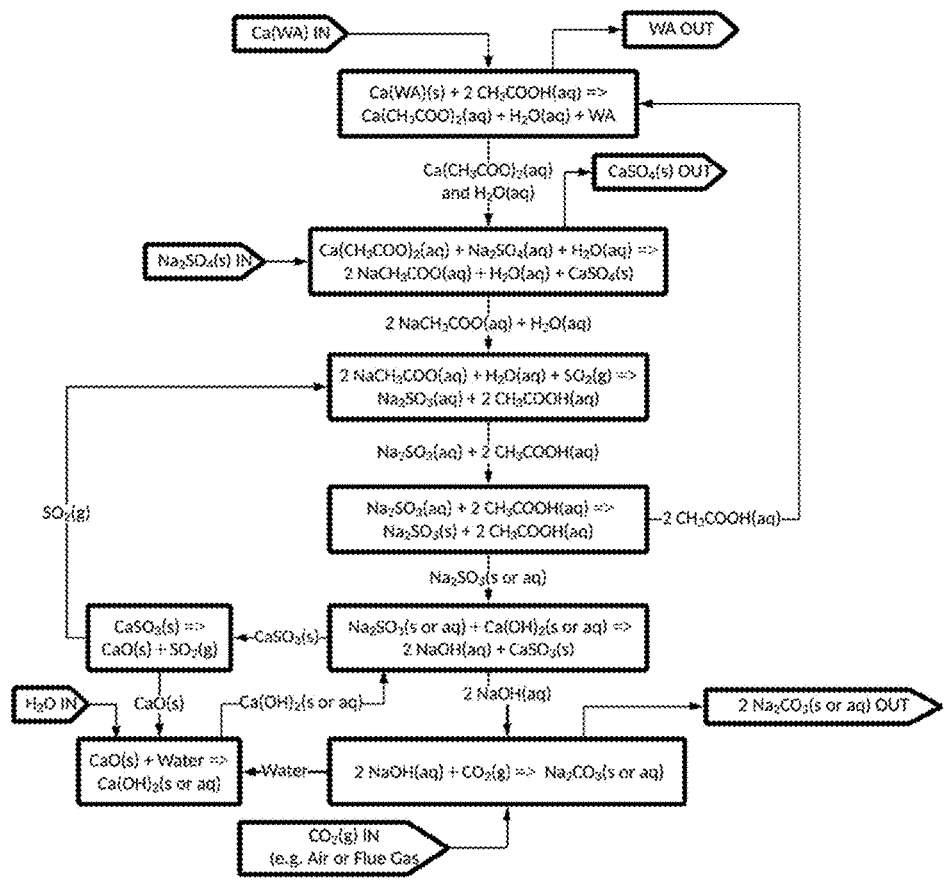
FIG. 35 (ABOVE)

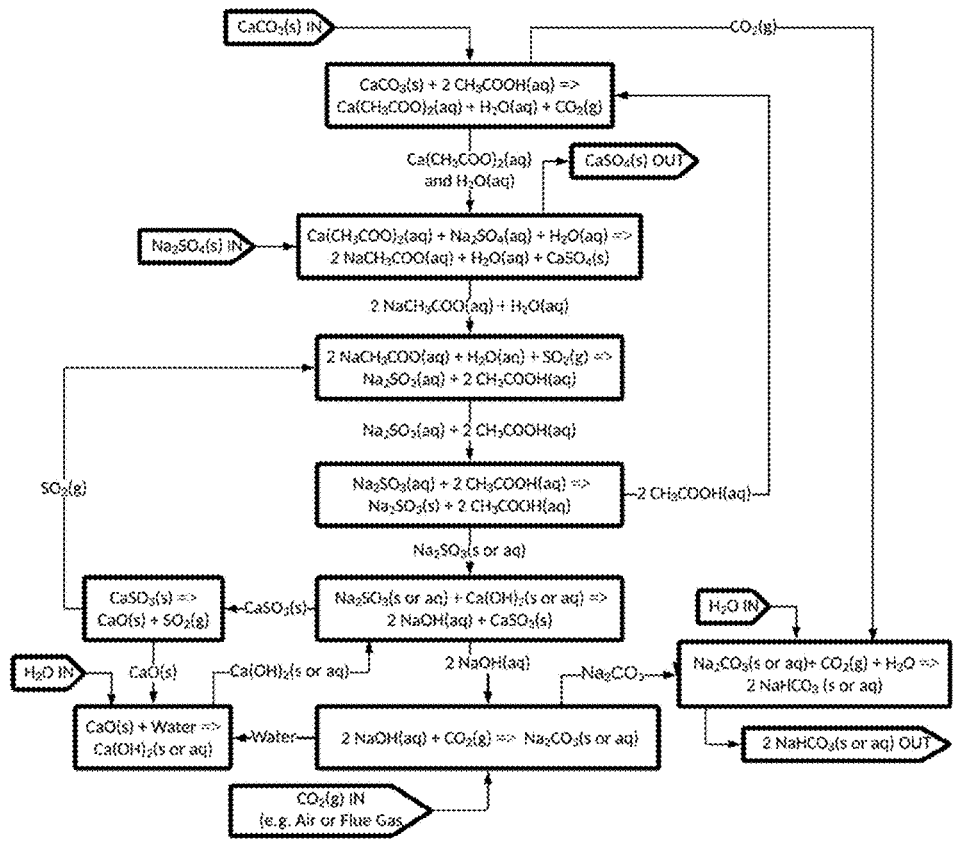
FIG. 36 (ABOVE)

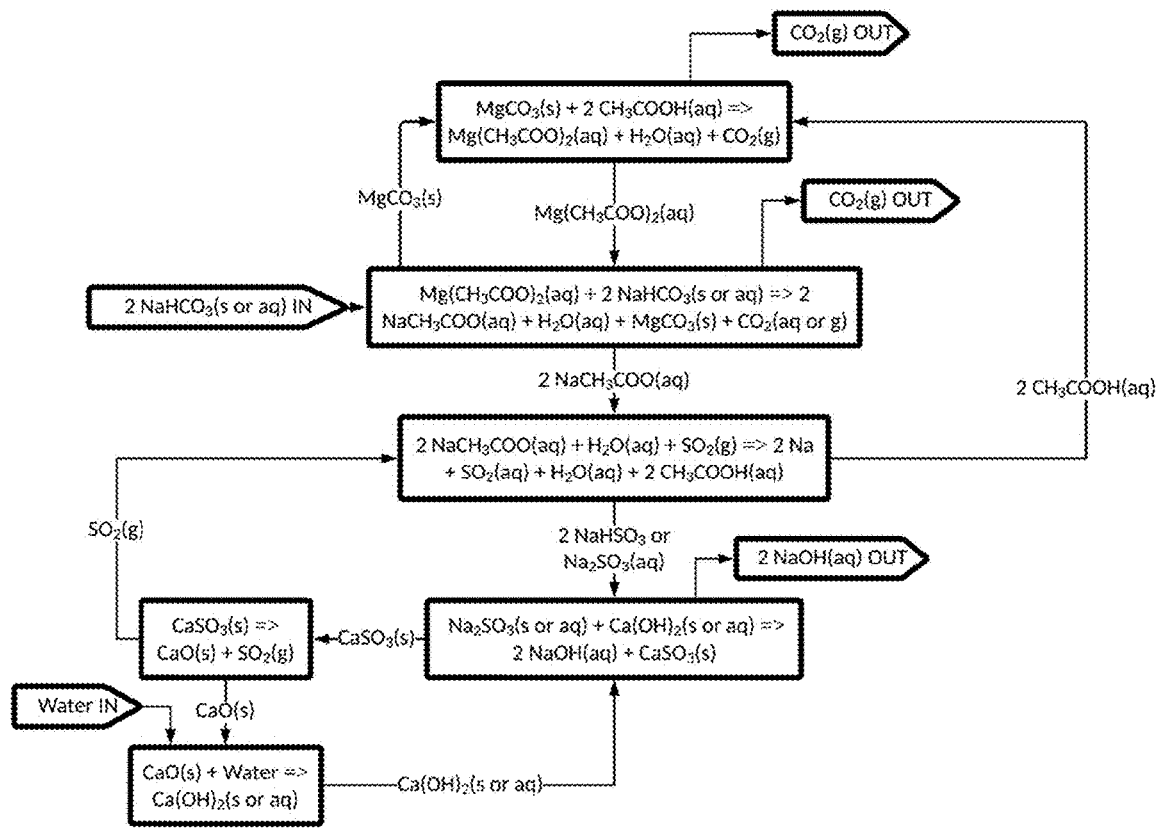
FIG. 37 (Above)

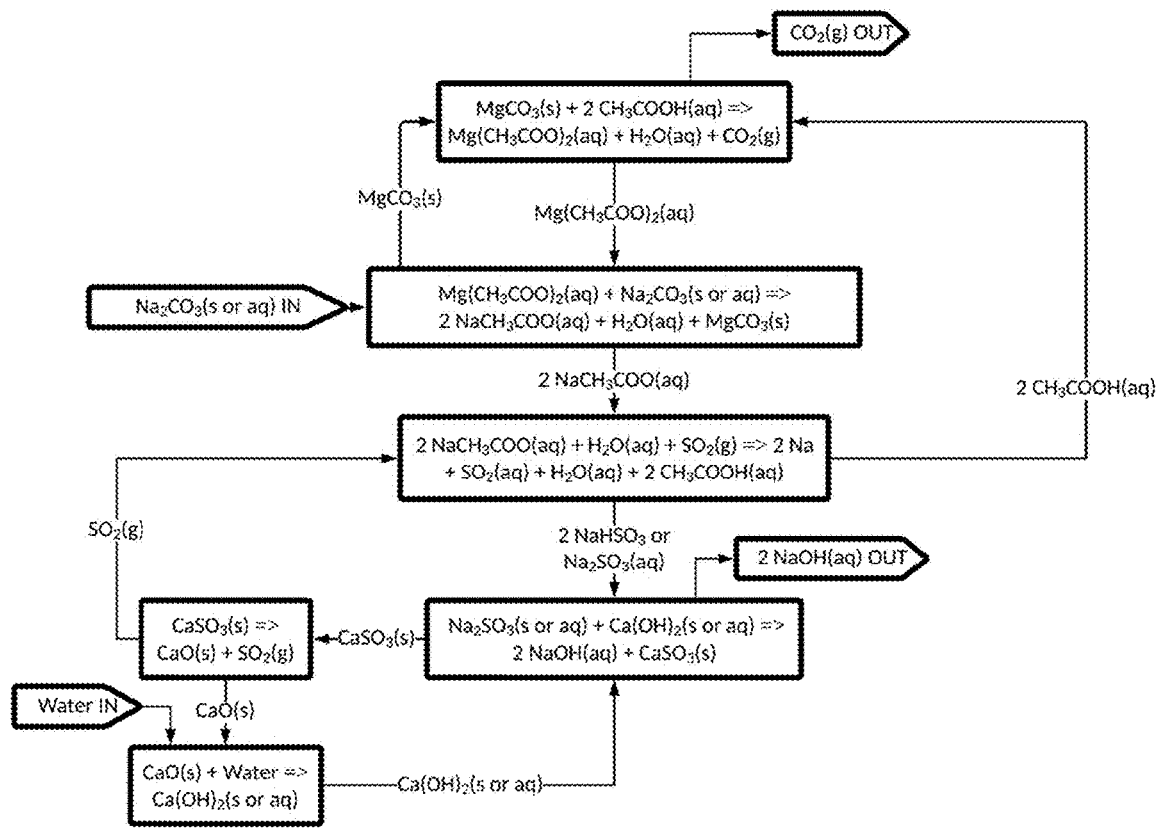
FIG. 38 (Above)

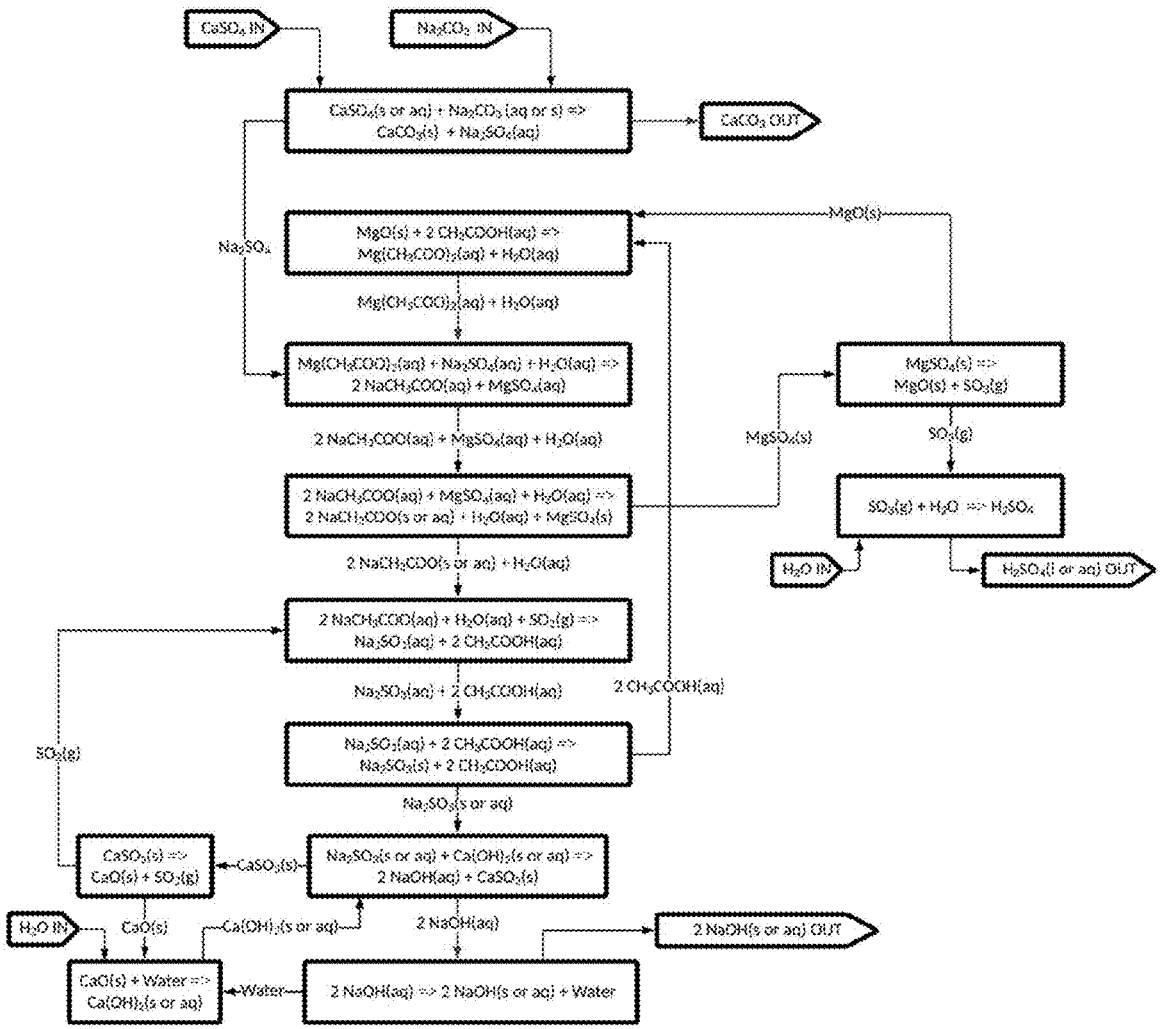
FIG. 39 (Above)

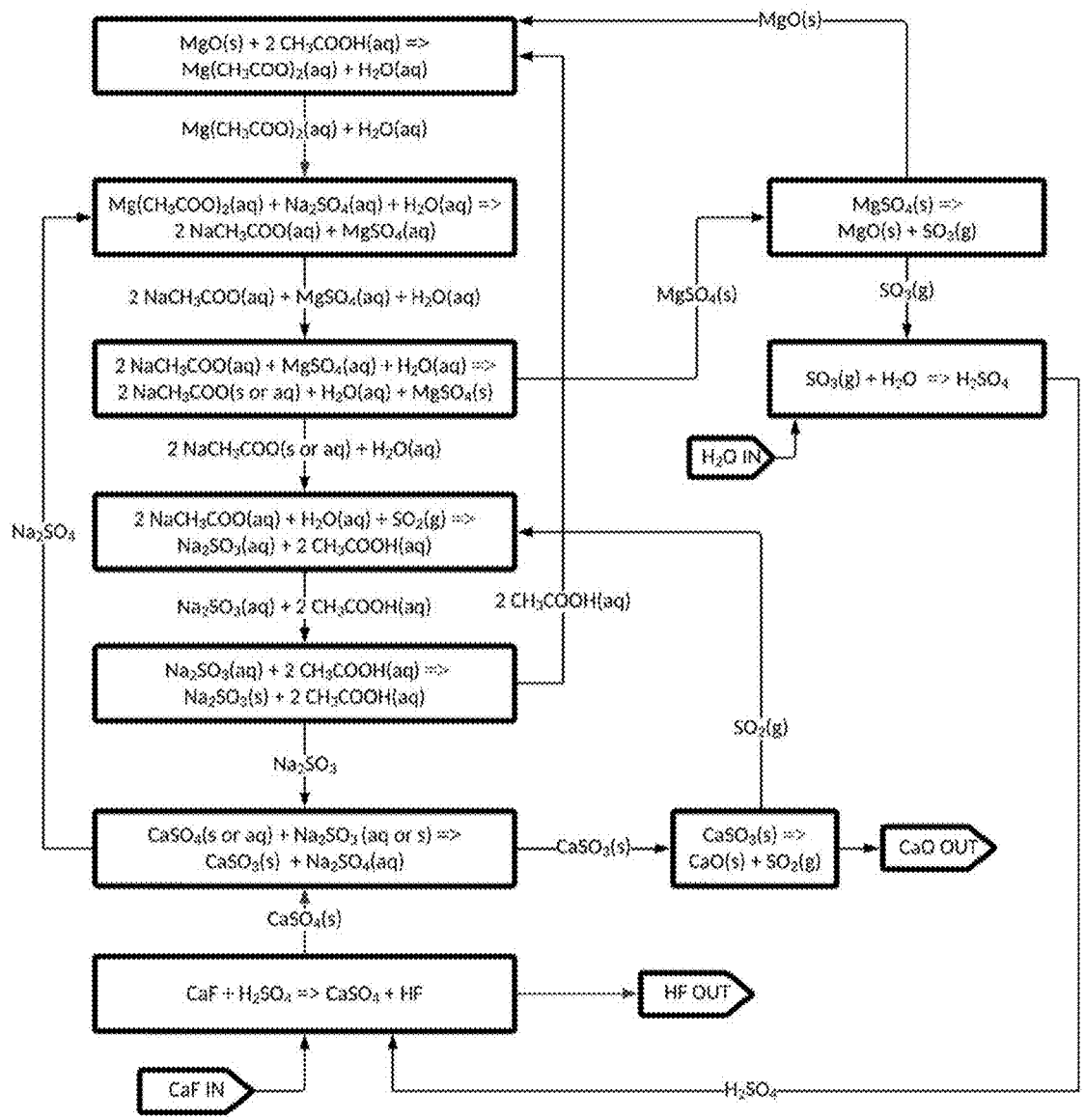
FIG. 40 (Above)

SYSTEMS AND METHODS FOR PRODUCING ALKALI HYDROXIDES AND SULFURIC ACID OR HYDROCHLORIC ACID

CROSS-REFERENCE TO RELATED APPLICATIONS

This application claims priority to the following U.S. provisional applications.
- U.S. Provisional Application No. 63/534,366 filed Aug. 24, 2023 entitled SODIUM HYDROXIDE, HCL OR HYDROCHLORIC ACID PRODUCTION EMPLOYING NACL INPUT AND MAGNESIUM INTERMEDIATE (HAK Ref. 121530.0000118).
- U.S. Provisional Application No. 63/537,356 filed Sep. 8, 2023 entitled SYSTEMS AND METHODS FOR ALKALI OR ALKALINE EARTH CHEMICAL OR ACID PRODUCTION (HAK Ref. 121530.0000119).
- U.S. Provisional Application No. 63/623,363 filed Jan. 22, 2024 entitled PRODUCING ALKALI HYDROXIDES FROM ALKALI BICARBONATES OR ALKALI CARBONATES (HAK Ref. 121530.0000138).
- U.S. Provisional Application No. 63/623,897 filed Jan. 23, 2024 Entitled SYSTEMS AND METHODS FOR PRODUCING AN ALKALI HYDROXIDE AND SULFURIC ACID OR HYDROGEN HALIDE ACID FROM AN ALKALI SULFATE OR AN ALKALI HALIDE AND/OR ALKALINE OXIDE AND SULFURIC ACID FROM AN ALKALINE EARTH SULFATE (HAK Ref. 121530.0000139).
- U.S. Provisional Application No. 63/623,898 filed Jan. 23, 2024 entitled PRODUCING ALKALI HYDROXIDES FROM ALKALI SULFATES WITH INTEGRATED EFFECTIVE IMPURITY REMOVAL (HAK Ref. 121530.0000140).
- U.S. Provisional Application No. 63/624,370 filed Jan. 23, 2024 entitled SYSTEMS AND METHODS FOR PRODUCING AN ALKALI HYDROXIDE AND SULFURIC ACID OR HYDROGEN HALIDE ACID FROM AN ALKALI SULFATE OR AN ALKALI HALIDE AND/OR ALKALINE OXIDE AND SULFURIC ACID FROM AN ALKALINE EARTH SULFATE WITH FIGURES AND CALCULATORS (HAK Ref. 121530.0000143).

This application is also related to U.S. Pat. Nos. 11,034,619; 11,236,033; 11,512,036; 11,542,219; 11,897,840; 12,030,846; 12,030,847;

All of the aforementioned provisional applications and issued patents are incorporated herein by reference.

BACKGROUND AND SUMMARY

Sodium sulfate waste streams and sodium chloride waste streams are a significant and growing problem. There are many sources and waste streams comprising sodium sulfate. A significantly growing source of sodium sulfate waste comprises the lithium ion battery industry. For example, significant sodium sulfate waste is and will be produced from lithium processing, lithium ion battery production, and lithium ion battery recycling. For example, in some lithium ion battery production processes it is estimated that for every 1 ton of cathode material, at least 2 tons of sodium sulfate waste is produced. For example, in some lithium ion battery recycling processes it is estimated that for every 1 ton of lithium recycled from a lithium ion battery, at least 10 tons of sodium sulfate waste is produced.

One of the challenges with recovering or converting some sodium sulfate waste streams into something of value, or disposing the sodium sulfate waste, or any combination thereof is the presence of significant impurities, which may comprise heavy metals such as cobalt, or nickel, or iron, or manganese, or any combination thereof. It may be difficult to separate or remove these impurities using, for example, nanofiltration or electrodialysis, because sodium sulfate is divalent and/or sodium sulfate being divalent may also be rejected by a nanofiltration membrane which may reduce the quality or capability of separation. Additionally, the presence of some impurities may foul or damage any electrochemical process employed to produce sodium hydroxide, which may make it challenging to perform any effective electrochemical production of sodium hydroxide.

One of the challenges with converting some sodium sulfate waste streams into sodium hydroxide is that prior art methods for converting sodium sulfate into sodium hydroxide are very expensive and energy intensive. It may be desirable to develop a process producing sodium hydroxide from sodium sulfate which is significantly more effective and energy efficient than alternative processes.

Additionally, the sodium sulfate waste may originate from sodium hydroxide or sodium carbonate inputs to, for example, a lithium processing or lithium ion battery recycling process or facility. It is of significant desire to develop a process which efficiently and effective transforms at least a portion of the sodium sulfate waste into sodium hydroxide or sodium carbonate, which may enable circularity or a circular economy, and/or may significantly reduce costs and/or significantly reduce waste produced by a lithium processing, or lithium ion battery production, or lithium ion battery recycling process.

Additionally, sodium sulfate waste or sodium chloride waste may originate from sulfuric acid or hydrochloric acid inputs to, for example, a lithium processing or lithium ion battery recycling process or facility. It is of significant desire to develop a process which efficiently and effective transforms at least a portion of the sodium sulfate waste or sodium chloride waste into sulfuric acid or hydrochloric acid, which may enable circularity or a circular economy, and/or may significantly reduce costs and/or significantly reduce waste produced by a lithium processing or lithium ion battery recycling process.

Example Production or Source of Alkali Chloride

In some embodiments, an alkali chloride may be sourced from, or supplied from, or originate from, or produced from, or any combination thereof, for example, including, but not limited to, one or more or any combination of the following:
- Ore or mineral comprising sodium chloride or potassium chloride
- Brine comprising sodium chloride or potassium chloride
- Byproduct or waste comprising sodium chloride or potassium chloride
- Sea Salt
- Potash Example Production or Source of Alkali Sulfate In some embodiments, an alkali sulfate may be sourced from, or supplied from, or originate from, or produced from, or any combination thereof, for example, including, but not limited to, one or more or any combination of the following:
- Ore or mineral comprising sodium sulfate
- Brine comprising sodium sulfate
- Byproduct or waste comprising sodium sulfate Reacting at least a portion of sodium chloride or potassium chloride with at least a portion of sulfuric acid to form, for example, at least a portion of sodium sulfate or potassium sulfate.

Reacting at least a portion of sodium fluoride or potassium fluoride with at least a portion of sulfuric acid to form, for example, at least a portion of sodium sulfate or potassium sulfate.

Reacting at least a portion of potassium or sodium sulfite, or carbonate, or bicarbonate, or bisulfite, or metabisulfite, or sesquicarbonate, or sulfide, or citrate, or fluoride, or any combination thereof with at least a portion of calcium sulfate to form at least a portion of potassium or sodium sulfate.

Example Production or Source of Alkaline Earth Sulfate

In some embodiments, an alkaline-earth sulfate may be sourced from, or supplied from, or originate from, or produced from, or any combination thereof, for example, including, but not limited to, one or more or any combination of the following:

Ore or mineral comprising calcium sulfate

Byproduct or waste comprising calcium sulfate, which may include, but are not limited to, one or more or any combination of the following: an acid neutralization product, or phosphogypsum

BRIEF DESCRIPTION OF DRAWINGS

FIG. 1: Process for producing sodium hydroxide from sodium sulfate.

FIG. 2: Process for producing calcium oxide and sulfuric acid employing magnesium and sulfur dioxide intermediates.

FIG. 3: Process for producing sodium hydroxide, sulfuric acid, and calcium oxide.

FIG. 4: Process for producing sodium hydroxide and sulfuric acid with calcium regeneration.

FIG. 5: Process for producing sodium hydroxide and sulfuric acid with calcium regeneration and inherent $CO_2$ capture.

FIG. 6: Process for producing sodium hydroxide, calcium oxide, and hydrochloric acid from sodium chloride employing magnesium and sulfur dioxide intermediates.

FIG. 7: Process for producing sodium hydroxide, sulfuric acid, and calcium oxide with calcium sulfate reduction.

FIG. 8: Process for producing sodium hydroxide, sulfuric acid, and calcium oxide with calcium sulfate reduction.

FIG. 9: Process for producing sodium hydroxide, sulfuric acid, and calcium oxide with calcium sulfate decomposition.

FIG. 10: Process for producing sodium hydroxide and sulfur from sodium sulfate employing a calcium intermediate.

FIG. 11: Process for producing sodium hydroxide and sulfur from sodium sulfate employing a calcium intermediate.

FIG. 12: Process for producing sodium hydroxide, sulfuric acid, and calcium oxide with calcium sulfate reduction.

FIG. 13: Process for producing sodium hydroxide, hydrochloric acid, and calcium oxide with calcium sulfate reduction.

FIG. 14: Process for producing sodium hydroxide, hydrochloric acid, and calcium oxide with calcium sulfate reduction.

FIG. 15: Process for producing sodium hydroxide and hydrochloric acid with calcium sulfate reduction and a calcium intermediate.

FIG. 16: Process for producing sodium hydroxide and hydrochloric acid with calcium sulfate reduction and a calcium intermediate.

FIG. 17: Example embodiment producing at least a portion of sodium hydroxide and at least a portion of sulfuric acid from at least a portion of sodium sulfate.

FIG. 18: Example embodiment producing at least a portion of sodium hydroxide and at least a portion of sulfuric acid from at least a portion of sodium sulfate example unit operations.

FIG. 19: Example embodiment producing at least a portion of sodium hydroxide and at least a portion of sulfuric acid from at least a portion of sodium sulfate example unit operations.

FIG. 20: Example embodiment producing at least a portion of sodium hydroxide and at least a portion of sulfuric acid from at least a portion of sodium sulfate and while capturing $CO_2$ emissions or other $CO_2$ into high quality, and/or high purity, and/or high pressure $CO_2$.

FIG. 21: Example embodiment producing at least a portion of sodium hydroxide and at least a portion of sulfuric acid from at least a portion of sodium sulfate and while capturing $CO_2$ emissions or other $CO_2$ into high quality, and/or high purity, and/or high pressure $CO_2$.

FIG. 22: Example embodiment producing at least a portion of sodium hydroxide and at least a portion of hydrogen chloride or hydrochloric acid from at least a portion of sodium chloride.

FIG. 23: Example embodiment producing at least a portion of sodium hydroxide and at least a portion of hydrogen chloride or hydrochloric acid from at least a portion of sodium chloride example unit operations.

FIG. 24: Example embodiment producing at least a portion of sodium hydroxide and at least a portion of hydrogen chloride or hydrochloric acid from at least a portion of sodium chloride example unit operations.

FIG. 25: Example embodiment producing at least a portion of sodium hydroxide and at least a portion of hydrogen chloride or hydrochloric acid from at least a portion of sodium chloride and while capturing $CO_2$ emissions or other $CO_2$ into high quality, and/or high purity, and/or high pressure $CO_2$.

FIG. 26: Example embodiment producing at least a portion of sodium hydroxide and at least a portion of hydrogen chloride or hydrochloric acid from at least a portion of sodium chloride and while capturing $CO_2$ emissions or other $CO_2$ into high quality, and/or high purity, and/or high pressure $CO_2$.

FIG. 27: Example embodiment producing at least a portion of calcium oxide and at least a portion of sulfuric acid from at least a portion of calcium sulfate.

FIG. 28: Example embodiment producing at least a portion of calcium oxide and at least a portion of sulfuric acid from at least a portion of calcium sulfate example unit operations.

FIG. 29: Example embodiment producing at least a portion of calcium oxide and at least a portion of sulfuric acid from at least a portion of calcium sulfate example unit operations.

FIG. 30: Example embodiment producing at least a portion of calcium oxide and at least a portion of sulfuric acid from at least a portion of calcium sulfate and while capturing $CO_2$ emissions or other $CO_2$ into high quality, and/or high purity, and/or high pressure $CO_2$.

FIG. 31: Example embodiment producing at least a portion of sulfuric acid and at least a portion of calcium carbonate from at least a portion of calcium sulfate and at FIG. 32: Example Embodiment Nanofiltration Impurity Removal Process with Example Mass and Energy Flows per 1000 kg (1 Tonne) NaOH Produced FIG. 33: Example Embodiment NaOH Process Integrated with Nanofiltration Impurity Removal Process (Numbered Steps and Unit Operations)

FIG. 34: Example Embodiment NaOH Process Integrated with Nanofiltration Impurity Removal Process (Numbered Steps and Unit Operations)

FIG. 35: Example Embodiment Process for Producing Alkali Carbonate

FIG. 36: Example Embodiment Process for Producing Alkali Bicarbonate

FIG. 37: Process for producing alkali hydroxide from alkali bicarbonate or alkali sesquicarbonate using alkaline earth and/or sulfur dioxide intermediates.

FIG. 38: Process for producing alkali hydroxide from alkali carbonate using alkaline earth and/or sulfur dioxide intermediates.

FIG. 39: Example embodiment producing at least a portion of a component comprising sulfuric acid and at least a portion of a component comprising calcium carbonate from at least a portion of a component comprising calcium sulfate and/or at least a portion of a component comprising sodium carbonate, or sodium sesquicarbonate, or sodium bicarbonate, or a derivative thereof, or any combination thereof.

FIG. 40: Example embodiment producing at least a portion of a component comprising calcium oxide and at least a portion of a component comprising hydrofluoric acid from at least a portion of a component comprising calcium fluoride.

DETAILED DESCRIPTION

Example Embodiments which May Produce Alkali Hydroxide, or Alkali Carbonate, or Alkaline Earth Oxide, or Alkaline Earth Hydroxide, or Sulfuric Acid, or Sulfur, or a Derivative Thereof or any Combination Thereof which May Involve Calcium Sulfate Example Description Some embodiments may pertain to the production of alkali hydroxide, or alkali carbonate, or alkali bicarbonate, or alkali+carbon dioxide species salts, or other alkali salts, or alkaline earth oxide, or alkaline earth carbonate, or other alkaline earth salts, or sulfuric acid, or sulfur dioxide, or a derivative thereof, or any combination thereof from at least a portion of a chemical comprising a chemical comprising an alkali, or alkaline earth, or sulfate, or any combination thereof. Some embodiments may pertain to the production of alkali hydroxide, or alkali+carbon dioxide species salt, or sulfuric acid, or alkaline earth oxide, or alkaline earth hydroxide, or alkaline earth+carbon dioxide species salt, or cement, or clinker, or a derivative thereof, or any combination thereof. Some embodiments may pertain to the production of alkali hydroxide, or alkali+carbon dioxide species salt, or sulfuric acid, or hydrochloric acid, or hydrogen chloride, or chlorine chemical, or sulfur chemical, or mineral acid, or alkaline earth oxide, or alkaline earth hydroxide, or alkaline earth+carbon dioxide species salt, or cement, or clinker, or a derivative thereof, or any combination thereof from an chemical comprising an alkali sulfate, or alkali chloride, or alkaline earth sulfate, or any combination thereof.

EXAMPLE CHEMISTRY

Example Chemistry 1: Example Simplified Chemistry $Na_2SO_4$ Input and Ca(WA) Input to Produce NaOH, CaO, and $H_2SO_4$ with Mg Intermediate Production of Alkali Hydroxide and Alkaline-Earth Sulfate:
(1) React at least a portion of a component comprising an alkaline earth—weak acid with at least a portion of an acid to form at least a portion of a solution comprising alkaline earth—acid anion and at least a portion of a component comprising weak acid derivative. Example chemistry may comprise including, but not limited to, one or more or any combination of the following:

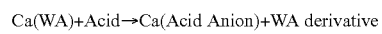
Ca(WA)+Acid→Ca(Acid Anion)+WA derivative

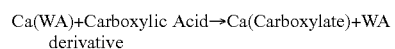
Ca(WA)+Carboxylic Acid→Ca(Carboxylate)+WA derivative

$CaCO_3+2CH_3COOH→Ca(CH_3COO)_2+H_2O+CO_2$

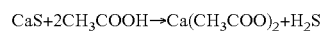
$CaS+2CH_3COOH→Ca(CH_3COO)_2+H_2S$

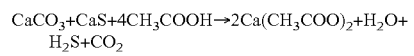
$CaCO_3+CaS+4CH_3COOH→2Ca(CH_3COO)_2+H_2O+H_2S+CO_2$

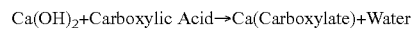
$Ca(OH)_2$+Carboxylic Acid→Ca(Carboxylate)+Water

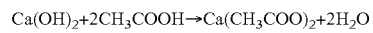
$Ca(OH)_2+2CH_3COOH→Ca(CH_3COO)_2+2H_2O$

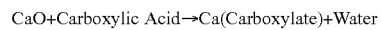
CaO+Carboxylic Acid→Ca(Carboxylate)+Water

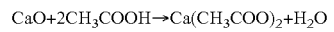
$CaO+2CH_3COOH→Ca(CH_3COO)_2+H_2O$

Note: A component comprising $CO_2$ may comprise high pressure or high purity, or high quality, or high partial pressure, or useful, or high concentration, or 'captured', or any combination thereof carbon dioxide.

(2) React at least a portion of a solution comprising alkaline-earth acid anion with at least a portion of a component comprising an alkali sulfate to form at least a portion of a component comprising an alkaline-earth sulfate and at least a portion of a component comprising an alkali-acid anion. Example chemistry may comprise including, but not limited to, one or more or any combination of the following:

Ca(Acid Anion)+Alkali Sulfate→CaSO4+Alkali-Acid Anion

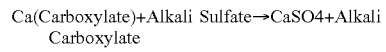
Ca(Carboxylate)+Alkali Sulfate→CaSO4+Alkali Carboxylate

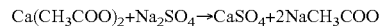
$Ca(CH_3COO)_2+Na_2SO_4→CaSO_4+2NaCH_3COO$ (3) React at least a portion of a component comprising alkali-acid anion with at least a portion of a component comprising sulfur dioxide or sulfurous acid or a derivative thereof to form at least a portion of a component comprising alkali+sulfur dioxide species and/or at least a portion of a component comprising acid or acid anion derivative. Example chemistry may comprise including, but not limited to, one or more or any combination of the following:

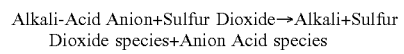
Alkali-Acid Anion+Sulfur Dioxide→Alkali+Sulfur Dioxide species+Anion Acid species

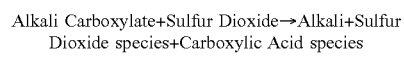
Alkali Carboxylate+Sulfur Dioxide→Alkali+Sulfur Dioxide species+Carboxylic Acid species $2NaCH_3COO+SO_2 \rightarrow 2Na+SO_2+CH_3COO$ $2NaCH_3COO+SO_2+H_2O \rightarrow 2Na+SO_2+CH_3COOH$ $2NaCH_3COO+SO_2+H_2O \rightarrow 2NaHSO_3+2CH_3COOH$ $2NaCH_3COO+SO_2+H_2O \rightarrow NaHSO_3+NaCH_3COO+CH_3COOH$ $2NaCH_3COO+SO_2+H_2O \rightarrow Na_2SO_3+2CH_3COOH$ (4) Separate at least a portion of a component comprising alkali+sulfur dioxide species from at least a portion of a component comprising acid or acid anion derivative. Example chemistry may comprise including, but not limited to, one or more or any combination of the following:

Alkali+Sulfur Dioxide species+Anion Acid species→[Alkali+Sulfur Dioxide species](Separate)+Anion Acid species(Separate)

Alkali+Sulfur Dioxide species+Carboxylic Acid species→[Alkali+Sulfur Dioxide species](Separate)+Carboxylic Acid(Separate)

$2NaHSO_3+2CH_3COOH \rightarrow 2NaHSO_3(separate)+2CH_3COOH(separate)$ $NaHSO_3+NaCH_3COO \rightarrow NaHSO_3(separate)+NaCH_3COO(separate)$ $NaHSO_3+NaCH_3COO+CH_3COOH \rightarrow NaHSO_3(separate)+NaCH_3COO(separate)+CH_3COOH(separate)$ $Na_2SO_3+2CH_3COOH \rightarrow Na_2SO_3(separate)+2CH_3COOH(separate)$ $NaHSO_3 \rightarrow Na_2SO_3+SO_2+H_2O$ (5) React at least a portion of a component comprising alkali+sulfur dioxide species with at least a portion of a component comprising alkaline-earth oxide, or alkaline-earth hydroxide, or any combination thereof to form at least a portion of a component comprising an alkali hydroxide and/or at least a portion of a component comprising an alkaline-earth sulfite. Example chemistry may comprise including, but not limited to, one or more or any combination of the following:

Alkali+Sulfur Dioxide species+Alkaline Earth Hydroxide→Alkali Hydroxide+[Alkaline Earth+Sulfur Dioxide species]

Alkali+Sulfur Dioxide species+Alkaline Earth Hydroxide→Alkali Hydroxide+Alkaline Earth Sulfite $Ca(OH)_2+Na_2SO_3 \rightarrow CaSO_3+2NaOH$ (6) Decompose at least a portion of a component comprising alkaline-earth sulfite to form at least a portion of a component comprising an alkaline earth oxide, or alkaline earth hydroxide, or any combination thereof and/or a component comprising sulfur dioxide, or a derivative thereof, or any combination thereof. Example chemistry may comprise including, but not limited to, one or more or any combination of the following:

Alkaline Earth Sulfite→Alkaline Earth Oxide+Sulfur Dioxide $CaSO_3 \rightarrow CaO+SO_2$ $CaO+H_2O \rightarrow Ca(OH)_2$ Production of Alkaline Earth Oxide or Hydroxide and/or Sulfuric Acid from Alkaline Earth Sulfate:

(7) React at least a portion of a component comprising a first alkaline-earth salt comprising alkaline-earth sulfate with at least a portion of a second alkaline-earth salt which may result in at least a portion of the anion of the second alkaline-earth salt transferring to the cation of the first alkaline-earth salt forming a third alkaline-earth salt and the anion of the first alkaline-earth salt transferring to the cation of the second alkaline-earth salt forming a fourth alkaline-earth salt. Example chemistry may comprise including, but not limited to, one or more or any combination of the following:

Alkaline Earth Sulfate(1)+Alkaline Earth Anion(2)→Alkaline Earth Anion(3)+Alkaline Earth Sulfate(4)

Alkaline Earth Sulfate+Alkaline Earth Sulfite→Alkaline Earth Sulfite+Alkaline Earth Sulfate $CaSO_4+MgSO_3 \rightarrow CaSO_3+MgSO_4$ Alkaline Earth Sulfate+Alkaline Earth Citrate→Alkaline Earth Citrate+Alkaline Earth Sulfate $CaSO_4+Mg(Citrate) \rightarrow Ca(Citrate)+MgSO_4$ (8) React and/or decompose at least a portion of the component comprising a third alkaline-earth salt to form at least a portion of a component comprising alkaline-earth oxide, or alkaline-earth hydroxide, or alkaline-earth carbonate, or alkaline-earth weak acid (WA), or alkaline-earth derivative, or a derivative thereof, or any combination thereof and/or at least a portion of component comprising sulfur dioxide, or sulfur, or a derivative thereof, or any combination thereof. Example chemistry may comprise including, but not limited to, one or more or any combination of the following:

Alkaline Earth Anion(3)→Alkaline Earth Oxide+Anion Derivative

Alkaline Earth Sulfite→Alkaline Earth Oxide+Sulfur Dioxide $CaSO_3 \rightarrow CaO+SO_2(g)$ Alkaline Earth Citrate+Sulfur Dioxide→Alkaline Earth Sulfite+Citric Acid $Ca(Citrate)+SO_2 \rightarrow CaSO_3+Citric Acid$ $CaSO_3 \rightarrow CaO+SO_2(g)$ $CaO+H_2O \rightarrow Ca(OH)_2$ $Ca(OH)_2+CO_2 \rightarrow CaCO_3+H_2O$ (9) React and/or decompose at least a portion of the a component comprising a fourth alkaline-earth salt to form at least a portion of a component comprising alkaline-earth oxide, or alkaline-earth hydroxide, or alkaline-earth carbonate, or alkaline-earth weak acid (WA), or alkaline-earth derivative, or a derivative thereof, or any combination thereof and/or at least a portion of component comprising sulfuric acid, or sulfur, or a derivative thereof, or any combination thereof. Example chemistry may comprise including, but not limited to, one or more or any combination of the following:

Alkaline Earth Sulfate(4)→Alkaline Earth Oxide+Sulfur Trioxide

Alkaline Earth Sulfate(4)→Alkaline Earth Oxide+Sulfur Dioxide+Diatomic Oxygen $MgSO_4 \rightarrow MgO+SO_3$ $MgSO_4 \rightarrow MgO+SO_2+\frac{1}{2}O_2$ $MgO+H_2O \rightarrow Mg(OH)_2$ $Mg(OH)_2+CO_2 \rightarrow MgCO_3+H_2O$

(10) React a component comprising sulfur trioxide, or sulfur dioxide, or oxygen, or diatomic oxygen, or any combination thereof with, for example, a component comprising water, to form, for example, at least a portion of a component comprising sulfuric acid, or sulfur, or a derivative thereof, or any combination thereof. Example chemistry may comprise including, but not limited to, one or more or any combination of the following:

$SO_2+\frac{1}{2}O_2+H_2O \rightarrow H_2SO_4$ $SO_3+H_2O \rightarrow H_2SO_4$

Example Chemistry 2: Example Simplified Chemistry $Na_2SO_4$ Input and Ca(WA) Input to Produce NaOH, CaO, and $H_2SO_4$ with Thermal Decomposition of $CaSO_4$ Production of Alkali Hydroxide and Alkaline-Earth Sulfate: Similar to Example Chemistry 1.
Production of Alkaline Earth Oxide or Hydroxide and/or Sulfuric Acid from Alkaline Earth Sulfate:
React and/or decompose at least a portion of a component comprising alkaline-earth sulfate to form at least a portion of a component comprising alkaline-earth oxide, or alkaline-earth hydroxide, or alkaline-earth carbonate, or alkaline-earth weak acid (WA), or alkaline-earth derivative, or a derivative thereof, or any combination thereof and/or at least a portion of component comprising sulfuric acid, or sulfur, or a derivative thereof, or any combination thereof. Example chemistry may comprise including, but not limited to, one or more or any combination of the following:

Alkaline Earth Sulfate→Alkaline Earth Oxide+Sulfur Trioxide

Alkaline Earth Sulfate Alkaline Earth Oxide+Sulfur Dioxide+Diatomic Oxygen

Alkaline Earth Sulfate+Reducing Agent Alkaline Earth Oxide+Sulfur Dioxide+Reducing Agent Derivative Alkaline Earth Sulfate+Reducing Agent→Alkaline Earth Oxide+Sulfur Dioxide+Reducing Agent Oxide Alkaline Earth Sulfate+Reducing Agent→Alkaline Earth Sulfide+Reducing Agent Derivative Alkaline Earth Sulfate+Reducing Agent→Alkaline Earth Sulfide+Reducing Agent Oxide Alkaline Earth Sulfate+Carbon Alkaline Earth Oxide+Sulfur Dioxide+Carbon Dioxide Alkaline Earth Sulfate+Carbon→Alkaline Earth Sulfide+Carbon Dioxide Alkaline Earth Sulfate+Hydrocarbon→Alkaline Earth Oxide+Sulfur Dioxide+Carbon Dioxide+Water Alkaline Earth Sulfate+Hydrocarbon→Alkaline Earth Sulfide+Carbon Dioxide+Water Alkaline Earth Sulfate+Syngas→Alkaline Earth Sulfide+Carbon Dioxide+Water Alkaline Earth Sulfate+Syngas→Alkaline Earth Oxide+Sulfur Dioxide+Carbon Dioxide+Water Alkaline Earth Sulfate+Ammonia→Alkaline Earth Oxide+Sulfur Dioxide+Water+Nitrogen Alkaline Earth Sulfate+Methane→Alkaline Earth Oxide+Sulfur Dioxide+Carbon Dioxide+Water Alkaline Earth Sulfate+Hydrogen→Alkaline Earth Oxide+Sulfur Dioxide+Water Alkaline Earth Sulfate+Sulfur→Alkaline Earth Oxide+Sulfur Dioxide Alkaline Earth Sulfate+Hydrogen Sulfide→Alkaline Earth Oxide+Sulfur Dioxide+Water Alkaline Earth Sulfate→Alkaline Earth Oxide+Sulfur Dioxide+Diatomic Oxygen $CaSO_4 \rightarrow CaO+SO_3$ $CaSO_4 \rightarrow CaO+SO_2+\frac{1}{2}O_2$ $CaSO_4+C \rightarrow CaO+SO_2+\frac{1}{2}CO_2$ $CaSO_4+C \rightarrow CaS+2CO_2$ $3CaSO_4+H_2S \rightarrow 3CaO+H_2O+4SO_2$ $CaSO_4+CH_4 \rightarrow CaCO_3+H_2S+H_2O$ $CaSO_4+CH_4 \rightarrow CaO+CO_2+H_2S+H_2O$ $CaSO_4+CH_4 \rightarrow CaS+CO_2+2H_2O$ $CaO+H_2O \rightarrow Ca(OH)_2$ $Ca(OH)_2+CO_2 \rightarrow CaCO_3+H_2O$ $CaS+CO_2+H_2O \rightarrow CaCO_3+H_2S$ $CaS+SO_2+H_2O \rightarrow CaSO_3+H_2S$ $CaSO_4+4CO \rightarrow CaS+4CO_2$ $CaSO_4+4H_2 \rightarrow CaS+4H_2O$ $CaSO_4+CO \rightarrow CaO+CO_2+SO_2$ $CaSO_4+2C \rightarrow CaS+2CO_2$ $3CaSO_4+CaS \rightarrow 4CaO+4SO_2$ $CaS+\text{Carboxylic Acid} \rightarrow Ca(\text{Carboxylate})+H_2S$ $CaS+CH_3COOH \rightarrow Ca(CH_3COO)_2+H_2S$ $$H_2S+O_2 \rightarrow SO_2+H_2O$$

$$SO_2+2H_2S \rightarrow 3S+2H_2O$$

$$H_2S \rightarrow H_2+S$$

$$S+O_2 \rightarrow SO_2$$

$$SO_2+\tfrac{1}{2}O_2 \rightarrow SO_3$$

$$SO_3+H_2O \rightarrow H_2SO_4$$

Claus Process $$H_2S+1.5O_2 \rightarrow SO_2+H_2O$$

$$2H_2S+SO_2 \rightarrow 2H_2O+3S$$

Sulfuric Acid Production from Sulfur, or Sulfur Dioxide, or Hydrogen Sulfide, or Sulfur Trioxide, or Water, or Oxygen, or any Combination Thereof.

Note: In some embodiments, a component comprising alkaline earth carbonate, such as a component comprising $CaCO_3$, which may be produced from, for example, a component comprising calcium sulfate, may be employed as at least a portion of the component comprising alkaline earth—WA, such as a component comprising alkaline earth carbonate, employed in the reaction of a component comprising alkaline earth—WA with a component comprising carboxylic acid or other acid stronger than 'weak acid' and/or weaker than sulfurous acid or aqueous sulfur dioxide.

Note: In some embodiments, at least a portion of a component comprising $H_2S$ may be converted into at least a portion of a component comprising hydrogen and/or at least a portion of a component comprising sulfur or a sulfur derivative. For example, in some embodiments, a component comprising $H_2S$ may be reacted or separated in a manner to form, for example, a component comprising sulfur and/or a component comprising hydrogen. For example, in some embodiments, a component comprising $H_2S$ may be reacted or separated in a manner to form, for example, a component comprising sulfur, such as elemental sulfur, and/or a component comprising hydrogen, such as diatomic hydrogen.

Note: In some embodiments, a component comprising calcium sulfide may be converted into or reacted to form at least a portion of a component comprising elemental sulfur.

Note: In some embodiments, component comprising calcium sulfate may be reacted with a component comprising hydrogen, or carbon monoxide, or a syngas, or a derivative thereof, or any combination thereof. In some embodiments, component comprising calcium sulfate may be reacted with a component comprising hydrogen, or carbon monoxide, or a syngas, or a derivative thereof, or any combination thereof to form, for example, a component comprising, including, but not limited to, one or more or any combination of the following: calcium sulfide, or calcium oxide, or calcium hydroxide, or calcium carbonate, or sulfur, or sulfur dioxide, or sulfuric acid, or hydrogen sulfide, or a derivative thereof, or any combination thereof.

Note: In some embodiments, a component comprising alkaline earth sulfide, such as a component comprising CaS, which may be produced from, for example, a component comprising calcium sulfate, may be employed as at least a portion of the component comprising alkaline earth—WA, such as a component comprising alkaline earth sulfide, employed in the reaction of a component comprising alka- line earth—WA with carboxylic acid or other acid stronger than 'weak acid' and/or weaker than sulfurous acid or aqueous sulfur dioxide.

Note: Heat, or steam, or power, or any combination thereof may be recovered or utilized from, for example, including, but not limited to, the combustion or reaction of one or more or any combination of components comprising the at least a portion of sulfur, which may include, but are not limited to, one or more or any combination of the following: sulfur, or sulfur dioxide, or sulfate, or hydrogen sulfide, or sulfite, or bisulfite, or oxygen, or water, or sulfur trioxide, or sulfuric acid, or sulfurous acid, or sulfur dioxide derivative, or sulfur derivative.

Example Chemistry 3: Example Simplified Chemistry NaCl Input and Ca(WA) Input to Produce NaOH, CaO, and 2HCl with Mg Intermediate Production of Alkali Hydroxide, Hydrochloric Acid, and Alkaline-Earth Sulfate:

Similar to Example Chemistry 1, Except:

In some embodiments, a component comprising Alkali Chloride may be at least partially reacted to form a component comprising alkali sulfate or alkali bisulfate and/or a component comprising chlorine, or hydrogen chloride, or hydrochloric acid, or any combination thereof, by, for example, a reaction with sulfuric acid, which may comprise, including, but not limited to, for example, the Mannheim Process.

$$KCl+H_2SO_4 \rightarrow 2HCl+K_2SO_4$$

$$NaCl+H_2SO_4 \rightarrow HCl+NaHSO_4$$

$$NaCl+NaHSO_4 \rightarrow HCl+Na_2SO_4$$

In some embodiments, at least a portion of a component comprising sulfuric acid may be regenerated or recovered, and/or at least a portion of said component comprising regenerated or recovered sulfuric acid may be employed in the reaction of at least a portion of a component comprising alkali chloride with at least a portion of a component comprising sulfuric acid.

For example:

(1) React at least a portion of a component comprising an alkali chloride with at least a portion of a component comprising sulfuric acid to form at least a portion of a component comprising alkali sulfate and/or at least a portion of a component comprising hydrogen chloride. Example chemistry may comprise including, but not limited to, one or more or any combination of the following:

$$KCl+H_2SO_4 \rightarrow 2HCl+K_2SO_4$$

$$NaCl+H_2SO_4 \rightarrow HCl+NaHSO_4$$

$$NaCl+NaHSO_4 \rightarrow HCl+Na_2SO_4$$

Note: At least a portion of a component comprising sulfuric acid may comprise at least a portion of a component comprising sulfuric acid regenerated, or recovered, or otherwise produced, or any combination thereof from within the process, or from within the embodiment, or from calcium sulfate, or from sodium sulfate, or any combination thereof.

Production of Alkaline Earth Oxide or Hydroxide and/or Sulfuric Acid from Alkaline Earth Sulfate: Similar to Example Chemistry 1.

Example Chemistry 4: Example Simplified Chemistry NaCl Input and Ca(WA) Input to Produce NaOH, CaO, and 2HCl with Thermal Decomposition of CaSO₄

Production of Alkali Hydroxide, Hydrochloric Acid, and Alkaline-Earth Sulfate:
Similar to Example Chemistry 3.
Production of Alkaline Earth Oxide or Hydroxide and/or Sulfuric Acid from Alkaline Earth Sulfate:
Similar to Example Chemistry 2.

Example Chemistry 5: Example Simplified Chemistry Na₂SO₄ Input and Ca Intermediate to Produce NaOH and H₂SO₄ with Mg Intermediate Production of Alkali Hydroxide and Alkaline-Earth Sulfate:
Similar to Example Chemistry 1, except at least a portion of a component comprising alkaline earth weak acid, such as Ca(WA), may comprise at least a portion of an alkaline earth weak acid salt regenerated, or recovered, or produced, or any combination thereof within the process, or within one or more embodiments, or from alkaline earth sulfate, or any combination thereof. For example, in some embodiments, Ca(WA) may comprise at least a portion of a component comprising calcium oxide, or calcium hydroxide, or calcium carbonate, or calcium sulfide, or other calcium cation-weak acid anion salt, or any combination thereof.
Production of Alkaline Earth Oxide or Hydroxide and/or Sulfuric Acid from Alkaline Earth Sulfate:
Similar to Example Chemistry 1.

Example Chemistry 6: Example Simplified Chemistry Na₂SO₄ Input and Ca Intermediate to Produce NaOH and H₂SO₄ with Thermal Decomposition of CaSO₄

Production of Alkali Hydroxide and Alkaline-Earth Sulfate:
Similar to Example Chemistry 5.
Production of Alkaline Earth Oxide or Hydroxide and/or Sulfuric Acid from Alkaline Earth Sulfate:
Similar to Example Chemistry 2.

Example Chemistry 7: Example Simplified Chemistry NaCl Input and Ca Intermediate to Produce NaOH and 2HCl with Mg Intermediate Production of Alkali Hydroxide, Hydrochloric Acid, and Alkaline-Earth Sulfate:
Similar to Example Chemistry 3, except at least a portion of a component comprising alkaline earth weak acid, such as Ca(WA), may comprise at least a portion of an alkaline earth weak acid salt regenerated, or recovered, or produced, or any combination thereof within the process, or within one or more embodiments, or from alkaline earth sulfate, or any combination thereof. For example, in some embodiments, Ca(WA) may comprise at least a portion of a component comprising calcium oxide, or calcium hydroxide, or calcium carbonate, or calcium sulfide, or other calcium cation-weak acid anion salt, or any combination thereof.
Production of Alkaline Earth Oxide or Hydroxide and/or Sulfuric Acid from Alkaline Earth Sulfate:
Similar to Example Chemistry 1.

Example Chemistry 8: Example Simplified Chemistry NaCl Input and Ca Intermediate to Produce NaOH and 2HCl with Thermal Decomposition of CaSO₄

Production of Alkali Hydroxide, Hydrochloric Acid, and Alkaline-Earth Sulfate:
Similar to Example Chemistry 3, except at least a portion of a component comprising alkaline earth weak acid, such as Ca(WA), may comprise at least a portion of an alkaline earth weak acid salt regenerated, or recovered, or produced, or any combination thereof within the process, or within one or more embodiments, or from alkaline earth sulfate, or any combination thereof. For example, in some embodiments, Ca(WA) may comprise at least a portion of a component comprising calcium oxide, or calcium hydroxide, or calcium carbonate, or calcium sulfide, or other calcium cation-weak acid anion salt, or any combination thereof.
Production of Alkaline Earth Oxide or Hydroxide and/or Sulfuric Acid from Alkaline Earth Sulfate:
Similar to Example Chemistry 2.

Example Chemistry 9: Producing Calcium Oxide or Calcium Hydroxide and Sulfuric Acid using Magnesium Sulfite Intermediate. Some embodiments may comprise, including, but not limited to, one or more or any combination of the following:

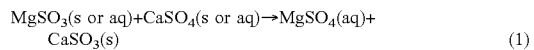

Note: In some embodiments, at least a portion of a component comprising CaSO₃(s) may be separated by a solid-liquid separation process, such as filtration, or centrifuge, or any combination thereof.

Note: In some embodiments, a component comprising MgSO₄(aq) may be concentrated and/or crystallized in a multi-step process. For example, in some embodiments, MgSO₄(aq) may be concentrated using electrodialysis and/or reverse osmosis and/or nanofiltration and/or forward osmosis and/or osmotically assisted reverse osmosis and/or other separation method to, for example, separate at least a portion of a component comprising water from a at least a portion of a component comprising MgSO₄(aq). For example, in some embodiments, a component comprising MgSO₄(aq) may be concentrated using systems and/or methods for separating water and/or crystallization. For example, in some embodiments, a component comprising MgSO₄ (aq) may be concentrated using, including, but not limited to, one or more or any combination of the following: distillation, or membrane distillation, or mechanical vapor compression distillation, or mechanical vapor recompression distillation, or multi-effect distillation, or multistage flash distillation, or forward osmosis, or osmotically assisted reverse osmosis, or electrodialysis, or solventing-out, or anti-solvent precipitation, or cryo-desalination, or cryo-precipitation, or other separation method described herein, or other separation method known in the art, or any combination thereof. For example, in some embodiments, at least a portion of a component comprising MgSO₄(aq) may be separated or crystallized by cooling crystallization or precipitation.

Note: In some embodiments, for example, at least a portion of heat from the exothermic formation or production of sulfuric acid or other potential exothermic reactions or steps may be employed to, for example, facilitate the separation of at least a portion of a component comprising water from a component comprising magnesium sulfate or the crystallization of magnesium sulfate.

$$CaSO_3(s) \rightarrow CaO(s) + SO_2(g) \qquad (3)$$

Note: In some embodiments, a component comprising calcium sulfite may be decomposed or thermally decomposed or reacted to form, for example, including, but not limited to, one or more or any combination of the following: calcium oxide, or cement, or sulfur dioxide, or carbon dioxide, or water vapor, or calcium hydroxide, or a derivative described herein, or a derivative known in the art, or a derivative thereof, or any combination thereof.

Note: In some embodiments, a component comprising CaO(s) may be reacted with water to produce a component comprising calcium hydroxide. In some embodiments, at least a portion of the heat generated may be employed or recovered to, for example, provide a portion of heat for or facilitate distillation or water removal or concentrating or crystallization of a solution, or other heat consuming process or step or application, or any combination thereof.

$$MgSO_4(s) \rightarrow MgO(s) + SO_2(g) + \tfrac{1}{2}O_2(g) \qquad (4)$$

Note: In some embodiments, a component comprising magnesium sulfate may be decomposed or thermally decomposed to form a component comprising, for example, including, but not limited to, one or more or any combination of the following: magnesium oxide, or magnesium hydroxide, or magnesium oxide derivative, or magnesium oxide and sulfur trioxide, or sulfur dioxide, or diatomic oxygen, or gaseous oxygen, or sulfur oxide, or carbon dioxide, or carbon dioxide (due to, for example, the presence of a carbonaceous reducing agent), or water, or cement, or clinker, or silicate, or ferrite, or ferrate, or aluminate, or any combination thereof.

(5) React a component comprising magnesium oxide or magnesium hydroxide with a component comprising carbon dioxide or carbonate or carbon dioxide derivative.

$$MgO(s) + CO_2(g) \rightarrow MgCO_3(s)$$

$$MgO(s) + H_2O(l \text{ or } g) \rightarrow Mg(OH)_2(s \text{ or } aq)$$

$$Mg(OH)_2(s \text{ or } aq) + CO_2(g \text{ or } aq) \rightarrow MgCO_3(s) + H_2O(l \text{ or } g)$$

$$Mg(OH)_2(s \text{ or } aq) + (NH_4)_2CO_3(aq) \rightarrow MgCO_3(s) + NH_3(aq) + 2H_2O(aq)$$

$$Mg(OH)_2(s \text{ or } aq) + \text{Amine-Carbon dioxide}(aq) \rightarrow MgCO_3(s) + \text{Amine}(aq) + 2H_2O(aq)$$

Note: In some embodiments, a component comprising $CO_2$ may comprise, including but not limited to, one or more or any combination of the following: emissions gas, or point source gas, or air, or a $CO_2$ absorption solution, or a $CO_2$ capture solution, or any combination thereof.

(6) React a component comprising magnesium carbonate, or magnesium oxide, or magnesium hydroxide, or any combination thereof with a component comprising a carboxylic acid to form a component comprising magnesium carboxylate and/or a component comprising captured carbon dioxide.

$$MgCO_3(s) + \text{Carboxylic Acid} \rightarrow Mg(\text{Carboxylate})(aq) + CO_2(g) + H_2O(l)$$

$$MgCO_3(s) + \text{Citric Acid} \rightarrow Mg(\text{Citrate})(aq) + CO_2(g) + H_2O(l)$$

$$MgCO_3(s) + \text{Acetic Acid} \rightarrow Mg(\text{Acetate})(aq) + CO_2(g) + H_2O(l)$$

$$MgCO_3(s) + \text{Formic Acid} \rightarrow Mg(\text{Formate})(aq) + CO_2(g) + H_2O(l)$$

$$MgCO_3(s) + \text{Propanoic Acid} \rightarrow Mg(\text{Propanoate})(aq) + CO_2(g) + H_2O(l)$$

Note: In some embodiments, at least a portion of the component comprising formed carbon dioxide or $CO_2(g)$ may comprise, for example, including, but not limited to, one or more or any combination of the following: high purity, or captured, or high concentration, or high partial pressure, or any combination thereof carbon dioxide.

(7) React a component comprising magnesium oxide, or magnesium hydroxide, or magnesium carbonate, or magnesium-carboxylic acid, or magnesium citrate, or magnesium acetate, or a derivative thereof, or any combination thereof with a component comprising sulfur dioxide, or sulfurous acid, or any combination thereof to form magnesium sulfite and/or water, or carbon dioxide, or captured carbon dioxide, or carboxylic acid, or any combination thereof.

$$MgO(s) + SO_2(g \text{ or } aq) \rightarrow MgSO_3(s \text{ or } aq)$$

$$Mg(OH)_2(s \text{ or } aq) + SO_2(g \text{ or } aq) \rightarrow MgSO_3(s \text{ or } aq) + H_2O(l)$$

$$MgCO_3(s) + SO_2(g \text{ or } aq) \rightarrow MgSO_3(s \text{ or } aq) + CO_2(g)$$

Note: Carbon dioxide or $CO_2(g)$ may comprise high purity, or captured, or high concentration, or high partial pressure, or any combination thereof carbon dioxide.

$$Mg(\text{Carboxylate})(aq) + SO_2(g \text{ or } aq) \rightarrow MgSO_3(s \text{ or } aq) + \text{Carboxylic Acid}(aq)$$

$$Mg(\text{Formate})(aq) + SO_2(g \text{ or } aq) \rightarrow MgSO_3(s \text{ or } aq) + \text{Formic Acid}(aq)$$

Note: $MgSO_3$(s or aq) may be separated from carboxylic acid by, including, but not limited to, one or more or any combination of the following: precipitation, or cooling precipitation, or membrane based process, or nanofiltration, or reverse osmosis, or distillation, or membrane distillation, or multi-effect distillation, or electrodialysis, or solid-liquid separation, or filtration, or rinsing, or clarifying, or decanting, or centrifuge, or filter press, or any combination thereof.

$$SO_2(g) + \tfrac{1}{2}O_2(g) + H_2O(l \text{ or } g) \rightarrow H_2SO_4(l \text{ or } g \text{ or } aq) \qquad (8)$$

Note: React at least a portion of a component comprising sulfur dioxide, or sulfur trioxide, or sulfur, or oxygen, or hydrogen, or water to form at least a portion of a component comprising one or more or any combination of the following: sulfuric acid, or sulfur, or hydrogen, or steam.

Note: May generate heat which may be recovered and/or may be utilized in one or more or any combination of process steps or applications.

Example Detailed Chemistry: Process for Producing Calcium Oxide or Calcium Hydroxide and Sulfuric Acid using Magnesium Citrate Intermediate. An embodiment may comprise one or more or any combination of the following:

$$\text{Magnesium Citrate(aq)} + \text{CaSO}_4(\text{s or aq}) \rightarrow \text{MgSO}_4(\text{aq}) + \text{Calcium Citrate(s)} \tag{1}$$

Note: In some embodiments, a component comprising calcium citrate may be separated by a solid-liquid separation process, such as filtration, or centrifuge, or decanting, or settling, or clarifier, or other separation method described herein, or other separation method known in the art, or any combination thereof.

Note: If desired, in some embodiments, at least a portion of any residual dissolved calcium citrate may be separated by concentrating and/or precipitation, such as cooling precipitation or concentrating precipitation. Alternatively, or additionally, at least a portion of residual dissolved calcium in a form comprising calcium citrate may be removed or precipitated by reaction with at least a portion of a component comprising, including, but not limited to, one or more or any combination of the following: sulfur dioxide, or sulfite, or bisulfite, or sulfurous acid, or sulfide, or carbonate, or carbon dioxide, or bicarbonate, or a derivative thereof, or any combination thereof. In some embodiments, at least a portion of citric acid or citric acid species may be recovered or separated using, for example, nanofiltration.

Note: If desired, in some embodiments, a portion of residual dissolved calcium citrate may be recirculated or may comprise a portion of the 'water' or solvent water recirculated or employed to dissolve calcium sulfate or magnesium citrate.

$$\text{MgSO}_4(\text{aq}) \rightarrow \text{MgSO}_4(\text{s}) + \text{Water} \tag{2}$$

Note: In some embodiments, a component comprising $\text{MgSO}_4(\text{aq})$ may be concentrated and/or crystallized in a multi-step process. For example, in some embodiments, $\text{MgSO}_4(\text{aq})$ may be concentrated using electrodialysis and/or reverse osmosis and/or nanofiltration and/or forward osmosis and/or osmotically assisted reverse osmosis and/or other separation method, for example, separate at least a portion of a component comprising water from a at least a portion of a component comprising $\text{MgSO}_4(\text{aq})$. For example, in some embodiments, a component comprising $\text{MgSO}_4(\text{aq})$ may be concentrated using systems and/or methods for separating water and/or crystallization. For example, in some embodiments, a component comprising $\text{MgSO}_4(\text{aq})$ may be concentrated using, including, but not limited to, one or more or any combination of the following: distillation, or membrane distillation, or mechanical vapor compression distillation, or mechanical vapor recompression distillation, or multi-effect distillation, or multistage flash distillation, or forward osmosis, or osmotically assisted reverse osmosis, or electrodialysis, or solventing-out, or anti-solvent precipitation, or cryo-desalination, or cryo-precipitation, or other separation method described herein, or other separation method known in the art, or any combination thereof. For example, in some embodiments, at least a portion of a component comprising $\text{MgSO}_4(\text{aq})$ may be separated or crystallized by cooling crystallization or precipitation.

Note: In some embodiments, for example, at least a portion of heat from the exothermic formation or production of sulfuric acid or other potential exothermic reactions or steps may be employed to, for example, facilitate the separation of at least a portion of a component comprising water from a component comprising magnesium sulfate or the crystallization of magnesium sulfate.

(3a) React a component comprising calcium citrate with a component comprising sulfur dioxide or sulfurous acid or a derivative thereof to form a component comprising calcium sulfite and a component comprising citric acid.

$$\text{Calcium Citrate(s)} + \text{SO}_2(\text{g or aq}) \rightarrow \text{CaSO}_3(\text{s}) + \text{Citric Acid(aq)}$$

$$\text{SO}_2(\text{g}) + \text{H}_2\text{O(l)} \rightarrow \text{H}_2\text{SO}_3(\text{aq})$$

$$\text{SO}_2(\text{g}) + \text{Water(solvent)} \rightarrow \text{SO}_2(\text{aq})$$

Note: Calcium sulfite may be separated by a solid-liquid separation.

(3b) React a component comprising calcium citrate with a component comprising sodium or alkali or ammonia or alkali-like or any combination thereof cation+sulfur dioxide anion salt, to form a component comprising calcium sulfite and an aqueous solution comprising a citrate salt. In some embodiments, a citrate salt, or a citrate salt solution, or a derivative thereof may comprise a valuable product. In some embodiments, In some embodiments, a citrate salt, or a citrate salt solution, or a derivative thereof may comprise an intermediate. In some embodiments, at least a portion of a solution comprising citrate salt may be reacted with a component comprising sulfur dioxide to form at least a portion of a sodium or alkali or ammonia or alkali-like or any combination thereof cation–sulfur dioxide or derivative thereof anion salt and a component comprising citric acid. In some embodiments, a component or solution comprising citric acid may be at least partially separated from the sodium or alkali or ammonia or alkali-like or any combination thereof cation-sulfur dioxide or derivative thereof salt using, for example, including, but not limited to, one or more or any combination of the following: nanofiltration, or reverse osmosis, or ultrafiltration, or electrodialysis, or cooling precipitation, or precipitation, or distillation, or crystallization, or melt crystallization, or membrane-based process, or a separation method described herein, or a separation method known in the art, or any combination thereof.

$$\text{Calcium Citrate(s or aq)} + \text{Na}_2\text{SO}_3(\text{aq}) \rightarrow \text{CaSO}_3(\text{s}) + \text{Sodium Citrate(aq)}$$

$$\text{Sodium Citrate(aq)} + \text{SO}_2(\text{g}) \rightarrow \text{Na}_2\text{SO}_3(\text{aq}) + \text{Citric Acid}$$

Separate at least a portion of Sodium+Sulfur Dioxide Salt from at least a portion of Citric Acid Note: Calcium sulfite may be separated by a solid-liquid separation.

$$\text{CaSO}_3(\text{s}) \rightarrow \text{CaO(s)} + \text{SO}_2(\text{g}) \tag{4}$$

Note: In some embodiments, a component comprising calcium sulfite may be decomposed or thermally decomposed or reacted to form, for example, including, but not limited to, one or more or any combination of the following: calcium oxide, or cement, or sulfur dioxide, or carbon dioxide, or water vapor, or calcium hydroxide, or a derivative described herein, or a derivative known in the art, or a derivative thereof, or any combination thereof.

Note: In some embodiments, a component comprising CaO(s) may be reacted with water to produce a component comprising calcium hydroxide. In some embodiments, at least a portion of the heat generated may be employed or recovered to, for example, provide a portion of heat for or facilitate distillation or water removal or concentrating or crystallization of a solution, or other heat consuming process or step or application, or any combination thereof.

$$MgSO_4(s) \rightarrow MgO(s) + SO_2(g) + \tfrac{1}{2}O_2(g) \qquad (5)$$

Note: In some embodiments, a component comprising magnesium sulfate may be decomposed or thermally decomposed to form a component comprising, for example, including, but not limited to, one or more or any combination of the following: magnesium oxide, or magnesium hydroxide, or magnesium oxide derivative, or magnesium oxide and sulfur trioxide, or sulfur dioxide, or diatomic oxygen, or gaseous oxygen, or sulfur oxide, or carbon dioxide, or carbon dioxide (due to, for example, the presence of a carbonaceous reducing agent), or water, or cement, or clinker, or silicate, or ferrite, or ferrate, or aluminate, or any combination thereof.

(6) React a component comprising magnesium oxide or magnesium hydroxide with a component comprising carbon dioxide or carbonate or carbon dioxide derivative.

$$MgO(s) + CO_2(g) \rightarrow MgCO_3(s)$$

$$MgO(s) + H_2O(l \text{ or } g) \rightarrow Mg(OH)_2(s \text{ or } aq)$$

$$Mg(OH)_2(s \text{ or } aq) + CO_2(g \text{ or } aq) \rightarrow MgCO_3(s) + H_2O(l \text{ or } g)$$

$$Mg(OH)_2(s \text{ or } aq) + (NH_4)_2CO_3(aq) \rightarrow MgCO_3(s) + NH_3(aq) + 2H_2O(aq)$$

$$Mg(OH)_2(s \text{ or } aq) + \text{Amine-Carbon dioxide}(aq) \rightarrow MgCO_3(s) + \text{Amine}(aq) + 2H_2O(aq)$$

Note: In some embodiments, a component comprising $CO_2$ may comprise, including but not limited to, one or more or any combination of the following: emissions gas, or point source gas, or air, or a $CO_2$ absorption solution, or a $CO_2$ capture solution, or any combination thereof.

(7) React a component comprising magnesium carbonate, or magnesium oxide, or magnesium hydroxide, or any combination thereof with a component comprising a carboxylic acid to form a component comprising magnesium carboxylate and/or a component comprising captured carbon dioxide.

$$MgCO_3(s) + \text{Carboxylic Acid} \rightarrow Mg(\text{Carboxylate})(aq) + CO_2(g) + H_2O(l)$$

$$MgCO_3(s) + \text{Citric Acid} \rightarrow Mg(\text{Citrate})(aq) + CO_2(g) + H_2O(l)$$

$$MgCO_3(s) + \text{Acetic Acid} \rightarrow Mg(\text{Acetate})(aq) + CO_2(g) + H_2O(l)$$

$$MgCO_3(s) + \text{Formic Acid} \rightarrow Mg(\text{Formate})(aq) + CO_2(g) + H_2O(l)$$

$$MgCO_3(s) + \text{Propanoic Acid} \rightarrow Mg(\text{Propanoate})(aq) + CO_2(g) + H_2O(l)$$

Note: In some embodiments, at least a portion of the component comprising formed carbon dioxide or $CO_2$ (g) may comprise, for example, including, but not limited to, one or more or any combination of the following: high purity, or captured, or high concentration, or high partial pressure, or any combination thereof carbon dioxide.

(8) React a component comprising magnesium oxide, or magnesium hydroxide, or magnesium carbonate, or magnesium-carboxylic acid, or magnesium citrate, or magnesium acetate, or a derivative thereof, or any combination thereof with a component comprising sulfur dioxide, or sulfurous acid, or any combination thereof to form magnesium sulfite and/or water, or carbon dioxide, or captured carbon dioxide, or carboxylic acid, or any combination thereof.

$$MgO(s) + SO_2(g \text{ or } aq) \rightarrow MgSO_3(s \text{ or } aq)$$

$$Mg(OH)_2(s \text{ or } aq) + SO_2(g \text{ or } aq) \rightarrow MgSO_3(s \text{ or } aq) + H_2O(l)$$

$$MgCO_3(s) + SO_2(g \text{ or } aq) \rightarrow MgSO_3(s \text{ or } aq) + CO_2(g)$$

Note: Carbon dioxide or $CO_2(g)$ may comprise high purity, or captured, or high concentration, or high partial pressure, or any combination thereof carbon dioxide.

$$Mg(\text{Carboxylate})(aq) + SO_2(g \text{ or } aq) \rightarrow MgSO_3(s \text{ or } aq) + \text{Carboxylic Acid}(aq)$$

$$Mg(\text{Formate})(aq) + SO_2(g \text{ or } aq) \rightarrow MgSO_3(s \text{ or } aq) + \text{Formic Acid}(aq)$$

Note: $MgSO_3$(s or aq) may be separated from carboxylic acid by, including, but not limited to, one or more or any combination of the following: precipitation, or cooling precipitation, or membrane based process, or nanofiltration, or reverse osmosis, or distillation, or membrane distillation, or multi-effect distillation, or electrodialysis, or solid-liquid separation, or filtration, or rinsing, or clarifying, or decanting, or centrifuge, or filter press, or any combination thereof.

$$SO_2(g) + \tfrac{1}{2}O_2(g) + H_2O(l \text{ or } g) \rightarrow H_2SO_4(l \text{ or } g \text{ or } aq) \qquad (9)$$

Note: React at least a portion of a component comprising sulfur dioxide, or sulfur trioxide, or sulfur, or oxygen, or hydrogen, or water to form at least a portion of a component comprising one or more or any combination of the following: sulfuric acid, or sulfur, or hydrogen, or steam.

Note: May generate heat which may be recovered and/or may be utilized in one or more or any combination of process steps or applications.

Example 3: Process for producing calcium oxide, or magnesium oxide, or sulfuric acid, or a derivative thereof, or any combination thereof using magnesium+calcium input, or dolomite, or dolostone, or any combination thereof. An embodiment may comprise one or more or any combination of the following:

(1) React a component comprising calcium sulfate, or a component comprising dolomite, or a component comprising a mixture of magnesium and calcium, or a component comprising a mixture of magnesium and calcium oxide or hydroxide, or a component comprising a mixture of magnesium carbonate and calcium carbonate, or a component comprising sulfur dioxide, or any combination thereof to form, for example, a component comprising at least a portion of calcium sulfite, or a component comprising magnesium sulfite, or a component comprising at least a portion of magnesium sulfate, or a component comprising carbon dioxide, or any combination thereof.

a. $CaSO_4 + MgCO_3 + CaCO_3 + 2SO_2 \rightarrow 2CaSO_3 + MgSO_4 + CO_2$ b. $CaSO_4 + MgCO_3 + CaCO_3 + SO_2 \rightarrow CaSO_3 + CaCO_3 + MgSO_4$ (2) Decompose at least a portion of a solid comprising calcium sulfite to form at least a portion of a solid comprising calcium oxide or a derivative thereof and a component comprising sulfur dioxide or a derivative thereof.

a. $CaSO_3 \rightarrow CaO + SO_2$ b. $2CaSO_3 \rightarrow 2CaO + 2SO_2$ $$MgSO_4(aq) \rightarrow MgSO_4(s) + Water \quad (3)$$

Note: In some embodiments, a component comprising $MgSO_4(aq)$ may be concentrated and/or crystallized in a multi-step process. For example, in some embodiments, $MgSO_4(aq)$ may be concentrated using electrodialysis and/or reverse osmosis and/or nanofiltration and/or forward osmosis and/or osmotically assisted reverse osmosis and/or other separation method to, for example, separate at least a portion of a component comprising water from a at least a portion of a component comprising $MgSO_4$ (aq). For example, in some embodiments, a component comprising $MgSO_4(aq)$ may be concentrated using systems and/or methods for separating water and/or crystallization. For example, in some embodiments, a component comprising $MgSO_4(aq)$ may be concentrated using, including, but not limited to, one or more or any combination of the following: distillation, or membrane distillation, or mechanical vapor compression distillation, or mechanical vapor recompression distillation, or multi-effect distillation, or multistage flash distillation, or forward osmosis, or osmotically assisted reverse osmosis, or electrodialysis, or solventing-out, or anti-solvent precipitation, or cryo-desalination, or cryo-precipitation, or other separation method described herein, or other separation method known in the art, or any combination thereof. For example, in some embodiments, at least a portion of a component comprising $MgSO_4(aq)$ may be separated or crystallized by cooling crystallization or precipitation.

Note: In some embodiments, for example, at least a portion of heat from the exothermic formation or production of sulfuric acid or other potential exothermic reactions or steps may be employed to, for example, facilitate the separation of at least a portion of a component comprising water from a component comprising magnesium sulfate or the crystallization of magnesium sulfate.

$$MgSO_4(s) \rightarrow MgO(s) + SO_2(g) + \tfrac{1}{2}O_2(g) \quad (4)$$

Note: In some embodiments, a component comprising magnesium sulfate may be decomposed or thermally decomposed to form a component comprising, for example, including, but not limited to, one or more or any combination of the following: magnesium oxide, or magnesium hydroxide, or magnesium oxide derivative, or magnesium oxide and sulfur trioxide, or sulfur dioxide, or diatomic oxygen, or gaseous oxygen, or sulfur oxide, or carbon dioxide, or carbon dioxide (due to, for example, the presence of a carbonaceous reducing agent), or water, or cement, or clinker, or silicate, or ferrite, or ferrate, or aluminate, or any combination thereof.

(5) React a component comprising magnesium oxide or magnesium hydroxide with a component comprising carbon dioxide or carbonate or carbon dioxide derivative.

$$MgO(s) + CO_2(g) \rightarrow MgCO_3(s)$$

$$MgO(s) + H_2O(l \text{ or } g) \rightarrow Mg(OH)_2(s \text{ or } aq)$$

$$Mg(OH)_2(s \text{ or } aq) + CO_2(g \text{ or } aq) \rightarrow MgCO_3(s) + H_2O(l \text{ or } g)$$

$$Mg(OH)_2(s \text{ or } aq) + (NH_4)_2CO_3(aq) \rightarrow MgCO_3(s) + NH_3(aq) + 2H_2O(aq)$$

$$Mg(OH)_2(s \text{ or } aq) + \text{Amine-Carbon dioxide}(aq) \rightarrow MgCO_3(s) + \text{Amine}(aq) + 2H_2O(aq)$$

Note: In some embodiments, a component comprising $CO_2$ may comprise, including but not limited to, one or more or any combination of the following: emissions gas, or point source gas, or air, or a $CO_2$ absorption solution, or a $CO_2$ capture solution, or any combination thereof.

(6) React a component comprising magnesium carbonate, or magnesium oxide, or magnesium hydroxide, or any combination thereof with a component comprising a carboxylic acid to form a component comprising magnesium carboxylate and/or a component comprising captured carbon dioxide.

$$MgCO_3(s) + \text{Carboxylic Acid} \rightarrow Mg(\text{Carboxylate})(aq) + CO_2(g) + H_2O(l)$$

$$MgCO_3(s) + \text{Citric Acid} \rightarrow Mg(\text{Citrate})(aq) + CO_2(g) + H_2O(l)$$

$$MgCO_3(s) + \text{Acetic Acid} \rightarrow Mg(\text{Acetate})(aq) + CO_2(g) + H_2O(l)$$

$$MgCO_3(s) + \text{Formic Acid} \rightarrow Mg(\text{Formate})(aq) + CO_2(g) + H_2O(l)$$

$$MgCO_3(s) + \text{Propanoic Acid} \rightarrow Mg(\text{Propanoate})(aq) + CO_2(g) + H_2O(l)$$

Note: In some embodiments, at least a portion of the component comprising formed carbon dioxide or $CO_2(g)$ may comprise, for example, including, but not limited to, one or more or any combination of the following: high purity, or captured, or high concentration, or high partial pressure, or any combination thereof carbon dioxide.

(7) React a component comprising magnesium oxide, or magnesium hydroxide, or magnesium carbonate, or magnesium-carboxylic acid, or magnesium citrate, or magnesium acetate, or a derivative thereof, or any combination thereof with a component comprising sulfur dioxide, or sulfurous acid, or any combination thereof to form magnesium sulfite and/or water, or carbon dioxide, or captured carbon dioxide, or carboxylic acid, or any combination thereof.

$$MgO(s)+SO_2(g \text{ or } aq) \rightarrow MgSO_3(s \text{ or } aq)$$

$$Mg(OH)_2(s \text{ or } aq)+SO_2(g \text{ or } aq) \rightarrow MgSO_3(s \text{ or } aq)+H_2O(l)$$

$$MgCO_3(s)+SO_2(g \text{ or } aq) \rightarrow MgSO_3(s \text{ or } aq)+CO_2(g) \quad (5)$$

Note: Carbon dioxide or $CO_2(g)$ may comprise high purity, or captured, or high concentration, or high partial pressure, or any combination thereof carbon dioxide.

$$Mg(Carboxylate)(aq)+SO_2(g \text{ or } aq) \rightarrow MgSO_3(s \text{ or } aq)+Carboxylic\ Acid(aq)$$

$$Mg(Formate)(aq)+SO_2(g \text{ or } aq) \rightarrow MgSO_3(s \text{ or } aq)+Formic\ Acid(aq)$$

Note: $MgSO_3$(s or aq) may be separated from carboxylic acid by, including, but not limited to, one or more or any combination of the following: precipitation, or cooling precipitation, or membrane based process, or nanofiltration, or reverse osmosis, or distillation, or membrane distillation, or multi-effect distillation, or electrodialysis, or solid-liquid separation, or filtration, or rinsing, or clarifying, or decanting, or centrifuge, or filter press, or any combination thereof.

$$SO_2(g)+\tfrac{1}{2}O_2(g)+H_2O(l \text{ or } g) \rightarrow H_2SO_4(l \text{ or } g \text{ or } aq) \quad (8)$$

Note: React at least a portion of a component comprising sulfur dioxide, or sulfur trioxide, or sulfur, or oxygen, or hydrogen, or water to form at least a portion of a component comprising one or more or any combination of the following: sulfuric acid, or sulfur, or hydrogen, or steam.

Note: May generate heat which may be recovered and/or may be utilized in one or more or any combination of process steps or applications.

Note: Example 3 may enable the separation of at least a portion of magnesium and/or calcium.

Note: In some embodiments:
a. $MgSO_4$ may be separated from at least a portion of water using, for example, including, but not limited to, one or more or any combination of the following: distillation or freeze separation or crystallization
b. $MgSO_4$ may comprise a product, such as. magnesium sulfate or Epsom salt
c. $MgSO_4$ may be decomposed to form MgO and $SO_3$ or $H_2SO_4$. $SO_3$ or $SO_2+\tfrac{1}{2}O_2$ may be reacted, for example, with water to form $H_2SO_4$. MgO may be recycled in the process, if desired. Sulfur trioxide or sulfuric acid may comprise a valuable product.

Example 2: Process for Producing Calcium Oxide or Calcium Hydroxide and Sulfuric Acid using Magnesium Citrate Intermediate. An embodiment may comprise one or more or any combination of the following:

$$Magnesium\ Citrate(aq)+CaSO_4(s \text{ or } aq) \rightarrow MgSO_4(aq)+Calcium\ Citrate(s) \quad (1)$$

Note: In some embodiments, a component comprising calcium citrate may be separated by a solid-liquid separation process, such as filtration, or centrifuge, or decanting, or settling, or clarifier, or other separation method described herein, or other separation method known in the art, or any combination thereof.

Note: If desired, in some embodiments, at least a portion of any residual dissolved calcium citrate may be separated by concentrating and/or precipitation, such as cooling precipitation or concentrating precipitation.

Alternatively, or additionally, at least a portion of residual dissolved calcium in a form comprising calcium citrate may be removed or precipitated by reaction with at least a portion of a component comprising, including, but not limited to, one or more or any combination of the following: sulfur dioxide, or sulfite, or bisulfite, or sulfurous acid, or sulfide, or carbonate, or carbon dioxide, or bicarbonate, or a derivative thereof, or any combination thereof. In some embodiments, at least a portion of citric acid or citric acid species may be recovered or separated using, for example, nanofiltration.

Note: If desired, in some embodiments, a portion of residual dissolved calcium citrate may be recirculated or may comprise a portion of the 'water' or solvent water recirculated or employed to dissolve calcium sulfate or magnesium citrate.

$$MgSO_4(aq) \rightarrow MgSO_4(s)+Water \quad (2)$$

Note: In some embodiments, a component comprising $MgSO_4$(aq) may be concentrated and/or crystallized in a multi-step process. For example, in some embodiments, $MgSO_4$(aq) may be concentrated using electrodialysis and/or reverse osmosis and/or nanofiltration and/or forward osmosis and/or osmotically assisted reverse osmosis and/or other separation method to, for example, separate at least a portion of a component comprising water from a at least a portion of a component comprising $MgSO_4$(aq). For example, in some embodiments, a component comprising $MgSO_4$(aq) may be concentrated using systems and/or methods for separating water and/or crystallization. For example, in some embodiments, a component comprising $MgSO_4$ (aq) may be concentrated using, including, but not limited to, one or more or any combination of the following: distillation, or membrane distillation, or mechanical vapor compression distillation, or mechanical vapor recompression distillation, or multi-effect distillation, or multistage flash distillation, or forward osmosis, or osmotically assisted reverse osmosis, or electrodialysis, or solventing-out, or anti-solvent precipitation, or cryo-desalination, or cryo-precipitation, or other separation method described herein, or other separation method known in the art, or any combination thereof. For example, in some embodiments, at least a portion of a component comprising $MgSO_4$(aq) may be separated or crystallized by cooling crystallization or precipitation.

Note: In some embodiments, for example, at least a portion of heat from the exothermic formation or production of sulfuric acid or other potential exothermic reactions or steps may be employed to, for example, facilitate the separation of at least a portion of a component comprising water from a component comprising magnesium sulfate or the crystallization of magnesium sulfate.

(3a) React a component comprising calcium citrate with a component comprising sulfur dioxide or sulfurous acid or a derivative thereof to form a component comprising calcium sulfite and a component comprising citric acid.

$$Calcium\ Citrate(s)+SO_2(g \text{ or } aq) \rightarrow CaSO_3(s)+Citric\ Acid(aq)$$

$$SO_2(g)+H_2O(l) \rightarrow H_2SO_3(aq)$$

$$SO_2(g)+Water(solvent) \rightarrow SO_2(aq)$$

Note: Calcium sulfite may be separated by a solid-liquid separation.

(3b) React a component comprising calcium citrate with a component comprising sodium or alkali or ammonia or alkali-like or any combination thereof cation+sulfur dioxide anion salt, to form a component comprising calcium sulfite and an aqueous solution comprising a citrate salt. In some embodiments, a citrate salt, or a citrate salt solution, or a derivative thereof may comprise a valuable product. In some embodiments, In some embodiments, a citrate salt, or a citrate salt solution, or a derivative thereof may comprise an intermediate. In some embodiments, at least a portion of a solution comprising citrate salt may be reacted with a component comprising sulfur dioxide to form at least a portion of a sodium or alkali or ammonia or alkali-like or any combination thereof cation-sulfur dioxide or derivative thereof anion salt and a component comprising citric acid. In some embodiments, a component or solution comprising citric acid may be at least partially separated from the sodium or alkali or ammonia or alkali-like or any combination thereof cation-sulfur dioxide or derivative thereof salt using, for example, including, but not limited to, one or more or any combination of the following: nanofiltration, or reverse osmosis, or ultrafiltration, or electrodialysis, or cooling precipitation, or precipitation, or distillation, or crystallization, or melt crystallization, or membrane-based process, or a separation method described herein, or a separation method known in the art, or any combination thereof.

Calcium Citrate(s or aq)+Na$_2$SO$_3$(aq)→CaSO$_3$(s)+ Sodium Citrate(aq)

Sodium Citrate(aq)+SO$_2$(g)→Na$_2$SO$_3$(aq)+Citric Acid

Separate at least a portion of Sodium+Sulfur Dioxide Salt from at least a portion of Citric Acid Note: Calcium sulfite may be separated by a solid-liquid separation.

$$CaSO_3(s) \rightarrow CaO(s) + SO_2(g) \quad (4)$$

Note: In some embodiments, a component comprising calcium sulfite may be decomposed or thermally decomposed or reacted to form, for example, including, but not limited to, one or more or any combination of the following: calcium oxide, or cement, or sulfur dioxide, or carbon dioxide, or water vapor, or calcium hydroxide, or a derivative described herein, or a derivative known in the art, or a derivative thereof, or any combination thereof.

Note: In some embodiments, a component comprising CaO(s) may be reacted with water to produce a component comprising calcium hydroxide. In some embodiments, at least a portion of the heat generated may be employed or recovered to, for example, provide a portion of heat for or facilitate distillation or water removal or concentrating or crystallization of a solution, or other heat consuming process or step or application, or any combination thereof.

$$MgSO_4(s) \rightarrow MgO(s) + SO_2(g) + \tfrac{1}{2}O_2(g) \quad (5)$$

Note: In some embodiments, a component comprising magnesium sulfate may be decomposed or thermally decomposed to form a component comprising, for example, including, but not limited to, one or more or any combination of the following: magnesium oxide, or magnesium hydroxide, or magnesium oxide derivative, or magnesium oxide and sulfur trioxide, or sulfur dioxide, or diatomic oxygen, or gaseous oxygen, or sulfur oxide, or carbon dioxide, or carbon dioxide (due to, for example, the presence of a carbonaceous reducing agent), or water, or cement, or clinker, or silicate, or ferrite, or ferrate, or aluminate, or any combination thereof.

(6) React a component comprising magnesium oxide or magnesium hydroxide with a component comprising carbon dioxide or carbonate or carbon dioxide derivative.

MgO(s)+CO$_2$(g)→MgCO$_3$(s)

MgO(s)+H$_2$O(l or g)→Mg(OH)$_2$(s or aq)

Mg(OH)$_2$(s or aq)+CO$_2$(g or aq)→MgCO$_3$(s)+H$_2$O(l or g)

Mg(OH)$_2$(s or aq)+(NH$_4$)$_2$CO$_3$(aq)→MgCO$_3$(s)+NH$_3$(aq)+2H$_2$O(aq)

Mg(OH)$_2$(s or aq)+Amine-Carbon dioxide(aq)→MgCO$_3$(s)+Amine(aq)+2H$_2$O(aq)

Note: In some embodiments, a component comprising CO$_2$ may comprise, including but not limited to, one or more or any combination of the following: emissions gas, or point source gas, or air, or a CO$_2$ absorption solution, or a CO$_2$ capture solution, or any combination thereof.

(7) React a component comprising magnesium carbonate, or magnesium oxide, or magnesium hydroxide, or any combination thereof with a component comprising a carboxylic acid to form a component comprising magnesium carboxylate and/or a component comprising captured carbon dioxide.

MgCO$_3$(s)+Carboxylic Acid→Mg(Carboxylate)(aq)+ CO$_2$(g)+H$_2$O(l)

MgCO$_3$(s)+Citric Acid→Mg(Citrate)(aq)+CO$_2$(g)+ H$_2$O(l)

MgCO$_3$(s)+Acetic Acid→Mg(Acetate)(aq)+CO$_2$(g)+ H$_2$O(l)

MgCO$_3$(s)+Formic Acid→Mg(Formate)(aq)+CO$_2$(g)+H$_2$O(l)

MgCO$_3$(s)+Propanoic Acid→Mg(Propanoate)(aq)+ CO$_2$(g)+H$_2$O(l)

Note: In some embodiments, at least a portion of the component comprising formed carbon dioxide or CO$_2$ (g) may comprise, for example, including, but not limited to, one or more or any combination of the following: high purity, or captured, or high concentration, or high partial pressure, or any combination thereof carbon dioxide.

(8) React a component comprising magnesium oxide, or magnesium hydroxide, or magnesium carbonate, or magnesium-carboxylic acid, or magnesium citrate, or magnesium acetate, or a derivative thereof, or any combination thereof with a component comprising sulfur dioxide, or sulfurous acid, or any combination thereof to form magnesium sulfite and/or water, or carbon dioxide, or captured carbon dioxide, or carboxylic acid, or any combination thereof.

$MgO(s)+SO_2(g\ or\ aq) \rightarrow MgSO_3(s\ or\ aq)$ $Mg(OH)_2(s\ or\ aq)+SO_2(g\ or\ aq) \rightarrow MgSO_3(s\ or\ aq)+H_2O(l)$ $MgCO_3(s)+SO_2(g\ or\ aq) \rightarrow MgSO_3(s\ or\ aq)+CO_2(g)$ (5)

Note: Carbon dioxide or $CO_2(g)$ may comprise high purity, or captured, or high concentration, or high partial pressure, or any combination thereof carbon dioxide.

$Mg(Carboxylate)(aq)+SO_2(g\ or\ aq) \rightarrow MgSO_3(s\ or\ aq)+Carboxylic\ Acid(aq)$ $Mg(Formate)(aq)+SO_2(g\ or\ aq) \rightarrow MgSO_3(s\ or\ aq)+Formic\ Acid(aq)$ Note: $MgSO_3$(s or aq) may be separated from carboxylic acid by, including, but not limited to, one or more or any combination of the following: precipitation, or cooling precipitation, or membrane based process, or nanofiltration, or reverse osmosis, or distillation, or membrane distillation, or multi-effect distillation, or electrodialysis, or solid-liquid separation, or filtration, or rinsing, or clarifying, or decanting, or centrifuge, or filter press, or any combination thereof.

$SO_2(g)+\frac{1}{2}O_2(g)+H_2O(l\ or\ g) \rightarrow H_2SO_4(l\ or\ g\ or\ aq)$ (9)

Note: React at least a portion of a component comprising sulfur dioxide, or sulfur trioxide, or sulfur, or oxygen, or hydrogen, or water to form at least a portion of a component comprising one or more or any combination of the following: sulfuric acid, or sulfur, or hydrogen, or steam.

Note: May generate heat which may be recovered and/or may be utilized in one or more or any combination of process steps or applications.

Example 3: Process for producing calcium oxide, or magnesium oxide, or sulfuric acid, or a derivative thereof, or any combination thereof using magnesium+calcium input, or dolomite, or dolostone, or any combination thereof. An embodiment may comprise one or more or any combination of the following:

(1) React a component comprising calcium sulfate, or a component comprising dolomite, or a component comprising a mixture of magnesium and calcium, or a component comprising a mixture of magnesium and calcium oxide or hydroxide, or a component comprising a mixture of magnesium carbonate and calcium carbonate, or a component comprising sulfur dioxide, or any combination thereof to form, for example, a component comprising at least a portion of calcium sulfite, or a component comprising magnesium sulfite, or a component comprising at least a portion of magnesium sulfate, or a component comprising carbon dioxide, or any combination thereof.

$CaSO_4+MgCO_3+CaCO_3+2SO_2 \rightarrow 2CaSO_3+MgSO_4+CO_2$     a.

$CaSO_4+MgCO_3+CaCO_3+SO_2 \rightarrow CaSO_3+CaCO_3+MgSO_4$     b.

(2) Decompose at least a portion of a solid comprising calcium sulfite to form at least a portion of a solid comprising calcium oxide or a derivative thereof and a component comprising sulfur dioxide or a derivative thereof.

$CaSO_3 \rightarrow CaO+SO_2$     a.

$2CaSO_3 \rightarrow 2CaO+2SO_2$     b.

$MgSO_4(aq) \rightarrow MgSO_4(s)+Water$ (3)

Note: In some embodiments, a component comprising $MgSO_4(aq)$ may be concentrated and/or crystallized in a multi-step process. For example, in some embodiments, $MgSO_4(aq)$ may be concentrated using electrodialysis and/or reverse osmosis and/or nanofiltration and/or forward osmosis and/or osmotically assisted reverse osmosis and/or other separation method to, for example, separate at least a portion of a component comprising water from a at least a portion of a component comprising $MgSO_4$ (aq). For example, in some embodiments, a component comprising $MgSO_4(aq)$ may be concentrated using systems and/or methods for separating water and/or crystallization. For example, in some embodiments, a component comprising $MgSO_4(aq)$ may be concentrated using, including, but not limited to, one or more or any combination of the following: distillation, or membrane distillation, or mechanical vapor compression distillation, or mechanical vapor recompression distillation, or multi-effect distillation, or multistage flash distillation, or forward osmosis, or osmotically assisted reverse osmosis, or electrodialysis, or solventing-out, or anti-solvent precipitation, or cryo-desalination, or cryo-precipitation, or other separation method described herein, or other separation method known in the art, or any combination thereof. For example, in some embodiments, at least a portion of a component comprising $MgSO_4(aq)$ may be separated or crystallized by cooling crystallization or precipitation.

Note: In some embodiments, for example, at least a portion of heat from the exothermic formation or production of sulfuric acid or other potential exothermic reactions or steps may be employed to, for example, facilitate the separation of at least a portion of a component comprising water from a component comprising magnesium sulfate or the crystallization of magnesium sulfate.

$MgSO_4(s) \rightarrow MgO(s)+SO_2(g)+\frac{1}{2}O_2(g)$ (4)

Note: In some embodiments, a component comprising magnesium sulfate may be decomposed or thermally decomposed to form a component comprising, for example, including, but not limited to, one or more or any combination of the following: magnesium oxide, or magnesium hydroxide, or magnesium oxide derivative, or magnesium oxide and sulfur trioxide, or sulfur dioxide, or diatomic oxygen, or gaseous oxygen, or sulfur oxide, or carbon dioxide, or carbon dioxide (due to, for example, the presence of a carbonaceous reducing agent), or water, or cement, or clinker, or silicate, or ferrite, or ferrate, or aluminate, or any combination thereof.

(5) React a component comprising magnesium oxide or magnesium hydroxide with a component comprising carbon dioxide or carbonate or carbon dioxide derivative.

$MgO(s)+CO_2(g) \rightarrow MgCO_3(s)$ $MgO(s)+H_2O(l\ or\ g) \rightarrow Mg(OH)_2(s\ or\ aq)$ $Mg(OH)_2(s \text{ or } aq)+CO_2(g \text{ or } aq) \rightarrow MgCO_3(s)+H_2O(l \text{ or } g)$ $Mg(OH)_2(s \text{ or } aq)+(NH_4)_2CO_3(aq) \rightarrow MgCO_3(s)+NH_3(aq)+2H_2O(aq)$ $Mg(OH)_2(s \text{ or } aq)+\text{Amine-Carbon dioxide}(aq) \rightarrow MgCO_3(s)+\text{Amine}(aq)+2H_2O(aq)$ Note: In some embodiments, a component comprising $CO_2$ may comprise, including but not limited to, one or more or any combination of the following: emissions gas, or point source gas, or air, or a $CO_2$ absorption solution, or a $CO_2$ capture solution, or any combination thereof.

(6) React a component comprising magnesium carbonate, or magnesium oxide, or magnesium hydroxide, or any combination thereof with a component comprising a carboxylic acid to form a component comprising magnesium carboxylate and/or a component comprising captured carbon dioxide.

$MgCO_3(s)+\text{Carboxylic Acid} \rightarrow Mg(\text{Carboxylate})(aq)+CO_2(g)+H_2O(l)$ $MgCO_3(s)+\text{Citric Acid} \rightarrow Mg(\text{Citrate})(aq)+CO_2(g)+H_2O(l)$ $MgCO_3(s)+\text{Acetic Acid} \rightarrow Mg(\text{Acetate})(aq)+CO_2(g)+H_2O(l)$ $MgCO_3(s)+\text{Formic Acid} \rightarrow Mg(\text{Formate})(aq)+CO_2(g)+H_2O(l)$ $MgCO_3(s)+\text{Propanoic Acid} \rightarrow Mg(\text{Propanoate})(aq)+CO_2(g)+H_2O(l)$ Note: In some embodiments, at least a portion of the component comprising formed carbon dioxide or $CO_2(g)$ may comprise, for example, including, but not limited to, one or more or any combination of the following: high purity, or captured, or high concentration, or high partial pressure, or any combination thereof carbon dioxide.

(7) React a component comprising magnesium oxide, or magnesium hydroxide, or magnesium carbonate, or magnesium-carboxylic acid, or magnesium citrate, or magnesium acetate, or a derivative thereof, or any combination thereof with a component comprising sulfur dioxide, or sulfurous acid, or any combination thereof to form magnesium sulfite and/or water, or carbon dioxide, or captured carbon dioxide, or carboxylic acid, or any combination thereof.

$MgO(s)+SO_2(g \text{ or } aq) \rightarrow MgSO_3(s \text{ or } aq)$ $Mg(OH)_2(s \text{ or } aq)+SO_2(g \text{ or } aq) \rightarrow MgSO_3(s \text{ or } aq)+H_2O(l)$ $MgCO_3(s)+SO_2(g \text{ or } aq) \rightarrow MgSO_3(s \text{ or } aq)+CO_2(g)$ Note: Carbon dioxide or $CO_2(g)$ may comprise high purity, or captured, or high concentration, or high partial pressure, or any combination thereof carbon dioxide.

$Mg(\text{Carboxylate})(aq)+SO_2(g \text{ or } aq) \rightarrow MgSO_3(s \text{ or } aq)+\text{Carboxylic Acid}(aq)$ $Mg(\text{Formate})(aq)+SO_2(g \text{ or } aq) \rightarrow MgSO_3(s \text{ or } aq)+\text{Formic Acid}(aq)$ Note: $MgSO_3$(s or aq) may be separated from carboxylic acid by, including, but not limited to, one or more or any combination of the following: precipitation, or cooling precipitation, or membrane based process, or nanofiltration, or reverse osmosis, or distillation, or membrane distillation, or multi-effect distillation, or electrodialysis, or solid-liquid separation, or filtration, or rinsing, or clarifying, or decanting, or centrifuge, or filter press, or any combination thereof.

$SO_2(g)+\frac{1}{2}O_2(g)+H_2O(l \text{ or } g) \rightarrow H_2SO_4(l \text{ or } g \text{ or } aq)$ (8)

Note: React at least a portion of a component comprising sulfur dioxide, or sulfur trioxide, or sulfur, or oxygen, or hydrogen, or water to form at least a portion of a component comprising one or more or any combination of the following: sulfuric acid, or sulfur, or hydrogen, or steam.

Note: May generate heat which may be recovered and/or may be utilized in one or more or any combination of process steps or applications.

Note: Example 3 may enable the separation of at least a portion of magnesium and/or calcium.

Note: In some embodiments:

a. $MgSO_4$ may be separated from at least a portion of water using, for example, including, but not limited to, one or more or any combination of the following: distillation or freeze separation or crystallization b. $MgSO_4$ may comprise a product, such as. magnesium sulfate or Epsom salt c. $MgSO_4$ may be decomposed to form $MgO$ and $SO_3$ or $H_2SO_4$. $SO_3$ or $SO_2+\frac{1}{2}O_2$ may be reacted, for example, with water to form $H_2SO_4$. $MgO$ may be recycled in the process, if desired. Sulfur trioxide or sulfuric acid may comprise a valuable product.

Example Description Magnesium Intermediate Facilitated Calcium Sulfate to Calcium Oxide, or Sulfuric Acid, or Other Valuable Components Some embodiments may comprise a double displacement or metathesis reaction between a salt comprising calcium sulfate and a salt comprising magnesium—'x' anion, which may form a salt comprising calcium—'x' anion and a salt comprising magnesium sulfate. In some embodiments, at least a portion of a salt comprising magnesium sulfate may comprise a valuable product, or may comprise an intermediate, or any combination thereof. In some embodiments, at least a portion of a salt comprising magnesium sulfate may be decomposed to form, for example, at least a portion of magnesium oxide, or sulfur dioxide, or sulfur trioxide, or diatomic oxygen, or any combination thereof. In some embodiments, at least a portion of sulfur dioxide, or diatomic oxygen, or sulfur trioxide, or any combination thereof may comprise a valuable product, or an intermediate, or may be converted into sulfuric acid, or may be reacted with at least a portion of water to form at least a portion of sulfuric acid, or any combination thereof. In some embodiments, a calcium—'x' anion salt may comprise at least a portion of calcium sulfite. In some embodiments, a calcium—'x' anion salt may be reacted with at least a portion of sulfur dioxide or a sulfur dioxide derivative or a sulfite salt or bisulfite salt or sulfurous acid or any combination thereof to form at least a portion of a salt comprising calcium sulfite and/or at least a portion of an acid comprising at least a portion of the acid derivative or an acid derivative of the 'x' anion. In some embodiments, at least a portion of a salt comprising calcium sulfite may be thermally decomposed into calcium oxide or cement, and sulfur dioxide. In some embodiments, at least a portion of a salt or material comprising calcium oxide may be formed and/or, in some embodiments, at least a portion of a material comprising calcium oxide may be reacted with at least a portion of water to form at least a portion of a calcium hydroxide or a derivative thereof, and/or may be reacted with carbon dioxide to form calcium carbonate, if desired.

In some embodiments, a salt comprising magnesium—'x' anion may be more soluble than a salt comprising calcium with same anion or a salt comprising calcium—'x' anion. In some embodiments, a calcium—'x' anion salt may be less soluble in water than calcium sulfate, which may result in or facilitate a precipitation reaction, for example, wherein at least a portion of a salt comprising calcium—'x' anion salt may precipitate in a reaction with reagents or reactants comprising a salt comprising magnesium—'x' anion and a salt comprising calcium sulfate. In some embodiments, at least a portion of the reactants may be dissolved, or at least a portion of the reactants may comprise an aqueous state, or a portion of the reactants may be at a solid phase, or at least a portion of the reactants may comprise a solid-liquid mixture, or any combination thereof.

In some embodiments, calcium sulfate may possess a solubility of less than 10 g/kg in water, or about 2-3 g/kg in water, or 0.5-15 g/kg in water depending on the form or state or other solutes present or temperature, or any combination thereof which may comprise a low solubility compared to some other calcium salts, such as calcium chloride, however calcium sulfate may have a greater solubility than some other calcium salts, such as, for example, calcium citrate (example solubility of about 0.85 g/kg in water), or calcium carbonate (example solubility of about 0.015 g/kg in water), or calcium sulfite (example solubility of about 0.0043 g/kg in water). In some embodiments, magnesium salts of the same anions may possess greater solubility in water, such as, for example, magnesium sulfite (example solubility of about 5.2 g/kg in water), or magnesium citrate (example solubility of about 200-300 g/kg in water), or any combination thereof.

In some embodiments, a salt comprising magnesium 'x'-anion may comprise magnesium sulfite, or magnesium sesquisulfite, or magnesium bisulfite, or any combination thereof. In some embodiments, a solid, or solution, or slurry, or any combination thereof comprising magnesium sulfite, or magnesium sesquisulfite, or magnesium bisulfite, or any combination thereof may be mixed or reacted with a solid, or solution, or slurry, or any combination thereof comprising calcium sulfate to form at least a portion of a solid, or solution, or slurry, or any combination thereof comprising magnesium sulfate and/or at least a portion of a solid, or solution, or slurry, or any combination thereof comprising calcium sulfite, or calcium sesquisulfite, or calcium bisulfite, or any combination thereof.

Some embodiments may comprise systems and/or methods for producing magnesium salts, or calcium salts, or calcium citrate, or calcium carboxylates, or magnesium carboxylates, or calcium sulfite, or magnesium sulfate, or magnesium oxide, or magnesium carbonate, or sulfuric acid, or sulfur dioxide, or sulfur, or calcium oxide, or calcium hydroxide, or captured carbon dioxide, or any combination thereof. For example, in some embodiments, a salt or solution comprising magnesium sulfate may be produced and/or magnesium sulfate may comprise a valuable product. For example, in some embodiments, a salt comprising calcium citrate may be produced and/or calcium citrate may comprise a valuable product. For example, in some embodiments, magnesium oxide, or magnesium hydroxide, or magnesium carbonate, or any combination thereof may be produced, and/or may comprise a valuable product. In some embodiments, a material comprising magnesium may comprise an input or feed to one or more embodiments and/or may comprise, for example, including, but not limited to, one or more or any combination of the following: dolomite, or dolostone, or magnesium oxide, or magnesium carbonate, or magnesium carboxylate, or magnesium sulfite. In some embodiments, magnesium or a material comprising magnesium may comprise a feed or input. In some embodiments, magnesium or a material comprising magnesium may comprise an intermediate, or catalyst, or process intermediate, or chemical intermediate, or intermediate reagent, or any combination thereof.

Some embodiments may comprise a $CO_2$ capture, or an acid gas capture or separation process, or any combination thereof. In some embodiments, carbon dioxide may be provided as an example acid gas, however other acid gases may be applicable, which may include, but are not limited to, one or more or any combination of the following: carbon dioxide, or sulfur dioxide, or hydrogen sulfide, or nitrogen oxides, or sulfur oxide. For example, in some embodiments, a material comprising magnesium oxide may be formed or may be produced. For example, in some embodiments, at least a portion of a material comprising magnesium oxide may be reacted with at least a portion of a gas comprising carbon dioxide in a manner to form at least a portion of a material comprising magnesium carbonate. For example, in some embodiments, at least a portion of a material comprising magnesium oxide may be reacted with at least a portion of a component comprising water to form at least a portion of component or solid or solution or slurry comprising magnesium hydroxide and/or at least a portion of said component comprising magnesium hydroxide may be reacted with a gas or fluid or component comprising carbon dioxide to form at least a portion of a component comprising magnesium carbonate. In some embodiments, at least a portion of a component comprising magnesium carbonate may be reacted to form at least a portion of carbon dioxide or captured carbon dioxide. For example, in some embodiments, at least a portion of a component comprising magnesium carbonate may be reacted with a carboxylic acid to form at least a portion of a component magnesium carboxylate and at least a portion of a component comprising carbon dioxide. For example, in some embodiments, at least a portion of a component comprising magnesium carboxylate may be reacted with a component comprising calcium sulfate to form at least a portion of a component comprising calcium carboxylate and a component comprising magnesium sulfate. For example, in some embodiments, at least a portion of a component comprising magnesium carboxylate may be reacted with a component comprising sulfur dioxide to form at least a portion of a component comprising magnesium sulfite or magnesium+sulfur dioxide and/or a component comprising carboxylic acid or carboxylic acid species. For example, in some embodiments, at least a portion of a component comprising magnesium carbonate may be reacted with a component comprising sulfur dioxide to form at least a portion of a component comprising magnesium sulfite or magnesium+sulfur dioxide and/or a component comprising carbon dioxide, such as, for example, captured carbon dioxide gas or fluid or liquid or supercritical fluid.

Some embodiments may pertain to the production of calcium oxide, or calcium hydroxide, or calcium sulfite, or calcium citrate, or calcium carboxylate, or any combination thereof. Some embodiments may pertain to the production of sulfuric acid, or sulfur dioxide, or sulfur, or any combination thereof. Some embodiments may pertain to the production of magnesium oxide, or magnesium sulfate, or magnesium hydroxide, or magnesium citrate, or magnesium carboxylate, or any combination thereof.

Some embodiments may comprise a double displacement or metathesis reaction between a salt comprising calcium sulfate and a salt comprising magnesium—'x' anion, which may form a salt comprising calcium—'x' anion and a salt comprising magnesium sulfate. In some embodiments, 'x' anion may comprise an anion which may enable or facilitate or participate in a double displacement reaction. In some embodiments, 'x' anion may comprise an anion which may enable or facilitate or participate in a double displacement reaction wherein at least a portion of 'x' anion may transfer from pairing with magnesium to pairing with calcium, or transfer from a salt comprising magnesium to a salt comprising calcium. In some embodiments, 'x' anion may form a salt with calcium which may be less soluble in water than calcium sulfate. In some embodiments, 'x' anion may form a salt with calcium which may be less soluble in water than a salt comprising 'x' anion with magnesium. In some embodiments, for example, 'x' anion may comprise, including, but not limited to, one or more or any combination of the following: sulfite, citric acid, or sulfur dioxide derivative, or bisulfite, or citrate.

In some embodiments, a salt comprising magnesium—'x' anion may be mixed with a salt comprising calcium sulfate in a solution, or solid-liquid slurry, or any combination thereof. For example, in some embodiments, magnesium—'x' anion may be at least partially dissolved in water and/or calcium sulfate may be at least a partially dissolved in water and/or the solutions may be mixed to form at least a portion of a solution comprising magnesium sulfate and/or at least a portion of a solid or solution comprising calcium—'x' anion. For example, in some embodiments, a solid or solid-liquid slurry comprising magnesium—'x' anion may be mixed with a solid or solid-liquid slurry comprising calcium sulfate. For example, in some embodiments, a solid or solid-liquid slurry comprising magnesium—'x' anion may be mixed with a solid or solid-liquid slurry comprising calcium sulfate under conditions to form at least a portion of a solid or solution or slurry comprising calcium—'x' anion and a solution comprising magnesium sulfate. For example, in some embodiments, a solid or solid-liquid slurry comprising magnesium—'x' anion may be mixed with a solid or solid-liquid slurry comprising calcium sulfate under conditions to form at least a portion of a solid comprising calcium—'x' anion and a solution comprising magnesium sulfate. For example, in some embodiments, a solid or solid-liquid slurry comprising magnesium oxide, or magnesium hydroxide, or magnesium carbonate may be mixed with a solid or solid-liquid slurry comprising calcium sulfate in the presence of or with contact or reaction with a gas or fluid or solution comprising a derivative or acid gas derivative or acidic solution derivative of 'x' anion. For example, in some embodiments, a solid or solid-liquid slurry comprising magnesium oxide, or magnesium hydroxide, or magnesium carbonate may be mixed with a solid or solid-liquid slurry comprising calcium sulfate in the presence of or with contact or reaction with a gas or fluid or solution comprising a derivative or acid gas derivative or acidic solution derivative of 'x' anion under conditions to form at least a portion of a solid comprising calcium—'x' anion and a solution comprising magnesium sulfate. In some embodiments, at least a portion of a solid comprising calcium—'x' anion may be separated from a solution comprising magnesium sulfate using, for example, a solid-liquid separation. In some embodiments, at least a portion of solid or solution comprising magnesium may be separated from at least a portion of solid comprising calcium—'x' anion by, for example, including, but not limited to, one or more or any combination of the following: rinsing, or density based separation, or centrifuge, or filtration, or chemical separation, or any combination thereof. In some embodiments, a component comprising calcium—'x' anion may comprise a valuable product. In some embodiments, a component comprising calcium—'x' anion may comprise an intermediate. In some embodiments, a component comprising calcium—'x' anion may be decomposed to form at least a portion of a component comprising calcium oxide, or calcium hydroxide, or calcium carbonate, or any combination thereof and/or a component comprising a derivative of 'x' anion, such as, for example, an acid gas derivative of 'x' anion. In some embodiments, a component comprising calcium oxide, or calcium hydroxide, or calcium carbonate, or any combination thereof may comprise a valuable product. In some embodiments, a solution comprising magnesium sulfate may comprise a valuable product. In some embodiments, a solution comprising magnesium sulfate may comprise an intermediate. In some embodiments, a solution comprising magnesium sulfate may be concentrated, or crystallized, or any combination thereof to form, for example, at least a portion of a brine comprising magnesium sulfate, or at least a portion of a solid or crystal comprising magnesium sulfate, or any combination thereof. For example, in some embodiments, a solution comprising magnesium sulfate may be concentrated or crystallized using, including, but not limited to, one or more or any combination of the following: reverse osmosis (RO), or nanofiltration (NF), or diffusion, or selective diffusion, or non-ionic selective diffusion, or electrodialysis (ED), or electro-deionization, or Ion Concentration Polarization (ICP), or membrane-based process, or forward osmosis, or high pressure reverse osmosis (HPRO), or osmotically assisted reverse osmosis, or monovalent selective electrodialysis, or ion selective separation, or vapor separation, or carrier gas separation, or carrier gas extraction, or membrane distillation, or stripping gas, or multi-effect distillation (MED), or multi-stage flash distillation (MSF), or mechanical vapor compression distillation (MVC), or extraction distillation, or conventional distillation, or column, or contactor, or membrane contactor, or countercurrent separation, or countercurrent exchange, or ion exchange, or ion exchange resin, or adsorption, or absorption, or freeze separation, or melt crystallization, or cryogenic separation, or forward osmosis (FO), or osmotically assisted reverse osmosis, or methods for separation known described herein, or methods for separation known in the art. In some embodiments, for example, a solution comprising magnesium sulfate may be separated into at least a portion of water and/or at least a portion of a solid or crystal comprising magnesium sulfate. In some embodiments, magnesium sulfate may be decomposed, for example, thermally decomposed, to form at least a portion of magnesium oxide and/or at least a portion of sulfur dioxide, or sulfur trioxide, or diatomic oxygen, or any combination thereof. In some embodiments, at least a portion of magnesium sulfate, or calcium—'x' anion, or any combination thereof may be decomposed using, for example, including, but not limited to, one or more or any combination of the following: a kiln, or a calciner, or a rotary kiln, or an direct kiln, or an indirect kiln, or a heat recovery kiln, or an energy efficient kiln, or a kiln powered by combustion, or a kiln powered by electricity, or a batch kiln, or a semi-batch kiln, or a continuous kiln, or a kiln designed to recovery at least a portion of any sulfur dioxide or sulfur trioxide or diatomic oxygen which may be formed. In some embodiments, at least a portion of a formed component comprising sulfur dioxide, or sulfur trioxide, or diatomic oxygen, or sulfur, or any combination thereof may be transformed into, for example, sulfuric acid, by, for example, a reaction with water. In some embodiments, at least a portion of a formed component comprising sulfur dioxide, or sulfur trioxide, or diatomic oxygen, or sulfur, or any combination thereof may be transformed into, for example, sulfur, by, for example, a reaction with hydrogen sulfide. In some embodiments, at least a portion of heat may be recovered from one or more or any combination of process steps. For example, in some embodiments, at least a portion of heat may be recovered from the reaction or process to form sulfuric acid from sulfur dioxide, or sulfur trioxide, or diatomic oxygen, or water, or any combination thereof, which may be exothermic. For example, in some embodiments, heat recovered from one or more process steps may be employed to at least partially supply heat to power or drive at least a portion of the separation of water from a solution comprising magnesium sulfate, or the formation of crystals or solid comprising magnesium sulfate, or the drying or dehydration of at least a portion of a solid comprising magnesium sulfate, or any combination thereof. In some embodiments, sulfuric acid, or sulfur, or any combination thereof may comprise a valuable product. In some embodiments, at least a portion of a component comprising magnesium oxide may comprise a valuable product. In some embodiments, at least a portion of a component comprising magnesium oxide may comprise an intermediate. For example, in some embodiments, at least a portion of a component comprising magnesium oxide may be reacted with water to form magnesium hydroxide. For example, in some embodiments, at least a portion of a component comprising magnesium oxide or magnesium hydroxide may be transferred to a reaction of calcium sulfate and/or 'x' anion derivative acid or acid gas. For example, in some embodiments, at least a portion of a component comprising magnesium oxide may be utilized as a productive or useful intermediate and/or a component comprising magnesium oxide may be utilized to conduct additional or auxiliary beneficial or valuable reactions, or separations, or activities, or any combination thereof which may be beneficial. For example, in some embodiments, at least a portion of a component comprising magnesium oxide or magnesium hydroxide may be reacted with a gas comprising carbon dioxide to form at least a portion of a component comprising magnesium carbonate, or magnesium bicarbonate, or any combination thereof, which may enable or comprising separating or capturing carbon dioxide. For example, in some embodiments, a component comprising magnesium carbonate may be reacted with an 'x' anion derivative acid or acid gas to form at least a portion of a component comprising magnesium—'x' anion salt and/or at least a portion of carbon dioxide. For example, in some embodiments, a component comprising magnesium carbonate may be reacted with an 'x' anion derivative acid or acid gas to form at least a portion of a component comprising magnesium—'x' anion salt and/or at least a portion of carbon dioxide, wherein at least a portion of said formed carbon dioxide may comprise captured, or high purity, or high pressure, or any combination thereof carbon dioxide. For example, in some embodiments, utilizing at least a portion of magnesium oxide or magnesium hydroxide in the separation or capturing of carbon dioxide may minimally impact the energy consumption of one or more or any combination of embodiments, while increasing the value generated or creating addition substantial commercial value for one or more or any combination of embodiments.

In some embodiments, magnesium may comprise an intermediate. For example, in some embodiments, magnesium may be employed as a carrier of sulfate. For example, in some embodiments, at least a portion of sulfate may transfer from bonding or pairing with calcium to a bonding or pairing with magnesium. For example, in some embodiments, at least a portion of sulfate may transfer from bonding or pairing with calcium to a bonding or pairing with magnesium, wherein a solid comprising magnesium sulfate may be decomposed to form a solid comprising magnesium oxide and a gas or fluid comprising sulfur dioxide, or sulfur trioxide, or diatomic oxygen, or any combination thereof, which may be reacted to form at least a portion of sulfuric acid, or sulfur, or any combination thereof. In some embodiments, a solid comprising magnesium sulfate may possess a lower decomposition temperature than a solid comprising calcium sulfate, and/or a solid comprising magnesium sulfate may require less energy to be decomposed than a solid comprising calcium sulfate, and/or the decomposition of a solid comprising magnesium sulfate may form at least a portion of a solid comprising magnesium oxide which may comprise at least a portion of a reactive form of magnesium oxide and/or non-sintered form of magnesium oxide. In some embodiments, magnesium may also be utilized as an intermediate to transfer an 'x' anion to calcium wherein the calcium 'x' anion may possess a lower decomposition temperature or energy than calcium sulfate, or a higher value than calcium sulfate, or any combination thereof. For example, in some embodiments, a calcium salt comprising an 'x' anion comprising sulfite, such as a solid comprising calcium sulfite, may possess a lower decomposition temperature than calcium sulfate and/or may be decomposed to form at least a portion of a solid comprising calcium oxide. For example, in some embodiments, a calcium salt comprising an 'x' anion comprising citrate, such as a solid comprising calcium citrate, may be more valuable than a solid comprising calcium sulfate. For example, in some embodiments, a component comprising magnesium comprising an 'x' anion comprising carbonate, or sesquicarbonate, or bicarbonate, or any combination thereof may react with a component comprising calcium sulfate to form at least a portion of a component comprising calcium carbonate, or sesquicarbonate, or bicarbonate, or any combination thereof and a component comprising magnesium sulfate.

In some embodiments, at least a portion of magnesium may be employed as an intermediate or agent in the separation or capturing of an acid gas. For example, in some embodiments, a solid or solution or slurry comprising magnesium oxide or magnesium hydroxide may be reacted with a least a portion of an acid gas, such as an acid gas comprising carbon dioxide, to form at least a portion of a solid or solution or slurry comprising magnesium carbonate, or sesquicarbonate, or bicarbonate, or any combination thereof. In some embodiments, for example, an gas or fluid or solution or material or component or any combination thereof comprising 'x' anion derivative, which may have a stronger pKa than carbonic acid, such as sulfur dioxide, or sulfurous acid, or citric acid, or a carboxylic acid, or any combination thereof, may be reacted with at least a portion of a solid or solution or slurry comprising magnesium carbonate, or sesquicarbonate, or bicarbonate, or any combination thereof to form at least a portion of a component comprising magnesium 'x'-anion and/or a gas or fluid comprising carbon dioxide, such as a component comprising carbon dioxide comprising high pressure, or high concentration, or high purity, or high partial pressure, or captured, or any combination thereof.

In some embodiments, a component comprising magnesium may comprise an input. For example, in some embodiments, a component comprising magnesium may comprise an input and/or a component comprising magnesium may comprise an output. For example, in some embodiments, a component comprising magnesium may comprise an input and/or a component comprising, for example, including, but not limited to, one or more or any combination of the following: magnesium sulfate, or magnesium sulfide, or magnesium sulfite, or magnesium chloride, or magnesium halide, or magnesium carboxylate, or magnesium citrate, or magnesium oxide, or magnesium hydroxide, or magnesium metal, or magnesium alloy, or any combination thereof may comprise an output. In some embodiments, for example, an input comprising magnesium may comprise, for example, including, but not limited to, one or more or any combination of the following: magnesium carbonate, or dolomite, or dolostone, or a mineral comprising calcium and magnesium, or magnesium oxide, or magnesium hydroxide.

In some embodiments, at least a portion of a component comprising magnesium may be separated or further separated from at least a portion of a component comprising calcium. In some embodiments, at least a portion of a component comprising calcium may be separated or further separated from at least a portion of a component comprising magnesium. For example, in some embodiments, a solid comprising calcium sulfite may further comprise a portion of magnesium sulfate, or magnesium sulfite, or magnesium hydroxide, or magnesium oxide, or any combination thereof, and/or it may be desirable to separate or further separate at least a portion of a salt comprising magnesium from a salt comprising calcium, or a salt comprising calcium from a salt comprising magnesium, or any combination thereof. For example, in some embodiments, a solution or solid or slurry or any combination thereof comprising magnesium sulfate may further comprise a portion of calcium sulfate, or calcium sulfite, or calcium hydroxide, or calcium oxide, or any combination thereof, and/or it may be desirable to separate or further separate at least a portion of a salt comprising magnesium from a salt comprising calcium, or a salt comprising calcium from a salt comprising magnesium, or any combination thereof. In some embodiments, at least a portion of impurities may be present in one or more or any combination of inputs, or reactants, or products, or intermediates, or materials, or any combination thereof and/or it may be desirable to separate at least a portion of impurities. In some embodiments, at least a portion of said separations may be conducted using, including, but not limited to, one or more or any combination of the following: separation methods described herein, or separation methods described in the art. For example, in some embodiments, at least a portion of separation may comprise, including, but not limited to, one or more or any combination of the following: rinsing, or nanofiltration, or membrane-based process, or electrodialysis, or ion exchange, or density-based separation, or particle size based separation, or filtration, or decanting, or centrifuge, or reverse osmosis, or forward osmosis, or precipitation, or freeze separation, or melt crystallization, or phase change, or solubility-based separation, or a separation described herein, or a separation in the art, any combination thereof.

In some embodiments, at least a portion of magnesium may be present in at least a portion of a component comprising calcium. In some embodiments, at least a portion of calcium may be present in a component comprising magnesium. In some embodiments, for example, the present of at least a portion of calcium in a component comprising magnesium may be tolerable or desirable in a product or output for an application. In some embodiments, for example, the present of at least a portion of magnesium in a component comprising calcium may be tolerable or desirable in a product or output for an application. For example, in some embodiments, if a component comprising calcium comprises a building material, such as calcium oxide, or calcium silicate, or calcium oxide derivative, or calcium hydroxide derivative, or cement, or concrete, the presence of a portion of magnesium may be tolerable or desirable in some applications. For example, in some embodiments, if a component comprising magnesium comprises an intermediate, the presence of a portion of calcium may be tolerable or desirable in some applications.

In some embodiments, a component comprising magnesium, or a component comprising 'x' anion derivative, or a component comprising calcium sulfate, or any combination thereof may be at least partially reacted in a manner to form at least a portion of a component comprising magnesium sulfate and/or a component comprising calcium 'x'-anion. For example, in some embodiments, the manner which a component comprising magnesium, or a component comprising 'x' anion derivative, or a component comprising calcium sulfate, or any combination thereof may be reacted may vary depending on the 'x'-anion, or the application, or the desired product attributes, or the desired process throughput, or the desired process footprint or sizing, or any combination thereof.

- For example, in some embodiments, the reaction may operate in a manner which may be batch, or semi-batch, or continuous.
- For example, in some embodiments, a component comprising magnesium may be reacted with a component comprising 'x'-anion or 'x'-anion derivative to form at least a portion of a component comprising magnesium 'x'-anion, and/or at least a portion of the component comprising magnesium 'x'-anion may be reacted with a component comprising calcium or a component comprising calcium sulfate, to form, for example, at least a portion of a component comprising calcium 'x'-anion and/or at least a portion of a component comprising magnesium sulfate.
- For example, in some embodiments, a component comprising magnesium may be mixed with a component comprising calcium or a component comprising calcium sulfate, and/or said mixture may be reacted with a component comprising 'x'-anion or 'x'-anion derivative to form, for example, at least a portion of a component comprising calcium 'x'-anion and/or at least a portion of a component comprising magnesium sulfate.
- In some embodiments, a reaction may be facilitated using, for example, including, but not limited to, a catalyst, or a solubility, or temperature, or pressure, or surfactant, or emulsifier, or a mixer, or any combination thereof. For example, in some embodiments, a solvent comprising water may comprise a facilitator. For example, in some embodiments, a solvent comprising water, or an organic solvent, or any combination thereof may comprise a facilitator. For example, in some embodiments, a component which increases the solubility, or reactivity, or any combination thereof of calcium sulfate, or magnesium 'x'-anion, or other reagent, or other chemical present, or other component present, or any combination thereof may be employed and/or may include, but may not be limited to, one or more or any combination of the following: water, or an organic solvent, or 'x'-anion derivative, or excess 'x'-anion derivative, or stoichiometric excess 'x'-anion derivative, or an 'x'-anion salt, or a salt which increases the solubility of calcium sulfate, or an acid, or a base, or a pH which increases the solubility or reactivity of calcium sulfate, or a pH adjuster which increases the solubility or reactivity of calcium sulfate, or the addition of an acidic chemical, or the addition of a basic chemical.

For example, in some embodiments, a reaction may be facilitated by providing a stoichiometric excess of 'x'-anion, or 'x'-anion derivative. For example, in some embodiments, a reaction may be facilitated by providing a stoichiometric excess of sulfur dioxide, or sulfurous acid, or any combination thereof before, or during, or after, or any combination thereof the reaction. For example, in some embodiments, a reaction may be facilitated by providing a stoichiometric excess of carboxylic acid, or citric acid, or any combination thereof before, or during, or after, or any combination thereof the reaction.

For example, in some embodiments, a reaction may be facilitated by providing a stoichiometric deficit of 'x'-anion, or 'x'-anion derivative. For example, in some embodiments, a reaction may be facilitated by providing a stoichiometric deficit of sulfur dioxide, or sulfurous acid, or any combination thereof before, or during, or after, or any combination thereof the reaction. For example, in some embodiments, a reaction may be facilitated by providing a stoichiometric deficit of carboxylic acid, or citric acid, or any combination thereof before, or during, or after, or any combination thereof the reaction.

For example, in some embodiments, at least a portion of a reaction may be facilitated electrochemically, using, for example, including, but not limited to, one or more or any combination of the following: electrodialysis, or electrodialysis metathesis, or bipolar electrodialysis, or Ion Concentration Polarization (ICP), or any combination thereof.

In some embodiments, a component comprising calcium 'x'-anion may possess a low solubility in water. For example, in some embodiments, a component comprising calcium 'x'-anion may possess a solubility in water less than the solubility of calcium sulfate.

In some embodiments, a solid comprising calcium 'x'-anion may be at least partially separated from a solution. For example, in some embodiments, a solid comprising calcium 'x'-anion may be at least partially separated from a solution using, for example, a solid-liquid separation methods, such as, including, but not limited to, one or more or any combination of the following: settling, or clarifying, or clarification, or decanting, or gravitational separation, or density based separation, or particle size based separation, or filtration, or filter press, or rotary filter, or centrifuge, or a solid-liquid separation methods described herein, or a solid-liquid separation methods known in the art.

In some embodiments, a solid comprising calcium 'x'-anion may be further separated or purified. For example, in some embodiments, at least a portion of any residual solids or solution comprising calcium sulfate, or magnesium 'x'-anion, or calcium, or magnesium, or impurities, or any combination thereof may be separated from at least a portion of the solid comprising calcium 'x'-anion. For example, in some embodiments, at least a portion of a solid comprising calcium 'x'-anion may be rinsed to remove at least a portion of, for example, any entrenched or wetted dissolved impurities, or components comprising magnesium, or any combination thereof. For example, in some embodiments, solids may be pressed, or mechanically pressed, or dried, or decomposed, or reacted, or any combination thereof.

In some embodiments, it may be desirable to handle components comprising 'x'-anions or other anions in a manner to ensure or enable high yield or beneficial operation or desirable operation. For example, in some embodiments, an 'x'-anion may comprise sulfur dioxide, or sulfurous acid, or sulfite, or bisulfite, or sesquisulfite, or a derivative thereof, or any combination thereof, which may be susceptible to or may react with diatomic oxygen under certain conditions. In some embodiments, it may be desirable to ensure the transfer and/or handling and/or operations comprising at least a portion of sulfur dioxide, or sulfurous acid, or sulfite, or bisulfite, or sesquisulfite, or a derivative thereof to be conducted in a manner which may minimize or reduce potential exposure to diatomic oxygen, or minimize or reduce potential reaction with diatomic oxygen, or any combination thereof. For example, in some embodiments, it may be desirable to employ an inert gas atmosphere, or a positive pressure inert gas atmosphere, or a closed atmosphere, or a reduced diatomic oxygen concentration atmosphere, or any combination thereof. For example, in some embodiments, an inert gas atmosphere may comprise, including, but not limited to, one or more or any combination of the following: nitrogen gas, or argon gas, or carbon dioxide, or hydrocarbon, or fluorocarbon.

In some embodiments, a component comprising calcium 'x'-anion may comprise a product. In some embodiments, a component comprising calcium 'x'-anion may comprise an intermediate.

In some embodiments, a component comprising calcium 'x'-anion may be reacted, or decomposed, or any combination thereof in a manner to produce at least a portion of a component comprising calcium oxide, or calcium hydroxide, or calcium sulfide, or calcium carbonate, or calcium silicate, or calcium aluminate, or calcium ferrite, or calcium ferrate, or cement, or clinker, or concrete, or a derivative thereof, any combination thereof and/or at least a portion of 'x'-anion, or 'x'-anion derivative, or any combination thereof.

For example, in some embodiments, a component comprising calcium 'x'-anion may be thermally decomposed to produce at least a portion of a component comprising calcium oxide, or calcium hydroxide, or calcium sulfide, or calcium carbonate, or calcium silicate, or calcium aluminate, or calcium ferrite, or calcium ferrate, or cement, or clinker, or concrete, or a derivative thereof, any combination thereof and/or at least a portion of 'x'-anion, or 'x'-anion derivative, or any combination thereof. For example, in some embodiments, thermal decomposition may be conducted using, for example, including, but not limited to, one or more or any combination of the following: a kiln, or a method for heating or thermal decomposition described herein, or a method for heating or thermal decomposition known in the art. In some embodiments, it may be desirable to dry, or dehydrate, or preheat, or any combination thereof at least a portion of the component comprising calcium 'x'-anion before or during the thermal decomposition. In some embodiments, at least a portion of a component comprising calcium oxide may be formed from the decomposition of a component comprising calcium 'x'-anion, and/or it may be desirable to react at least a portion of a component comprising calcium oxide with water to form at least a portion of a component comprising calcium hydroxide and/or heat. In some embodiments, for example, at least a portion of the dehydration or drying of at least a portion of the component comprising calcium 'x'-anion, or a component comprising magnesium sulfate, or any combination thereof before or during a thermal decomposition may be facilitated by the desiccation, or heat, or any combination thereof provided by, or enabled by, or facilitated by, or any combination thereof a reaction of a component comprising calcium oxide with a component comprising water to form at least a portion of a component comprising calcium hydroxide. In some embodiments, at least a portion of 'x'-anion or 'x'-anion derivative may form from the decomposition of at least a portion of calcium 'x'-anion. In some embodiments, at least a portion of said 'x'-anion or 'x'-anion derivative formed may be separated, or captured, or stored, or used, or reacted, or recovered, or recycled, or any combination thereof and/or at least a portion of the 'x'-anion or 'x'-anion derivative may be transferred to one or more or any combination of process steps or reactions which may employ 'x'-anion or 'x'-anion derivative in one or more or any combination of embodiments. For example, in some embodiments, a component comprising calcium 'x'-anion may comprise, for example, a component comprising calcium sulfite, wherein the 'x'-anion may comprise sulfite, and/or said component comprising calcium sulfite may be thermally decomposed to form at least a portion of a component comprising calcium oxide or a derivative thereof and/or at least a portion of a component comprising sulfur dioxide, wherein sulfur dioxide may comprise an 'x'-anion derivative. For example, in some embodiments, at least a portion of said component comprising sulfur dioxide formed from the decomposition of a component comprising calcium sulfite may be employed in a reaction with a component comprising magnesium, such as, for example. magnesium oxide, magnesium hydroxide, or magnesium carbonate, or any combination thereof, to form, for example, at least a portion of a component comprising magnesium sulfite, or magnesium bisulfite, or magnesium sesquisulfite, or magnesium+sulfur dioxide, or any combination thereof.

In some embodiments, a component comprising calcium 'x'-anion may be reacted with a component comprising an acid or acid anion which may be stronger than 'x'-anion, such as a 'y'-anion or 'y'-anion derivative, to form a component comprising calcium 'y'-anion salt and a component comprising 'x'-anion, 'x'-anion derivative, or 'x'-anion derivative acid, or any combination thereof. For example, in some embodiments, a component comprising calcium 'x'-anion may comprise calcium carbonate, wherein the 'x'-anion may comprise carbonate, or carbon dioxide, or a derivative thereof, and the 'y'-anion may comprise a carboxylic acid, or a carboxylate, or a sulfurous acid, or sulfur dioxide, or any combination thereof, wherein, for example, the reaction may form at least a portion of a component comprising calcium 'y'-anion comprising a component comprising calcium carboxylate, or calcium citrate, or calcium sulfite, or any combination thereof and/or an 'x'-anion derivative comprising carbon dioxide or captured carbon dioxide. For example, in some embodiments, a component comprising calcium 'x'-anion may comprise calcium citrate, wherein the 'x'-anion may comprise citrate or citric acid, or a derivative thereof, and the 'y'-anion may comprise sulfurous acid, or sulfur dioxide, or sulfite, or bisulfite, or sesquisulfite, or any combination thereof, wherein, for example, the reaction may form at least a portion of a component comprising calcium 'y'-anion comprising a component comprising calcium sulfite, or calcium bisulfite, or calcium sesquisulfite, or any combination thereof and/or an 'x'-anion derivative comprising citric acid or citrate. In some embodiments, the component comprising calcium 'y'-anion salt may be at least partially separated and/or decomposed to form, for example, including, but not limited to, one or more or any combination of the following: calcium oxide, or calcium hydroxide, or calcium sulfide, or calcium carbonate, or calcium silicate, or calcium aluminate, or calcium ferrite, or calcium ferrate, or cement, or clinker, or concrete, or a derivative thereof. In some embodiments, for example, the decomposition of at least a portion of a component comprising calcium 'y'-anion salt may form at least a portion of 'y'-anion or 'y'-anion derivative, such as, for example, sulfur dioxide, or sulfurous acid, or a derivative thereof. In some embodiments, for example, at least a portion of said 'y'-anion or 'y'-anion derivative may be recycled, or reused, or recirculated, or transferred, or employed, or any combination thereof to a reaction step or process step which may employ 'y'-anion or 'y'-anion derivative. In some embodiments, for example, at least a portion of said 'x'-anion or 'x'-anion derivative may be recycled, or reused, or recirculated, or transferred, or employed, or any combination thereof to a reaction step or process step which may employ 'x'-anion or 'x'-anion derivative.

In some embodiments, at least a portion of a component comprising magnesium sulfate may be at least partially separated. In some embodiments, a component comprising magnesium sulfate may comprise a product. In some embodiments, a component comprising magnesium sulfate may comprise an intermediate. In some embodiments, for example, a solution comprising magnesium sulfate may be separated to form at least a portion of a solid comprising magnesium sulfate and a solution or liquid or fluid comprising water. For example, in some embodiments, separating at least a portion of a component comprising magnesium sulfate may be conducted in one or more steps, or multiple steps, or any combination thereof, if desired, and/or may employ one or more or any combination of separation methods described herein, or separation methods described in the art, or any combination thereof. For example, in some embodiments, a solution comprising magnesium sulfate may be concentrated using, for example, including, but not limited to, one or more or any combination of the following: nanofiltration, or reverse osmosis, or high pressure nanofiltration, or high pressure reverse osmosis, or osmotically assisted reverse osmosis, or forward osmosis, or any combination thereof to a concentration of, for example, at least one or more or any combination of the following: 25 g/L, or 50 g/L, or 75 g/L, or 100 g/L, or 125 g/L, or 150 g/L, or 175 g/L, or 200 g/L. For example, in some embodiments, a concentrated solution comprising magnesium sulfate may be further concentrated and/or crystallized using, for example, including, but not limited to, one or more or any combination of the following: distillation, or MVC distillation, or MED distillation, or freeze separation, or MSF distillation, or membrane distillation, or crystallizer, or drying, or dehydrator, or a separation method described herein, or a separation method known in the art. In some embodiments, a solid comprising magnesium sulfate may be at least partially separated using, for example, a solid-liquid separation method, and/or may be further separated using, for example, including, but not limited to, one or more or any combination of the following: a filter press, or drier, or stripping gas, or desiccant, or heating, or dehydrator, or separation method described herein, or separation method known in the art.

In some embodiments, a solid comprising magnesium sulfate may be reacted to form a new chemical.

In some embodiments, a solid comprising magnesium sulfate may be thermally decomposed to form at least a portion of a component comprising magnesium oxide or a derivative of magnesium oxide and/or at least a portion of a component comprising sulfur dioxide, or sulfur trioxide, or diatomic oxygen, or sulfuric acid, or a derivative thereof. In some embodiments, at least a portion of a component comprising magnesium oxide may be formed from the decomposition of a component comprising magnesium sulfate, and/or it may be desirable to react at least a portion of a component comprising magnesium oxide with water to form at least a portion of a component comprising magnesium hydroxide and/or heat. In some embodiments, for example, at least a portion of the dehydration or drying of at least a portion of the component comprising magnesium sulfate, or calcium 'x'-anion, or any combination thereof before or during the thermal decomposition may be facilitated by the desiccation, or heat, or any combination thereof provided by, or enabled by, or facilitated by, or any combination thereof a reaction of a component comprising magnesium oxide with a component comprising water to form at least a portion of a component comprising magnesium hydroxide. In some embodiments, a component comprising magnesium oxide, or magnesium hydroxide, or any combination thereof may comprise a product. In some embodiments, a component comprising magnesium oxide, or magnesium hydroxide, or any combination thereof may comprise an intermediate. In some embodiments, at least a portion of a component comprising magnesium oxide, or magnesium hydroxide, or any combination thereof may be transferred to a reaction with 'x'-anion, or 'x'-anion derivative, or any combination thereof to form at least a portion of a component comprising magnesium 'x'-anion.

In some embodiments, a component comprising magnesium oxide, or magnesium hydroxide, or any combination thereof may be reacted with a fluid or component comprising an acid gas, such as, including, but not limited to, one or more or any combination of the following: carbon dioxide, or hydrogen sulfite, or sulfur dioxide, or other acid gas described herein, or other acid gas known in the art. For example, in some embodiments, said acid gas may comprise an 'x'-anion, or an 'x'-anion derivative, or any combination thereof. For example, in some embodiments, component comprising magnesium oxide, or magnesium hydroxide, or any combination thereof may be reacted with a fluid or component comprising an acid gas and/or may form at least a portion of a component comprising magnesium-acid gas anion. For example, in some embodiments, a component comprising magnesium-acid gas anion may comprise magnesium 'x'-anion. For example, in some embodiments, a component comprising magnesium—acid gas anion may be reacted with a component comprising 'x'-anion or 'x'-anion derivative to form at least a portion of a component comprising magnesium 'x'-anion and an acid gas, wherein the acid gas may comprise captured, or high partial pressure, or high purity acid gas, if desired. For example, in some embodiments, a component comprising magnesium-acid gas anion may be reacted with a component comprising 'x'-anion or 'x'-anion derivative to form at least a portion of a component comprising magnesium 'x'-anion and an acid gas, wherein the 'x'-anion derivative may comprise a pKa or acid strength stronger than the acid gas. For example, in some embodiments, an acid gas comprising carbon dioxide may be reacted with a component comprising magnesium hydroxide, which may form a component comprising magnesium carbonate, or magnesium bicarbonate, or magnesium sesquicarbonate, or any combination thereof and/or at least a portion of said component comprising magnesium carbonate, or magnesium bicarbonate, or magnesium sesquicarbonate, or any combination thereof may be reacted with an 'x'-anion or 'x'-anion derivative comprising a carboxylic acid, or sulfur dioxide, or a derivative thereof, or any combination thereof to form at least a portion of a component comprising magnesium carboxylate, or magnesium citrate, or magnesium sulfite, or magnesium bisulfite, or carboxylic acid, or magnesium sesquisulfite, or any combination thereof and/or a component comprising carbon dioxide comprising captured carbon dioxide, or high partial pressure carbon dioxide, or relatively high partial pressure carbon dioxide, or a gas stream comprising a partial pressure of carbon dioxide greater than the partial pressure of carbon dioxide in a feed stream or original stream, or high purity carbon dioxide, or any combination thereof.

In some embodiments, at least a portion of a component comprising magnesium sulfate may be decomposed to form at least a portion of a component comprising sulfur dioxide, or sulfur trioxide, or diatomic oxygen, or any combination thereof and/or it may be desirable to react at least a portion of said component comprising sulfur dioxide, or sulfur trioxide, or diatomic oxygen, or any combination thereof to form at least a portion of, for example, a component comprising sulfuric acid. For example, in some embodiments, a component comprising sulfur dioxide, or sulfur trioxide, or diatomic oxygen, or any combination thereof may be reacted in a manner to form sulfur trioxide and/or may be reacted with water in a manner to form at least a portion of sulfuric acid, or hydrogen, or any combination thereof. In some embodiments, for example, at least a portion of a component comprising sulfur dioxide may be reacted with at least a portion of a component comprising hydrogen sulfide to form at least a portion of a component comprising sulfur. In some embodiments, a component comprising sulfuric acid, or hydrogen, or sulfur, or any combination thereof may comprise a product. In some embodiments, a component comprising sulfuric acid, or hydrogen, or sulfur, or any combination thereof may comprise an intermediate. In some embodiments, the production of at least a portion of sulfuric acid may generate at least a portion of heat and/or at least a portion of said heat may be employed in one or more or any combination of process steps employing heat in one or more or any combination of embodiments, or may be stored, or said heat may be employed in a different process or application, or any combination thereof.

In some embodiments, one or more or any combination of process steps or reactions may generate at least a portion of heat and/or at least a portion of said heat may be employed in one or more or any combination of process steps employing heat in one or more or any combination of embodiments, or said heat may be employed in a different process or application, or any combination thereof.

In some embodiments, sulfur dioxide or a derivative thereof may comprise an example 'x'-anion. For example, in some embodiments, the manner which a reaction comprising magnesium, or sulfur dioxide, or calcium, or sulfate, or a derivative thereof, or any combination thereof may be conducted may vary depending on, for example, the conditions, the desired yield, the desired footprint, the desired operating mode, or other objectives, or any combination thereof.

In some embodiments, a wide range of reactors or reaction configurations may be suitable. For example, in some embodiments, a reactor may be configured to operate in a batch, or semi-batch, or continuous, or any combination thereof operating mode. For example, in some embodiments, a reactor or reaction step may be configured with multiple stages, or may comprise a cascading reactor, or any combination thereof.

In some embodiments, a component comprising magnesium may be mixed with a solution comprising water prior to, or during, or after, or any combination thereof mixing with a component comprising calcium. In some embodiments, a component comprising magnesium may be mixed with a solution comprising water prior to, or during, or after, or any combination thereof mixing with a component comprising 'x' anion. In some embodiments, a component comprising magnesium may be mixed with a component comprising 'x' anion prior to, or during, or after, or any combination thereof mixing with a component comprising water. In some embodiments, a component comprising magnesium may be mixed with a component comprising calcium prior to, or during, or after, or any combination thereof mixing with a component comprising 'x' anion.

In some embodiments, a component comprising calcium may be mixed with a solution comprising water prior to, or during, or after, or any combination thereof mixing with a component comprising magnesium. In some embodiments, a component comprising calcium may be mixed with a solution comprising water prior to, or during, or after, or any combination thereof mixing with a component comprising 'x' anion. In some embodiments, a component comprising calcium may be mixed with a component comprising 'x' anion prior to, or during, or after, or any combination thereof mixing with a component comprising water. In some embodiments, a component comprising calcium may be mixed with a component comprising magnesium prior to, or during, or after, or any combination thereof mixing with a component comprising 'x'-anion.

In some embodiments, for example, a solution or slurry comprising magnesium may be formed and a solution or slurry comprising calcium may be formed, and/or the solution or slurry comprising magnesium and/or the solution or slurry comprising calcium may be mixed. In some embodiments, for example, a solution or slurry comprising magnesium hydroxide may be formed and a solution or slurry comprising calcium sulfate may be formed, and/or the solution or slurry comprising magnesium and/or the solution or slurry comprising calcium may be mixed, and/or at least a portion of sulfur dioxide, or sulfurous acid, or sulfite, or bisulfite, or sesquisulfite, or any combination thereof may be added or may be present, which may enable or facilitate a reaction. In some embodiments, for example, a solution or slurry comprising magnesium+sulfur dioxide salt may be formed and a solution or slurry comprising calcium sulfate may be formed, and/or the solution or slurry comprising magnesium+sulfur dioxide salt and/or the solution or slurry comprising calcium may be mixed. In some embodiments, for example, a solution or slurry comprising magnesium+ sulfur dioxide salt may be formed and a solution or slurry comprising calcium sulfate may be formed, and/or the solution or slurry comprising magnesium+sulfur dioxide salt and/or the solution or slurry comprising calcium may be mixed, and/or additional sulfur dioxide or a derivative thereof may be added during the reaction.

In some embodiments, a solid or slurry or solution comprising magnesium oxide or magnesium hydroxide, or a solid or slurry or solution comprising calcium sulfate, or a component comprising sulfur dioxide or a derivative of sulfur dioxide, or a component comprising water, or any combination thereof may be mixed. In some embodiments, a solid or slurry or solution comprising magnesium+sulfur dioxide, or a solid or slurry or solution comprising calcium sulfate, or a component comprising sulfur dioxide or a derivative of sulfur dioxide, or a component comprising water, or any combination thereof may be mixed. In some embodiments, a solid or slurry or solution comprising magnesium+carbon dioxide, or a solid or slurry or solution comprising calcium sulfate, or a component comprising sulfur dioxide or a derivative of sulfur dioxide, or a component comprising water, or any combination thereof may be mixed.

In some embodiments, a reactor may be configured to remove or separate at least a portion of reaction product solids, which may comprise at least a portion of sulfite, or calcium sulfite, or sulfur dioxide, or a derivative thereof, or any combination thereof, and/or at least a portion of any reaction product solution, which may comprise at least a portion of sulfate, or magnesium sulfate, or a derivative thereof, or any combination thereof. In some embodiments, removal or separation may be at least partially continuous. In some embodiments, removal or separation may be at least partially batch.

In some embodiments, a solution or slurry comprising magnesium may be formed and a solution or slurry comprising calcium may be formed, and/or the solution or slurry comprising magnesium and/or the solution or slurry comprising calcium may be mixed.

In some embodiments, a component comprising magnesium oxide or magnesium hydroxide may be mixed with a solution comprising water to form a solid-liquid slurry. In some embodiments, a component comprising magnesium oxide or magnesium hydroxide may be mixed with a solution comprising water to form a solid-liquid slurry, and/or a component comprising sulfur dioxide may be reacted with the solution or slurry to form at least a portion of magnesium sulfite, or magnesium sesquisulfite, or magnesium bisulfite, or magnesium+sulfur dioxide, or any combination thereof. In some embodiments, a component comprising magnesium oxide or magnesium hydroxide may be mixed with a solution or component comprising sulfur dioxide to form at least a portion of magnesium sulfite, or magnesium sesquisulfite, or magnesium bisulfite, or magnesium+sulfur dioxide, or any combination thereof.

In some embodiments, a component comprising magnesium carbonate, or magnesium sesquicarbonate, or magnesium bicarbonate, or any combination thereof may be mixed with a solution comprising water to form a solution, or solid, or slurry, or any combination thereof to form a solid-liquid slurry. In some embodiments, a component comprising magnesium carbonate, or magnesium sesquicarbonate, or magnesium bicarbonate, or any combination thereof may be mixed with a solution comprising water to form a solid-liquid slurry, and/or a component comprising sulfur dioxide may be reacted with the solution or slurry to form at least a portion of magnesium sulfite, or magnesium sesquisulfite, or magnesium bisulfite, or magnesium+sulfur dioxide, or any combination thereof and/or at least a portion of a component comprising carbon dioxide which may comprise captured carbon dioxide. In some embodiments, a component comprising magnesium carbonate, or magnesium sesquicarbonate, or magnesium bicarbonate, or any combination thereof may be mixed with a solution or component comprising sulfur dioxide to form at least a portion of magnesium sulfite, or magnesium sesquisulfite, or magnesium bisulfite, or magnesium+sulfur dioxide, or any combination thereof and/or at least a portion of a component comprising carbon dioxide which may comprise captured carbon dioxide.

In some embodiments, a solid comprising calcium may be added to a solution or slurry comprising magnesium. In some embodiments, a solid comprising magnesium may be added to a solution or slurry comprising calcium.

In some embodiments, a solid comprising calcium, a solid comprising magnesium may be mixed with a solution comprising water, and/or a component comprising x-anion derivative acid or acid gas may be added to the solution or slurry. In some embodiments, a solid comprising calcium, a solid comprising magnesium may be mixed with a solution comprising x-anion derivative acid or dissolved acid gas. In some embodiments, at least a portion of x-anion derivative acid may be added during the mixing or reaction.

In some embodiments, a reactor may be configured to minimize or reduce potential exposure or reaction of sulfur dioxide, or sulfite, or bisulfite, or sesquisulfite, or sulfurous acid, or any combination thereof with oxygen, or diatomic oxygen, or any combination thereof. For example, in some embodiments, an atmosphere comprising an inert gas may be employed, or a reduced oxygen atmosphere, or other methods described herein, or other methods described in the art, or any combination thereof may be employed In some embodiments, a reaction or reactor or process may be configured to achieve optimal or desired products, or yields, or kinetics, or any combination thereof. In some embodiments, one or more or any combination of factors may influence optimal or desired results, and/or may include, but are not limited to, one or more or any combination of the following: molar ratio of reagents, or the molar ratio of products, or the presence products in the reactants, or the temperature, or concentration, or pressure, or sequence of reactions, or mixing rate, or residence time, or mixing design, or reactor design, or number of reactor stages, or type of reactor stages, or presence of other reagents, or presence of catalysts, or molar ratio of magnesium:x-anion, or the composition or state of x-anion, or molar ratio of magnesium:calcium, or molar ratio of magnesium:sulfate, or molar ratio of calcium:x-anion, or the molar ratio of water to other reagents or products, or the concentration of calcium sulfate, or the concentration of x-anion species, or the pH, or the concentration of magnesium species, or the concentration of calcium species, or the concentration of other species, or the concentration of other ions, or the rate of separation of solids, or the separation techniques employed to separate solids, or the rate of separation of liquids, or the separation techniques employed to separate liquids.

For example, in some embodiments, it may be desirable to employ a molar ratio of x-anion:magnesium less than, or greater than, or equal to, one or more or any combination of the following:

For example, in some embodiments, it may be desirable to employ a molar ratio of x-anion to calcium less than, or greater than, or equal to, one or more or any combination of the following: 0.01:1, or 0.05:1, or 0.1:1, or 0.15:1, or 0.2:1, or 0.3:1, or 0.4:1, or 0.5:1, or 0.6:1, or 0.7:1, or 0.8:1, or 0.9:1, or 1:1, or 1.1:1, or 1.2:1, or 1.3:1, or 1.4:1, or 1.5:1, or 1.6:1, or 1.7:1, or 1.8:1, or 1.9:1, or 2:1, or 2.25:1, or 2.5:1, or 2.75:1, or 3:1, or 3.25:1, or 3.5:1, or 3.75:1, or 4:1, or 5:1, or 6:1, or 7:1, or 8:1, or 9:1, or 10:1.

For example, in some embodiments, it may be desirable to employ a molar ratio of magnesium to calcium less than, or greater than, or equal to, one or more or any combination of the following: 0.01:1, or 0.05:1, or 0.1:1, or 0.15:1, or 0.2:1, or 0.3:1, or 0.4:1, or 0.5:1, or 0.6:1, or 0.7:1, or 0.8:1, or 0.9:1, or 1:1, or 1.1:1, or 1.2:1, or 1.3:1, or 1.4:1, or 1.5:1, or 1.6:1, or 1.7:1, or 1.8:1, or 1.9:1, or 2:1, or 2.25:1, or 2.5:1, or 2.75:1, or 3:1, or 3.25:1, or 3.5:1, or 3.75:1, or 4:1, or 5:1, or 6:1, or 7:1, or 8:1, or 9:1, or 10:1.

For example, in some embodiments, it may be desirable to employ a molar ratio of magnesium to sulfate less than, or greater than, or equal to, one or more or any combination of the following: 0.01:1, or 0.05:1, or 0.1:1, or 0.15:1, or 0.2:1, or 0.3:1, or 0.4:1, or 0.5:1, or 0.6:1, or 0.7:1, or 0.8:1, or 0.9:1, or 1:1, or 1.1:1, or 1.2:1, or 1.3:1, or 1.4:1, or 1.5:1, or 1.6:1, or 1.7:1, or 1.8:1, or 1.9:1, or 2:1, or 2.25:1, or 2.5:1, or 2.75:1, or 3:1, or 3.25:1, or 3.5:1, or 3.75:1, or 4:1, or 5:1, or 6:1, or 7:1, or 8:1, or 9:1, or 10:1.

For example, in some embodiments, it may be desirable to employ a molar ratio of calcium to sulfate less than, or greater than, or equal to, one or more or any combination of the following: 0.01:1, or 0.05:1, or 0.1:1, or 0.15:1, or 0.2:1, or 0.3:1, or 0.4:1, or 0.5:1, or 0.6:1, or 0.7:1, or 0.8:1, or 0.9:1, or 1:1, or 1.1:1, or 1.2:1, or 1.3:1, or 1.4:1, or 1.5:1, or 1.6:1, or 1.7:1, or 1.8:1, or 1.9:1, or 2:1, or 2.25:1, or 2.5:1, or 2.75:1, or 3:1, or 3.25:1, or 3.5:1, or 3.75:1, or 4:1, or 5:1, or 6:1, or 7:1, or 8:1, or 9:1, or 10:1.

In some embodiments, citric acid or a derivative thereof may comprise an example 'x'-anion. For example, in some embodiments, the manner which a reaction comprising magnesium, or citric acid, or calcium, or sulfate, or a derivative thereof, or any combination thereof may be conducted may vary depending on, for example, the conditions, the desired yield, the desired footprint, the desired operating mode, or other objectives, or any combination thereof.

In some embodiments, for example, the solubility of magnesium citrate may be significantly greater than the solubility of magnesium sulfite, which may enable a wider range of potential concentrations, or molar ratios, or any combination thereof. In some embodiments, for example, calcium citrate may possess a low solubility in water and/or may comprise a solubility in water less than the solubility in water of some forms of calcium sulfate.

In some embodiments, at least a portion of a component comprising magnesium sulfate may be separated from at least a portion of a component comprising magnesium citrate using, for example nanofiltration due to, for example, the potentially significant difference in molecular weight and valence or charge or hydration radius between the salts, or ions, or any combination thereof.

In some embodiments, a component comprising calcium citrate may comprise a product. In some embodiments, a component comprising calcium citrate may comprise an intermediate.

For example, in some embodiments, a component comprising calcium citrate may be reacted with a component comprising sulfur dioxide or a derivative thereof to form at least a portion of a component comprising calcium sulfite and/or a component comprising citric acid. In some embodiments, a component comprising citric acid may be recycled or reused within the process or process step. In some embodiments, a component comprising calcium sulfite may be decomposed to form at least a portion of calcium oxide, or calcium sulfide, or sulfur dioxide, or calcium sulfate, or calcium hydroxide, or cement, or clinker, or calcium silicate, or calcium ferrite, or other component comprising calcium, or a derivative thereof, or any combination thereof.

In some embodiments, a mixture comprising magnesium oxide, or magnesium hydroxide, or magnesium carboxylate, or magnesium citrate, or citric acid, or carboxylic acid, or calcium sulfate, or water, or any combination thereof may be reacted with at least a portion of sulfur dioxide, or sulfurous acid, or sulfite, or bisulfite, or a derivative thereof, or any combination thereof to form, for example, at least a portion of a component comprising magnesium sulfate and at least a portion of a component comprising calcium sulfite. In some embodiments, carboxylic acid or carboxylate, such as the citric acid or citrate, may function as an intermediate or catalyst which may facilitate the reaction. In some embodiments, at least a portion of the carboxylic acid, or citric acid, or carboxylate, or citrate, or a derivative thereof, or any combination thereof may be recovered or removed. For example, in some embodiments, lower pH or acidic pH may enable or facilitate the reaction. For example, in some embodiments, higher pH or basic pH may enable or facilitate the reaction. For example, in some embodiments, neutral may enable or facilitate the reaction. For example, other catalysts, or intermediates, or facilitators, or any combination thereof may be employed. For example, other catalysts, or intermediates, or facilitators, or any combination thereof may be employed, which may include, but may not be limited to, one or more or any combination of the following: acids, or bases, anions, or cations, or inorganic chemicals, or organic chemicals, or organic solvents, or complex ions, or complexes, or transition metals cations, or transition metal salts, or alkali metal catalysts, or alkali metal cations, or an alkaline earth, or an alkaline earth oxide, or an alkaline earth hydroxide, or an alkaline earth salt, or a halogen, or a halogenated compound, or nitrogenous compounds, or oxygenated compounds, or phosphorous compounds, or sulfurous compounds, or carbonaceous compounds, or hydrogenous compounds, or polymers, or solids, or liquids, or emulsions, or solid-liquid mixtures, or fluids, or gases, or plasma, or heat, or light, or phase transition, or freezing, or melting, or vapor.

FIGURE DESCRIPTIONS

FIG. 1 Description:

FIG. 1 may show a process to produce a component comprising sodium hydroxide from a component comprising sodium sulfate. In some embodiments, a component comprising a calcium-weak acid anion (WA) may comprise an input and/or a component comprising calcium sulfate may comprise an output and/or a component comprising a weak acid anion derivative may comprise an output.

In some embodiments, the component comprising calcium sulfate may be transferred to further reactions or processing to form, for example, a component comprising, including, but not limited to, one or more or any combination of the following: calcium oxide, or calcium sulfide, or calcium hydroxide, or calcium carbonate, or Ca(WA), or sulfur dioxide, or sulfuric acid, or hydrogen sulfide, or sulfur, or sulfur trioxide, or diatomic oxygen, or a sulfur compound, or a derivative thereof, or any combination thereof.

In some embodiments, a component comprising sodium+sulfur dioxide species may be at least a partially separated from a component comprising carboxylic acid, such as acetic acid or acetate, using, for example, including, but not limited to, one or more or any combination of the following: reverse osmosis, or nanofiltration, or electrodialysis, or monovalent selective electrodialysis, or forward osmosis, or osmotically assisted reverse osmosis, or high pressure reverse osmosis, or a membrane based process, or a derivative thereof, or any combination thereof. In some embodiments, a component comprising carboxylic acid, such as acetic acid or acetate, may be at least a partially separated from a component comprising sodium+sulfur dioxide species using, for example, including, but not limited to, one or more or any combination of the following: reverse osmosis, or nanofiltration, or electrodialysis, or monovalent selective electrodialysis, or forward osmosis, or osmotically assisted reverse osmosis, or high pressure reverse osmosis, or a membrane based process, or a derivative thereof, or any combination thereof. In some embodiments, a component comprising sodium+sulfur dioxide species may comprise, including, but not limited to, one or more or any combination of the following: sodium, or alkali, or sulfur dioxide, or sulfurous acid, or sulfite, or bisulfite, or metabisulfite, or aqueous sulfur dioxide, or a derivative thereof, or any combination thereof.

FIG. 2 Description:

FIG. 2 may show a process to produce a component comprising calcium oxide, or calcium hydroxide, or a derivative thereof and/or a component comprising sulfur dioxide or sulfuric acid or a derivative thereof from, for example, a component comprising calcium sulfate. In some embodiments, a component comprising an alkaline earth other than calcium, such as an alkaline earth comprising magnesium, may be employed as an intermediate to enable or facilitate the process. For example, in some embodiments, magnesium sulfate may be capable of thermally decomposition into, for example, an alkaline earth oxide or sulfur dioxide, at more reasonable temperatures, such as less than 1,600° C., or 1,500° C., or 1,400° C., or 1,300° C., or 1,200° C., or 1,100° C., or 1,000° C., or 900° C., than the thermal decomposition temperature of calcium sulfate. For example, in some embodiments, a component comprising an alkaline earth other than calcium, such as magnesium, and an anion may be reacted in a manner to form at least a portion of a component comprising magnesium sulfate and/or a component comprising calcium-anion. For example, in some embodiments, a component comprising an alkaline earth other than calcium, such as magnesium, and an anion other than sulfate, such as sulfite or citrate, may be reacted in a manner to form at least a portion of a component comprising magnesium sulfate and/or a component comprising calcium-anion. In some embodiments, it may be desirable for the component comprising calcium-anion to comprise a chemical which may be less energetically consuming, or simpler, or less $CO_2$ emissions, or easier, or any combination thereof to convert into, or transform into, or comprise, or any combination thereof more valuable or useful alkaline earth chemicals than, for example, calcium sulfate. For example, in some embodiments, a component comprising calcium-anion may comprise calcium sulfite, wherein calcium sulfite may be capable of being thermally decomposed to form at least a portion of, for example, calcium oxide and/or sulfur dioxide.

FIG. 3 Description:

FIG. 3 may show a process to produce a component comprising sodium hydroxide, and/or a component comprising calcium oxide or calcium hydroxide, and/or a component comprising sulfuric acid or sulfur dioxide, or any combination thereof, from, for example, a component comprising sodium sulfate and/or a component comprising calcium weak acid anion and/or a component comprising water.

In some embodiments, a process for producing a component comprising sodium hydroxide from a component comprising sodium sulfate may produce a co-product comprising a component comprising calcium sulfate. In some embodiments, such as, for example, FIG. 3, at least a portion of the component comprising calcium sulfate may be at least partially reacted to form, for example, a component comprising calcium oxide or calcium hydroxide, and/or a component comprising sulfuric acid. For example, in some embodiments, FIG. 3 may show a process employing intermediates comprising magnesium to facilitate or enable the conversion of at least a portion of a component comprising calcium sulfate into at least a portion of a component comprising calcium oxide, or calcium hydroxide, or a derivative thereof, and/or sulfur dioxide, or sulfuric acid, or sulfurous acid, or a derivative thereof, or any combination thereof.

In some embodiments, such as, for example, FIG. 3, a component comprising Ca(WA) may comprise an input. For example, a component comprising Ca(WA) may comprise, including, but not limited to, one or more or any combination of the following: calcium carbonate, or calcium sulfide, or calcium silicate, or calcium oxide, or calcium hydroxide, or other Ca(WA) described herein, or other Ca(WA) in the art. For example, a component comprising WA may comprise, including, but not limited to, one or more or any combination of the following: carbon dioxide, or captured carbon dioxide, or hydrogen sulfide, or silicon dioxide, or water, or other weak acid derivative, or other weak acid derivative described herein, or weak acid or weak acid derivative in the art.

Example Embodiments

A process comprising:
  Reacting a component comprising a first alkaline earth weak acid with a component comprising an acid to form a component comprising a weak acid derivative and a component comprising a first alkaline earth acid anion;
  Reacting the component comprising the first alkaline earth acid anion with a component comprising an alkali sulfate to form a component comprising an alkali acid anion and a component comprising a first alkaline earth sulfate;
  Reacting the component comprising a first alkaline earth sulfate with a component comprising a second alkaline earth sulfite, or bisulfite, or any combination thereof to form at least a portion of a component comprising a first alkaline earth sulfite and a component comprising a second alkaline earth sulfate;
  Decomposing the component comprising a first alkaline earth sulfite to form a component comprising an alkaline earth oxide and a component comprising sulfur dioxide; and
  Decomposing the component comprising the second alkaline earth sulfate to form a component comprising an alkaline earth oxide and a component comprising sulfur dioxide, or sulfur trioxide, or oxygen, or sulfuric acid, or any combination thereof.

The process of embodiment_wherein the first alkaline earth comprises calcium.

The process of embodiment_wherein the second alkaline earth comprises magnesium.

A process comprising:
  Reacting a component comprising a first alkaline earth weak acid with a component comprising an acid to form a component comprising a weak acid derivative and a component comprising a first alkaline earth acid anion;
  Reacting the component comprising the first alkaline earth acid anion with a component comprising an alkali sulfate to form a component comprising an alkali acid anion and a component comprising a first alkaline earth sulfate;
  Reacting the component comprising a first alkaline earth sulfate with a component comprising a second alkaline earth citrate to form at least a portion of a component comprising a first alkaline earth citrate and a component comprising a second alkaline earth sulfate;
  Reacting the component comprising a first alkaline earth citrate with a component comprising sulfur dioxide to form at least a portion of a component comprising a first alkaline earth sulfite and a component comprising citric acid;
  Decomposing the component comprising a first alkaline earth sulfite to form a component comprising an alkaline earth oxide and a component comprising sulfur dioxide; and
  Decomposing the component comprising the second alkaline earth sulfate to form a component comprising an alkaline earth oxide and a component comprising sulfur dioxide, or sulfur trioxide, or oxygen, or sulfuric acid, or any combination thereof.

A process comprising:
  Reacting a component comprising calcium carbonate, or calcium sulfide, or any combination thereof with a component comprising acetic acid to form a component comprising a carbon dioxide, or hydrogen sulfide, or any combination thereof and a component comprising a calcium acetate;
  Reacting the component comprising the calcium acetate with a component comprising sodium sulfate to form a component comprising sodium acetate and a component comprising calcium sulfate;
  Reacting the component comprising a calcium sulfate with a component comprising a magnesium sulfite, or bisulfite, or any combination thereof to form at least a portion of a component comprising a calcium sulfite and a component comprising a magnesium sulfate;
  Decomposing the component comprising a calcium sulfite to form a component comprising an calcium oxide and a component comprising sulfur dioxide; and
  Decomposing the component comprising the magnesium sulfate to form a component comprising a magnesium oxide and a component comprising sulfur dioxide, or sulfur trioxide, or oxygen, or sulfuric acid, or any combination thereof.

FIG. 4 Description:

FIG. 4 may be similar to FIG. 3, except at least a portion of a component comprising calcium oxide or calcium hydroxide, which may be formed from at least a portion of a component comprising calcium sulfate, may be employed in a reaction with a component comprising an acid or acid anion, such as a carboxylic acid, such as acetic acid. For example, in some embodiments, such as in FIG. 4, calcium may be employed as an intermediate which may enable or facilitate the transfer of sulfate from sodium and/or form a component comprising sulfuric acid, or sulfur dioxide, or a derivative thereof. For example, in some embodiments, employing a component comprising calcium oxide, or calcium hydroxide, or a derivative thereof which may be at least partially generated or produced within or by the process may decrease to potential production of carbon dioxide and/or may decrease the potential for byproducts or waste and/or may decrease the amount of net feedstock or input consumption per ton of product.

Example Embodiments

The process of example embodiment_wherein the first alkaline earth oxide is transferred to the reaction of a first alkaline earth weak acid with an acid, wherein the alkaline earth oxide may comprise the first alkaline earth weak acid.

The process of example_embodiment wherein the first alkaline earth oxide may be at least partially employed in the reaction of the first alkaline earth weak acid with an acid, wherein the alkaline earth oxide may comprise the first alkaline earth weak acid.

The process of example embodiment_wherein at least a portion of the component comprising calcium oxide, or calcium hydroxide, or calcium carbonate, or calcium sulfide, or any combination thereof comprises at least a portion of a component formed from calcium sulfate.

The process of example embodiment_wherein at least a portion of the component comprising calcium oxide, or calcium hydroxide, or calcium carbonate, or calcium sulfide, or any combination thereof comprises at least a portion of a component formed from calcium sulfate and/or a component regenerated within the process.

The process of example embodiment_wherein the weak acid or weak acid derivative comprises water.

FIG. 5 Description:

FIG. 5 may be similar to FIG. 4, except at least a portion of a component comprising calcium oxide or calcium hydroxide, which may be formed from at least a portion of a component comprising calcium sulfate, may be employed in $CO_2$ capture, such as in a reaction with carbon dioxide or a derivative thereof. For example, in some embodiments, at least a portion of a component comprising calcium oxide or calcium hydroxide may be reacted with a component comprising carbon dioxide to form, for example, at least a portion of a component comprising calcium carbonate. For example, in some embodiments, a component comprising calcium oxide, or calcium hydroxide, or milk of lime, or any combination thereof may be highly reactive with carbon dioxide and/or may be capable of removing or reacting with $CO_2$, even at very low $CO_2$ concentrations. For example, a component comprising calcium oxide, or calcium hydroxide, or milk of lime, or any combination thereof may remove, or react with, or capture $CO_2$ from gas and/or liquid streams with $CO_2$ concentrations even as low as, or lower than, PPM concentrations, which may include, but are not limited to, one or more or any combination of the following: air, or flue gas, or emissions gas, or biogas, or other component comprising $CO_2$ described herein, or another component comprising $CO_2$ known in the art. The component comprising calcium carbonate, or calcium bicarbonate, or any combination thereof may be reacted with a component comprising an acid, such as a carboxylic acid, such as acetic acid, and/or may form a component comprising a calcium carboxylate, such as calcium acetate, and/or a gas comprising carbon dioxide, which may comprise captured carbon dioxide, or high purity carbon dioxide, or high partial pressure carbon dioxide, or high concentration carbon dioxide, or any combination thereof. Notably, in some embodiments, employing at least a portion of a component comprising calcium oxide or calcium hydroxide in a reaction with a component comprising carbon dioxide to form a component comprising calcium carbonate, or calcium bicarbonate, or any combination thereof may create significant value in the form of capturing carbon dioxide, while minimally increasing, if at all, the operating cost of the process. A similar value of capturing carbon dioxide using an alkaline-earth intermediate may be realized with magnesium intermediate, such as an intermediate comprising magnesium oxide or magnesium hydroxide, in the present embodiments, as well as in other embodiments herein.

Example Embodiments

The process of example embodiment_wherein the component comprising a first alkaline earth oxide, or alkaline earth hydroxide, or any combination thereof is reacted with a component comprising carbon dioxide to form at least a portion of a component comprising a first alkaline earth carbonate, or a first alkaline earth bicarbonate, or a derivative thereof, or any combination thereof.

The process of example embodiment_wherein the component comprising a calcium oxide, or calcium hydroxide, or any combination thereof is reacted with a component comprising carbon dioxide to form at least a portion of a component comprising calcium carbonate, or calcium bicarbonate, or a derivative thereof, or any combination thereof.

The process of example embodiment_wherein the component comprising carbon dioxide formed may comprise a high purity comprise captured carbon dioxide, or high purity carbon dioxide, or high partial pressure carbon dioxide, or high concentration carbon dioxide, or any combination thereof.

FIG. 6 Description:

FIG. 6 may be similar to FIG. 3, except a component comprising sulfuric acid may be reacted with a component comprising sodium chloride to form a component comprising sodium sulfate and/or a component comprising hydrochloric acid. In some embodiments, such as FIG. 6, a component comprising sodium sulfate may be produced from a component comprising sodium chloride and/or a product may comprise a component comprising hydrogen chloride, or hydrochloric acid, or chlorine, or a derivative thereof, or any combination thereof. In some embodiments, at least a portion of a component comprising sulfuric acid may be regenerated or recovered or circular within the process to, for example, enable the production of sodium hydroxide or a derivative thereof and/or hydrogen chloride or a derivative thereof, while decreasing or preventing the potential loss of sulfuric acid.

Example Embodiments

The process of example embodiment_wherein at least a portion of a component comprising sulfuric acid may be reacted with a component comprising an alkali chloride to form at least a portion of a component comprising an alkali sulfate and/or at least a portion of a component comprising hydrogen chloride, or chlorine, or hydrochloric acid, or a derivative thereof, or any combination thereof.

The process of example embodiment_wherein at least a portion of a component comprising formed sulfuric acid may be reacted with a component comprising an alkali chloride to form at least a portion of a component comprising an alkali sulfate and/or at least a portion of a component comprising hydrogen chloride, or chlorine, or hydrochloric acid, or a derivative thereof, or any combination thereof.

The process of example embodiment_wherein a component comprising sulfur dioxide, or sulfuric acid, or a derivative thereof, or any combination thereof may comprise an intermediate.

FIG. 7 Description:

FIG. 7 may comprise an integrated process for producing a component comprising sodium hydroxide or a derivative thereof and/or a component comprising sulfur or a derivative thereof from, for example, a component comprising sodium sulfate. FIG. 7 may employ a process for producing a component comprising sodium hydroxide in similar to FIG. 1, wherein the component comprising Ca(WA) comprises calcium sulfide, or calcium hydroxide, or calcium oxide, or any combination thereof and/or the WA or weak acid anion derivative may comprise hydrogen sulfide, or water, or any combination thereof. In some embodiments, at least a portion of the component comprising hydrogen sulfide may be reacted to form one or more or any combination of the following: hydrogen, or sulfur, or sulfur dioxide, or sulfuric acid, or sulfurous acid, or water, or a derivative thereof, or any combination thereof. In some embodiments, such as FIG. 7, a component comprising calcium sulfate which may be formed within a process may be reacted to form a component comprising Ca(WA), or a component which may be converted into a component comprising Ca(WA), or any combination thereof. In some embodiments, a component comprising calcium sulfate may be thermally, or chemically, or any combination thereof decomposed, or reduced, or any combination thereof. For example, in FIG. 7, a component comprising calcium sulfate may be at least partially decomposed, or reduced, or any combination thereof using, for example, a component comprising hydrogen. In some embodiments, a component comprising calcium sulfate may be reacted with a component comprising hydrogen to form a component comprising calcium sulfide and/or a component comprising water. In some embodiments, with a component comprising hydrogen to form a component comprising calcium oxide and/or a component comprising water and/or a component comprising sulfur dioxide.

In some embodiments, a component comprising sulfur dioxide may be reacted to form a component comprising sulfur. For example, in some embodiments, a component comprising sulfur dioxide may be reacted with a component comprising hydrogen sulfide to form a component comprising sulfur. In some embodiments, a component comprising sulfur dioxide may be reacted to form a component comprising sulfuric acid, or a derivative thereof, or any combination thereof.

Example Embodiments

A process comprising:
Reacting a component comprising an alkaline earth weak acid with a component comprising an acid to form a component comprising a weak acid derivative and a component comprising an alkaline earth acid anion;
Reacting the component comprising the alkaline earth acid anion with a component comprising an alkali sulfate to form a component comprising an alkali acid anion and a component comprising an alkaline earth sulfate;
Reacting the component comprising an alkaline earth sulfate with a component comprising a reducing agent to form at least a portion of a component comprising an alkaline earth weak acid and a component comprising a reducing agent oxide.

The process of example embodiment_wherein at least a portion of the component comprising the alkaline earth weak acid formed from the reaction of the component comprising an alkaline earth sulfate with the component comprising a reducing agent may be employed as at least a portion of the component comprising an alkaline earth weak acid in the reaction with the component comprising an acid.

The process of example embodiment_wherein the alkaline earth comprises calcium.

The process of example embodiment_wherein the alkaline earth acid anion comprises calcium carboxylate.

The process of example embodiment_wherein the acid comprises a carboxylic acid.

The process of example embodiment_wherein the acid anion comprises a carboxylate.

The process of example embodiment_wherein the weak acid derivative comprises hydrogen sulfide, or hydrosulfurous acid, or water, or any combination thereof.

The process of example embodiment_wherein the weak acid comprises a sulfide, or hydroxide, or oxide, hydrosulfurous acid, or hydrogen sulfide, or carbon dioxide, or carbonic acid, or silicate, or mercaptan, or sulfurous chemical, or a derivative thereof, or any combination thereof.

The process of example embodiment_wherein the alkaline earth weak acid comprises calcium sulfide, or calcium carbonate, or calcium hydroxide, or calcium oxide, or calcium hydrogen sulfide, or calcium bicarbonate, or any combination thereof.

The process of example embodiment_wherein the reducing agent comprises hydrogen, or carbon monoxide, or syngas, or carbon, or natural gas, or a hydrogenous fuel, or a nitrogenous fuel, or ammonia, or a carbonaceous fuel, or a hydrocarbon, or reducing agent described herein, or a reducing agent known in the art.

A process comprising:
Reacting a component comprising calcium sulfide, or calcium carbonate, or calcium hydroxide, calcium oxide, or a derivative thereof, or any combination thereof with a component comprising an acid to form a component comprising hydrogen sulfide, or carbon dioxide, or water, or a derivative thereof, or any combination thereof and a component comprising a calcium-acid anion;
Reacting the component comprising the calcium-acid anion with a component comprising an alkali sulfate to form a component comprising an alkali acid anion and a component comprising calcium sulfate;
Reacting the component comprising calcium sulfate with a component comprising a reducing agent to form at least a portion of a component comprising calcium sulfide, or calcium carbonate, or calcium hydroxide, calcium oxide, or a derivative thereof, or any combination thereof and a component comprising a reducing agent oxide.

A process comprising:
Reacting a component comprising an alkaline earth weak acid with a component comprising an acid to form a component comprising a weak acid derivative and a component comprising an alkaline earth acid anion;
Reacting the component comprising the alkaline earth acid anion with a component comprising an alkali sulfate to form a component comprising an alkali acid anion and a component comprising an alkaline earth sulfate;

Reacting the component comprising an alkaline earth sulfate with a component comprising a reducing agent to form at least a portion of a component comprising an alkaline earth weak acid and/or a component comprising a reducing agent derivate.

The process of example embodiment_wherein the component comprising hydrogen sulfide may be at least partially reacted or treated to form at least a portion of sulfur, or a sulfur derivative, or any combination thereof.

The process of example embodiment_wherein the component comprising hydrogen sulfide may be at least partially reacted or treated to form at least a portion of hydrogen and/or at least a portion of sulfur.

The process of example embodiment_wherein the component comprising hydrogen sulfide may be at least partially reacted or treated to form at least a portion of hydrogen and/or at least a portion of sulfur, wherein said process may be facilitated using a catalyst, or a plasma, or a reactor, or a light-based reactor, or heat based reactor, or catalyzed reactor, or thermolysis, or thermal decomposition.

The process of example embodiment_wherein the component comprising hydrogen sulfide may be at least partially reacted or treated to form at least a portion of hydrogen and/or at least a portion of sulfur, wherein the process for converting at least a portion of hydrogen sulfide into at least a portion of a component comprising sulfur and a component comprising hydrogen may be described herein, or may be in the art, or any combination thereof.

The process of example embodiment_wherein the component comprising hydrogen sulfide may be at least partially reacted or treated to form at least a portion of sulfuric acid, or sulfur, or sulfur dioxide, or water, or a derivative thereof, or any combination thereof.

The process of example embodiment_wherein at least a portion of hydrogen sulfide comprises a reducing agent.

The process of example embodiment_wherein at least a portion of a derivative of hydrogen sulfide comprises a reducing agent.

The process of example embodiment_wherein a sulfide, such as calcium sulfide, comprises at least a portion of a reducing agent.

FIG. 8 Description:

FIG. 8 may be similar to FIG. 7, except FIG. 8 may employ a component comprising carbon, or a carbonaceous fuel, or any combination thereof instead of, or in addition to, a component comprising hydrogen, in the reaction with a component comprising calcium sulfate to form a component comprising, for example, including, but not limited to, one or more or any combination of the following: calcium sulfide, or calcium oxide, or calcium hydroxide, or calcium sulfite, or calcium carbonate, or sulfur, or sulfur dioxide, or sulfur trioxide, or oxygen, or sulfuric acid, or water, or any combination thereof.

FIG. 9 Description:

FIG. 9 may comprise FIG. 1, except may employ one or more or any combination of processes for transforming the component comprising calcium sulfate into a component comprising calcium oxide, or a derivative thereof, and/or sulfuric acid, or a derivative thereof. In some embodiments, FIG. 9 may employ an at least partial decomposition of a component comprising calcium sulfate to form, for example, at least a portion of a component comprising calcium oxide, or calcium sulfide, or calcium hydroxide, or sulfur dioxide, or sulfur trioxide, or oxygen, or a derivative thereof, or any combination thereof.

Example Embodiments

The process of example embodiment_wherein at least a portion of a component comprising an alkaline earth sulfate may be thermally decomposed, electrically decomposed, or light-based decomposed, or radiation based decomposed, or otherwise decomposed, or any combination thereof to form at least a portion of a component comprising alkaline earth oxide, or alkaline earth hydroxide, or alkaline earth carbonate, or alkaline earth halide, or alkaline earth sulfide, or any combination thereof.

FIG. 10 Description:

FIG. 10 may be similar to FIG. 7, except FIG. 10 may employ a component comprising carbon monoxide, or hydrogen, or syngas, or any combination thereof instead of, or in addition to, a component comprising hydrogen, in the reaction with a component comprising calcium sulfate to form a component comprising, for example, including, but not limited to, one or more or any combination of the following: calcium sulfide, or calcium oxide, or calcium hydroxide, or calcium sulfite, or calcium carbonate, or hydrogen sulfide, or sulfur, or sulfur dioxide, or sulfur trioxide, or oxygen, or sulfuric acid, or water, or any combination thereof.

FIG. 11 Description:

FIG. 11 may be similar to FIG. 10, except FIG. 11 may show to least a portion of the component comprising hydrogen sulfide reacting to form, for example, a component comprising sulfur and/or a component comprising water, using, for example, a Claus Process.

In some embodiments, heat or power or any combination thereof may be recovered from one or more or any combination of reactions or processes. For example, the conversion of hydrogen sulfide to sulfur, or sulfur dioxide, or sulfuric acid, or a derivative thereof, or any combination thereof may be highly exothermic and/or may produce useful or valuable heat which may be harness to power one or more or any combination of processes.

FIG. 12 Description:

FIG. 12 may be similar to FIG. 9, except may employ a component comprising a syngas to facilitate the decomposition, or reaction, or reduction, or any combination thereof of a component comprising calcium sulfate to form one or more or any combination of components comprising, for example, including, but not limited to, one or more or any combination of the following: calcium sulfide, or calcium oxide, or calcium hydroxide, or calcium sulfite, or calcium carbonate, or hydrogen sulfide, or sulfur, or sulfur dioxide, or sulfur trioxide, or oxygen, or sulfuric acid, or water, or any combination thereof.

FIG. 13 Description:

FIG. 13 may be similar to FIG. 9, except may employ at least a portion of a component comprising sulfuric acid to react with at least a portion of a component comprising sodium chloride to form at least a portion of a component comprising sodium sulfate and/or forming at least a portion of a component comprising hydrochloric acid, or hydrogen chloride, or a derivative thereof, or any combination thereof. In some embodiments, a component comprising sulfuric acid may comprise an intermediate, which may facilitate the transformation of a component comprising sodium chloride into a component comprising sodium hydroxide and/or a component comprising hydrochloric acid, or hydrogen chloride, or a derivative thereof, or any combination thereof.

FIG. 14 Description:

FIG. 14 may be similar to FIG. 6, except may employ a different process for converting a component comprising calcium sulfate into a component comprising calcium oxide, or a derivative thereof and/or a component comprising sulfuric acid or a derivative thereof.

FIG. 14 may, for example, react at least a portion of a component comprising calcium sulfate with at least a portion of a component comprising a syngas to form at least a portion of a one or more or any combination of components comprising, for example, including, but not limited to, one or more or any combination of the following: calcium sulfide, or calcium oxide, or calcium hydroxide, or calcium sulfite, or calcium carbonate, or hydrogen sulfide, or sulfur, or sulfur dioxide, or sulfur trioxide, or oxygen, or sulfuric acid, or water, or any combination thereof.

FIG. 15 Description:

FIG. 15 may be similar to FIG. 13, except may employ a component comprising calcium oxide, or calcium hydroxide, or a derivative thereof, or any combination thereof, which may be at least partially generated internally, if desired, in the reaction with an acid, such as a carboxylic acid, such as acetic acid. In some embodiments, employing a component comprising calcium oxide, or calcium hydroxide, or a derivative thereof produced internally or within the process as at least a portion of the calcium employed a reaction with an acid may decrease the potential production of carbon dioxide in one or more embodiments.

FIG. 16 Description:

FIG. 16 may be similar to FIG. 14, except may employ a component comprising calcium oxide, or calcium hydroxide, or a derivative thereof, or any combination thereof, which may be at least partially generated internally, if desired, in the reaction with an acid, such as a carboxylic acid, such as acetic acid. In some embodiments, employing a component comprising calcium oxide, or calcium hydroxide, or a derivative thereof produced internally or within the process as at least a portion of the calcium employed a reaction with an acid may decrease the potential production of carbon dioxide in one or more embodiments.

Example Embodiments

A process comprising:
  Reacting a component comprising a first alkaline earth weak acid with a component comprising an acid to form a component comprising a weak acid derivative and a component comprising a first alkaline earth acid anion;
  Reacting the component comprising the first alkaline earth acid anion with a component comprising an alkali sulfate to form a component comprising an alkali acid anion and a component comprising a first alkaline earth sulfate;
  Reacting the component comprising a first alkaline earth sulfate with a component comprising a second alkaline earth sulfite, or bisulfite, or any combination thereof to form at least a portion of a component comprising a first alkaline earth sulfite and a component comprising a second alkaline earth sulfate;
  Decomposing the component comprising a first alkaline earth sulfite to form a component comprising an alkaline earth oxide and a component comprising sulfur dioxide; and
  Decomposing the component comprising the second alkaline earth sulfate to form a component comprising an alkaline earth oxide and a component comprising sulfur dioxide, or sulfur trioxide, or oxygen, or sulfuric acid, or any combination thereof.

The process of embodiment_wherein the first alkaline earth comprises calcium.

The process of embodiment_wherein the second alkaline earth comprises magnesium.

A process comprising:
  Reacting a component comprising a first alkaline earth weak acid with a component comprising an acid to form a component comprising a weak acid derivative and a component comprising a first alkaline earth acid anion;
  Reacting the component comprising the first alkaline earth acid anion with a component comprising an alkali sulfate to form a component comprising an alkali acid anion and a component comprising a first alkaline earth sulfate;
  Reacting the component comprising a first alkaline earth sulfate with a component comprising a second alkaline earth citrate to form at least a portion of a component comprising a first alkaline earth citrate and a component comprising a second alkaline earth sulfate;
  Reacting the component comprising a first alkaline earth citrate with a component comprising sulfur dioxide to form at least a portion of a component comprising a first alkaline earth sulfite and a component comprising citric acid;
  Decomposing the component comprising a first alkaline earth sulfite to form a component comprising an alkaline earth oxide and a component comprising sulfur dioxide; and
  Decomposing the component comprising the second alkaline earth sulfate to form a component comprising an alkaline earth oxide and a component comprising sulfur dioxide, or sulfur trioxide, or oxygen, or sulfuric acid, or any combination thereof.

A process comprising:
  Reacting a component comprising calcium carbonate, or calcium sulfide, or any combination thereof with a component comprising acetic acid to form a component comprising a carbon dioxide, or hydrogen sulfide, or any combination thereof and a component comprising a calcium acetate;
  Reacting the component comprising the calcium acetate with a component comprising sodium sulfate to form a component comprising sodium acetate and a component comprising calcium sulfate;
  Reacting the component comprising a calcium sulfate with a component comprising a magnesium sulfite, or bisulfite, or any combination thereof to form at least a portion of a component comprising a calcium sulfite and a component comprising a magnesium sulfate;
  Decomposing the component comprising a calcium sulfite to form a component comprising a calcium oxide and a component comprising sulfur dioxide; and
  Decomposing the component comprising the magnesium sulfate to form a component comprising a magnesium oxide and a component comprising sulfur dioxide, or sulfur trioxide, or oxygen, or sulfuric acid, or any combination thereof.

The process of example embodiment_wherein the first alkaline earth oxide is transferred to the reaction of a first alkaline earth weak acid with an acid, wherein the alkaline earth oxide may comprise the first alkaline earth weak acid.

The process of example embodiment_wherein the first alkaline earth oxide may be at least partially employed in the reaction of the first alkaline earth weak acid with an acid, wherein the alkaline earth oxide may comprise the first alkaline earth weak acid.

The process of example embodiment_wherein at least a portion of the component comprising calcium oxide, or calcium hydroxide, or calcium carbonate, or calcium sulfide, or any combination thereof comprises at least a portion of a component formed from calcium sulfate.

The process of example embodiment_wherein at least a portion of the component comprising calcium oxide, or calcium hydroxide, or calcium carbonate, or calcium sulfide, or any combination thereof comprises at least a portion of a component formed from calcium sulfate and/or a component regenerated within the process.

The process of example embodiment_wherein the weak acid or weak acid derivative comprises water.

The process of example embodiment_wherein the component comprising a first alkaline earth oxide, or alkaline earth hydroxide, or any combination thereof is reacted with a component comprising carbon dioxide to form at least a portion of a component comprising a first alkaline earth carbonate, or a first alkaline earth bicarbonate, or a derivative thereof, or any combination thereof.

The process of example embodiment_wherein the component comprising a calcium oxide, or calcium hydroxide, or any combination thereof is reacted with a component comprising carbon dioxide to form at least a portion of a component comprising calcium carbonate, or calcium bicarbonate, or a derivative thereof, or any combination thereof.

The process of example embodiment_wherein the component comprising carbon dioxide formed may comprise a high purity comprise captured carbon dioxide, or high purity carbon dioxide, or high partial pressure carbon dioxide, or high concentration carbon dioxide, or any combination thereof.

The process of example embodiment_wherein at least a portion of a component comprising sulfuric acid may be reacted with a component comprising an alkali chloride to form at least a portion of a component comprising an alkali sulfate and/or at least a portion of a component comprising hydrogen chloride, or chlorine, or hydrochloric acid, or a derivative thereof, or any combination thereof.

The process of example embodiment_wherein at least a portion of a component comprising formed sulfuric acid may be reacted with a component comprising an alkali chloride to form at least a portion of a component comprising an alkali sulfate and/or at least a portion of a component comprising hydrogen chloride, or chlorine, or hydrochloric acid, or a derivative thereof, or any combination thereof.

The process of example embodiment_wherein a component comprising sulfur dioxide, or sulfuric acid, or a derivative thereof, or any combination thereof may comprise an intermediate.

A process comprising:
  Reacting a component comprising an alkaline earth weak acid with a component comprising an acid to form a component comprising a weak acid derivative and a component comprising an alkaline earth acid anion;
  Reacting the component comprising the alkaline earth acid anion with a component comprising an alkali sulfate to form a component comprising an alkali acid anion and a component comprising an alkaline earth sulfate;
  Reacting the component comprising an alkaline earth sulfate with a component comprising a reducing agent to form at least a portion of a component comprising an alkaline earth weak acid and a component comprising a reducing agent oxide.

The process of example embodiment_wherein at least a portion of the component comprising the alkaline earth weak acid formed from the reaction of the component comprising an alkaline earth sulfate with the component comprising a reducing agent may be employed as at least a portion of the component comprising an alkaline earth weak acid in the reaction with the component comprising an acid.

The process of example embodiment_wherein the alkaline earth comprises calcium.

The process of example embodiment_wherein the alkaline earth acid anion comprises calcium carboxylate.

The process of example embodiment_wherein the acid comprises a carboxylic acid.

The process of example embodiment_wherein the acid anion comprises a carboxylate.

The process of example embodiment_wherein the weak acid derivative comprises hydrogen sulfide, or hydrosulfurous acid, or water, or any combination thereof.

The process of example embodiment_wherein the weak acid comprises a sulfide, or hydroxide, or oxide, hydrosulfurous acid, or hydrogen sulfide, or carbon dioxide, or carbonic acid, or silicate, or mercaptan, or sulfurous chemical, or a derivative thereof, or any combination thereof.

The process of example embodiment_wherein the alkaline earth weak acid comprises calcium sulfide, or calcium carbonate, or calcium hydroxide, or calcium oxide, or calcium hydrogen sulfide, or calcium bicarbonate, or any combination thereof.

The process of example embodiment_wherein the reducing agent comprises hydrogen, or carbon monoxide, or syngas, or carbon, or natural gas, or a hydrogenous fuel, or a nitrogenous fuel, or ammonia, or a carbonaceous fuel, or a hydrocarbon, or reducing agent described herein, or a reducing agent known in the art.

A process comprising:
  Reacting a component comprising calcium sulfide, or calcium carbonate, or calcium hydroxide, calcium oxide, or a derivative thereof, or any combination thereof with a component comprising an acid to form a component comprising hydrogen sulfide, or carbon dioxide, or water, or a derivative thereof, or any combination thereof and a component comprising a calcium-acid anion;
  Reacting the component comprising the calcium-acid anion with a component comprising an alkali sulfate to form a component comprising an alkali acid anion and a component comprising calcium sulfate;
  Reacting the component comprising calcium sulfate with a component comprising a reducing agent to form at least a portion of a component comprising calcium sulfide, or calcium carbonate, or calcium hydroxide, calcium oxide, or a derivative thereof, or any combination thereof and a component comprising a reducing agent oxide.

A process comprising:
  Reacting a component comprising an alkaline earth weak acid with a component comprising an acid to form a component comprising a weak acid derivative and a component comprising an alkaline earth acid anion;
  Reacting the component comprising the alkaline earth acid anion with a component comprising an alkali sulfate to form a component comprising an alkali acid anion and a component comprising an alkaline earth sulfate;
  Reacting the component comprising an alkaline earth sulfate with a component comprising a reducing agent to form at least a portion of a component comprising an alkaline earth weak acid and/or a component comprising a reducing agent derivate.

The process of example embodiment_wherein the component comprising hydrogen sulfide may be at least partially reacted or treated to form at least a portion of sulfur, or a sulfur derivative, or any combination thereof.

The process of example embodiment_wherein the component comprising hydrogen sulfide may be at least partially reacted or treated to form at least a portion of hydrogen and/or at least a portion of sulfur.

The process of example embodiment_wherein the component comprising hydrogen sulfide may be at least partially reacted or treated to form at least a portion of hydrogen and/or at least a portion of sulfur, wherein said process may be facilitated using a catalyst, or a plasma, or a reactor, or a light-based reactor, or heat based reactor, or catalyzed reactor, or thermolysis, or thermal decomposition.

The process of example embodiment_wherein the component comprising hydrogen sulfide may be at least partially reacted or treated to form at least a portion of hydrogen and/or at least a portion of sulfur, wherein the process for converting at least a portion of hydrogen sulfide into at least a portion of a component comprising sulfur and a component comprising hydrogen may be described herein, or may be in the art, or any combination thereof.

The process of example embodiment_wherein the component comprising hydrogen sulfide may be at least partially reacted or treated to form at least a portion of sulfuric acid, or sulfur, or sulfur dioxide, or water, or a derivative thereof, or any combination thereof.

The process of example embodiment_wherein at least a portion of hydrogen sulfide comprises a reducing agent.

The process of example embodiment_wherein at least a portion of a derivative of hydrogen sulfide comprises a reducing agent.

The process of example embodiment_wherein a sulfide, such as calcium sulfide, comprises at least a portion of a reducing agent.

The process of example embodiment_wherein at least a portion of a component comprising an alkaline earth sulfate may be thermally decomposed, electrically decomposed, or light-based decomposed, or radiation based decomposed, or otherwise decomposed, or any combination thereof to form at least a portion of a component comprising alkaline earth oxide, or alkaline earth hydroxide, or alkaline earth carbonate, or alkaline earth halide, or alkaline earth sulfide, or any combination thereof.

Example Notes

Note: An Alkaline Earth Weak Acid may have the same definition as an Alkaline Earth Weak Acid Anion.

Note: Chlorine or chloride may be provided as an example halogen or halide. Other halogens or halides or halide-like chemicals may be employed instead of, or in addition to, chlorine or chloride, for example, where chlorine, or chloride, or hydrogen chloride, or a derivative thereof, or any combination thereof may be described. For example, other halogen or halides or halide-like chemicals may include, but are not limited to, one or more or any combination of the following: fluorine, or chlorine, or bromine, or iodine, or astatine, or fluoride (F—), chloride (Cl—), bromide (Br—), iodide (I—) and astatide (At—).

Example Embodiments which May Employ Na2SO4+Mg(Carboxylate) Reaction and/or Separation of MgSO4 from Na(Carboxylate) in the Production of, for Example, NaOH or Na2CO3, or H2SO4, or CaO, or Ca(OH)

SUMMARY

Some embodiments may pertain to a system or process for producing an alkali hydroxide or an alkali carbonate. Some embodiments may transform at least a portion of sodium chloride, or water, or any combination thereof into sodium hydroxide, or hydrochloric acid, or any combination thereof. Some embodiments may transform at least a portion of sodium chloride, or water, or gas or fluid or material comprising carbon dioxide, or any combination thereof into sodium hydroxide, or hydrochloric acid, or captured carbon dioxide, or sodium carbonate, or any combination thereof.

In some embodiments, sodium chloride may be reacted with sulfuric acid to form, for example, at least a portion of sodium sulfate and hydrogen chloride or hydrochloric acid. In some embodiments, the reaction of sodium chloride with sulfuric acid to form at least a portion of sodium sulfate and hydrogen chloride or hydrochloric acid may be conducted in a manner similar to the Mannheim process.

In some embodiments, sodium sulfate may be reacted with a magnesium-anion salt to form, for example, at least a portion of sodium-anion salt or sodium salt and at least a portion of magnesium sulfate. In some embodiments, it may be desirable for the magnesium-anion salt to be soluble in water. In some embodiments, it may be desirable for the 'anion' to comprise an acid or an anion of an acid which may be of weaker acid strength than sulfurous acid or aqueous sulfur dioxide, for example, to enable reaction of the sodium-anion salt with sulfurous acid or sulfur dioxide in, for example, other reaction steps. In some embodiments, it may be desirable for the formed sodium-anion salt to possess or exhibit a greater solubility in an aqueous solution or in water than, for example, the magnesium sulfate, to, for example, facilitate or enable the separation of at least a portion of the magnesium sulfate and the sodium-anion salt using, for example, crystallization or precipitation or any combination thereof. In some embodiments, it may be desirable for the 'anion' to comprise a monovalent anion to, for example, enable the separation of at least a portion of sodium-anion salt from magnesium sulfate by, for example, using a monovalent selective membrane, or monovalent selective anion exchange membrane, or a monovalent selective cation exchange membrane, or any combination thereof, which may be in, for example, an electrodialysis system or process, or an electrodialysis separation system or process, or an electrodialysis reversal process, or any combination thereof. Magnesium may comprise a divalent cation and sodium may comprise a monovalent cation, and sulfate may comprise a divalent anion and, in some embodiments, the 'anion' may comprise a monovalent anion, which may enable separation of at least a portion of sodium anion salt from magnesium sulfate using, for example, monovalent selective electrodialysis. In some embodiments, it may be desirable to separate at least a portion of sodium-anion from magnesium sulfate using, for example, reverse osmosis or nanofiltration, wherein, for example, the hydration radius of a first salt is greater than a second salt, which may result in the at least partially selective permeation of a second salt and an at least partially selective rejection of a first salt, which may result in the at least partial separation of the first salt from the second salt. For example, in some embodiments, the hydration radius of magnesium sulfate may be greater than the sodium anion salt, and, for example, magnesium sulfate may be at least partially separated from sodium anion salt by reverse osmosis or nanofiltration, wherein magnesium sulfate may be at least partially rejected and sodium anion may at least partially permeate a semi-permeable membrane and/or the separate may form a permeate comprising sodium anion salt and a retentate or concentrate comprising a greater concentration of magnesium sulfate. For example, in some embodiments, the 'anion' may comprise a carboxylic acid, or an anion of a carboxylic acid, or an anion derivative of a carboxylic acid, or any combination thereof. For example, in some embodiments, the 'anion' may comprise a monovalent carboxylic acid, or an anion of a monovalent carboxylic acid, or a monovalent carboxylic acid anion, or any combination thereof, such as, for example, including, but not limited to, one or more or any combination of the following: formic acid, or acetic acid, or propanoic acid, or any combination thereof.

In some embodiments, the sodium-anion salt may be reacted with sulfur dioxide, or aqueous sulfur dioxide, or sulfurous acid, or any combination thereof to form, for example, at least a portion of sodium sulfite and an acid comprising the acid derivative of the anion. For example, in some embodiments, a sodium-anion salt comprising sodium acetate, or a solution comprising aqueous sodium acetate, may be reacted with a gas comprising sulfur dioxide to form, for example, at least a portion of sodium sulfite and acetic acid. In some embodiments, at least a portion of sodium sulfite may be separated from at least a portion of anion derivative acid, such as acetic acid, using one or more or any combination of separation systems or methods. In some embodiments, at least a portion of the anion derivative acid may be transferred to a reaction with magnesium oxide, or magnesium hydroxide, or a magnesium carbonate, or any combination thereof.

In some embodiments, at least a portion of sodium sulfite may be reacted with calcium oxide or calcium hydroxide to form, for example, at least a portion of calcium sulfite and sodium hydroxide. In some embodiments, at least a portion of sodium hydroxide may be separated from at least a portion of calcium sulfite using one or more or any combination of separation systems or methods.

In some embodiments calcium sulfite may be decomposed or calcined into, for example, at least a portion of calcium oxide and sulfur dioxide. In some embodiments, the formed sulfur dioxide or the formed gas comprising sulfur dioxide may be employed in the reaction step comprising reacting at least a portion of sodium-anion salt with at least a portion of sulfur dioxide. In some embodiments, calcium oxide may be reacted with water to form at least a portion of calcium hydroxide, or milk of lime, or any combination thereof. In some embodiments, heat may be recovered from the reaction to form calcium hydroxide or milk of lime. In some embodiments, the calcium oxide may be employed in the reaction step comprising reacting at least a portion of sodium sulfite with at least a portion of calcium oxide or calcium hydroxide.

In some embodiments, magnesium sulfate may be dehydrated and/or decomposed to form, for example, at least a portion of magnesium oxide, or sulfur dioxide, or diatomic oxygen, or sulfur trioxide, or any combination thereof. In some embodiments, magnesium sulfate may be decomposed, for example, employing calcining or thermal decomposition. In some embodiments, at least a portion of sulfur dioxide, or sulfur trioxide, or diatomic oxygen, or any combination thereof may be reacted with at least a portion of water to form, for example, at least a portion of sulfuric acid. In some embodiments, heat may be recovered from the reaction to form sulfuric acid. In some embodiment, at least a portion of formed sulfuric acid may be employed in a reaction step comprising reacting at least a portion of sodium chloride with at least a portion of sulfuric acid.

In some embodiments, at least a portion of magnesium oxide may be reacted with water to form magnesium hydroxide, or milk of magnesia, or any combination thereof. In some embodiments, heat may be recovered the reaction to form magnesium hydroxide, or milk of magnesia, or any combination thereof. In some embodiments, at least a portion of magnesium hydroxide or milk of magnesia may be employed to absorb or capture carbon dioxide, or hydrogen sulfide, or other acid gases, or any combination thereof. In some embodiments, at least a portion of magnesium hydroxide or milk of magnesia may be reacted with a gas comprising carbon dioxide, such as an emissions gas, or air, or other gas comprising carbon dioxide, and/or may form at least a portion of magnesium carbonate. In some embodiments, at least a portion of a magnesium carbonate may be reacted with an acid derivative of an 'anion,' to form, for example, magnesium-anion salt, or an aqueous solution comprising magnesium-anion salt, or any combination thereof and/or carbon dioxide, which may comprise captured, or high purity, or high partial pressure, or any combination thereof carbon dioxide. For example, in some embodiments, at least a portion of a magnesium carbonate may be reacted with at least a portion of acetic acid to form magnesium acetate and captured carbon dioxide. In some embodiments, magnesium oxide may be reacted with an acid derivative of an 'anion,' to form, for example, magnesium-anion salt, or an aqueous solution comprising magnesium-anion salt, or any combination thereof. For example, in some embodiments, magnesium oxide may be reacted with acetic acid to form magnesium acetate. In some embodiments, at least a portion of magnesium-anion salt or a solution comprising aqueous magnesium-anion salt may be employed in the reaction of at least a portion of sodium sulfate and at least a portion of a magnesium-anion salt.

In some embodiments, at least a portion heat may be recovered from one or more or any combination of exothermic reactions or process steps. In some embodiments, at least a portion of recovered heat may be reemployed in one or more or any combination of endothermic reactions or process steps or steps requiring heating or heat input.

Example Process Chemistry (1) React at least a portion of sodium chloride with at least a portion of sulfuric acid, to form, for example, at least a portion of sodium sulfate and at least a portion of hydrogen chloride or hydrochloric acid.

For example:

$$2NaCl+H_2SO_4 \rightarrow 2Na_2SO_4+HCl$$

(2) React at least a portion of sodium sulfate with at least a portion of a magnesium-anion salt to form, for example, at least a portion of a sodium-anion salt and at least a portion of magnesium sulfate.
For example:

$$Na_2SO_4+Mg(Anion) \rightarrow 2Na(Anion)+MgSO_4$$

$$Na_2SO_4+Mg(CH_3COO)_2 \rightarrow 2NaCH_3COO+MgSO_4$$

$$3Na_2SO_4+Mg_3(C_6H_5O_7)_2 \rightarrow 2Na_3C_6H_5O_7+3MgSO_4$$

(3) React at a portion of sodium-anion salt with at least a portion of sulfur dioxide to form at least a portion of sodium sulfite and at least a portion of anion derivative acid.
For example:

$$2Na(Anion)+SO_2 \rightarrow Na_2SO_3+Anion\ Derivative\ Acid$$

$$2NaCH_3COO+SO_2 \rightarrow Na_2SO_3+2CH_3COOH$$

$$2Na_3C_6H_5O_7+3SO_2 \rightarrow 3Na_2SO_3+C_6H_8O_7$$

(4) Separate at least a portion of sodium sulfite from at least a portion of anion derivative acid.
(5) React at least a portion of sodium sulfite with at least a portion of calcium hydroxide to form at least a portion of sodium hydroxide and at least a portion of calcium sulfite.
For example:

$$Na_2SO_3+Ca(OH)_2 \rightarrow 2NaOH+CaSO_3$$

(6) Decompose at least a portion of calcium sulfite to form at least a portion of calcium oxide and at least a portion of sulfur dioxide.
For example:

$$CaSO_3 \rightarrow CaO+SO_2$$

(7) React at least a portion of calcium oxide with at least a portion of water to form at least a portion of calcium hydroxide or milk of lime.
For example:

$$CaO+H_2O \rightarrow Ca(OH)_2$$

$$CaO+H_2O+Water \rightarrow Ca(OH)_2\ (milk\ of\ lime)$$

(8) Decompose at least a portion of magnesium sulfate to form at least a portion of magnesium oxide and at least a portion of sulfur dioxide, or sulfur trioxide, or diatomic oxygen or any combination thereof.
For example:

$$MgSO_4 \rightarrow MgO+SO_2+\tfrac{1}{2}O_2$$

(9) React at least a portion of sulfur dioxide with at least a portion of oxygen and at least a portion of water to form at least a portion of sulfuric acid.

$$SO_2+\tfrac{1}{2}O_2+H_2O \rightarrow H_2SO_4$$

(10) React at least a portion of magnesium oxide with at least a portion of water, or carbon dioxide, or acid gas, or any combination thereof to form at least a portion of magnesium hydroxide, or magnesium carbonate, or magnesium sulfide, or any combination thereof.
For example:

$$MgO+H_2O \rightarrow Mg(OH)_2$$

$$MgO+H_2O+Water \rightarrow Mg(OH)_2\ (milk\ of\ magnesia)$$

$$MgO+CO_2 \rightarrow MgCO_3$$

$$Mg(OH)_2+CO_2 \rightarrow MgCO_3+H_2O$$

$$MgO+H_2S \rightarrow MgS+H_2O$$

$$Mg(OH)_2+H_2S \rightarrow MgS+2H_2O$$

(11) React at least a portion of magnesium oxide, or magnesium carbonate, or magnesium sulfite, or any combination thereof with, for example, at least a portion of an anion-derivative acid, to form, for example, at least a portion of magnesium-anion salt, or captured carbon dioxide, or captured acid gas, or water, or any combination thereof.
For example:

$$MgO+Anion\ Derivative\ Acid \rightarrow Mg(Anion)+Water$$

$$MgCO_3+Anion\ Derivative\ Acid \rightarrow Mg(Anion)+CO_2$$
(which may comprise captured $CO_2$)

$$MgS+Anion\ Derivative\ Acid \rightarrow Mg(Anion)+H_2S$$
(may comprise captured $H_2S$)

$$MgO+ \rightarrow Mg(CH_3COO)_2+Water$$

$$MgCO_3+2CH_3COOH \rightarrow Mg(CH_3COO)_2+CO_2\ (which\ may\ comprise\ captured\ CO_2)$$

$$MgS+2CH_3COOH \rightarrow Mg(CH_3COO)_2+H_2S\ (may\ comprise\ captured\ H_2S)$$

Notes

Some embodiments, for example, may comprise characteristics which may comprise one or more or any combination of the following:

Sodium Hydroxide and/or HCl output

NaCl input

Inherent $CO_2$ capture if desired (separate $CO_2$ from other $CO_2$ emissions sources) (for example, if the process is powered by natural gas, separate the $CO_2$ from the natural gas combustion with the reaction with magnesium hydroxide) (or react the magnesium hydroxide with a different $CO_2$ source, such as, including, but not limited to, one or more or any combination of the following: air, or aqueous $CO_2$, or gaseous $CO_2$, or emissions gas, or acid gas)

May not require calcium carbonate input, if desired $CO_2$ production may not be inherent or required, if desired

SUMMARY

The present invention may pertain to a system or process for producing an alkali hydroxide or an alkali carbonate. Some embodiments may transform at least a portion of sodium sulfate, or water, or any combination thereof into at least a portion of sodium hydroxide, or sulfuric acid, or captured carbon dioxide, or sodium carbonate, or any combination thereof. Some embodiments may transform at least a portion of sodium sulfate, or water, or any combination thereof into at least a portion of sodium hydroxide, or sulfuric acid, or any combination thereof. Some embodiments may transform at least a portion of sodium chloride, or water, or any combination thereof into sodium hydroxide, or hydrochloric acid, or any combination thereof. Some embodiments may transform at least a portion of sodium chloride, or water, or gas or fluid or material comprising carbon dioxide, or any combination thereof into sodium hydroxide, or hydrochloric acid, or captured carbon dioxide, or sodium carbonate, or any combination thereof.

In some embodiments, sodium chloride may be reacted with sulfuric acid to form, for example, at least a portion of sodium sulfate and hydrogen chloride or hydrochloric acid. In some embodiments, the reaction of sodium chloride with sulfuric acid to form at least a portion of sodium sulfate and hydrogen chloride or hydrochloric acid may be conducted in a manner similar to the Mannheim process.

In some embodiments, sodium sulfate may be reacted with a magnesium-anion salt to form, for example, at least a portion of sodium-anion salt or sodium salt and at least a portion of magnesium sulfate. In some embodiments, it may be desirable for the magnesium-anion salt to be soluble in water. In some embodiments, it may be desirable for the 'anion' to comprise an acid or an anion of an acid which may be of weaker acid strength than sulfurous acid or aqueous sulfur dioxide, for example, to enable reaction of the sodium-anion salt with sulfurous acid or sulfur dioxide in, for example, other reaction steps. In some embodiments, it may be desirable for the formed sodium-anion salt to possess or exhibit a greater solubility in an aqueous solution or in water than, for example, the magnesium sulfate, to, for example, facilitate or enable the separation of at least a portion of the magnesium sulfate and the sodium-anion salt using, for example, crystallization or precipitation or any combination thereof. In some embodiments, it may be desirable for the 'anion' to comprise a monovalent anion to, for example, enable the separation of at least a portion of sodium-anion salt from magnesium sulfate by, for example, using a monovalent selective membrane, or monovalent selective anion exchange membrane, or a monovalent selective cation exchange membrane, or any combination thereof, which may be in, for example, an electrodialysis system or process, or an electrodialysis separation system or process, or an electrodialysis reversal process, or any combination thereof. Magnesium may comprise a divalent cation and sodium may comprise a monovalent cation, and sulfate may comprise a divalent anion and, in some embodiments, the 'anion' may comprise a monovalent anion, which may enable separation of at least a portion of sodium anion salt from magnesium sulfate using, for example, monovalent selective electrodialysis. In some embodiments, it may be desirable to separate at least a portion of sodium-anion from magnesium sulfate using, for example, reverse osmosis or nanofiltration, wherein, for example, the hydration radius of a first salt is greater than a second salt, which may result in the at least partially selective permeation of a second salt and an at least partially selective rejection of a first salt, which may result in the at least partial separation of the first salt from the second salt. For example, in some embodiments, the hydration radius of magnesium sulfate may be greater than the sodium anion salt, and, for example, magnesium sulfate may be at least partially separated from sodium anion salt by reverse osmosis or nanofiltration, wherein magnesium sulfate may be at least partially rejected and sodium anion may at least partially permeate a semi-permeable membrane and/or the separate may form a permeate comprising sodium anion salt and a retentate or concentrate comprising a greater concentration of magnesium sulfate. For example, in some embodiments, the 'anion' may comprise a carboxylic acid, or an anion of a carboxylic acid, or an anion derivative of a carboxylic acid, or any combination thereof. For example, in some embodiments, the 'anion' may comprise a monovalent carboxylic acid, or an anion of a monovalent carboxylic acid, or a monovalent carboxylic acid anion, or any combination thereof, such as, for example, including, but not limited to, one or more or any combination of the following: formic acid, or acetic acid, or propanoic acid, or any combination thereof.

In some embodiments, the sodium-anion salt may be reacted with sulfur dioxide, or aqueous sulfur dioxide, or sulfurous acid, or any combination thereof to form, for example, at least a portion of sodium sulfite and an acid comprising the acid derivative of the anion. For example, in some embodiments, a sodium-anion salt comprising sodium acetate, or a solution comprising aqueous sodium acetate, may be reacted with a gas comprising sulfur dioxide to form, for example, at least a portion of sodium sulfite and acetic acid. In some embodiments, at least a portion of sodium sulfite may be separated from at least a portion of anion derivative acid, such as acetic acid, using one or more or any combination of separation systems or methods. In some embodiments, at least a portion of the anion derivative acid may be transferred to a reaction with magnesium oxide, or magnesium hydroxide, or a magnesium carbonate, or any combination thereof.

In some embodiments, at least a portion of sodium sulfite may be reacted with calcium oxide or calcium hydroxide to form, for example, at least a portion of calcium sulfite and sodium hydroxide. In some embodiments, at least a portion of sodium hydroxide may be separated from at least a portion of calcium sulfite using one or more or any combination of separation systems or methods.

In some embodiments calcium sulfite may be decomposed or calcined into, for example, at least a portion of calcium oxide and sulfur dioxide. In some embodiments, the formed sulfur dioxide or the formed gas comprising sulfur dioxide may be employed in the reaction step comprising reacting at least a portion of sodium-anion salt with at least a portion of sulfur dioxide. In some embodiments, calcium oxide may be reacted with water to form at least a portion of calcium hydroxide, or milk of lime, or any combination thereof. In some embodiments, heat may be recovered from the reaction to form calcium hydroxide or milk of lime. In some embodiments, the calcium oxide may be employed in the reaction step comprising reacting at least a portion of sodium sulfite with at least a portion of calcium oxide or calcium hydroxide.

In some embodiments, magnesium sulfate may be dehydrated and/or decomposed to form, for example, at least a portion of magnesium oxide, or sulfur dioxide, or diatomic oxygen, or sulfur trioxide, or any combination thereof. In some embodiments, magnesium sulfate may be decomposed, for example, employing calcining or thermal decomposition. In some embodiments, at least a portion of sulfur dioxide, or sulfur trioxide, or diatomic oxygen, or any combination thereof may be reacted with at least a portion of water to form, for example, at least a portion of sulfuric acid. In some embodiments, heat may be recovered from the reaction to form sulfuric acid. In some embodiments, at least a portion of the formed sulfuric acid may comprise a valuable product. In some embodiments, at least a portion of the formed sulfuric acid and/or sodium hydroxide may be employed in a circular economy process, or a process consuming sodium hydroxide or sulfuric acid and producing sodium sulfate, such as a process for producing lithium carbonate or lithium hydroxide, or a battery recycling process, or a rayon production process, or any combination thereof. In some embodiment, at least a portion of formed sulfuric acid may be employed in a reaction step comprising reacting at least a portion of sodium chloride with at least a portion of sulfuric acid.

In some embodiments, at least a portion of magnesium oxide may be reacted with water to form magnesium hydroxide, or milk of magnesia, or any combination thereof. In some embodiments, heat may be recovered the reaction to form magnesium hydroxide, or milk of magnesia, or any combination thereof. In some embodiments, at least a portion of magnesium hydroxide or milk of magnesia may be employed to absorb or capture carbon dioxide, or hydrogen sulfide, or other acid gases, or any combination thereof. In some embodiments, at least a portion of magnesium hydroxide or milk of magnesia may be reacted with a gas comprising carbon dioxide, such as an emissions gas, or air, or other gas comprising carbon dioxide, and/or may form at least a portion of magnesium carbonate. In some embodiments, at least a portion of a magnesium carbonate may be reacted with an acid derivative of an 'anion,' to form, for example, magnesium-anion salt, or an aqueous solution comprising magnesium-anion salt, or any combination thereof and/or carbon dioxide, which may comprise captured, or high purity, or high partial pressure, or any combination thereof carbon dioxide. For example, in some embodiments, at least a portion of a magnesium carbonate may be reacted with at least a portion of acetic acid to form magnesium acetate and captured carbon dioxide. In some embodiments, magnesium oxide may be reacted with an acid derivative of an 'anion,' to form, for example, magnesium-anion salt, or an aqueous solution comprising magnesium-anion salt, or any combination thereof. For example, in some embodiments, magnesium oxide may be reacted with acetic acid to form magnesium acetate. In some embodiments, at least a portion of magnesium-anion salt or a solution comprising aqueous magnesium-anion salt may be employed in the reaction of at least a portion of sodium sulfate and at least a portion of a magnesium-anion salt.

In some embodiments, at least a portion heat may be recovered from one or more or any combination of exothermic reactions or process steps. In some embodiments, at least a portion of recovered heat may be reemployed in one or more or any combination of endothermic reactions or process steps or steps requiring heating or heat input.

Example Chemistry

Example Chemistry: Process for Producing Sodium Hydroxide and Hydrochloric Acid from Sodium Chloride (1) React at least a portion of sodium chloride with at least a portion of sulfuric acid, to form, for example, at least a portion of sodium sulfate and at least a portion of hydrogen chloride or hydrochloric acid.
For example:

$$2NaCl + H_2SO_4 \rightarrow 2Na_2SO_4 + 2HCl$$

(2) React at least a portion of sodium sulfate with at least a portion of a magnesium-anion salt to form, for example, at least a portion of a sodium-anion salt and at least a portion of magnesium sulfate.
For example:

$$Na_2SO_4 + Mg(Anion) \rightarrow 2Na(Anion) + MgSO_4$$

$$Na_2SO_4 + Mg(CH_3COO)_2 \rightarrow 2NaCH_3COO + MgSO_4$$

$$3Na_2SO_4 + Mg_3(C_6H_5O_7)_2 \rightarrow 2Na_3C_6H_5O_7 + 3MgSO_4$$

(3) React at a portion of sodium-anion salt with at least a portion of sulfur dioxide to form at least a portion of sodium sulfite and at least a portion of anion derivative acid.
For example:

$$2Na(Anion) + SO_2 \rightarrow Na_2SO_3 + Anion\ Derivative\ Acid$$

$$2NaCH_3COO + SO_2 \rightarrow Na_2SO_3 + 2CH_3COOH$$

$$2Na_3C_6H_5O_7 + 3SO_2 \rightarrow 3Na_2SO_3 + C_6H_8O_7$$

(4) Separate at least a portion of sodium sulfite from at least a portion of anion derivative acid.

(5) React at least a portion of sodium sulfite with at least a portion of calcium hydroxide to form at least a portion of sodium hydroxide and at least a portion of calcium sulfite.
For example:

$$Na_2SO_3 + Ca(OH)_2 \rightarrow 2NaOH + CaSO_3$$

(6) Decompose at least a portion of calcium sulfite to form at least a portion of calcium oxide and at least a portion of sulfur dioxide.
For example:

$$CaSO_3 \rightarrow CaO + SO_2$$

(7) React at least a portion of calcium oxide with at least a portion of water to form at least a portion of calcium hydroxide or milk of lime.
For example:

$$CaO + H_2O \rightarrow Ca(OH)_2$$

$$CaO + H_2O + Water \rightarrow Ca(OH)_2\ (milk\ of\ lime)$$

(8) Decompose at least a portion of magnesium sulfate to form at least a portion of magnesium oxide and at least a portion of sulfur dioxide, or sulfur trioxide, or diatomic oxygen or any combination thereof.
For example:

$$MgSO_4 \rightarrow MgO + SO_2 + \tfrac{1}{2}O_2$$

(9) React at least a portion of sulfur dioxide with at least a portion of oxygen and at least a portion of water to form at least a portion of sulfuric acid.

$$SO_2 + \tfrac{1}{2}O_2 + H_2O \rightarrow H_2SO_4$$

(10) React at least a portion of magnesium oxide with at least a portion of water, or carbon dioxide, or acid gas, or any combination thereof to form at least a portion of magnesium hydroxide, or magnesium carbonate, or magnesium sulfide, or any combination thereof.
For example:

$$MgO + H_2O \rightarrow Mg(OH)_2$$

$$MgO + H_2O + Water \rightarrow Mg(OH)_2\ (milk\ of\ magnesia)$$

$$MgO + CO_2 \rightarrow MgCO_3$$

$$Mg(OH)_2 + CO_2 \rightarrow MgCO_3 + H_2O$$

$$MgO + H_2S \rightarrow MgS + H_2O$$

$$Mg(OH)_2 + H_2S \rightarrow MgS + 2H_2O$$

(11) React at least a portion of magnesium oxide, or magnesium carbonate, or magnesium sulfite, or any combination thereof with, for example, at least a portion of an anion-derivative acid, to form, for example, at least a portion of magnesium-anion salt, or captured carbon dioxide, or captured acid gas, or water, or any combination thereof.
For example:

$$MgO + Anion\ Derivative\ Acid \rightarrow Mg(Anion) + Water$$

$$MgCO_3 + Anion\ Derivative\ Acid \rightarrow Mg(Anion) + CO_2$$
(which may comprise captured $CO_2$)

$$MgS + Anion\ Derivative\ Acid \rightarrow Mg(Anion) + H_2S$$
(may comprise captured $H_2S$)

MgO+→Mg(CH$_3$COO)$_2$+Water

MgCO$_3$+2CH$_3$COOH→Mg(CH$_3$COO)$_2$+CO$_2$ (which may comprise captured CO$_2$)

MgS+2CH$_3$COOH→Mg(CH$_3$COO)$_2$+H$_2$S (may comprise captured H$_2$S)

Example Chemistry: Process for Producing Sodium Hydroxide and Sulfuric Acid from Sodium Sulfate (1) React at least a portion of sodium sulfate with at least a portion of a magnesium-anion salt to form, for example, at least a portion of a sodium-anion salt and at least a portion of magnesium sulfate.
For example:

Na$_2$SO$_4$+Mg(Anion)→2Na(Anion)+MgSO$_4$

Na$_2$SO$_4$+Mg(CH$_3$COO)$_2$→2NaCH$_3$COO+MgSO$_4$

3Na$_2$SO$_4$+Mg$_3$(C$_6$H$_5$O$_7$)$_2$→2Na$_3$C$_6$H$_5$O$_7$+3MgSO$_4$

Note: Sodium Anion salt may be separated from magnesium sulfate using, for example, including but not limited to, one or more or any combination of the following: electrodialysis, or monovalent selective electrodialysis, or nanofiltration, or reverse osmosis, or distillation, or crystallization, or solubility differences, or cooling precipitation, or cryodesalination, or membrane distillation, or membrane-based process, or electrodialysis metathesis, or multi-effect distillation, or mechanical vapor compression distillation, or multi-stage flash distillation, or zero-liquid discharge, or antisolvent crystallization, or extractive distillation, or extraction.

(2) React at a portion of sodium-anion salt with at least a portion of sulfur dioxide to form at least a portion of sodium sulfite and at least a portion of anion derivative acid.
For example:

2Na(Anion)+SO$_2$→Na$_2$SO$_3$+Anion Derivative Acid

2NaCH$_3$COO+SO$_2$→Na$_2$SO$_3$+2CH$_3$COOH

2Na$_3$C$_6$H$_5$O$_7$+3SO$_2$→3Na$_2$SO$_3$+C$_6$H$_8$O$_7$ (3) Separate at least a portion of sodium sulfite from at least a portion of anion derivative acid.
(4) React at least a portion of sodium sulfite with at least a portion of calcium hydroxide to form at least a portion of sodium hydroxide and at least a portion of calcium sulfite.
For example:

Na$_2$SO$_3$+Ca(OH)$_2$→2NaOH+CaSO$_3$ (5) Decompose at least a portion of calcium sulfite to form at least a portion of calcium oxide and at least a portion of sulfur dioxide.
For example:

CaSO$_3$→CaO+SO$_2$ (6) React at least a portion of calcium oxide with at least a portion of water to form at least a portion of calcium hydroxide or milk of lime.
For example:

CaO+H$_2$O→Ca(OH)$_2$

CaO+H$_2$O+Water→Ca(OH)$_2$ (milk of lime)

(7) Decompose at least a portion of magnesium sulfate to form at least a portion of magnesium oxide and at least a portion of sulfur dioxide, or sulfur trioxide, or diatomic oxygen or any combination thereof.
For example:

MgSO$_4$→MgO+SO$_2$+½O$_2$ (8) React at least a portion of sulfur dioxide with at least a portion of oxygen and at least a portion of water to form at least a portion of sulfuric acid.

SO$_2$+½O$_2$+H$_2$O→H$_2$SO$_4$ (9) React at least a portion of magnesium oxide with at least a portion of water, or carbon dioxide, or acid gas, or any combination thereof to form at least a portion of magnesium hydroxide, or magnesium carbonate, or magnesium sulfide, or any combination thereof.
For example:

MgO+H$_2$O→Mg(OH)$_2$

MgO+H$_2$O+Water→Mg(OH)$_2$ (milk of magnesia)

MgO+CO$_2$→MgCO$_3$

Mg(OH)$_2$+CO$_2$→MgCO$_3$+H$_2$O

MgO+H$_2$S→MgS+H$_2$O

Mg(OH)$_2$+H$_2$S→MgS+2H$_2$O

(10) React at least a portion of magnesium oxide, or magnesium carbonate, or magnesium sulfite, or any combination thereof with, for example, at least a portion of an anion-derivative acid, to form, for example, at least a portion of magnesium-anion salt, or captured carbon dioxide, or captured acid gas, or water, or any combination thereof.
For example:

MgO+Anion Derivative Acid→Mg(Anion)+Water

MgCO$_3$+Anion Derivative Acid→Mg(Anion)+CO$_2$ (which may comprise captured CO$_2$)

MgS+Anion Derivative Acid→Mg(Anion)+H$_2$S (may comprise captured H$_2$S)

MgO+→Mg(CH$_3$COO)$_2$+Water

MgCO$_3$+2CH$_3$COOH→Mg(CH$_3$COO)$_2$+CO$_2$ (which may comprise captured CO$_2$)

MgS+2CH$_3$COOH→Mg(CH$_3$COO)$_2$+H$_2$S (may comprise captured H$_2$S)

Notes
Note: Sodium or Na may be provided as an example alkali. Other alkalis, or alkali-like chemicals, may be employed instead of or in addition to sodium or Na, and/or may include, but are not limited to, one or more or any combination of the following: lithium, or sodium, or potassium, or rubidium, or caesium, or ammonia, or ammonium, or ammonia derivatives, or Li, or Na, or K, or Rb, or Cs, or NH$_3$, or NH$_4^+$.

Some embodiments, for example, may comprise characteristics which may comprise one or more or any combination of the following:
Sodium Hydroxide and/or HCl output and/or H$_2$SO$_4$ output
NaCl input or Na$_2$SO$_4$ Input Inherent CO$_2$ capture if desired (separate CO$_2$ from other CO$_2$ emissions sources) (for example, if the process is powered by natural gas, separate the CO$_2$ from the natural gas combustion with the reaction with magnesium hydroxide) (or react the magnesium hydroxide with a different CO$_2$ source, such as, including, but not limited to, one or more or any combination of the following: air, or aqueous CO$_2$, or gaseous CO$_2$, or emissions gas, or acid gas)

CO$_2$ production may not be inherent or required, if desired

Example Embodiment Producing Alkali Hydroxide and Sulfuric Acid from Alkali Sulfate and Water, which may include, but is not limited to, one or more or any combination of the following:

(1) At least partially react at least a portion of a salt or solution comprising an alkali sulfate with at least a portion of a salt or solution comprising an alkaline earth-anion to form, for example, at least a portion of a salt or solution comprising an alkali-anion and/or at least a portion of alkaline earth sulfate.

For example, including, but not limited to, one or more or any combination of the following:

$$Na_2SO_4+Mg(anion)_2 \rightarrow 2Na(anion)+MgSO_4$$

$$Na_2SO_4+Mg(carboxylate)_2 \rightarrow 2Na(carboxylate)+MgSO_4$$

$$Na_2SO_4+Mg(CH_3COO)_2 \rightarrow 2NaCH_3COO+MgSO_4$$

$$Na_2SO_4(s\ or\ aq)+Mg(CH_3COO)_2(s\ or\ aq) \rightarrow 2NaCH_3COO(s\ or\ aq)+MgSO_4(s\ or\ aq)$$

$$Na_2SO_4(s\ or\ aq)+Mg(CH_3COO)_2(s\ or\ aq) \rightarrow 2NaCH_3COO(aq)+MgSO_4(aq)$$

$$K_2SO_4+Mg(anion)_2 \rightarrow 2K(anion)+MgSO_4$$

$$K_2SO_4+Mg(carboxylate)_2 \rightarrow 2K(carboxylate)+MgSO_4$$

$$K_2SO_4+Mg(CH_3COO)_2 \rightarrow 2KCH_3COO+MgSO_4$$

$$K_2SO_4(s\ or\ aq)+Mg(CH_3COO)_2(s\ or\ aq) \rightarrow 2KCH_3COO(s\ or\ aq)+MgSO_4(s\ or\ aq)$$

$$K_2SO_4(s\ or\ aq)+Mg(CH_3COO)_2(s\ or\ aq) \rightarrow 2KCH_3COO(aq)+MgSO_4(aq)$$

(1—separation) At least partially separating at least a portion of an alkali anion from at least a portion of an alkaline earth sulfate.

For example, including, but not limited to, one or more or any combination of the following:

$$2Na(anion)+MgSO_4 \rightarrow 2Na(anion)(at\ least\ partially\ separate)+MgSO_4(at\ least\ partially\ separate)$$

$$2Na(carboxylate)+MgSO_4 \rightarrow 2Na(carboxylate)(at\ least\ partially\ separate)+MgSO_4(at\ least\ partially\ separate)$$

$$2NaCH_3COO+MgSO_4 \rightarrow 2NaCH_3COO(at\ least\ partially\ separate)+MgSO_4(at\ least\ partially\ separate)$$

$$2NaCH_3COO(aq)+MgSO_4(aq) \rightarrow 2NaCH_3COO(aq)(at\ least\ partially\ separate)+MgSO_4(s)(at\ least\ partially\ separate)$$

$$2NaCH_3COO(aq)+MgSO_4(aq) \rightarrow 2NaCH_3COO(s)(at\ least\ partially\ separate)+MgSO_4(s)(at\ least\ partially\ separate)$$

$$2K(anion)+MgSO_4 \rightarrow 2K(anion)(at\ least\ partially\ separate)+MgSO_4(at\ least\ partially\ separate)$$

$$2K(carboxylate)+MgSO_4 \rightarrow 2K(carboxylate)(at\ least\ partially\ separate)+MgSO_4(at\ least\ partially\ separate)$$

$$2KCH_3COO+MgSO_4 \rightarrow 2KCH_3COO(at\ least\ partially\ separate)+MgSO_4(at\ least\ partially\ separate)$$

$$2KCH_3COO(aq)+MgSO_4(aq) \rightarrow 2KCH_3COO(aq)(at\ least\ partially\ separate)+MgSO_4(s)(at\ least\ partially\ separate)$$

$$2KCH_3COO(aq)+MgSO_4(aq) \rightarrow 2KCH_3COO(s)(at\ least\ partially\ separate)+MgSO_4(s)(at\ least\ partially\ separate)$$

Note: For example, in some embodiments, an alkaline earth sulfate may be at least partially separated from an alkali-anion by, for example, including, but not limited to, one or more or any combination of the following: distillation, or crystallization, or nanofiltration, or electrodialysis, or monovalent selective electrodialysis, or electrodialysis reversal, or other separation process described herein, or a separation process known in the art. For example, in some embodiments, sodium acetate may possess a greater solubility than magnesium sulfate and/or may be at least partially separated from magnesium sulfate by, for example, including, but not limited to, one or more or any combination of the following: crystallization, or concentrating, or solubility, or precipitation, or selective precipitation, or solid-liquid separation or any combination thereof.

(1B—Reaction or Treatment for Separation) At least partially add or react at least a portion of an alkali carbonate, or hydroxide, or sulfite, or sulfide, or a salt of with an anion which may form a low solubility salt with an alkaline earth, or any combination thereof to or with a solid or solution or salt comprising at least a portion of an alkali-anion to react with at least a portion of any residual alkaline-earth to form, for example, at least a portion of a precipitate or solid comprising an alkaline-earth:

For example, including, but not limited to, one or more or any combination of the following:

Alkali–Anion Salt+Alkaline Earth–Sulfate+Alkali–(Anion which forms low solubility in salt with an alkaline earth)→Alkali–Anion Salt+Alkali–Sulfate+Alkaline Earth–(Anion which forms low solubility in salt with an alkaline earth)

Alkali–Anion Salt(aq)+Alkaline Earth–Sulfate(aq)+Alkali–(Anion which forms low solubility in salt with an alkaline earth)(aq)→Alkali–Anion Salt(aq)+Alkali–Sulfate(aq)+Alkaline Earth–(Anion which forms low solubility in salt with an alkaline earth)(s)

$$2Na(Anion)+MgSO_4+Na_2CO_3 \rightarrow 2Na(Anion)+Na_2SO_4+MgCO_3$$

$$2Na(Anion)+MgSO_4+Na_2SO_3 \rightarrow 2Na(Anion)+Na_2SO_4+MgSO_3$$

$$2Na(Anion)+MgSO_4+2NaHCO_3 \rightarrow 2Na(Anion)+Na_2SO_4+MgCO_3+CO_2$$

$$2Na(Anion)+MgSO_4+Na_2S \rightarrow 2Na(Anion)+Na_2SO_4+MgS$$

$$2Na(Anion)+MgSO_4+2NaOH \rightarrow 2Na(Anion)+Na_2SO_4+Mg(OH)_2$$

$2NaCH_3COO+MgSO_4+2NaOH \rightarrow 2NaCH_3COO+Na_2SO_4+Mg(OH)_2$ $2NaCH_3COO+MgSO_4+Na_2CO_3 \rightarrow 2NaCH_3COO+Na_2SO_4+MgCO_3$ $2NaCH_3COO+MgSO_4+Na_2SO_3 \rightarrow 2NaCH_3COO+Na_2SO_4+MgSO_3$ $2NaCH_3COO+MgSO_4+2NaHCO_3 \rightarrow 2NaCH_3COO+Na_2SO_4+MgCO_3+CO_2$ $2NaCH_3COO+MgSO_4+Na_2S \rightarrow 2NaCH_3COO+Na_2SO_4+MgS$ $2Na(Anion)(aq)+MgSO_4(aq)+2NaOH(s \text{ or } aq) \rightarrow 2Na(Anion)(aq)+Na_2SO_4(aq \text{ or } s)+Mg(OH)_2(s)$ $2NaCH_3COO(aq)+MgSO_4(aq)+2NaOH(aq) \rightarrow 2NaCH_3COO(aq)+Na_2SO_4(aq)+Mg(OH)_2(s)$ $2Na(Anion)(aq)+MgSO_4(aq)+Na_2CO_3(s \text{ or } aq) \rightarrow 2Na(Anion)(aq)+Na_2SO_4(aq)+MgCO_3(s)$ $2Na(Anion)(aq)+MgSO_4(aq)+Na_2SO_3(s \text{ or } aq) \rightarrow 2Na(Anion)(aq)Na_2SO_4(aq)+MgSO_3(s)+$ $2Na(Anion)(aq)+MgSO_4(aq)+2NaHCO_3(s \text{ or } aq) \rightarrow 2Na(Anion)(aq)+Na_2SO_4(aq)+MgCO_3(s)+CO_2(g)$ $2Na(Anion)(aq)+MgSO_4(aq)+Na_2S(s \text{ or } aq) \rightarrow 2Na(Anion)(aq)+Na_2SO_4(aq)+MgS(s)$ $2NaCH_3COO(aq)+MgSO_4(aq)+Na_2CO_3(s \text{ or } aq) \rightarrow 2NaCH_3COO(aq)+Na_2SO_4(aq)+MgCO_3(s)$ $2NaCH_3COO(aq)+MgSO_4(aq)+Na_2SO_3(aq) \rightarrow 2NaCH_3COO(aq)+Na_2SO_4(aq)+MgSO_3(s)$ $2NaCH_3COO(aq)+MgSO_4(aq)+2NaHCO_3(s \text{ or } aq) \rightarrow 2NaCH_3COO(aq)+Na_2SO_4(aq)+MgCO_3(s)+CO_2(g)$ $2NaCH_3COO(aq)+MgSO_4(aq)+Na_2S(s \text{ or } aq) \rightarrow 2NaCH_3COO(aq)+Na_2SO_4(aq)+MgS(s)$ $2Na(Anion)+CaSO_4+Na_2CO_3 \rightarrow 2Na(Anion)+Na_2SO_4+CaCO_3$ $2Na(Anion)+CaSO_4+Na_2SO_3 \rightarrow 2Na(Anion)+Na_2SO_4+CaSO_3$ $2Na(Anion)+CaSO_4+2NaHCO_3 \rightarrow 2Na(Anion)+Na_2SO_4+CaCO_3+CO_2$ $2Na(Anion)+CaSO_4+Na_2S \rightarrow 2Na(Anion)+Na_2SO_4+CaS$ $2NaCH_3COO+CaSO_4+Na_2CO_3 \rightarrow 2NaCH_3COO+Na_2SO_4+CaCO_3$ $2NaCH_3COO+CaSO_4+Na_2SO_3 \rightarrow 2NaCH_3COO+Na_2SO_4+CaSO_3$ $2NaCH_3COO+CaSO_4+2NaHCO_3 \rightarrow 2NaCH_3COO+Na_2SO_4+CaCO_3+CO_2$ $2NaCH_3COO+CaSO_4+Na_2S \rightarrow 2NaCH_3COO+Na_2SO_4+CaS$ $2Na(Anion)(aq)+CaSO_4(aq)+Na_2CO_3(s \text{ or } aq) \rightarrow 2Na(Anion)(aq)+Na_2SO_4(aq)+CaCO_3(s)$ $2Na(Anion)(aq)+CaSO_4(aq)+Na_2SO_3(s \text{ or } aq) \rightarrow 2Na(Anion)(aq)Na_2SO_4(aq)+CaSO_3(s)+$ $2Na(Anion)(aq)+CaSO_4(aq)+2NaHCO_3(s \text{ or } aq) \rightarrow 2Na(Anion)(aq)+Na_2SO_4(aq)+CaCO_3(s)+CO_2(g)$ $2Na(Anion)(aq)+CaSO_4(aq)+Na_2S(s \text{ or } aq) \rightarrow 2Na(Anion)(aq)+Na_2SO_4(aq)+CaS(s)$ $2NaCH_3COO(aq)+CaSO_4(aq)+Na_2CO_3(s \text{ or } aq) \rightarrow 2NaCH_3COO(aq)+Na_2SO_4(aq)+CaCO_3(s)$ $2NaCH_3COO(aq)+CaSO_4(aq)+Na_2SO_3(aq) \rightarrow 2NaCH_3COO(aq)+Na_2SO_4(aq)+CaSO_3(s)$ $2NaCH_3COO(aq)+CaSO_4(aq)+2NaHCO_3(s \text{ or } aq) \rightarrow 2NaCH_3COO(aq)+Na_2SO_4(aq)+CaCO_3(s)+CO_2(g)$ $2NaCH_3COO(aq)+CaSO_4(aq)+Na_2S(s \text{ or } aq) \rightarrow 2NaCH_3COO(aq)+Na_2SO_4(aq)+CaS(s)$ Note: In some embodiments, magnesium carbonate or magnesium sulfite produced and/or separated may be transferred to a process step which may employ magnesium carbonate or magnesium sulfite.

Note: In some embodiments, calcium carbonate or calcium sulfite produced and/or separated may be transferred to a process step which may employ calcium carbonate or calcium sulfite.

(1C—Separation of Precipitate) At least partially separating at least a portion of any precipitate or solid comprising an alkaline-earth employing, for example, a solid-liquid separation:

For example, including, but not limited to, one or more or any combination of the following:

Alkali–Anion Salt+Alkali Sulfate+[Alkaline-Earth–Low Solubility Anion]→Alkali–Anion Salt+Alkali Sulfate+[Alkaline-Earth–Low Solubility Anion](at least partially separated)

Alkali–Anion Salt(aq)+Alkali Sulfate(aq)+[Alkaline-Earth–Low Solubility Anion](s)→Alkali–Anion Salt(aq)+Alkali Sulfate(aq)+[Alkaline-Earth–Low Solubility Anion](s)(at least partially separated)

$2Na(Anion)(aq)+Na_2SO_4(aq)+CaCO_3(s) \rightarrow 2Na(Anion)(aq)+Na_2SO_4(aq)+CaCO_3(s)$(at least partially separated)

$2Na(Anion)(aq)+Na_2SO_4(aq)+CaSO_3(s) \rightarrow 2Na(Anion)(aq)+Na_2SO_4(aq)+CaSO_3(s)$(at least partially separated)

$2Na(Anion)(aq)+Na_2SO_4(aq)+CaCO_3(s)+CO_2(g) \rightarrow 2Na(Anion)(aq)+Na_2SO_4(aq)+CaSO_3(s)$(at least partially separated)

$2Na(Anion)(aq)+Na_2SO_4(aq)+CaS(s) \rightarrow 2Na(Anion)(aq)+Na_2SO_4(aq)+CaSO_3(s)$(at least partially separated)

$2Na(Anion)+Na_2SO_4+Mg(OH)_2 \rightarrow 2Na(Anion)+Na_2SO_4+Mg(OH)$(at least partially separated)

$2NaCH_3COO+Na_2SO_4+Mg(OH)_2 \rightarrow 2NaCH_3COO)+Na_2SO_4)+Mg(OH)_2$(at least partially separated)

$2Na(Anion)(aq)+Na_2SO_4(aq \text{ or } s)+Mg(OH)_2(s) \rightarrow 2Na(Anion)(aq)+Na_2SO_4(aq \text{ or } s)+Mg(OH)_2(s)$(at least partially separated)

$2NaCH_3COO(aq)+Na_2SO_4(aq)+$
$Mg(OH)_2(s) \rightarrow 2NaCH_3COO(aq)+Na_2SO_4(aq)+$
$Mg(OH)_2(s)$(at least partially separated)

$2NaCH_3COO(aq)+Na_2SO_4(aq)+$
$CaCO_3(s) \rightarrow 2NaCH_3COO(aq)+Na_2SO_4(aq)+$
$CaSO_3(s)$(at least partially separated)

$2NaCH_3COO(aq)+Na_2SO_4(aq)+$
$CaSO_3(s) \rightarrow 2NaCH_3COO(aq)+Na_2SO_4(aq)+$
$CaSO_3(s)$(at least partially separated)

$2NaCH_3COO(aq)+Na_2SO_4(aq)+CaCO_3(s)+$
$CO_2(g) \rightarrow 2NaCH_3COO(aq)+Na_2SO_4(aq)+$
$CaSO_3(s)$(at least partially separated)

$2NaCH_3COO(aq)+Na_2SO_4(aq)+$
$CaS(s) \rightarrow 2NaCH_3COO(aq)+Na_2SO_4(aq)+$
$CaSO_3(s)$(at least partially separated)

(1D—Separation) At least partially separate at least a portion of divalent salts, or divalent ions, or multivalent ions, or heavy metal salts, or impurities, or alkaline earth, or alkaline earth sulfate, or magnesium sulfate, or any combination thereof from, for example, at least a portion of an alkali-anion salt or alkali-monovalent anion salt employing, for example, nanofiltration:

For example, including, but not limited to, one or more or any combination of the following:

Alkali–Anion Salt+[Heavy Metal Impurities, and/or Divalent Ions and/or Multivalent Ions and/or Other Impurities]→[Separate Permeate comprising Alkali–Anion Salt]+[Separate Retentate comprising(Heavy Metal Impurities, and/or Divalent Ions and/or Multivalent Ions and/or Other Impurities) and/or Alkali Sulfate]

2Na(Anion)+[Heavy Metal Impurities, and/or Divalent Ions and/or Multivalent Ions and/or Other Impurities]→[Separate Permeate comprising 2Na(Anion)]+[Separate Retentate comprising (Heavy Metal Impurities, and/or Divalent Ions and/or Multivalent Ions and/or Other Impurities) and/or $Na_2SO_4$]

2Na(Anion)+$Na_2SO_4$+[Heavy Metal Impurities, and/or Divalent Ions and/or Multivalent Ions and/or Other Impurities]→[Separate Permeate comprising 2Na(Anion)]+[Separate Retentate comprising(Heavy Metal Impurities, and/or Divalent Ions and/or Multivalent Ions and/or Other Impurities) and/or $Na_2SO_4$]

2Na(Anion)(aq)+$Na_2SO_4$(aq)+[Heavy Metal Impurities, and/or Divalent Ions and/or Multivalent Ions and/or Other Impurities](aq)→[Separate Permeate comprising 2Na(Anion)](aq)+[Separate Retentate comprising(Heavy Metal Impurities, and/or Divalent Ions and/or Multivalent Ions and/or Other Impurities) and/or $Na_2SO_4$] (aq)

$2NaCH_3COO$+[Heavy Metal Impurities, and/or Divalent Ions and/or Multivalent Ions and/or Other Impurities]→[Separate Permeate comprising $2NaCH_3COO$]+[Separate Retentate comprising(Heavy Metal Impurities, and/or Divalent Ions and/or Multivalent Ions and/or Other Impurities) and/or $Na_2SO_4$]

$2NaCH_3COO$+$Na_2SO_4$+[Heavy Metal Impurities, and/or Divalent Ions and/or Multivalent Ions and/or Other Impurities]→[Separate Permeate comprising $2NaCH_3COO$]+[Separate Retentate comprising(Heavy Metal Impurities, and/or Divalent Ions and/or Multivalent Ions and/or Other Impurities) and/or $Na_2SO_4$]

$2NaCH_3COO$(aq)+$Na_2SO_4$(aq)+[Heavy Metal Impurities, and/or Divalent Ions and/or Multivalent Ions and/or Other Impurities](aq)→[Separate Permeate comprising $2NaCH_3COO$](aq)+[Separate Retentate comprising(Heavy Metal Impurities, and/or Divalent Ions and/or Multivalent Ions and/or Other Impurities) and/or $Na_2SO_4$] (aq)

Note: In some embodiments, a nanofiltration process may form at least a portion of a retentate comprising at least a portion of divalent salts, or divalent ions, or multivalent ions, or heavy metal salts, or impurities, or any combination thereof and/or a permeate comprising a solution comprising alkali-anion salt or alkali-monovalent anion salt.

(1E—Treatment of Retentate) At least partially add at least a portion of a chemical comprising an acid to at least a portion of the solution comprising a retentate to, for example, react with at least a portion of any residual alkali-anion salt and/or form, for example, at least a portion of anion acid or anion derivative acid:

For example, including, but not limited to, one or more or any combination of the following:

[Heavy Metal Impurities, and/or Divalent Ions and/or Multivalent Ions and/or Other Impurities]+ 2Na(Anion)+Acid #2→[Heavy Metal Impurities, and/or Divalent Ions and/or Multivalent Ions and/or Other Impurities]+2Na(Acid #2Anion)+Anion Acid

[Heavy Metal Impurities, and/or Divalent Ions and/or Multivalent Ions and/or Other Impurities]+ 2Na(Anion)+Stronger Acid→[Heavy Metal Impurities, and/or Divalent Ions and/or Multivalent Ions and/or Other Impurities]+2Na(Stronger Acid Anion)+Anion Acid

[Heavy Metal Impurities, and/or Divalent Ions and/or Multivalent Ions and/or Other Impurities] (aq)+2Na(Anion)(aq)+Stronger Acid(aq)→ [Heavy Metal Impurities, and/or Divalent Ions and/or Multivalent Ions and/or Other Impurities](aq)+2Na(Stronger Acid Anion)(aq)+Anion Acid(aq or g or l)

[Heavy Metal Impurities, and/or Divalent Ions and/or Multivalent Ions and/or Other Impurities] (aq)+$2NaCH_3COO$(aq)+2HCl(aq)→[Heavy Metal Impurities, and/or Divalent Ions and/or Multivalent Ions and/or Other Impurities](aq)+ 2NaCl(aq)+$2CH_3COOH$(aq or g or l)

[Heavy Metal Impurities, and/or Divalent Ions and/or Multivalent Ions and/or Other Impurities] (aq)+$2NaCH_3COO$(aq)+$SO_2$(g or aq)→[Heavy Metal Impurities, and/or Divalent Ions and/or Multivalent Ions and/or Other Impurities](aq)+ $Na_2SO_3$(aq)+$2CH_3COOH$(aq or g or l)

[Heavy Metal Impurities, and/or Divalent Ions and/or Multivalent Ions and/or Other Impurities] (aq)+$2NaCH_3COO$(aq)+$H_2SO_4$(g or aq)→ [Heavy Metal Impurities, and/or Divalent Ions and/or Multivalent Ions and/or Other Impurities](aq)+$Na_2SO_4$(aq)+$2CH_3COOH$(aq or g or l)

(1F—Recovery of Useful or Valuable or Desired Chemical from Retentate) At least partially recovering or separating or removing at least a portion of a useful or valuable or desired chemical from the retentate or treated retentate:

For example, including, but not limited to, one or more or any combination of the following:

[Heavy Metal Impurities, and/or Divalent Ions and/or Multivalent Ions and/or Other Impurities]+ 2Na(Acid #2Anion)+Anion Acid→[Heavy Metal Impurities, and/or Divalent Ions and/or Multivalent Ions and/or Other Impurities and/or 2Na(Acid #2Anion)]+[Anion Acid+Solvent Water]

[Heavy Metal Impurities, and/or Divalent Ions and/or Multivalent Ions and/or Other Impurities](aq)+2Na(Acid #2Anion)(aq)+Anion Acid(aq)→[Heavy Metal Impurities, and/or Divalent Ions and/or Multivalent Ions and/or Other Impurities and/or 2Na(Acid #2Anion)](s)+[Separate Anion Acid+Solvent Water](aq)

[Heavy Metal Impurities, and/or Divalent Ions and/or Multivalent Ions and/or Other Impurities](aq)+2Na(Acid #2Anion)(aq)+Anion Acid(aq)→[Heavy Metal Impurities, and/or Divalent Ions and/or Multivalent Ions and/or Other Impurities and/or 2Na(Acid #2Anion)](s)+[Separate Anion Acid](aq)

[Heavy Metal Impurities, and/or Divalent Ions and/or Multivalent Ions and/or Other Impurities]+2NaCl+2CH$_3$OOH→[Heavy Metal Impurities, and/or Divalent Ions and/or Multivalent Ions and/or Other Impurities and/or 2NaCl]+[2CH$_3$OOH+Solvent Water]

[Heavy Metal Impurities, and/or Divalent Ions and/or Multivalent Ions and/or Other Impurities](aq)+2NaCl(aq)+2CH$_3$OOH(aq)→[Heavy Metal Impurities, and/or Divalent Ions and/or Multivalent Ions and/or Other Impurities and/or 2NaCl](s)+[2CH$_3$OOH+Solvent Water](aq)

[Heavy Metal Impurities, and/or Divalent Ions and/or Multivalent Ions and/or Other Impurities](aq)+2NaCl(aq)+2CH$_3$OOH(aq)→[Heavy Metal Impurities, and/or Divalent Ions and/or Multivalent Ions and/or Other Impurities and/or 2NaCl](s)+2CH$_3$OOH(aq)

Note: In some embodiments, anion acid may be recovered or separated by distillation because, for example, the vapor pressure of some anion acids may enable distillation or vaporization or condensation simultaneous to or with the distillation or vaporization or condensation of solvent water, which may result in a solution, or condensate, or distillate comprising aqueous anion acid. In some embodiments, anion acid, such as acetic acid or formic acid, may be recovered or separated by distillation because, for example, the vapor pressure of some anion acids, such as acetic acid or formic acid, may enable distillation or vaporization or condensation simultaneous to or with the distillation or vaporization or condensation of solvent water, which may result in a solution, or condensate, or distillate comprising aqueous anion acid, such as aqueous acetic acid or formic acid.

(1G—Reacting Chemical Recovered from Retentate and/or Concentrating) At least partially reacting at least a portion of the useful or valuable or desired chemical recovered from retentate or treated retentate and/or concentrating:

For example, including, but not limited to, one or more or any combination of the following:

[Anion Acid]+[Alkaline-Earth Base]→Alkaline-Earth–Anion Salt

[Anion Acid](aq)+[Alkaline-Earth Base](s)→Alkaline-Earth-Anion Salt(s or aq)

[Anion Acid](aq)+[Alkaline-Earth Base](s or aq)→Alkaline-Earth–Anion Salt(aq)

Alkaline-Earth–Anion Salt(aq)→Alkaline-Earth–Anion Salt(aq)(concentrated RO or NF retentate)(separate)+Solvent Water(separate)

Alkaline-Earth–Anion Salt(aq)→Alkaline-Earth–Anion Salt(aq)(concentrated)(separate)+Solvent Water(distillate or condensate)(separate)

Alkaline-Earth–Anion Salt(aq)→Alkaline-Earth–Anion Salt(s)(separate)+Solvent Water(separate)

[Anion Acid](aq)+[Alkaline-Earth Base]→Alkaline-Earth–Anion Salt

[Anion Acid](aq)+[Alkaline-Earth Base](s)→Alkaline-Earth–Anion Salt(s or aq)

[Anion Acid](aq)+[Alkaline-Earth Base](s or aq)→Alkaline-Earth–Anion Salt(aq)

Alkaline-Earth–Anion Salt(aq)→Alkaline-Earth–Anion Salt(aq)(concentrated RO or NF retentate)(separate)+Solvent Water(separate)

Alkaline-Earth–Anion Salt(aq)→Alkaline-Earth–Anion Salt(aq)(concentrated)(separate)+Solvent Water(distillate or condensate)(separate)

Alkaline-Earth–Anion Salt(aq)→Alkaline-Earth–Anion Salt(s)(separate)+Solvent Water(separate)

[Anion Acid]+[Alkali Base]→Alkali–Anion Salt

[Anion Acid](aq)+[Alkali Base](s)→Alkali–Anion Salt(s or aq)

[Anion Acid](aq)+[Alkali Base](s or aq)→Alkali–Anion Salt(aq)

Alkali-Anion Salt(aq)→Alkali–Anion Salt(aq)(concentrated RO or NF retentate)(separate)+Solvent Water(permeate separate)

Alkali–Anion Salt(aq)→Alkali–Anion Salt(aq)(concentrated)(separate)+Solvent Water(distillate or condensate)(separate)

Alkali–Anion Salt(aq)→Alkali–Anion Salt(s)(separate)+Solvent Water(separate)

$2CH_3COOH+CaCO_3\rightarrow Ca(CH_3COO)_2+CO_2$ $2CH_3COOH(aq)+CaCO_3(s)\rightarrow Ca(CH_3COO)_2$(aq or s)$+CO_2(g)$ $Ca(CH_3COO)_2$(aq)$Ca(CH_3COO)_2$(aq)(concentrated RO or NF retentate)(separate)+Solvent Water (permeate,separate)

$Ca(CH_3COO)_2$(aq)→$Ca(CH_3COO)_2$(aq)(concentrated)(separate)+Solvent Water(distillate or condensate)(separate)

$Ca(CH_3COO)_2$(aq)→$Ca(CH_3COO)_2$(s)(separate)+Solvent Water(g or l or s) (separate)

$2CH_3COOH+Na_2CO_3\rightarrow 2NaCH_3COO+CO_2$ $2CH_3COOH(aq)+Na_2CO_3(s)\rightarrow 2NaCH_3COO$(aq or s)$+CO_2(g)$ $2NaCH_3COO$(aq)$_2NaCH_3COO$(aq)(concentrated RO or NF retentate)(separate)+Solvent Water(permeate,separate)

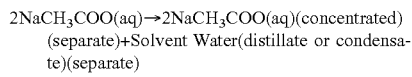

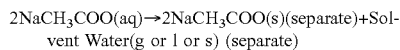

Note: In some embodiments, it may be desirable to change or adjust the order of the steps or sub-steps comprising step 1, or step 1B, or step 1C, or step 1D, or step 1E, or step 1F, or step 1G, or any combination thereof.

Note: In some embodiments, it may be desirable to (1) dissolve at least a portion of a salt comprising alkali anion to form, for example, a solution comprising alkali anion; then, for example, (2) transfer said solution comprising alkali anion to a membrane separation process, such as nanofiltration, to form a permeate comprising a solution comprising alkali anion salt and a retentate comprising at least a portion of any residual alkaline-earth sulfate; then for example, (3) transfer at least a portion of the retentate to a distillation and/or crystallization process to separate at least a portion of the salt comprising an alkaline earth sulfate from at least a portion of the salt comprising alkali anion.

Note: In some embodiments, it may be desirable to (1) dissolve at least a portion of a salt comprising sodium acetate to form, for example, a solution comprising sodium acetate; then, for example, (2) transfer said solution comprising sodium acetate to a membrane separation process, such as nanofiltration, to form a permeate comprising a solution comprising sodium acetate salt and a retentate comprising at least a portion of any residual magnesium sulfate; then for example, (3) transfer at least a portion of the retentate to a distillation and/or crystallization process to separate at least a portion of the salt comprising an magnesium sulfate from at least a portion of the salt comprising sodium acetate.

Note: In some embodiments, at least a portion of alkaline earth sulfate may be separated from at least a portion of alkali-anion salt using nanofiltration, or electrodialysis, or monovalent selective electrodialysis, or any combination thereof.

Note: In some embodiments, at least a portion of magnesium sulfate may be separated from at least a portion of sodium acetate using nanofiltration, or electrodialysis, or monovalent selective electrodialysis, or any combination thereof.

Note: In some embodiments, at least a portion of magnesium sulfate may be at least partially separated from at least a portion of sodium acetate using nanofiltration. For example, including, but not limited to, one or more or any combination of the following:

(1) At least partially mix or react a solution comprising sodium sulfate and with a solution comprising magnesium acetate to form a solution comprising sodium sulfate and magnesium acetate.

Note: In some embodiments, it may be desirable for the concentration of the nanofiltration feed solution to be relatively dilute, such as a concentration less than the maximum total dissolved solids or osmotic pressure for a nanofiltration or high pressure nanofiltration process, or a concentration of magnesium sulfate less than 100 grams per liter, or a concentration of sodium acetate less than 100 grams per liter, or any combination thereof.

(2) At least partially separate at least a portion of magnesium sulfate from at least a portion of sodium acetate using, for example, nanofiltration, to form, for example, a retentate comprising magnesium sulfate and a permeate comprising sodium acetate.

(3) Option A: In some embodiments, at least partially concentrate the retentate and/or at least partially crystallize the retentate. In some embodiments, at least partially concentrate the retentate and/or at least partially crystallize the retentate, wherein least a portion of magnesium sulfate may separate from at least a portion of sodium acetate due to differences in solubility. In some embodiments, for example, at least a portion of magnesium sulfate may crystallize or form a solid while at least a portion of sodium acetate may remain at an aqueous phase.

(4) Option B: The retentate may be treated before crystallization, to, for example, remove residual sodium acetate or recover any residual acetate or acetic acid. Alternatively, the permeate may be further treated to remove at least a portion of any residual magnesium, magnesium sulfate, or any combination thereof. In some embodiments, for example, a purge stream comprising at portion of the retentate may be removed to, for example, remove at least a portion of any impurities or, for example, reduce or prevent substantial accumulation of any impurities or any heavy metal impurities.

(5) Option C: The retentate, which may be referred to as a 'first solution' may comprise at least a portion of residual sodium acetate. In some embodiments, at least a portion of sulfuric acid may be added to the retentate ('first solution') to react with, for example, at least a portion of the residual sodium acetate to form, for example, a second solution comprising at least a portion of sodium sulfate and/or at least a portion of acetic acid. In some embodiments, at least a portion of the sodium sulfate may be separated from the second solution by, for example, the substantial difference in solubility between sodium sulfate and magnesium sulfate, especially at lower temperatures or temperatures below 40 degrees Celsius, or 30 degrees Celsius, or 20 degrees Celsius, or any combination thereof. For example, the second solution may be cooled, or may undergo further concentrating, or may be distilled, or any combination thereof to crystallize or precipitate at least a portion of the sodium sulfate from the second solution. In some embodiments, at least a portion of the vapor, or condensate, or permeate, or any combination thereof produced from the second solution may comprise acetic acid or aqueous acetic acid. In some embodiments, the second solution may be at least partially separated into streams or at least partially separate streams comprising one or more or any combination of the following: magnesium sulfate, or sodium sulfate, or acetic acid, or aqueous acetic acid, or sodium acetate.

(6) In some embodiments, at least partially concentrate the permeate solution comprising sodium acetate using, for example, reverse osmosis. Alternatively, or additionally, in some embodiments, the solution comprising sodium acetate may be transferred to a step wherein the solution comprising sodium acetate may be contacted with a gas or fluid or solution comprising sulfur dioxide to form, for example, at least a portion of sodium sulfite and/or at least a portion of acetic acid.

Note: A solid or solution comprising at least partially separated magnesium sulfate, or at least partially separated magnesium sulfate solid which may be dissolved in water or an aqueous solution to form a solution comprising aqueous magnesium sulfate, or any combination thereof may be references as a 'first solution' and/or may comprise at least a portion of residual sodium acetate. In some embodiments, at least a portion of a chemical comprising sulfuric acid may be added to the first solution and/or at least a portion of a chemical comprising sulfuric acid may react with, for example, at least a portion of the residual sodium acetate to form, for example, a second solution comprising at least a portion of sodium sulfate, or at least a portion of acetic acid, or any combination thereof. In some embodiments, at least a portion of the sodium sulfate may be separated from the second solution by, for example, the substantial difference in solubility between sodium sulfate and magnesium sulfate, especially at lower temperatures or temperatures below 40 degrees Celsius, or 30 degrees Celsius, or 20 degrees Celsius, or any combination thereof. For example, the second solution may be cooled, or may undergo further concentrating, or may be distilled, or any combination thereof to crystallize or precipitate at least a portion of the sodium sulfate from the second solution. In some embodiments, at least a portion of the vapor, or condensate, or permeate, or any combination thereof produced from the second solution may comprise acetic acid or aqueous acetic acid. In some embodiments, the second solution may be at least partially separated into streams or at least partially separate streams comprising one or more or any combination of the following: magnesium sulfate, or sodium sulfate, or acetic acid, or aqueous acetic acid, or sodium acetate.

Note: Separate magnesium sulfate from sodium acetate using monovalent selective electrodialysis (2) At least partially decompose at least a portion of a material comprising an alkaline earth sulfate to form, for example, at least a portion of an alkaline earth oxide and/or at least a portion of a gas or fluid comprising sulfur dioxide, or diatomic oxygen, or sulfur trioxide, or any combination thereof.

For example, including, but not limited to, one or more or any combination of the following:

$MgSO_4 \rightarrow MgO+SO_2+\frac{1}{2}O_2$ $MgSO_4 \rightarrow MgO+SO_3$ $MgSO_4(s) \rightarrow MgO(s)+SO_2(g)+\frac{1}{2}O_2(g)$ $MgSO_4(s) \rightarrow MgO(s)+SO_3(g)$ (3) At least partially react at least a portion of a gas or fluid comprising sulfur dioxide, or diatomic oxygen, or sulfur trioxide, or any combination thereof with at least a portion of water or sulfuric acid to form, for example, at least a portion of sulfuric acid.

For example, including, but not limited to, one or more or any combination of the following:

$H_2SO_4+SO_3 \rightarrow H_2S_2O_7$ $H_2S_2O_7+H_2O \rightarrow 2H_2SO_4$ $SO_2+\frac{1}{2}O_2+H_2O \rightarrow H_2SO_4$ $SO_3+H_2O \rightarrow H_2SO_4$ $SO_3+H_2O \rightarrow H_2SO_4(g)$ $H_2SO_4(g) \rightarrow H_2SO_4(l)$ $SO_2(g \text{ or aq or } l)+\frac{1}{2}O_2(g)+H_2O(g \text{ or } l) \rightarrow H_2SO_4(l \text{ or g or aq})$ $SO_3(g \text{ or aq or } l)+H_2O(g \text{ or } l) \rightarrow H_2SO_4(l \text{ or g or aq})$ Note: Heat may be recovered from one or more or any combination of reactions to form or produce sulfuric acid.

(4) At least partially react at least a portion of a material comprising an alkaline earth oxide, or alkaline earth hydroxide, or a derivative of an alkaline earth oxide, or an alkaline earth carbonate, or any combination thereof with at least a portion of an anion acid to form at least a portion of a salt or solution comprising an alkaline earth anion and/or a gas or fluid or liquid or solution comprising water and/or a gas or fluid comprising carbon dioxide.

For example, including, but not limited to, one or more or any combination of the following:

$MgO+2CH_3COOH \rightarrow Mg(CH_3COO)_2+H_2O$ $Mg(OH)_2+2CH_3COOH \rightarrow Mg(CH_3COO)_2+H_2O$ $MgO+CO_2 \rightarrow MgCO_3$ $MgO+H_2O \rightarrow Mg(OH)_2$ $Mg(OH)_2+CO_2 \rightarrow MgCO_3+H_2O$ $Mg(OH)_2+\text{Carbonate or Bicarbonate Salt} \rightarrow MgCO_3$ $MgCO_3+2CH_3COOH \rightarrow Mg(CH_3COO)_2+H_2O+CO_2$ $MgO(s)+2CH_3COOH(g \text{ or } l \text{ or aq}) \rightarrow Mg(CH_3COO)_2(s \text{ or aq})+H_2O(aq \text{ or g})$ $Mg(OH)_2(s \text{ or aq})+2CH_3COOH(aq \text{ or } l \text{ or g or s}) \rightarrow Mg(CH_3COO)_2(aq \text{ or s})+H_2O(aq \text{ or } l \text{ or g})$ $MgO(s)+CO_2(g \text{ or aq}) \rightarrow MgCO_3(s)$ $MgO(s)+H_2O(g \text{ or } l \text{ or aq}) \rightarrow Mg(OH)_2(s \text{ or aq})$ $Mg(OH)_2(s \text{ or aq})+CO_2(g \text{ or aq}) \rightarrow MgCO_3(s)+H_2O(aq \text{ or } l \text{ or g})$ $Mg(OH)_2(s \text{ or aq})+\text{Carbonate or Bicarbonate Salt}(s \text{ or aq}) \rightarrow MgCO_3(s)$ $MgCO_3(s)+2CH_3COOH(aq \text{ or } l \text{ or g}) \rightarrow Mg(CH_3COO)_2(aq \text{ or s})+H_2O(l \text{ or aq or g})+CO_2(g \text{ or aq})$ Note: Heat may be recovered from one or more or any combination of reactions which may be employed to form or produce magnesium acetate.

Note: Heat may be recovered from one or more or any combination of reactions to form or produce magnesium hydroxide.

Note: Magnesium oxide or magnesium hydroxide may be employed to capture $CO_2$ and/or at least a portion of $CO_2$ may be desorbed by reacting at least a portion magnesium carbonate with at least a portion of acetic acid to form magnesium acetate and captured carbon dioxide.

(5) At least partially react at least a portion of a solution or salt comprising an alkali anion salt with at least a portion of a gas comprising sulfur dioxide, to form, for example, at least a portion of a solution or salt comprising an alkali sulfite or bisulfite and/or at least a portion of a solution or acid or vapor comprising an anion acid.

For example, including, but not limited to, one or more or any combination of the following:

[Alkali–Anion]+$SO_2 \rightarrow$ Alkali Sulfite+Anion Acid

[Alkali–Anion](aq)+$SO_2$(g or aq)$\rightarrow$Alkali Sulfite(aq or s)+Anion Acid(aq or g)

$$2\text{Na(anion)} + \text{SO}_2 + \text{H}_2\text{O} \rightarrow \text{Na}_2\text{SO}_3 + 2\text{Anion Acid}$$

$$2\text{Na(anion)(aq or s)} + \text{SO}_2\text{(g or aq)} + \text{H}_2\text{O(l or g)} \rightarrow \text{Na}_2\text{SO}_3\text{(aq or s)} + 2\text{Anion Acid(aq or g)}$$

$$2\text{Na(anion)(aq)} + \text{SO}_2\text{(g)} + \text{H}_2\text{O(l)} \rightarrow \text{Na}_2\text{SO}_3\text{(aq)} + 2\text{Anion Acid(aq)}$$

$$2\text{Na(carboxylate)} + \text{SO}_2 + \text{H}_2\text{O} \rightarrow \text{Na}_2\text{SO}_3 + 2\text{Carboxylic Acid}$$

$$2\text{Na(carboxylate)(aq or s)} + \text{SO}_2\text{(g or aq)} + \text{H}_2\text{O(l or g)} \rightarrow \text{Na}_2\text{SO}_3\text{(aq or s)} + 2\text{Carboxylic Acid(aq or g)}$$

$$2\text{Na(carboxylate)(aq)} + \text{SO}_2\text{(g)} + \text{H}_2\text{O(l)} \rightarrow \text{Na}_2\text{SO}_3\text{(aq)} + 2\text{Carboxylic Acid(aq)}$$

$$2\text{NaCH}_3\text{COO} + \text{SO}_2 + \text{H}_2\text{O} \rightarrow \text{Na}_2\text{SO}_3 + 2\text{CH}_3\text{COOH}$$

$$2\text{NaCH}_3\text{COO(aq or s)} + \text{SO}_2\text{(g or aq)} + \text{H}_2\text{O(l or g)} \rightarrow \text{Na}_2\text{SO}_3\text{(aq or s)} + 2\text{CH}_3\text{COOH(aq or g)}$$

$$2\text{NaCH}_3\text{COO(aq)} + \text{SO}_2\text{(g)} + \text{H}_2\text{O(l)} \rightarrow \text{Na}_2\text{SO}_3\text{(aq)} + 2\text{CH}_3\text{COOH(aq)}$$

(5—separation) At least partially separate at least a portion of an anion acid from at least a portion of an alkali sulfite or bisulfite:

For example, including, but not limited to, one or more or any combination of the following:

$$\text{Alkali Sulfite} + \text{Anion Acid} \rightarrow \text{Alkali Sulfite(separate)} + \text{Anion Acid(separate)}$$

$$\text{Alkali Sulfite(aq)} + \text{Anion Acid(aq)} \rightarrow \text{Alkali Sulfite(s)} + \text{Anion Acid(aq)(separate)}$$

$$\text{Na}_2\text{SO}_3 + 2\text{CH}_3\text{COOH} \rightarrow \text{Na}_2\text{SO}_3\text{(separate)} + 2\text{CH}_3\text{COOH(separate)}$$

$$\text{Na}_2\text{SO}_3\text{(aq)} + 2\text{CH}_3\text{COOH(aq)} \rightarrow \text{Na}_2\text{SO}_3\text{(s)(separate)} + 2\text{CH}_3\text{COOH(aq) (separate)}$$

$$\text{Na}_2\text{SO}_3\text{(aq)} + 2\text{CH}_3\text{COOH(aq)} \rightarrow \text{Na}_2\text{SO}_3\text{(aq)(retentate)} + 2\text{CH}_3\text{COOH(aq) (permeate)}$$

$$\text{Na}_2\text{SO}_3\text{(aq)} + 2\text{CH}_3\text{COOH(aq)} \rightarrow \text{Na}_2\text{SO}_3\text{(aq)(concentrate)} + 2\text{CH}_3\text{COOH(aq) (diluate)}$$

$$\text{Na}_2\text{SO}_3\text{(aq)} + 2\text{CH}_3\text{COOH(aq)} \rightarrow \text{Na}_2\text{SO}_3\text{(aq)(concentrate)} + 2\text{CH}_3\text{COOH(s)(aq)} + \text{Water Solvent(s)}$$

$$\text{Na}_2\text{SO}_3 + 2\text{CH}_3\text{COOH} \rightarrow \text{Na}_2\text{SO}_3 \text{ (at least partially separate)} + 2\text{CH}_3\text{COOH (at least partially separate)}$$

$$\text{Na}_2\text{SO}_3\text{(aq)} + 2\text{CH}_3\text{COOH(aq)} \rightarrow \text{Na}_2\text{SO}_3\text{(s)(at least partially separate)} + 2\text{CH}_3\text{COOH(aq)(at least partially separate)}$$

Note: Separating may comprise, for example, including, but not limited to, one or more or any combination of the following: mechanical vapor compression distillation, or multieffect distillation, or crystallization, or reverse osmosis, or nanofiltration, or a membrane based process, or electrodialysis, or freeze desalination, or a combination of freeze desalination and reverse osmosis, or a separation process described herein, or a separation process known in the art.

Note: In some embodiments, at least partially separating, for example, Alkali Sulfite+Anion Acid into at least a portion of at least partially separated Alkali Sulfite and at least partially separated Anion Acid may comprise one or more or any combination of the following:

(1) Freezing a solution comprising aqueous Alkali Sulfite and Anion Acid, such as sodium sulfite and acetic acid, to form, for example, a solid comprising water and anion acid, such as acetic acid, and a liquid or solution comprising aqueous alkali sulfite, such as sodium sulfite, which may comprise a concentrated solution or concentrated brine.

(2) Separating the liquid or solution comprising aqueous alkali sulfite, such as sodium sulfite, from the solid comprising water and anion acid, such as acetic acid.

(3) Melting the solid comprising water and anion acid, such as acetic acid, to form, for example, a solution comprising aqueous anion acid, such as aqueous acetic acid.

(4) Separating at least a portion of any residual alkali sulfite from a solution comprising aqueous anion acid, such as aqueous acetic acid, using, for example, reverse osmosis or nanofiltration or electrodialysis. For example, transfer at least a portion of a solution comprising aqueous anion acid, such as aqueous acetic acid, as a feed solution into a reverse osmosis or nanofiltration process, to form a retentate comprising aqueous alkali sulfite, such as sodium sulfite, and a permeate comprising anion acid, such as acetic acid.

(5) In some embodiments, the retentate comprising aqueous alkali sulfite may comprise residual anion acid, and/or the retentate comprising aqueous alkali sulfite may be transferred to the freezing step, or a step employing aqueous alkali sulfite, or any combination thereof.

(6) In some embodiments, the permeate comprising aqueous anion acid may be transferred to a step employing aqueous anion acid, such as a step reacting aqueous anion acid with a material comprising an alkaline earth.

(6) At least partially reacting at least a portion of a material or solution or solid comprising an alkaline earth oxide or alkaline earth hydroxide with at least a portion of a chemical comprising an alkali sulfite, to form, for example, at least a portion of a material or solid comprising alkaline earth sulfite and at least a portion of a chemical or solution comprising an alkali hydroxide.

For example, including, but not limited to, one or more or any combination of the following:

$$\text{Alkali Sulfite} + \text{Alkaline Earth Hydroxide} \rightarrow \text{Alkali Hydroxide} + \text{Alkaline Earth Sulfite}$$

$$\text{Alkali Sulfite} + \text{Alkaline Earth Oxide} + \text{Water} \rightarrow \text{Alkali Hydroxide} + \text{Alkaline Earth Sulfite}$$

$$\text{Alkali Sulfite} + \text{Alkaline Earth Oxide} + \text{Water(solvent)} \rightarrow \text{Alkali Hydroxide} + \text{Alkaline Earth Sulfite}$$

$$\text{Alkali Sulfite(s or aq)} + \text{Alkaline Earth Hydroxide(s or aq)} \rightarrow \text{Alkali Hydroxide(aq)} + \text{Alkaline Earth Sulfite(s)}$$

$$\text{Alkali Sulfite(s or aq)} + \text{Alkaline Earth Oxide(s)} + \text{Water(l or g)} \rightarrow \text{Alkali Hydroxide(aq)} + \text{Alkaline Earth Sulfite(s)}$$

$$\text{Na}_2\text{SO}_3 + \text{Ca(OH)}_2 \rightarrow 2\text{NaOH} + \text{CaSO}_3$$

$$\text{Na}_2\text{SO}_3\text{(s or aq)} + \text{Ca(OH)}_2\text{(s or aq)} \rightarrow 2\text{NaOH(aq)} + \text{CaSO}_3\text{(s)}$$

$$Na_2SO_3+CaO+H_2O \rightarrow 2NaOH+CaSO_3$$

$$Na_2SO_3(s\ or\ aq)+CaO(s)+H_2O(l\ or\ g) \rightarrow 2NaOH(aq)+CaSO_3(s)$$

(6—Separating) At least partially separating at least a portion of a solution comprising an alkali hydroxide from at least a portion of a solid comprising an alkaline earth sulfite.

For example, including, but not limited to, one or more or any combination of the following:

Alkali Hydroxide+Alkaline Earth Sulfite→Alkali Hydroxide(at least partially separate)+Alkaline Earth Sulfite(at least partially separate)

Alkali Hydroxide(aq)+Alkaline Earth Sulfite(s)→Alkali Hydroxide(aq)(at least partially separate)+Alkaline Earth Sulfite(s)(at least partially separate)

2NaOH+CaSO$_3$→2NaOH(at least partially separate)+CaSO$_3$(at least partially separate)

2NaOH(aq)+CaSO$_3$(s)→2NaOH(aq)(at least partially separate)+CaSO$_3$(s) at least partially separate)

Note: In some embodiments, a portion of residual alkaline earth hydroxide may be present in the solid comprising alkaline earth sulfite.

(7) At least partially decomposing at least a portion of a material comprising an alkaline earth sulfite to form, for example, a material comprising an alkaline earth oxide and a gas or fluid comprising sulfur dioxide.

For example, including, but not limited to, one or more or any combination of the following:

Alkaline Earth Sulfite→Alkaline Earth Oxide+Sulfur Dioxide

Alkaline Earth Sulfite(s)→Alkaline Earth Oxide(s)+Sulfur Dioxide(g)

$$CaSO_3 \rightarrow CaO+SO_2$$

$$CaSO_3(s) \rightarrow CaO(s)+SO_2(g)$$

$$CaSO_3+Ca(OH)_2 \rightarrow 2CaO+H_2O+SO_2$$

$$CaSO_3(s)+Ca(OH)_2(s) \rightarrow 2CaO(s)+H_2O(g\ or\ l\ or\ aq)+SO_2(g\ or\ l\ or\ aq)$$

Note: In some embodiments, at least a portion of the alkaline earth sulfite may be decomposed in a kiln, or calciner, or an indirect kiln, or a thermal decomposition device, or a thermal decomposition system or method, or a heating method, or any combination thereof.

Note: In some embodiments, acetic acid and acetate may be provides as an example. In some embodiments, acetic acid and acetate may be provides as an example carboxylic acid, or an example anion or acid with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof. One or more or any combination of carboxylic acids, or other anions or acids with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof may be employed instead of, or in addition to, acetic acid, for example, herein.

Example Chemistry Steps of Some Embodiments

Example Embodiment Producing Sodium Hydroxide and Sulfuric Acid from Sodium Sulfate and Water, which may include, but not limited to, one or more or any combination of the following:

(1) React at least a portion of sodium sulfate with at least a portion of magnesium acetate to form at least a portion of sodium acetate and at least a portion of magnesium sulfate.

For example, including, but not limited to, one or more or any combination of the following:

$$Na_2SO_4+Mg(CH_3COO)_2 \rightarrow 2NaCH_3COO+MgSO_4$$

$$Na_2SO_4(s\ or\ aq)+Mg(CH_3COO)_2(s\ or\ aq) \rightarrow 2NaCH_3COO(s\ or\ aq)+MgSO_4(s\ or\ aq)$$

$$Na_2SO_4(s\ or\ aq)+Mg(CH_3COO)_2(s\ or\ aq) \rightarrow 2NaCH_3COO(aq)+MgSO_4(aq)$$

(1—separation) Separating at least a portion of sodium acetate from at least a portion of magnesium sulfate.

For example, including, but not limited to, one or more or any combination of the following:

2NaCH$_3$COO+MgSO$_4$→2NaCH$_3$COO(at least partially separate)+MgSO$_4$(at least partially separate)

2NaCH$_3$COO(aq)+MgSO$_4$(aq)→2NaCH$_3$COO(aq)(at least partially separate)+MgSO$_4$(s)(at least partially separate)

2NaCH$_3$COO(aq)+MgSO$_4$(aq)→2NaCH$_3$COO(s)(at least partially separate)+MgSO$_4$(s)(at least partially separate)

(2) Decompose at least a portion of magnesium sulfate to form at least a portion of magnesium oxide and at least a portion of sulfur dioxide, or diatomic oxygen, or sulfur trioxide, or any combination thereof.

For example, including, but not limited to, one or more or any combination of the following:

$$MgSO_4 \rightarrow MgO+SO_2+\tfrac{1}{2}O_2$$

$$MgSO_4 \rightarrow MgO+SO_3$$

$$MgSO_4(s) \rightarrow MgO(s)+SO_2(g)+\tfrac{1}{2}O_2(g)$$

$$MgSO_4(s) \rightarrow MgO(s)+SO_3(g)$$

(3) React at least a portion of sulfur dioxide, or diatomic oxygen, or sulfur trioxide, or any combination thereof with at least a portion of water to form at least a portion of sulfuric acid.

For example, including, but not limited to, one or more or any combination of the following:

$$H_2SO_4+SO_3 \rightarrow H_2S_2O_7$$

$$H_2S_2O_7+H_2O \rightarrow 2H_2SO_4$$

$$SO_2+\tfrac{1}{2}O_2 \rightarrow SO_3$$

$$SO_2+\tfrac{1}{2}O_2+H_2O \rightarrow H_2SO_4$$

$$SO_3+H_2O \rightarrow H_2SO_4$$

$$SO_3+H_2O \rightarrow H_2SO_4(g)$$

$$H_2SO_4(g) \rightarrow H_2SO_4(l)$$

$$SO_2(g \text{ or aq or } l) + \tfrac{1}{2}O_2(g) + H_2O(g \text{ or } l) \rightarrow H_2SO_4(l \text{ or g or aq})$$

$$SO_3(g \text{ or aq or } l) + H_2O(g \text{ or } l) \rightarrow H_2SO_4(l \text{ or g or aq})$$

Note: Heat may be recovered from one or more or any combination of reactions to form or produce sulfuric acid.

(4) React at least a portion of magnesium oxide or a derivative of magnesium oxide with at least a portion of acetic acid to form at least a portion of magnesium acetate and water.

For example, including, but not limited to, one or more or any combination of the following:

$$MgO + 2CH_3COOH \rightarrow Mg(CH_3COO)_2 + H_2O$$

$$Mg(OH)_2 + 2CH_3COOH \rightarrow Mg(CH_3COO)_2 + H_2O$$

$$MgO + CO_2 \rightarrow MgCO_3$$

$$MgO + H_2O \rightarrow Mg(OH)_2$$

$$Mg(OH)_2 + CO_2 \rightarrow MgCO_3 + H_2O$$

$$Mg(OH)_2 + \text{Carbonate or Bicarbonate Salt} \rightarrow MgCO_3$$

$$MgCO_3 + 2CH_3COOH \rightarrow Mg(CH_3COO)_2 + H_2O + CO_2$$

$$MgO(s) + 2CH_3COOH(g \text{ or } l \text{ or aq}) \rightarrow Mg(CH_3COO)_2(s \text{ or aq}) + H_2O(aq \text{ or g})$$

$$Mg(OH)_2(s \text{ or aq}) + 2CH_3COOH(aq \text{ or } l \text{ or g or s}) \rightarrow Mg(CH_3COO)_2(aq \text{ or s}) + H_2O(aq \text{ or } l \text{ or g})$$

$$MgO(s) + CO_2(g \text{ or aq}) \rightarrow MgCO_3(s)$$

$$MgO(s) + H_2O(g \text{ or } l \text{ or aq}) \rightarrow Mg(OH)_2(s \text{ or aq})$$

$$Mg(OH)_2(s \text{ or aq}) + CO_2(g \text{ or aq}) \rightarrow MgCO_3(s) + H_2O(aq \text{ or } l \text{ or g})$$

$$Mg(OH)_2(s \text{ or aq}) + \text{Carbonate or Bicarbonate Salt}(s \text{ or aq}) \rightarrow MgCO_3(s)$$

$$MgCO_3(s) + 2CH_3COOH(aq \text{ or } l \text{ or g}) \rightarrow Mg(CH_3COO)_2(aq \text{ or s}) + H_2O(l \text{ or aq or g}) + CO_2(g \text{ or aq})$$

Note: Heat may be recovered from one or more or any combination of reactions which may be employed to form or produce magnesium acetate.

Note: Heat may be recovered from one or more or any combination of reactions to form or produce magnesium hydroxide.

Note: Magnesium oxide or magnesium hydroxide may be employed to capture $CO_2$ and/or at least a portion of $CO_2$ may be desorbed by reacting at least a portion magnesium carbonate with at least a portion of acetic acid to form magnesium acetate and captured carbon dioxide.

(5) React at least a portion of sodium acetate with at least a portion of sulfur dioxide to form at least a portion of sodium sulfite and at least a portion of acetic acid.

For example, including, but not limited to, one or more or any combination of the following:

$$2NaCH_3COO + SO_2 + H_2O \rightarrow Na_2SO_3 + 2CH_3COOH$$

$$2NaCH_3COO(aq \text{ or s}) + SO_2(g \text{ or aq}) + H_2O(l \text{ or g}) \rightarrow Na_2SO_3(aq \text{ or s}) + 2CH_3COOH(aq \text{ or g})$$

$$2NaCH_3COO(aq) + SO_2(g) + H_2O(l) \rightarrow Na_2SO_3(aq) + 2CH_3COOH(aq)$$

(5—separation) Separate at least a portion of sodium sulfite from at least a portion of acetic acid.

For example, including, but not limited to, one or more or any combination of the following:

$$Na_2SO_3 + 2CH_3COOH \rightarrow Na_2SO_3(\text{at least partially separate}) + 2CH_3COOH(\text{at least partially separate})$$

$$Na_2SO_3(aq) + 2CH_3COOH(aq) \rightarrow Na_2SO_3(\text{at least partially separate}) + 2CH_3COOH(aq)(\text{at least partially separate})$$

$$[Na+SO_2 \text{ species}] + 2CH_3COOH(aq) \rightarrow [Na+SO_2 \text{ species}](\text{at least partially separate}) + 2CH_3COOH(aq)(\text{at least partially separate})$$

For example, in some embodiments, at least a portion of Na+SO₂ species, such as Na2SO3, or NaHSO3, or a derivative thereof, or any combination thereof, may be at least partially separated from at least a portion of an acid or acid anion, such as a carboxylic acid or a carboxylic acid anion, using, for example, including, but not limited to, a membrane based process, such as for example, including, but not limited to, one or more or any combination of the following: reverse osmosis, or nanofiltration, or a derivative thereof, or a separation method described herein, or a separation method in the art, or any combination thereof.

(6) React at least a portion of sodium sulfite with at least a portion of calcium hydroxide or calcium oxide to form at least a portion of sodium hydroxide and at least a portion of calcium sulfite.

For example, including, but not limited to, one or more or any combination of the following:

$$Na_2SO_3 + Ca(OH)_2 \rightarrow 2NaOH + CaSO_3$$

$$CaO + H_2O \rightarrow Ca(OH)_2$$

$$Na_2SO_3(s \text{ or aq}) + Ca(OH)_2(s \text{ or aq}) \rightarrow 2NaOH(aq) + CaSO_3(s)$$

$$Na_2SO_3(aq) + Ca(OH)_2(s \text{ or aq}) \rightarrow 2NaOH(aq) + CaSO_3(s)$$

$$CaO(s) + H_2O(l \text{ or g or aq}) \rightarrow Ca(OH)_2(s \text{ or aq})$$

(6—separation) Separating at least a portion of calcium sulfite from at least a portion of sodium hydroxide.

For example, including, but not limited to, one or more or any combination of the following:

$$2NaOH + CaSO_3 \rightarrow 2NaOH(\text{at least partially separate}) + CaSO_3(\text{at least partially separate})$$

$$2NaOH(aq) + CaSO_3(s) \rightarrow 2NaOH(aq)(\text{at least partially separate}) + CaSO_3(s)(\text{at least partially separate})$$

(7) Decomposing at least a portion of calcium sulfite to form at least a portion of calcium oxide and at least a portion of sulfur dioxide.

For example, including, but not limited to, one or more or any combination of the following:

$$CaSO_3 \rightarrow CaO + SO_2$$

$$CaSO_3(s) \rightarrow CaO(s) + SO_2(g)$$

Note: In some embodiments, acetic acid and acetate may be provides as an example. In some embodiments, acetic acid and acetate may be provides as an example carboxylic acid, or an example anion or acid with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof. One or more or any combination of carboxylic acids, or other anions or acids with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof may be employed instead of, or in addition to, acetic acid, for example, herein.

Example Simplified Chemistry Steps of Some Embodiments

Example Embodiment Producing Sodium Hydroxide and Sulfuric Acid from Sodium Sulfate and Water, which may include, but is not limited to, one or more or any combination of the following:

(1) React at least a portion of sodium sulfate with at least a portion of magnesium acetate to form at least a portion of sodium acetate and at least a portion of magnesium sulfate.

$$Na_2SO_4(s \text{ or } aq)+Mg(CH_3COO)_2(s \text{ or } aq) \rightarrow 2NaCH_3COO(aq)+MgSO_4(aq)$$

(1—separation) Separating at least a portion of sodium acetate from at least a portion of magnesium sulfate.

$$2NaCH_3COO(aq)+MgSO_4(aq) \rightarrow 2NaCH_3COO(s \text{ or } aq)(\text{at least partially separate})+MgSO_4(s)(\text{at least partially separate})$$

(2) Decompose at least a portion of magnesium sulfate to form at least a portion of magnesium oxide and at least a portion of sulfur dioxide, or diatomic oxygen, or sulfur trioxide, or any combination thereof.

$$MgSO_4(s) \rightarrow MgO(s)+SO_2(g)+\tfrac{1}{2}O_2(g)$$

$$MgSO_4(s) \rightarrow MgO(s)+SO_3(g)$$

(3) React at least a portion of sulfur dioxide, or diatomic oxygen, or sulfur trioxide, or any combination thereof with at least a portion of water to form at least a portion of sulfuric acid.

For example, including, but not limited to, one or more or any combination of the following:

$$SO_2+\tfrac{1}{2}O_2 \rightarrow SO_3$$

$$H_2SO_4+SO_3 \rightarrow H_2S_2O_7$$

$$H_2S_2O_7+H_2O \rightarrow 2H_2SO_4$$

$$SO_2+\tfrac{1}{2}O_2+H_2O \rightarrow H_2SO_4$$

(4) React at least a portion of magnesium oxide or a derivative of magnesium oxide with at least a portion of acetic acid to form at least a portion of magnesium acetate and water.

For example, including, but not limited to, one or more or any combination of the following:

$$MgO(s)+H_2O(l) \rightarrow Mg(OH)_2(s \text{ or } aq)$$

$$Mg(OH)_2(s \text{ or } aq)+2CH_3COOH(aq \text{ or } g) \rightarrow Mg(CH_3COO)_2(aq)+H_2O(l)$$

Or $$Mg(OH)_2(s \text{ or } aq)+CO_2(g \text{ or } aq) \rightarrow MgCO_3(s)+H_2O(aq \text{ or } l \text{ or } g)$$

$$MgCO_3(s)+2CH_3COOH(aq \text{ or } l \text{ or } g) \rightarrow Mg(CH_3COO)_2(aq \text{ or } s)+H_2O(l)+CO_2(g)$$

(5) React at least a portion of sodium acetate with at least a portion of sulfur dioxide to form at least a portion of sodium sulfite and at least a portion of acetic acid.

$$2NaCH_3COO(aq)+SO_2(g)+H_2O(l) \rightarrow Na_2SO_3(aq)+2CH_3COOH(aq)$$

(5—separation) Separate at least a portion of sodium sulfite from at least a portion of acetic acid.

$$Na_2SO_3(aq)+2CH_3COOH(aq) \rightarrow Na_2SO_3(s)(\text{at least partially separate})+2CH_3COOH(aq)(\text{at least partially separate})$$

(6) React at least a portion of sodium sulfite with at least a portion of calcium hydroxide or calcium oxide to form at least a portion of sodium hydroxide and at least a portion of calcium sulfite.

$$Na_2SO_3(aq)+Ca(OH)_2(s \text{ or } aq) \rightarrow 2NaOH(aq)+CaSO_3(s)$$

$$CaO(s)+H_2O(l \text{ or } g \text{ or } aq) \rightarrow Ca(OH)_2(s \text{ or } aq)$$

(6—separation) Separating at least a portion of calcium sulfite from at least a portion of sodium hydroxide.

$$2NaOH(aq)+CaSO_3(s) \rightarrow 2NaOH(aq)(\text{at least partially separate})+CaSO_3(s)(\text{at least partially separate})$$

(7) Decomposing at least a portion of calcium sulfite to form at least a portion of calcium oxide and at least a portion of sulfur dioxide:

$$CaSO_3(s) \rightarrow CaO(s)+SO_2(g)$$

Example Embodiment Producing Sodium Hydroxide or Potassium Hydroxide and Hydrochloric Acid from Sodium Chloride or Potassium Chloride and Water, which may include, but is not limited to, one or more or any combination of the following:

(1) React at least a portion of sodium chloride or potassium chloride with at least a portion of sulfuric acid to form at least a portion of sodium sulfate and at least a portion of hydrogen chloride.

For example, including, but not limited to, one or more or any combination of the following:

$$NaCl+H_2SO_4 \rightarrow NaHSO_4+HCl$$

$$NaCl+NaHSO_4 \rightarrow Na_2SO_4+HCl$$

$$2NaCl+H_2SO_4 \rightarrow Na_2SO_4+2HCl$$

$$2NaCl(s)+H_2SO_4(l) \rightarrow Na_2SO_4(s)+2HCl(g)$$

$$KCl+H_2SO_4 \rightarrow KHSO_4+HCl$$

$$KCl+KHSO_4 \rightarrow K_2SO_4+HCl$$

$$2KCl+H_2SO_4 \rightarrow K_2SO_4+2HCl$$

$$2KCl(s)+H_2SO_4(l) \rightarrow K_2SO_4(s)+2HCl(g)$$

$$2HCl(g)+Water(solvent) \rightarrow HCl(aq)$$

Note: In some embodiments, at least a portion of the sulfuric acid produced from the decomposition of magnesium sulfate, or the sulfuric acid from at least a portion of the gaseous products from the decomposition of magnesium sulfate may be employed as at least a portion of the sulfuric acid in the reaction with at least a portion of sodium chloride.

(2) React at least a portion of sodium sulfate with at least a portion of magnesium acetate to form at least a portion of sodium acetate and at least a portion of magnesium sulfate.

For example, including, but not limited to, one or more or any combination of the following:

$$Na_2SO_4+Mg(CH_3COO)_2 \rightarrow 2NaCH_3COO+MgSO_4$$

$$Na_2SO_4(s \text{ or aq})+Mg(CH_3COO)_2(s \text{ or aq}) \rightarrow 2NaCH_3COO(s \text{ or aq})+MgSO_4(s \text{ or aq})$$

$$Na_2SO_4(s \text{ or aq})+Mg(CH_3COO)_2(s \text{ or aq}) \rightarrow 2NaCH_3COO(aq)+MgSO_4(aq)$$

(2—separation) Separating at least a portion of sodium acetate from at least a portion of magnesium sulfate.

For example, including, but not limited to, one or more or any combination of the following:

$$2NaCH_3COO+MgSO_4 \rightarrow 2NaCH_3COO(\text{at least partially separate})+MgSO_4(\text{at least partially separate})$$

$$2NaCH_3COO(aq)+MgSO_4(aq) \rightarrow 2NaCH_3COO(aq)(\text{at least partially separate})+MgSO_4(s)(\text{at least partially separate})$$

$$2NaCH_3COO(aq)+MgSO_4(aq) \rightarrow 2NaCH_3COO(s)(\text{at least partially separate})+MgSO_4(s)(\text{at least partially separate})$$

(3) Decompose at least a portion of magnesium sulfate to form at least a portion of magnesium oxide and at least a portion of sulfur dioxide, or diatomic oxygen, or sulfur trioxide, or any combination thereof.

For example, including, but not limited to, one or more or any combination of the following:

$$MgSO_4 \rightarrow MgO+SO_2+\tfrac{1}{2}O_2$$

$$MgSO_4 \rightarrow MgO+SO_3$$

$$MgSO_4(s) \rightarrow MgO(s)+SO_2(g)+\tfrac{1}{2}O_2(g)$$

$$MgSO_4(s) \rightarrow MgO(s)+SO_3(g)$$

(4) React at least a portion of sulfur dioxide, or diatomic oxygen, or sulfur trioxide, or any combination thereof with at least a portion of water to form at least a portion of sulfuric acid.

For example, including, but not limited to, one or more or any combination of the following:

$$H_2SO_4+SO_3 \rightarrow H_2S_2O_7$$

$$H_2S_2O_7+H_2O \rightarrow 2H_2SO_4$$

$$SO_2+\tfrac{1}{2}O_2+H_2O \rightarrow H_2SO_4$$

$$SO_3+H_2O \rightarrow H_2SO_4$$

$$SO_3+H_2O \rightarrow H_2SO_4(g)$$

$$H_2SO_4(g) \rightarrow H_2SO_4(l)$$

$$SO_2(g \text{ or aq or l})+\tfrac{1}{2}O_2(g)+H_2O(g \text{ or l}) \rightarrow H_2SO_4(l \text{ or g or aq})$$

$$SO_3(g \text{ or aq or l})+H_2O(g \text{ or l}) \rightarrow H_2SO_4(l \text{ or g or aq})$$

Note: Heat may be recovered from one or more or any combination of reactions to form or produce sulfuric acid.

(5) React at least a portion of magnesium oxide or a derivative of magnesium oxide with at least a portion of acetic acid to form at least a portion of magnesium acetate and water.

For example, including, but not limited to, one or more or any combination of the following:

$$MgO+2CH_3COOH \rightarrow Mg(CH_3COO)_2+H_2O$$

$$Mg(OH)_2+2CH_3COOH \rightarrow Mg(CH_3COO)_2+H_2O$$

$$MgO+CO_2 \rightarrow MgCO_3$$

$$MgO+H_2O \rightarrow Mg(OH)_2$$

$$Mg(OH)_2+CO_2 \rightarrow MgCO_3+H_2O$$

$$Mg(OH)_2+\text{Carbonate or Bicarbonate Salt} \rightarrow MgCO_3$$

$$MgCO_3+2CH_3COOH \rightarrow Mg(CH_3COO)_2+H_2O+CO_2$$

$$MgO(s)+2CH_3COOH(g \text{ or l or aq}) \rightarrow Mg(CH_3COO)_2(s \text{ or aq})+H_2O(aq \text{ or g})$$

$$Mg(OH)_2(s \text{ or aq})+2CH_3COOH(aq \text{ or l or g or s}) \rightarrow Mg(CH_3COO)_2(aq \text{ or s})+H_2O(aq \text{ or l or g})$$

$$MgO(s)+CO_2(g \text{ or aq}) \rightarrow MgCO_3(s)$$

$$MgO(s)+H_2O(g \text{ or l or aq}) \rightarrow Mg(OH)_2(s \text{ or aq})$$

$$Mg(OH)_2(s \text{ or aq})+CO_2(g \text{ or aq}) \rightarrow MgCO_3(s)+H_2O(aq \text{ or l or g})$$

$$Mg(OH)_2(s \text{ or aq})+\text{Carbonate or Bicarbonate Salt}(s \text{ or aq}) \rightarrow MgCO_3(s)$$

$$MgCO_3(s)+2CH_3COOH(aq \text{ or l or g}) \rightarrow Mg(CH_3COO)_2(aq \text{ or s})+H_2O(l \text{ or aq or g})+CO_2(g \text{ or aq})$$

Note: Heat may be recovered from one or more or any combination of reactions which may be employed to form or produce magnesium acetate.

Note: Heat may be recovered from one or more or any combination of reactions to form or produce magnesium hydroxide.

Note: Magnesium oxide or magnesium hydroxide may be employed to capture $CO_2$ and/or at least a portion of $CO_2$ may be desorbed by reacting at least a portion magnesium carbonate with at least a portion of acetic acid to form magnesium acetate and captured carbon dioxide.

(6) React at least a portion of sodium acetate with at least a portion of sulfur dioxide to form at least a portion of sodium sulfite and at least a portion of acetic acid.

For example, including, but not limited to, one or more or any combination of the following:

$$2NaCH_3COO+SO_2+H_2O \rightarrow Na_2SO_3+2CH_3COOH$$

$$2NaCH_3COO(aq \text{ or s})+SO_2(g \text{ or aq})+H_2O(l \text{ or g}) \rightarrow Na_2SO_3(aq \text{ or s})+2CH_3COOH(aq \text{ or g})$$

$$2NaCH_3COO(aq)+SO_2(g)+H_2O(l) \rightarrow Na_2SO_3(aq)+2CH_3COOH(aq)$$

(6—separation) Separate at least a portion of sodium sulfite from at least a portion of acetic acid.

For example, including, but not limited to, one or more or any combination of the following:

$$Na_2SO_3+2CH_3COOH \rightarrow Na_2SO_3(\text{at least partially separate})+2CH_3COOH(\text{at least partially separate})$$

$$Na_2SO_3(aq)+2CH_3COOH(aq) \rightarrow Na_2SO_3(s)(\text{at least partially separate})+2CH_3COOH(aq)(\text{at least partially separate})$$

(7) React at least a portion of sodium sulfite with at least a portion of calcium hydroxide or calcium oxide to form at least a portion of sodium hydroxide and at least a portion of calcium sulfite.

For example, including, but not limited to, one or more or any combination of the following:

$Na_2SO_3 + Ca(OH)_2 \rightarrow 2NaOH + CaSO_3$ $CaO + H_2O \rightarrow Ca(OH)_2$ $Na_2SO_3(s \text{ or } aq) + Ca(OH)_2(s \text{ or } aq) \rightarrow 2NaOH(aq) + CaSO_3(s)$ $Na_2SO_3(aq) + Ca(OH)_2(s \text{ or } aq) \rightarrow 2NaOH(aq) + CaSO_3(s)$ $CaO(s) + H_2O(l \text{ or } g \text{ or } aq) \rightarrow Ca(OH)_2(s \text{ or } aq)$ (7—separation) Separating at least a portion of calcium sulfite from at least a portion of sodium hydroxide.

For example, including, but not limited to, one or more or any combination of the following:

$2NaOH + CaSO_3 \rightarrow 2NaOH(\text{at least partially separate}) + CaSO_3(\text{at least partially separate})$ $2NaOH(aq) + CaSO_3(s) \rightarrow 2NaOH(aq)(\text{at least partially separate}) + CaSO_3(s)(\text{at least partially separate})$ (8) Decomposing at least a portion of calcium sulfite to form at least a portion of calcium oxide and at least a portion of sulfur dioxide.

For example, including, but not limited to, one or more or any combination of the following:

$CaSO_3 \rightarrow CaO + SO_2$ $CaSO_3(s) \rightarrow CaO(s) + SO_2(g)$

Note: In some embodiments, acetic acid and acetate may be provides as an example. In some embodiments, acetic acid and acetate may be provides as an example carboxylic acid, or an example anion or acid with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof. One or more or any combination of carboxylic acids, or other anions or acids with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof may be employed instead of, or in addition to, acetic acid, for example, herein.

Example Embodiment Producing Sodium Hydroxide and Sulfuric Acid from Sodium Sulfate and Water, which may include, but is not limited to, one or more or any combination of the following:

(1) React at least a portion of sodium chloride with at least a portion of sulfuric acid to form at least a portion of sodium sulfate and at least a portion of hydrogen chloride.

$NaCl + H_2SO_4 \rightarrow NaHSO_4 + HCl$ $NaCl + NaHSO_4 \rightarrow Na_2SO_4 + HCl$ (2) React at least a portion of sodium sulfate with at least a portion of magnesium acetate to form at least a portion of sodium acetate and at least a portion of magnesium sulfate.

$Na_2SO_4(s \text{ or } aq) + Mg(CH_3COO)_2(s \text{ or } aq) \rightarrow 2NaCH_3COO(aq) + MgSO_4(aq)$ (2—separation) Separating at least a portion of sodium acetate from at least a portion of magnesium sulfate.

$2NaCH_3COO(aq) + MgSO_4(aq) \rightarrow 2NaCH_3COO(s \text{ or } aq)(\text{at least partially separate}) + MgSO_4(s)(\text{at least partially separate})$ (3) Decompose at least a portion of magnesium sulfate to form at least a portion of magnesium oxide and at least a portion of sulfur dioxide, or diatomic oxygen, or sulfur trioxide, or any combination thereof.

$MgSO_4(s) \rightarrow MgO(s) + SO_2(g) + \frac{1}{2}O_2(g)$ $MgSO_4(s) \rightarrow MgO(s) + SO_3(g)$ (4) React at least a portion of sulfur dioxide, or diatomic oxygen, or sulfur trioxide, or any combination thereof with at least a portion of water to form at least a portion of sulfuric acid.

For example, including, but not limited to, one or more or any combination of the following:

$SO_2 + \frac{1}{2}O_2 \rightarrow SO_3$ $H_2SO_4 + SO_3 \rightarrow H_2S_2O_7$ $H_2S_2O_7 + H_2O \rightarrow 2H_2SO_4$ $SO_2 + \frac{1}{2}O_2 + H_2O \rightarrow H_2SO_4$ (5) React at least a portion of magnesium oxide or a derivative of magnesium oxide with at least a portion of acetic acid to form at least a portion of magnesium acetate and water.

For example, including, but not limited to, one or more or any combination of the following:

$MgO(s) + H_2O(l) \rightarrow Mg(OH)_2(s \text{ or } aq)$ $Mg(OH)_2(s \text{ or } aq) + 2CH_3COOH(aq \text{ or } g) \rightarrow Mg(CH_3COO)_2(aq) + H_2O(l)$ Or $Mg(OH)_2(s \text{ or } aq) + CO_2(g \text{ or } aq) \rightarrow MgCO_3(s) + H_2O(aq \text{ or } l \text{ or } g)$ $MgCO_3(s) + 2CH_3COOH(aq \text{ or } l \text{ or } g) \rightarrow Mg(CH_3COO)_2(aq \text{ or } s) + H_2O(l) + CO_2(g)$ (6) React at least a portion of sodium acetate with at least a portion of sulfur dioxide to form at least a portion of sodium sulfite and at least a portion of acetic acid.

$2NaCH_3COO(aq) + SO_2(g) + H_2O(l) \rightarrow Na_2SO_3(aq) + 2CH_3COOH(aq)$ (7—separation) Separate at least a portion of sodium sulfite from at least a portion of acetic acid.

$Na_2SO_3(aq) + 2CH_3COOH(aq) \rightarrow Na_2SO_3(s)(\text{at least partially separate}) + 2CH_3COOH(aq)(\text{at least partially separate})$ $Na_2SO_3(aq) + 2CH_3COOH(aq) \rightarrow Na_2SO_3(aq)(\text{at least partially separate}) + 2CH_3COOH(aq)(\text{at least partially separate})$ (8) React at least a portion of sodium sulfite with at least a portion of calcium hydroxide or calcium oxide to form at least a portion of sodium hydroxide and at least a portion of calcium sulfite.

$Na_2SO_3(aq) + Ca(OH)_2(s \text{ or } aq) \rightarrow 2NaOH(aq) + CaSO_3(s)$ $CaO(s) + H_2O(l \text{ or } g \text{ or } aq) \rightarrow Ca(OH)_2(s \text{ or } aq)$ (8—separation) Separating at least a portion of calcium sulfite from at least a portion of sodium hydroxide.

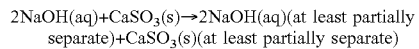

(9) Decomposing at least a portion of calcium sulfite to form at least a portion of calcium oxide and at least a portion of sulfur dioxide:

FIGURE DESCRIPTIONS

FIG. 17 Description:
FIG. 17 may show an embodiment which may form at least a portion of a component comprising alkali hydroxide, or alkali carbonate, or a derivative thereof and/or a component comprising sulfur dioxide, or sulfuric acid, or a derivative thereof from at least a portion of a component comprising alkali sulfate and/or water. Some embodiments, such as, for example, FIG. 17, may employ a reaction of a component comprising an alkali sulfate with a component comprising an alkaline earth acid anion to form at least a portion of a component comprising an alkali acid and at least a portion of a component comprising an alkaline earth sulfate. In some embodiments, at least a portion of the formed component comprising alkaline earth sulfate may be at least partially reacted or decomposed to form at least a portion of an a component comprising an alkaline earth oxide, or an alkaline earth hydroxide, or an alkaline earth carbonate, or an alkaline earth sulfide, or sulfur dioxide, or oxygen, or sulfur trioxide, or sulfuric acid, or a derivative thereof, or any combination thereof.

In some embodiments, the reaction between a component comprising an alkali sulfate and the component comprising an alkaline earth acid anion to form at least a portion of a component comprising an alkali acid anion and/or at least a portion of a component comprising an alkaline earth sulfate may be facilitated, or mediated, or any combination thereof. For example, in some embodiments, in some embodiments, the reaction may be facilitated using, for example, including, but not limited to, one or more or any combination of the following: temperature, or heat, or cold, or cooling, or heating, or nanofiltration, or reverse osmosis, or membrane based process, or electrodialysis, or monovalent selective electrodialysis, or selective electrodialysis, or electrodeionization, or electrodialysis metathesis, or EDI, or EDR, or bipolar electrodialysis, or electrolysis, or electrochemical process, or a separation described herein, or a separation known in the art.

Example Embodiments

A process comprising:
  Reacting a component comprising an alkaline earth weak acid with a component comprising an acid to form at least a portion of a component comprising alkaline earth acid anion and at least a portion of a component comprising a weak acid derivative;
  Reacting a component comprising an alkaline earth acid anion with a component comprising an alkali sulfate to form at least a portion of a component comprising alkaline earth sulfate and at least a portion of a component comprising an alkali acid anion;
  Decomposing at least a portion of the component comprising alkaline earth sulfate to form at least a portion of a component comprising alkaline earth oxide, or alkaline earth hydroxide, or alkaline earth carbonate, or a derivative thereof, or any combination thereof, and/or at least a portion of a component comprising sulfuric acid, or sulfur dioxide, or oxygen, or a derivative thereof, or any combination thereof.

The process of example embodiment_wherein the alkaline earth weak acid comprises a component comprising magnesium hydroxide, or magnesium carbonate, or magnesium oxide, or magnesium sulfide, or magnesium bicarbonate, or a derivative thereof, or any combination thereof.

The process of example embodiment_wherein the weak acid derivative may comprise a component comprising water, or carbon dioxide, or hydrogen sulfide, or a derivative thereof, or any combination thereof.

The process of example embodiment_wherein the acid anion may comprise a carboxylic acid.

A process comprising:
  Reacting a component comprising a magnesium weak acid with a component comprising an acid to form at least a portion of a component comprising magnesium acid anion and at least a portion of a component comprising a weak acid derivative;
  Reacting a component comprising a magnesium acid anion with a component comprising an alkali sulfate to form at least a portion of a component comprising magnesium sulfate and at least a portion of a component comprising an alkali acid anion;
  Decomposing at least a portion of the component comprising magnesium sulfate to form at least a portion of a component comprising magnesium oxide, or magnesium hydroxide, or magnesium carbonate, or a derivative thereof, or any combination thereof, and/or at least a portion of a component comprising sulfuric acid, or sulfur dioxide, or oxygen, or a derivative thereof, or any combination thereof.

A process comprising:
  Reacting a component comprising a magnesium weak acid with a component comprising a carboxylic acid to form at least a portion of a component comprising magnesium carboxylate and at least a portion of a component comprising a weak acid derivative;
  Reacting a component comprising a magnesium carboxylate with a component comprising an alkali sulfate to form at least a portion of a component comprising magnesium sulfate and at least a portion of a component comprising an alkali carboxylate;
  Decomposing at least a portion of the component comprising magnesium sulfate to form at least a portion of a component comprising magnesium oxide, or magnesium hydroxide, or magnesium carbonate, or a derivative thereof, or any combination thereof, and/or at least a portion of a component comprising sulfuric acid, or sulfur dioxide, or oxygen, or a derivative thereof, or any combination thereof.

The process of example embodiment_wherein at least a portion of the component comprising an alkali acid anion is separated from at least a portion of a component comprising an alkaline earth sulfate using including, but not limited to, one or more or any combination of the following: nanofiltration, or reverse osmosis, or electrodialysis, or crystallization, or temperature, or heating, or cooling, or precipitation, or a separation process described herein, or a separation process in the art.

The process of example embodiment_wherein at least a portion of the component comprising an alkaline earth sulfate is separated from at least a portion of a component comprising an alkali acid anion using including, but not limited to, one or more or any combination of the following: nanofiltration, or reverse osmosis, or electrodialysis, or crystallization, or temperature, or heating, or cooling, or precipitation, or a separation process described herein, or a separation process in the art.

FIG. 18 Description:

FIG. 18 may show example unit operations of the embodiment shown in FIG. 17.

FIG. 19 Description:

FIG. 18 may show example unit operations of the embodiment shown in FIG. 17. A potential difference between FIG. 18 and FIG. 19 is that FIG. 19 may show the use of reverse osmosis, or nanofiltration, or electrodialysis, or a membrane-based process, or a derivative thereof, or any combination thereof as a unit operation in the separation of at least a portion of alkali+sulfur dioxide species from at least a portion of acid species, or the separation of at least a portion of acid anion species from at least a portion of alkali+sulfur dioxide species, or any combination thereof. In some embodiments, the separation of at least a portion of a component comprising alkali acid anion from at least a portion of a component comprising alkaline earth sulfate may be conducted using similar processes, if desired.

Example Embodiments

The process of example embodiment_wherein at least a portion of a alkali+sulfur dioxide species are separated from at least a portion of acid species, or at least a portion of acid anion species are separated from at least a portion of alkali+sulfur dioxide species, or any combination thereof may be conducted using reverse osmosis, or nanofiltration, or electrodialysis, or a process described herein, or a derivative thereof, or a process described in the art, or any combination thereof.

FIG. 20 Description:

FIG. 20 may be similar to FIG. 17, except may employ at least a portion of the component comprising alkaline earth oxide, or alkaline earth hydroxide, or alkali sulfide, or a derivative thereof, or any combination thereof in the separation of carbon dioxide, or in $CO_2$ capture, or any combination thereof.

Example Embodiments

The process of example embodiment_wherein at least a portion of a component comprising alkaline earth oxide, or alkaline earth hydroxide, or any combination thereof may be reacted with at least a portion of a component comprising carbon dioxide, or a fluid comprising a dilute concentration of carbon dioxide, or a fluid comprising a low pressure of carbon dioxide, or any combination thereof to form at least a portion of a component comprising an alkaline earth carbonate, or alkaline earth bicarbonate, or any combination thereof.

The process of example embodiment_wherein at least a portion of a component comprising weak acid derivative comprises carbon dioxide, or captured carbon dioxide, or high purity carbon dioxide, or a derivative thereof, or any combination thereof.

FIG. 21 Description:

FIG. 21 may be similar to FIG. 20. A potential difference between FIG. 21 and FIG. 20 is that FIG. 21 may explicitly describe Na+$SO_2$ species forming in a reaction with a component comprising sulfur dioxide and/or the potential formation of a component comprising sodium sulfite, or sodium bisulfite, or a derivative thereof, or any combination thereof.

FIG. 22 Description:

FIG. 22 may show an embodiment which may form at least a portion of a component comprising alkali hydroxide, or alkali carbonate, or a derivative thereof, or any combination thereof and/or a component comprising hydrogen chloride, or hydrochloric acid, or chlorine, or a derivative thereof from at least a portion of a component comprising alkali chloride and/or water. Some embodiments, such as, for example, FIG. 22, may employ a reaction of a component comprising an alkali chloride with a component comprising sulfuric acid to form at least a portion of a component comprising an alkali sulfate and/or a component comprising at least a portion of hydrogen chloride, or hydrochloric acid, or chlorine, or a derivative thereof, or any combination thereof. Some embodiments, such as, for example, FIG. 22, may employ a reaction of a component comprising an alkali sulfate with a component comprising an alkaline earth acid anion to form at least a portion of a component comprising an alkali acid and at least a portion of a component comprising an alkaline earth sulfate. In some embodiments, at least a portion of the formed component comprising alkaline earth sulfate may be at least partially reacted or decomposed to form at least a portion of an a component comprising an alkaline earth oxide, or an alkaline earth hydroxide, or an alkaline earth carbonate, or an alkaline earth sulfide, or sulfur dioxide, or oxygen, or sulfur trioxide, or sulfuric acid, or a derivative thereof, or any combination thereof.

Example Embodiments

The process of example embodiment_wherein at least a portion of the component comprising alkali sulfate may be formed from at least a portion of a component comprising an alkali chloride.

The process of example embodiment_wherein at least a portion of the component comprising alkali sulfate may be formed from a reaction of at least a portion of a component comprising an alkali chloride and at least a portion of a component comprising a sulfuric acid.

The process of example embodiment_wherein at least a portion of a component comprising an alkali chloride is reacted with at least a portion of a component comprising sulfuric acid to form at least a portion of a component comprising an alkali sulfate and/or at least a portion of a component comprising hydrogen chloride, or hydrochloric acid, or chlorine, or a derivative thereof, or any combination thereof.

The process of example embodiment_wherein at least a portion of a component comprising sulfuric acid may comprise an intermediate.

The process of example embodiment_wherein at least a portion of a component comprising sulfuric acid may be at least partially regenerated or generated or formed within the process if desired.

The process of example embodiment_wherein at least a portion of a component comprising magnesium weak acid may be at least partially regenerated or generated or formed within the process if desired.

The process of example embodiment_wherein at least a portion of a component comprising alkaline earth weak acid may be at least partially regenerated or generated or formed within the process if desired.

FIG. 23 Description:

FIG. 23 may show example unit operations of the embodiment shown in FIG. 22.

FIG. 24 Description:

FIG. 24 may show example unit operations of the embodiment shown in FIG. 22. A potential difference between FIG. 23 and FIG. 24 is that FIG. 24 may show the use of reverse osmosis, or nanofiltration, or electrodialysis, or a membrane-based process, or a derivative thereof, or any combination thereof as a unit operation in the separation of at least a portion of alkali+sulfur dioxide species from at least a portion of acid species, or the separation of at least a portion of acid anion species from at least a portion of alkali+sulfur dioxide species, or any combination thereof. In some embodiments, the separation of at least a portion of a component comprising alkali acid anion from at least a portion of a component comprising alkaline earth sulfate may be conducted using similar processes, if desired.

FIG. 25 Description:

FIG. 25 may be similar to FIG. 22, except may employ at least a portion of the component comprising alkaline earth oxide, or alkaline earth hydroxide, or alkali sulfide, or a derivative thereof, or any combination thereof in the separation of carbon dioxide, or in $CO_2$ capture, or any combination thereof.

FIG. 26 Description:

FIG. 26 may be similar to FIG. 25. A potential difference between FIG. 26 and FIG. 25 is that FIG. 26 may explicitly describe Na+$SO_2$ species forming in a reaction with a component comprising sulfur dioxide and/or the potential formation of a component comprising sodium sulfite, or sodium bisulfite, or a derivative thereof, or any combination thereof.

Example Embodiments

A process comprising:
  Reacting a component comprising an alkaline earth weak acid with a component comprising an acid to form at least a portion of a component comprising alkaline earth acid anion and at least a portion of a component comprising a weak acid derivative;
  Reacting a component comprising an alkaline earth acid anion with a component comprising an alkali sulfate to form at least a portion of a component comprising alkaline earth sulfate and at least a portion of a component comprising an alkali acid anion;
  Decomposing at least a portion of the component comprising alkaline earth sulfate to form at least a portion of a component comprising alkaline earth oxide, or alkaline earth hydroxide, or alkaline earth carbonate, or a derivative thereof, or any combination thereof, and/or at least a portion of a component comprising sulfuric acid, or sulfur dioxide, or oxygen, or a derivative thereof, or any combination thereof.

The process of example embodiment_wherein the alkaline earth weak acid comprises a component comprising magnesium hydroxide, or magnesium carbonate, or magnesium oxide, or magnesium sulfide, or magnesium bicarbonate, or a derivative thereof, or any combination thereof.

The process of example embodiment_wherein the weak acid derivative may comprise a component comprising water, or carbon dioxide, or hydrogen sulfide, or a derivative thereof, or any combination thereof.

The process of example embodiment_wherein the acid anion may comprise a carboxylic acid.

A process comprising:
  Reacting a component comprising a magnesium weak acid with a component comprising an acid to form at least a portion of a component comprising magnesium acid anion and at least a portion of a component comprising a weak acid derivative;
  Reacting a component comprising a magnesium acid anion with a component comprising an alkali sulfate to form at least a portion of a component comprising magnesium sulfate and at least a portion of a component comprising an alkali acid anion;
  Decomposing at least a portion of the component comprising magnesium sulfate to form at least a portion of a component comprising magnesium oxide, or magnesium hydroxide, or magnesium carbonate, or a derivative thereof, or any combination thereof, and/or at least a portion of a component comprising sulfuric acid, or sulfur dioxide, or oxygen, or a derivative thereof, or any combination thereof.

A process comprising:
  Reacting a component comprising a magnesium weak acid with a component comprising a carboxylic acid to form at least a portion of a component comprising magnesium carboxylate and at least a portion of a component comprising a weak acid derivative;
  Reacting a component comprising a magnesium carboxylate with a component comprising an alkali sulfate to form at least a portion of a component comprising magnesium sulfate and at least a portion of a component comprising an alkali carboxylate;
  Decomposing at least a portion of the component comprising magnesium sulfate to form at least a portion of a component comprising magnesium oxide, or magnesium hydroxide, or magnesium carbonate, or a derivative thereof, or any combination thereof, and/or at least a portion of a component comprising sulfuric acid, or sulfur dioxide, or oxygen, or a derivative thereof, or any combination thereof.

The process of example embodiment_wherein at least a portion of the component comprising an alkali acid anion is separated from at least a portion of a component comprising an alkaline earth sulfate using including, but not limited to, one or more or any combination of the following: nanofiltration, or reverse osmosis, or electrodialysis, or crystallization, or temperature, or heating, or cooling, or precipitation, or a separation process described herein, or a separation process in the art.

The process of example embodiment_wherein at least a portion of the component comprising an alkaline earth sulfate is separated from at least a portion of a component comprising an alkali acid anion using including, but not limited to, one or more or any combination of the following: nanofiltration, or reverse osmosis, or electrodialysis, or crystallization, or temperature, or heating, or cooling, or precipitation, or a separation process described herein, or a separation process in the art.

The process of example embodiment_wherein at least a portion of a alkali+sulfur dioxide species are separated from at least a portion of acid species, or at least a portion of acid anion species are separated from at least a portion of alkali+sulfur dioxide species, or any combination thereof may be conducted using reverse osmosis, or nanofiltration, or electrodialysis, or a process described herein, or a derivative thereof, or a process described in the art, or any combination thereof.

The process of example embodiment_wherein at least a portion of a component comprising alkaline earth oxide, or alkaline earth hydroxide, or any combination thereof may be reacted with at least a portion of a component comprising carbon dioxide, or a fluid comprising a dilute concentration of carbon dioxide, or a fluid comprising a low pressure of carbon dioxide, or any combination thereof to form at least a portion of a component comprising an alkaline earth carbonate, or alkaline earth bicarbonate, or any combination thereof.

The process of example embodiment_wherein at least a portion of a component comprising weak acid derivative comprises carbon dioxide, or captured carbon dioxide, or high purity carbon dioxide, or a derivative thereof, or any combination thereof.

The process of example embodiment_wherein at least a portion of the component comprising alkali sulfate may be formed from at least a portion of a component comprising an alkali chloride.

The process of example embodiment_wherein at least a portion of the component comprising alkali sulfate may be formed from a reaction of at least a portion of a component comprising an alkali chloride and at least a portion of a component comprising a sulfuric acid.

The process of example embodiment_wherein at least a portion of a component comprising an alkali chloride is reacted with at least a portion of a component comprising sulfuric acid to form at least a portion of a component comprising an alkali sulfate and/or at least a portion of a component comprising hydrogen chloride, or hydrochloric acid, or chlorine, or a derivative thereof, or any combination thereof.

The process of example embodiment_wherein at least a portion of a component comprising sulfuric acid may comprise an intermediate.

The process of example embodiment_wherein at least a portion of a component comprising sulfuric acid may be at least partially regenerated or generated or formed within the process if desired.

The process of example embodiment_wherein at least a portion of a component comprising magnesium weak acid may be at least partially regenerated or generated or formed within the process if desired.

The process of example embodiment_wherein at least a portion of a component comprising alkaline earth weak acid may be at least partially regenerated or generated or formed within the process if desired.

Example Embodiments Comprising Calcium Oxide and/or Sulfuric Acid Production from Calcium Sulfate Example Description

SUMMARY

Some embodiments may pertain to systems or methods for producing calcium oxide or calcium hydroxide and/or sulfuric acid from calcium sulfate and/or water. Some embodiments may employ sodium, or other alkali, or magnesium, or sulfur dioxide, or sulfur dioxide derivative, or any combination thereof intermediates.

Example Chemistry

Example Chemistry:

(1) React at least a portion of sodium sulfite with at least a portion of calcium sulfate to form, for example, at least a portion of sodium sulfate and/or at least a portion of calcium sulfite.

For example:

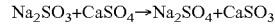
$Na_2SO_3 + CaSO_4 \rightarrow Na_2SO_4 + CaSO_3$ (2) Decompose at least a portion of calcium sulfite to form, for example, at least a portion of calcium oxide and/or at least a portion of sulfur dioxide.

For example:

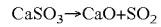
$CaSO_3 \rightarrow CaO + SO_2$ (3) React at least a portion of sodium sulfate with at least a portion of a magnesium-anion salt to form, for example, at least a portion of a sodium-anion salt and at least a portion of magnesium sulfate.

For example:

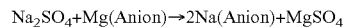
$Na_2SO_4 + Mg(Anion) \rightarrow 2Na(Anion) + MgSO_4$

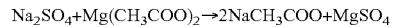
$Na_2SO_4 + Mg(CH_3COO)_2 \rightarrow 2NaCH_3COO + MgSO_4$

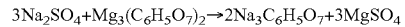
$3Na_2SO_4 + Mg_3(C_6H_5O_7)_2 \rightarrow 2Na_3C_6H_5O_7 + 3MgSO_4$ (4) React at a portion of sodium-anion salt with at least a portion of sulfur dioxide to form at least a portion of sodium sulfite and at least a portion of anion derivative acid.

For example:

$2Na(Anion) + SO_2 \rightarrow Na_2SO_3 + \text{Anion Derivative Acid}.$

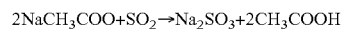
$2NaCH_3COO + SO_2 \rightarrow Na_2SO_3 + 2CH_3COOH$

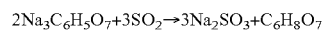
$2Na_3C_6H_5O_7 + 3SO_2 \rightarrow 3Na_2SO_3 + C_6H_8O_7$ (5) Separate at least a portion of sodium sulfite from at least a portion of anion derivative acid.

(6) Decompose at least a portion of magnesium sulfate to form at least a portion of magnesium oxide and at least a portion of sulfur dioxide, or sulfur trioxide, or diatomic oxygen or any combination thereof.

For example:

$MgSO_4 \rightarrow MgO + SO_2 + \tfrac{1}{2}O_2$ (7) React at least a portion of sulfur dioxide with at least a portion of oxygen and at least a portion of water to form at least a portion of sulfuric acid.

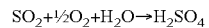
$SO_2 + \tfrac{1}{2}O_2 + H_2O \rightarrow H_2SO_4$

(10) React at least a portion of magnesium oxide with at least a portion of water, or carbon dioxide, or acid gas, or any combination thereof to form at least a portion of magnesium hydroxide, or magnesium carbonate, or magnesium sulfide, or any combination thereof.

For example:

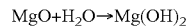
$MgO + H_2O \rightarrow Mg(OH)_2$

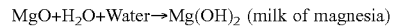
$MgO + H_2O + Water \rightarrow Mg(OH)_2 \text{ (milk of magnesia)}$

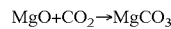
$MgO + CO_2 \rightarrow MgCO_3$

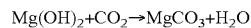
$Mg(OH)_2 + CO_2 \rightarrow MgCO_3 + H_2O$ $$MgO+H_2S \rightarrow MgS+H_2O$$

$$Mg(OH)_2+H_2S \rightarrow MgS+2H_2O$$

(8) React at least a portion of magnesium oxide, or magnesium carbonate, or magnesium sulfite, or any combination thereof with, for example, at least a portion of an anion-derivative acid, to form, for example, at least a portion of magnesium-anion salt, or captured carbon dioxide, or captured acid gas, or water, or any combination thereof.

For example:

$$MgO+\text{Anion Derivative Acid} \rightarrow Mg(\text{Anion})+\text{Water}$$

$$MgCO_3+\text{Anion Derivative Acid} \rightarrow Mg(\text{Anion})+CO_2$$
(which may comprise captured $CO_2$)

$$MgS+\text{Anion Derivative Acid} \rightarrow Mg(\text{Anion})+H_2S$$
(may comprise captured $H_2S$)

$$MgO+ \rightarrow Mg(CH_3COO)_2+\text{Water}$$

$$MgCO_3+2CH_3COOH \rightarrow Mg(CH_3COO)_2+CO_2 \text{ (which may comprise captured } CO_2)$$

$$MgS+2CH_3COOH \rightarrow Mg(CH_3COO)_2+H_2S \text{ (may comprise captured } H_2S)$$

Example Embodiment Producing Calcium Oxide and Sulfuric Acid from Calcium Sulfate and Water employing a Sulfite Intermediate, which may include, but is not limited to, one or more or any combination of the following:

(1) React at least a portion of calcium sulfate with at least a portion of sodium sulfite or sodium bisulfite or sodium metabisulfite to form at least a portion of calcium sulfite and at least a portion of sodium sulfate.

For example, including, but not limited to, one or more or any combination of the following:

$$CaSO_4+Na_2SO_3 \rightarrow CaSO_3+Na_2SO_4$$

$$CaSO_4+2NaHSO_3 \rightarrow CaSO_3+Na_2SO_4+SO_2+H_2O$$

$$CaSO_4+2NaHSO_3 \rightarrow Ca(HSO_3)_2+Na_2SO_4$$

$$CaSO_4+Na_2S_2O_5 \rightarrow CaSO_3+Na_2SO_4+SO_2$$

$$Ca(HSO_3)_2 \rightarrow CaSO_3+SO_2+H_2O$$

$$CaSO_4(\text{s or aq})+Na_2SO_3(\text{aq or s}) \rightarrow CaSO_3(\text{s})+Na_2SO_4(\text{aq})$$

$$CaSO_4(\text{s or aq})+2NaHSO_3(\text{aq}) \rightarrow CaSO_3(\text{s})+Na_2SO_4(\text{aq})+SO_2(\text{g or aq})+H_2O(\text{l or g})$$

$$CaSO_4(\text{s or aq})+2NaHSO_3(\text{aq}) \rightarrow Ca(HSO_3)_2(\text{aq})+Na_2SO_4(\text{aq})$$

$$CaSO_4(\text{s or aq})+Na_2S_2O_5(\text{s}) \rightarrow CaSO_3(\text{s})+Na_2SO_4(\text{aq})+SO_2(\text{g or aq})$$

$$Ca(HSO_3)_2(\text{aq}) \rightarrow CaSO_3(\text{aq})+SO_2(\text{g or aq})+H_2O(\text{l or aq})$$

(2) Decomposing at least a portion of calcium sulfite to form at least a portion of calcium oxide and at least a portion of sulfur dioxide.

For example, including, but not limited to, one or more or any combination of the following:

$$CaSO_3 \rightarrow CaO+SO_2$$

$$CaSO_3(\text{s}) \rightarrow CaO(\text{s})+SO_2(\text{g})$$

(3) React at least a portion of sodium sulfate with at least a portion of magnesium acetate to form at least a portion of sodium acetate and at least a portion of magnesium sulfate.

For example, including, but not limited to, one or more or any combination of the following:

$$Na_2SO_4+Mg(CH_3COO)_2 \rightarrow 2NaCH_3COO+MgSO_4$$

$$Na_2SO_4(\text{s or aq})+Mg(CH_3COO)_2(\text{s or aq}) \rightarrow 2NaCH_3COO(\text{s or aq})+MgSO_4(\text{s or aq})$$

$$Na_2SO_4(\text{s or aq})+Mg(CH_3COO)_2(\text{s or aq}) \rightarrow 2NaCH_3COO(\text{aq})+MgSO_4(\text{aq})$$

(3—separation) Separating at least a portion of sodium acetate from at least a portion of magnesium sulfate.

For example, including, but not limited to, one or more or any combination of the following:

$$2NaCH_3COO+MgSO_4 \rightarrow 2NaCH_3COO(\text{at least partially separate})+MgSO_4(\text{at least partially separate})$$

$$2NaCH_3COO(\text{aq})+MgSO_4(\text{aq}) \rightarrow 2NaCH_3COO(\text{aq})(\text{at least partially separate})+MgSO_4(\text{s})(\text{at least partially separate})$$

$$2NaCH_3COO(\text{aq})+MgSO_4(\text{aq}) \rightarrow 2NaCH_3COO(\text{s})(\text{at least partially separate})+MgSO_4(\text{s})(\text{at least partially separate})$$

(4) Decompose at least a portion of magnesium sulfate to form at least a portion of magnesium oxide and at least a portion of sulfur dioxide, or diatomic oxygen, or sulfur trioxide, or any combination thereof.

For example, including, but not limited to, one or more or any combination of the following:

$$MgSO_4 \rightarrow MgO+SO_2+\tfrac{1}{2}O_2$$

$$MgSO_4 \rightarrow MgO+SO_3$$

$$MgSO_4(\text{s}) \rightarrow MgO(\text{s})+SO_2(\text{g})+\tfrac{1}{2}O_2(\text{g})$$

$$MgSO_4(\text{s}) \rightarrow MgO(\text{s})+SO_3(\text{g})$$

(5) React at least a portion of sulfur dioxide, or diatomic oxygen, or sulfur trioxide, or any combination thereof with at least a portion of water to form at least a portion of sulfuric acid.

For example, including, but not limited to, one or more or any combination of the following:

$$H_2SO_4+SO_3 \rightarrow H_2S_2O_7$$

$$H_2S_2O_7+H_2O \rightarrow 2H_2SO_4$$

$$SO_2+\tfrac{1}{2}O_2+H_2O \rightarrow H_2SO_4$$

$$SO_3+H_2O \rightarrow H_2SO_4$$

$$SO_3+H_2O \rightarrow H_2SO_4(\text{g})$$

$$H_2SO_4(\text{g}) \rightarrow H_2SO_4(\text{l})$$

$$SO_2(\text{g or aq or l})+\tfrac{1}{2}O_2(\text{g})+H_2O(\text{g or l}) \rightarrow H_2SO_4(\text{l or g or aq})$$

$$SO_3(\text{g or aq or l})+H_2O(\text{g or l}) \rightarrow H_2SO_4(\text{l or g or aq})$$

Note: Heat may be recovered from one or more or any combination of reactions to form or produce sulfuric acid.

(6) React at least a portion of magnesium oxide or a derivative of magnesium oxide with at least a portion of acetic acid to form at least a portion of magnesium acetate and water.

For example, including, but not limited to, one or more or any combination of the following:

$$MgO+2CH_3COOH \rightarrow Mg(CH_3COO)_2+H_2O$$

$$Mg(OH)_2+2CH_3COOH \rightarrow Mg(CH_3COO)_2+H_2O$$

$$MgO+CO_2 \rightarrow MgCO_3$$

$$MgO+H_2O \rightarrow Mg(OH)_2$$

$$Mg(OH)_2+CO_2 \rightarrow MgCO_3+H_2O$$

$$Mg(OH)_2 + \text{Carbonate or Bicarbonate Salt} \rightarrow MgCO_3$$

$$MgCO_3+2CH_3COOH \rightarrow Mg(CH_3COO)_2+H_2O+CO_2$$

$$MgO(s)+2CH_3COOH(g \text{ or } l \text{ or } aq) \rightarrow$$

$$CaO(s)+H_2O(l \text{ or } g \text{ or } aq) \rightarrow Ca(OH)_2(s \text{ or } aq)$$
$$Mg(CH_3COO)_2(s \text{ or } aq)+H_2O(aq \text{ or } g)$$

$$Mg(OH)_2(s \text{ or } aq)+2CH_3COOH(aq \text{ or } l \text{ or } g \text{ or } s) \rightarrow Mg(CH_3COO)_2(aq \text{ or } s)+H_2O(aq \text{ or } l \text{ or } g)$$

$$MgO(s)+CO_2(g \text{ or } aq) \rightarrow MgCO_3(s)$$

$$MgO(s)+H_2O(g \text{ or } l \text{ or } aq) \rightarrow Mg(OH)_2(s \text{ or } aq)$$

$$Mg(OH)_2(s \text{ or } aq)+CO_2(g \text{ or } aq) \rightarrow MgCO_3(s)+H_2O(aq \text{ or } l \text{ or } g)$$

$$Mg(OH)_2(s \text{ or } aq)+\text{Carbonate or Bicarbonate Salt}(s \text{ or } aq) \rightarrow MgCO_3(s)$$

$$MgCO_3(s)+2CH_3COOH(aq \text{ or } l \text{ or } g) \rightarrow Mg(CH_3COO)_2(aq \text{ or } s)+H_2O(l \text{ or } aq \text{ or } g)+CO_2(g \text{ or } aq)$$

Note: Heat may be recovered from one or more or any combination of reactions which may be employed to form or produce magnesium acetate.

Note: Heat may be recovered from one or more or any combination of reactions to form or produce magnesium hydroxide.

Note: Magnesium oxide or magnesium hydroxide may be employed to capture $CO_2$ and/or at least a portion of $CO_2$ may be desorbed by reacting at least a portion magnesium carbonate with at least a portion of acetic acid to form magnesium acetate and captured carbon dioxide.

(7) React at least a portion of sodium acetate with at least a portion of sulfur dioxide to form at least a portion of sodium sulfite or sodium bisulfite and at least a portion of acetic acid.

For example, including, but not limited to, one or more or any combination of the following:

$$2NaCH_3COO+SO_2+H_2O \rightarrow Na_2SO_3+2CH_3COOH$$

$$Na_2SO_3+2CH_3COOH+SO_2+H_2O \rightarrow 2NaHSO_3+2CH_3COOH$$

$$2NaCH_3COO(aq \text{ or } s)+SO_2(g \text{ or } aq)+H_2O(l \text{ or } g) \rightarrow Na_2SO_3(aq \text{ or } s)+2CH_3COOH(aq \text{ or } g)$$

$$2NaCH_3COO(aq)+SO_2(g)+H_2O(l) \rightarrow Na_2SO_3(aq)+2CH_3COOH(aq)$$

$$Na_2SO_3(aq \text{ or } s)+2CH_3COOH(aq \text{ or } g \text{ or } l)+SO_2(g \text{ or } l \text{ or } aq)+H_2O(l \text{ or } g \text{ or } aq) \rightarrow 2NaHSO_3(aq)+2CH_3COOH(aq \text{ or } g)$$

$$Na_2SO_3(aq)+2CH_3COOH(aq)+SO_2(g)+H_2O(l \text{ or } aq \text{ or } g) \rightarrow 2NaHSO_3(aq)+2CH_3COOH(aq)$$

(7—separation) Separate at least a portion of sodium sulfite or sodium bisulfite or sodium metabisulfite from at least a portion of acetic acid.

For example, including, but not limited to, one or more or any combination of the following:

$$Na_2SO_3+2CH_3COOH \rightarrow Na_2SO_3(\text{at least partially separate})+2CH_3COOH(\text{at least partially separate})$$

$$Na_2SO_3(aq)+2CH_3COOH(aq) \rightarrow Na_2SO_3(s)(\text{at least partially separate})+2CH_3COOH(aq)(\text{at least partially separate})$$

$$2NaHSO_3+2CH_3COOH \rightarrow 2NaHSO_3(\text{at least partially separate})+2CH_3COOH(\text{at least partially separate}).$$

$$2NaHSO_3+2CH_3COOH \rightarrow Na_2S_2O_5(\text{at least partially separate})+2CH_3COOH(\text{at least partially separate})+H_2O$$

$$2NaHSO_3(aq)+2CH_3COOH(aq) \rightarrow Na_2S_2O_5(s)(\text{at least partially separate})+2CH_3COOH(aq)(\text{at least partially separate})$$

Note: In some embodiments, at least a portion of calcium oxide may be an output.

Note: In some embodiments, at least a portion of sulfuric acid may be an output.

Note: In some embodiments, at least a portion of sodium sulfite or sodium bisulfite produced by the process may be transferred to or employed as at least a portion of the sodium sulfite or sodium bisulfite reactant in the reaction between at least a portion of sodium sulfite or sodium bisulfite and at least a portion of calcium sulfate.

Note: In some embodiments, acetic acid and acetate may be provides as an example. In some embodiments, acetic acid and acetate may be provides as an example carboxylic acid, or an example anion or acid with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof. One or more or any combination of carboxylic acids, or other anions or acids with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof may be employed instead of, or in addition to, acetic acid, for example, herein.

Example Embodiment Producing Calcium Oxide and Sulfuric Acid from Calcium Sulfate and Water employing a Sulfite Intermediate, which may include, but is not limited to, one or more or any combination of the following:

(1) React at least a portion of calcium sulfate with at least a portion of sodium sulfite or sodium bisulfite or sodium metabisulfite to form at least a portion of calcium sulfite and at least a portion of sodium sulfate.

$$CaSO_4(s \text{ or } aq)+Na_2SO_3(aq \text{ or } s) \rightarrow CaSO_3(s)+Na_2SO_4(aq)$$

(2) Decomposing at least a portion of calcium sulfite to form at least a portion of calcium oxide and at least a portion of sulfur dioxide.

$$CaSO_3(s) \rightarrow CaO(s) + SO_2(g)$$

(3) React at least a portion of sodium sulfate with at least a portion of magnesium acetate to form at least a portion of sodium acetate and at least a portion of magnesium sulfate.

$$Na_2SO_4(s \text{ or aq}) + Mg(CH_3COO)_2(s \text{ or aq}) \rightarrow 2NaCH_3COO(aq) + MgSO_4(aq)$$

(3—separation) Separating at least a portion of sodium acetate from at least a portion of magnesium sulfate.

$$2NaCH_3COO(aq) + MgSO_4(aq) \rightarrow 2NaCH_3COO(aq \text{ or s})(\text{at least partially separate}) + MgSO_4(s)(\text{at least partially separate})$$

(4) Decompose at least a portion of magnesium sulfate to form at least a portion of magnesium oxide and at least a portion of sulfur dioxide, or diatomic oxygen, or sulfur trioxide, or any combination thereof.

$$MgSO_4(s) \rightarrow MgO(s) + SO_2(g) + \tfrac{1}{2}O_2(g)$$

$$MgSO_4(s) \rightarrow MgO(s) + SO_3(g)$$

(5) React at least a portion of sulfur dioxide, or diatomic oxygen, or sulfur trioxide, or any combination thereof with at least a portion of water to form at least a portion of sulfuric acid.

For example, including, but not limited to, one or more or any combination of the following:

$$SO_2 + \tfrac{1}{2}O_2 \rightarrow SO_3$$

$$H_2SO_4 + SO_3 \rightarrow H_2S_2O_7$$

$$H_2S_2O_7 + H_2O \rightarrow 2H_2SO_4$$

$$SO_2 + \tfrac{1}{2}O_2 + H_2O \rightarrow H_2SO_4$$

(6) React at least a portion of magnesium oxide or a derivative of magnesium oxide with at least a portion of acetic acid to form at least a portion of magnesium acetate and water.

For example, including, but not limited to, one or more or any combination of the following:

$$MgO(s) + H_2O(l) \rightarrow Mg(OH)_2(s \text{ or aq})$$

$$Mg(OH)_2(s \text{ or aq}) + 2CH_3COOH(aq \text{ or g}) \rightarrow Mg(CH_3COO)_2(aq) + H_2O(l)$$

Or $$Mg(OH)_2(s \text{ or aq}) + CO_2(g \text{ or aq}) \rightarrow MgCO_3(s) + H_2O(aq \text{ or l or g})$$

$$MgCO_3(s) + 2CH_3COOH(aq \text{ or l or g}) \rightarrow Mg(CH_3COO)_2(aq \text{ or s}) + H_2O(l) + CO_2(g)$$

(6) React at least a portion of sodium acetate with at least a portion of sulfur dioxide to form at least a portion of sodium sulfite and at least a portion of acetic acid.

$$2NaCH_3COO(aq) + SO_2(g) + H_2O(l) \rightarrow Na_2SO_3(aq) + 2CH_3COOH(aq)$$

(7—separation) Separate at least a portion of sodium sulfite from at least a portion of acetic acid.

$$Na_2SO_3(aq) + 2CH_3COOH(aq) \rightarrow Na_2SO_3(s)(\text{at least partially separate}) + 2CH_3COOH(aq)(\text{at least partially separate})$$

Example Embodiment Producing Calcium Oxide, Sulfuric Acid, and Calcium Carbonate from Calcium Sulfate, Carbon Dioxide, and Water, which may include, but is not limited to, one or more or any combination of the following:

(1) React at least a portion of calcium sulfate with at least a portion of sodium sulfite or sodium bisulfite or sodium metabisulfite to form at least a portion of calcium sulfite and at least a portion of sodium sulfate.

$$CaSO_4(s \text{ or aq}) + Na_2CO_3(aq \text{ or s}) \rightarrow CaCO_3(s) + Na_2SO_4(aq)$$

(2) React at least a portion of sodium sulfate with at least a portion of magnesium acetate to form at least a portion of sodium acetate and at least a portion of magnesium sulfate.

$$Na_2SO_4(s \text{ or aq}) + Mg(CH_3COO)_2(s \text{ or aq}) \rightarrow 2NaCH_3COO(aq) + MgSO_4(aq)$$

(2—separation) Separating at least a portion of sodium acetate from at least a portion of magnesium sulfate.

$$2NaCH_3COO(aq) + MgSO_4(aq) \rightarrow 2NaCH_3COO(aq \text{ or s})(\text{at least partially separate}) + MgSO_4(s)(\text{at least partially separate})$$

(3) Decompose at least a portion of magnesium sulfate to form at least a portion of magnesium oxide and at least a portion of sulfur dioxide, or diatomic oxygen, or sulfur trioxide, or any combination thereof.

$$MgSO_4(s) \rightarrow MgO(s) + SO_2(g) + \tfrac{1}{2}O_2(g)$$

$$MgSO_4(s) \rightarrow MgO(s) + SO_3(g)$$

(4) React at least a portion of sulfur dioxide, or diatomic oxygen, or sulfur trioxide, or any combination thereof with at least a portion of water to form at least a portion of sulfuric acid.

For example, including, but not limited to, one or more or any combination of the following:

$$SO_2 + \tfrac{1}{2}O_2 \rightarrow SO_3$$

$$H_2SO_4 + SO_3 \rightarrow H_2S_2O_7$$

$$H_2S_2O_7 + H_2O \rightarrow 2H_2SO_4$$

$$SO_2 + \tfrac{1}{2}O_2 + H_2O \rightarrow H_2SO_4$$

(5) React at least a portion of magnesium oxide or a derivative of magnesium oxide with at least a portion of acetic acid to form at least a portion of magnesium acetate and water.

For example, including, but not limited to, one or more or any combination of the following:

$$MgO(s) + H_2O(l) \rightarrow Mg(OH)_2(s \text{ or aq})$$

$$Mg(OH)_2(s \text{ or aq}) + 2CH_3COOH(aq \text{ or g}) \rightarrow Mg(CH_3COO)_2(aq) + H_2O(l)$$

Or $$Mg(OH)_2(s \text{ or aq}) + CO_2(g \text{ or aq}) \rightarrow MgCO_3(s) + H_2O(aq \text{ or l or g})$$

$$MgCO_3(s) + 2CH_3COOH(aq \text{ or l or g}) \rightarrow Mg(CH_3COO)_2(aq \text{ or s}) + H_2O(l) + CO_2(g)$$

(6) React at least a portion of sodium acetate with at least a portion of sulfur dioxide to form at least a portion of sodium sulfite and at least a portion of acetic acid.

$$2NaCH_3COO(aq) + SO_2(g) + H_2O(l) \rightarrow Na_2SO_3(aq) + 2CH_3COOH(aq)$$

(6—separation) Separate at least a portion of sodium sulfite from at least a portion of acetic acid.

$Na_2SO_3(aq)+2CH_3COOH(aq) \rightarrow Na_2SO_3(s)$(at least partially separate)$+2CH_3COOH(aq)$(at least partially separate)

(7) React at least a portion of sodium sulfite with at least a portion of calcium hydroxide or calcium oxide to form at least a portion of sodium hydroxide and at least a portion of calcium sulfite.

$Na_2SO_3(aq)+Ca(OH)_2$(s or aq)$\rightarrow 2NaOH(aq)+$ $CaO(s)+H_2O$(l or g or aq)$\rightarrow Ca(OH)_2$(s or aq) $CaSO_3(s)$ $CaO(s)+H_2O$(l or g or aq)$\rightarrow Ca(OH)_2$(s or aq)

(7—separation) Separating at least a portion of calcium sulfite from at least a portion of sodium hydroxide.

$2NaOH(aq)+CaSO_3(s) \rightarrow 2NaOH(aq)$(at least partially separate)$+CaSO_3(s)$(at least partially separate)

(8) Decomposing at least a portion of calcium sulfite to form at least a portion of calcium oxide and at least a portion of sulfur dioxide:

$CaSO_3(s) \rightarrow CaO(s)+SO_2(g)$ (9) Reacting at least a portion of sodium hydroxide with at least a portion of carbon dioxide to form, for example, at least a portion of sodium carbonate or sodium bicarbonate.

$2NaOH(aq)+CO_2$(g or aq)$\rightarrow Na_2CO_3$(aq or s)$+H_2O$(l or aq or g)

$Na_2CO_3$(aq or s)$+CO_2$(g or aq)$+H_2O$(l or aq or g)$\rightarrow 2NaHCO_3$(aq or s)

FIGURE DESCRIPTIONS

FIG. 27 Description:
FIG. 27 may show a process to produce a component comprising an alkaline earth oxide, or an alkaline earth hydroxide, or an alkaline earth carbonate, or an alkaline earth sulfide, or a derivative thereof, or any combination thereof and/or a component comprising sulfuric acid, or sulfur dioxide, or a derivative thereof, or any combination thereof. In some embodiments, at least a portion of a component comprising an alkaline earth sulfate may be reacted with at least a portion of a component comprising an alkali sulfite to form at least a portion of a component comprising an alkaline earth sulfite and at least a portion of a component comprising an alkali sulfate. In some embodiments, a component comprising an alkaline earth sulfite may be reacted or decomposed to form at least a portion of a component comprising an alkaline earth oxide, or alkaline earth hydroxide, or alkaline earth carbonate, or an alkaline earth sulfide, or a derivative thereof, or any combination thereof and/or a component comprising sulfur dioxide, or a derivative thereof. In some embodiments, a component comprising sulfur dioxide may comprise an intermediate within one or more or any combination of embodiments. In some embodiments, a component comprising alkali sulfate may be reacted in a process to form a component comprising an alkali sulfite, wherein said alkali may be employed or function as, for example, an intermediate in one or more or any combination of embodiments. For example, in some embodiments, component comprising an alkaline earth intermediate, such as magnesium, may be employed to facilitate the conversion of a component comprising an alkali sulfate. For example, in some embodiments, a component comprising an alkali sulfate may be reacted with a component comprising an alkali earth acid anion, such as a component comprising magnesium, or such as a component comprising magnesium carboxylate, or such as a component comprising magnesium sulfite, or any combination thereof to form at least a portion of a component comprising an alkali acid anion, such as a component comprising sodium carboxylate, or sodium sulfite, or a derivative thereof, or any combination thereof. In some embodiments, a component comprising an alkali acid anion may be reacted with a component comprising sulfur dioxide to form at least a portion of a component comprising an alkali-sulfur dioxide species. In some embodiments, a component comprising an alkali-sulfur dioxide species, which may, for example, comprise sodium sulfite, or sodium bisulfite, or other sodium+sulfur dioxide species, or a derivative thereof, or any combination thereof, may be reacted with a component comprising an alkaline earth sulfate, which may, for example, comprise calcium sulfate, to form, for example, a component comprising an alkali sulfate, which may comprise, for example, sodium sulfate or potassium sulfate, and/or a component comprising an alkaline earth sulfite, which may comprise, for example, calcium sulfite.

FIG. 28 Description:
FIG. 28 may show example unit operations of an embodiment shown in FIG. 27.

FIG. 29 Description:
FIG. 29 may show example unit operations of an embodiment shown in FIG. 27. A potential difference between FIG. 29 and FIG. 28 may be that FIG. 29 may show the at least partial separation of a component comprising alkali+sulfur dioxide species from a component comprising an acid anion or an acid, using, for example, including, but not limited to, one or more or any combination of the following: reverse osmosis, or nanofiltration, or electrodialysis, or a process described herein, or a derivative thereof, or a separation process known in the art, or any combination thereof.

FIG. 30 Description:
FIG. 30 may be similar to FIG. 27, except may show at least a portion of a component comprising an alkaline earth hydroxide, or an alkaline earth oxide, or an alkaline earth sulfide, or a derivative thereof, or any combination thereof being at least partially employed in a reaction with a component comprising carbon dioxide or capturing at least a portion of a component comprising carbon dioxide, to form, for example, a component comprising an alkaline earth carbonate. In some embodiments, at least a portion of a reaction of a component comprising an alkaline earth carbonate with at least a portion of a component comprising an acid anion may form at least a portion of a component comprising captured, or separated, or high concentration, or high purity, or high partial pressure, or any combination thereof carbon dioxide. A component comprising carbon dioxide may be provided as an example acid gas, and/or other acid gases instead of, or in addition to, carbon dioxide may be captured or separated or reacted instead of, or in addition to, carbon dioxide, in one or more or any combination of embodiments.

Notes
Note: A component comprising carbon dioxide may be provided as an example acid gas, and/or other acid gases instead of, or in addition to, carbon dioxide may be captured or separated or reacted instead of, or in addition to, carbon dioxide, in one or more or any combination of embodiments. For example, in some embodiments, a component comprising hydrogen sulfide may be captured using, for example, at least a portion of a component comprising an alkaline earth hydroxide, or an alkaline earth oxide, or any combination thereof.

Example Embodiment Producing Calcium Oxide, Sulfuric Acid, and Calcium Carbonate from Calcium Sulfate, Carbon Dioxide, and Water, which may include, but is not limited to, one or more or any combination of the following:

(1) React at least a portion of calcium sulfate with at least a portion of sodium carbonate or sodium bicarbonate to form at least a portion of calcium sulfite and at least a portion of sodium sulfate.

For example, including, but not limited to, one or more or any combination of the following:

$$CaSO_4+Na_2CO_3 \rightarrow CaCO_3+Na_2SO_4$$

$$CaSO_4+2NaHCO_3 \rightarrow CaCO_3+Na_2SO_4+CO_2+H_2O$$

$$CaSO_4+2NaHCO_3 \rightarrow Ca(HCO_3)_2+Na_2SO_4$$

$$Ca(HCO_3)_2 \rightarrow CaCO_3+CO_2+H_2O$$

$$CaSO_4(s \text{ or } aq)+Na_2CO_3(aq \text{ or } s) \rightarrow CaCO_3(s)+Na_2SO_4(aq)$$

$$CaSO_4(s \text{ or } aq)+2NaHCO_3(aq) \rightarrow CaCO_3(s)+Na_2SO_4(aq)+CO_2(g \text{ or } aq)+H_2O(l \text{ or } g)$$

$$CaSO_4(s \text{ or } aq)+2NaHCO_3(aq) \rightarrow Ca(HCO_3)_2(aq)+Na_2SO_4(aq)$$

$$Ca(HCO_3)_2(aq) \rightarrow CaCO_3(aq)+CO_2(g \text{ or } aq)+H_2O(l \text{ or } aq)$$

(2) React at least a portion of sodium sulfate with at least a portion of magnesium acetate to form at least a portion of sodium acetate and at least a portion of magnesium sulfate.

For example, including, but not limited to, one or more or any combination of the following:

$$Na_2SO_4+Mg(CH_3COO)_2 \rightarrow 2NaCH_3COO+MgSO_4$$

$$Na_2SO_4(s \text{ or } aq)+Mg(CH_3COO)_2(s \text{ or } aq) \rightarrow 2NaCH_3COO(s \text{ or } aq)+MgSO_4(s \text{ or } aq)$$

$$Na_2SO_4(s \text{ or } aq)+Mg(CH_3COO)_2(s \text{ or } aq) \rightarrow 2NaCH_3COO(aq)+MgSO_4(aq)$$

(2—separation) Separating at least a portion of sodium acetate from at least a portion of magnesium sulfate.

For example, including, but not limited to, one or more or any combination of the following:

$$2NaCH_3COO+MgSO_4 \rightarrow 2NaCH_3COO(\text{at least partially separate})+MgSO_4(\text{at least partially separate})$$

$$2NaCH_3COO(aq)+MgSO_4(aq) \rightarrow 2NaCH_3COO(aq)(\text{at least partially separate})+MgSO_4(s)(\text{at least partially separate})$$

$$2NaCH_3COO(aq)+MgSO_4(aq) \rightarrow 2NaCH_3COO(s)(\text{at least partially separate})+MgSO_4(s)(\text{at least partially separate})$$

(3) Decompose at least a portion of magnesium sulfate to form at least a portion of magnesium oxide and at least a portion of sulfur dioxide, or diatomic oxygen, or sulfur trioxide, or any combination thereof.

For example, including, but not limited to, one or more or any combination of the following:

$$MgSO_4 \rightarrow MgO+SO_2+\tfrac{1}{2}O_2$$

$$MgSO_4 \rightarrow MgO+SO_3$$

$$MgSO_4(s) \rightarrow MgO(s)+SO_2(g)+\tfrac{1}{2}O_2(g)$$

$$MgSO_4(s) \rightarrow MgO(s)+SO_3(g)$$

(4) React at least a portion of sulfur dioxide, or diatomic oxygen, or sulfur trioxide, or any combination thereof with at least a portion of water to form at least a portion of sulfuric acid.

For example, including, but not limited to, one or more or any combination of the following:

$$H_2SO_4+SO_3 \rightarrow H_2S_2O_7$$

$$H_2S_2O_7+H_2O \rightarrow 2H_2SO_4$$

$$SO_2+\tfrac{1}{2}O_2+H_2O \rightarrow H_2SO_4$$

$$SO_3+H_2O \rightarrow H_2SO_4$$

$$SO_3+H_2O \rightarrow H_2SO_4(g)$$

$$H_2SO_4(g) \rightarrow H_2SO_4(l)$$

$$SO_2(g \text{ or } aq \text{ or } l)+\tfrac{1}{2}O_2(g)+H_2O(g \text{ or } l) \rightarrow H_2SO_4(l \text{ or } g \text{ or } aq)$$

$$SO_3(g \text{ or } aq \text{ or } l)+H_2O(g \text{ or } l) \rightarrow H_2SO_4(l \text{ or } g \text{ or } aq)$$

Note: Heat may be recovered from one or more or any combination of reactions to form or produce sulfuric acid.

(5) React at least a portion of magnesium oxide or a derivative of magnesium oxide with at least a portion of acetic acid to form at least a portion of magnesium acetate and water.

For example, including, but not limited to, one or more or any combination of the following:

$$MgO+2CH_3COOH \rightarrow Mg(CH_3COO)_2+H_2O$$

$$Mg(OH)_2+2CH_3COOH \rightarrow Mg(CH_3COO)_2+H_2O$$

$$MgO+CO_2 \rightarrow MgCO_3$$

$$MgO+H_2O \rightarrow Mg(OH)_2$$

$$Mg(OH)_2+CO_2 \rightarrow MgCO_3+H_2O$$

$$Mg(OH)_2+\text{Carbonate or Bicarbonate Salt} \rightarrow MgCO_3$$

$$MgCO_3+2CH_3COOH \rightarrow Mg(CH_3COO)_2+H_2O+CO_2$$

$$MgO(s)+2CH_3COOH(g \text{ or } l \text{ or } aq) \rightarrow Mg(CH_3COO)_2(s \text{ or } aq)+H_2O(aq \text{ or } g)$$

$$Mg(OH)_2(s \text{ or } aq)+2CH_3COOH(aq \text{ or } l \text{ or } g \text{ or } s) \rightarrow Mg(CH_3COO)_2(aq \text{ or } s)+H_2O(aq \text{ or } l \text{ or } g)$$

$$MgO(s)+CO_2(g \text{ or } aq) \rightarrow MgCO_3(s)$$

$$MgO(s)+H_2O(g \text{ or } l \text{ or } aq) \rightarrow Mg(OH)_2(s \text{ or } aq)$$

$$Mg(OH)_2(s \text{ or } aq)+CO_2(g \text{ or } aq) \rightarrow MgCO_3(s)+H_2O(aq \text{ or } l \text{ or } g)$$

$$Mg(OH)_2(s \text{ or } aq)+\text{Carbonate or Bicarbonate Salt}(s \text{ or } aq) \rightarrow MgCO_3(s)$$

MgCO$_3$(s)+2CH$_3$COOH(aq or l or g)→Mg(CH$_3$COO)$_2$(aq or s)+H$_2$O(l or aq or g)+CO$_2$(g or aq)

Note: Heat may be recovered from one or more or any combination of reactions which may be employed to form or produce magnesium acetate.

Note: Heat may be recovered from one or more or any combination of reactions to form or produce magnesium hydroxide.

Note: Magnesium oxide or magnesium hydroxide may be employed to capture CO$_2$ and/or at least a portion of CO$_2$ may be desorbed by reacting at least a portion magnesium carbonate with at least a portion of acetic acid to form magnesium acetate and captured carbon dioxide.

(6) React at least a portion of sodium acetate with at least a portion of sulfur dioxide to form at least a portion of sodium sulfite or sodium bisulfite and at least a portion of acetic acid.

For example, including, but not limited to, one or more or any combination of the following:

2NaCH$_3$COO+SO$_2$+H$_2$O→Na$_2$SO$_3$+2CH$_3$COOH

Na$_2$SO$_3$+2CH$_3$COOH+SO$_2$+H$_2$O→2NaHSO$_3$+2CH$_3$COOH

2NaCH$_3$COO(aq or s)+SO$_2$(g or aq)+H$_2$O(l or g)→Na$_2$SO$_3$(aq or s)+2CH$_3$COOH(aq or g)

2NaCH$_3$COO(aq)+SO$_2$(g)+H$_2$O(l)→Na$_2$SO$_3$(aq)+2CH$_3$COOH(aq)

Na$_2$SO$_3$(aq or s)+2CH$_3$COOH(aq or g or l)+SO$_2$(g or l or aq)+H$_2$O(l or g or aq)→2NaHSO$_3$(aq)+2CH$_3$COOH(aq or g)

Na$_2$SO$_3$(aq)+2CH$_3$COOH(aq)+SO$_2$(g)+H$_2$O(l or aq or g)→2NaHSO$_3$(aq)+2CH$_3$COOH(aq)

(6—separation) Separate at least a portion of sodium sulfite or sodium bisulfite or sodium metabisulfite from at least a portion of acetic acid.

For example, including, but not limited to, one or more or any combination of the following:

Na$_2$SO$_3$+2CH$_3$COOH→Na$_2$SO$_3$(at least partially separate)+2CH$_3$COOH(at least partially separate)

Na$_2$SO$_3$(aq)+2CH$_3$COOH(aq)→Na$_2$SO$_3$(s)(at least partially separate)+2CH$_3$COOH(aq)(at least partially separate)

2NaHSO$_3$+2CH$_3$COOH→2NaHSO$_3$(at least partially separate)+2CH$_3$COOH(at least partially separate)

2NaHSO$_3$+2CH$_3$COOH→Na$_2$S$_2$O$_5$(at least partially separate)+2CH$_3$COOH(at least partially separate)+H$_2$O 2NaHSO$_3$(aq)+2CH$_3$COOH(aq)→Na$_2$S$_2$O$_5$(s)(at least partially separate)+2CH$_3$COOH(aq)(at least partially separate)

Na$_2$S$_2$O$_5$→Na$_2$SO$_3$+SO$_2$

Na$_2$S$_2$O$_5$(s)→Na$_2$SO$_3$(s)+SO$_2$(g)

(7) React at least a portion of sodium sulfite with at least a portion of calcium hydroxide or calcium oxide to form at least a portion of sodium hydroxide and at least a portion of calcium sulfite.

For example, including, but not limited to, one or more or any combination of the following:

Na$_2$SO$_3$+Ca(OH)$_2$→2NaOH+CaSO$_3$

CaO+H$_2$O→Ca(OH)$_2$

Na$_2$SO$_3$(s or aq)+Ca(OH)$_2$(s or aq)→2NaOH(aq)+CaSO$_3$(s)

Na$_2$SO$_3$(aq)+Ca(OH)$_2$(s or aq)→2NaOH(aq)+

CaO(s)+H$_2$O(l or g or aq)→Ca(OH)$_2$(s or aq) CaSO$_3$(s)

CaO(s)+H$_2$O(l or g or aq)→Ca(OH)$_2$(s or aq)

(7—separation) Separating at least a portion of calcium sulfite from at least a portion of sodium hydroxide.

For example, including, but not limited to, one or more or any combination of the following:

2NaOH+CaSO$_3$→2NaOH(at least partially separate)+CaSO$_3$(at least partially separate)

2NaOH(aq)+CaSO$_3$(s)→2NaOH(aq)(at least partially separate)+CaSO$_3$(s)(at least partially separate)

(8) Decomposing at least a portion of calcium sulfite to form at least a portion of calcium oxide and at least a portion of sulfur dioxide.

For example, including, but not limited to, one or more or any combination of the following:

CaSO$_3$→CaO+SO$_2$

CaSO$_3$(s)→CaO(s)+SO$_2$(g)

(9) Reacting at least a portion of sodium hydroxide with at least a portion of carbon dioxide to form, for example, at least a portion of sodium carbonate or sodium bicarbonate.

For example, including, but not limited to, one or more or any combination of the following:

2NaOH+CO$_2$→Na$_2$CO$_3$+H$_2$O

Na$_2$CO$_3$+CO$_2$+H$_2$O→2NaHCO$_3$

2NaOH(aq)+CO$_2$(g or aq)→Na$_2$CO$_3$(aq or s)+H$_2$O(l or aq or g)

Na$_2$CO$_3$(aq or s)+CO$_2$(g or aq)+H$_2$O(l or aq or g)→2NaHCO$_3$(aq or s)

Note: In some embodiments, at least a portion of CO$_2$ may be captured and/or converted in, for example, the reaction of at least a portion of sodium hydroxide with at least portion of carbon dioxide to form at least a portion of sodium carbonate or sodium bicarbonate, and/or the reaction of at least a portion of sodium carbonate or sodium bicarbonate with at least a portion of calcium sulfate to form at least a portion of calcium carbonate and/or at least a portion of sodium sulfate.

Note: In some embodiments, at least a portion of the sodium carbonate or sodium bicarbonate produced may be employed in a reaction of at least a portion of calcium sulfate with at least a portion of sodium carbonate or sodium bicarbonate to form, for example, at least a portion of calcium carbonate and/or at least a portion of sodium sulfate.

Note: In some embodiments, acetic acid and acetate may be provides as an example. In some embodiments, acetic acid and acetate may be provides as an example carboxylic acid, or an example anion or acid with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof. One or more or any combination of carboxylic acids, or other anions or acids with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof may be employed instead of, or in addition to, acetic acid, for example, herein.

Example Embodiment Producing Sodium Hydroxide, Calcium Carbonate, and Sulfuric Acid from Calcium Sulfate, Sodium Bicarbonate or Sodium Carbonate, and Water, which may include, but is not limited to, one or more or any combination of the following:

(1) React at least a portion of calcium sulfate with at least a portion of sodium sulfite or sodium bisulfite or sodium metabisulfite to form at least a portion of calcium sulfite and at least a portion of sodium sulfate.

$$CaSO_4(s \text{ or } aq)+Na_2CO_3(aq \text{ or } s) \rightarrow CaCO_3(s)+Na_2SO_4(aq)$$

$$CaSO_4(s \text{ or } aq)+2NaHCO_3(aq \text{ or } s) \rightarrow CaCO_3(s)+Na_2SO_4(aq)+CO_2(g)$$

(2) React at least a portion of sodium sulfate with at least a portion of magnesium acetate to form at least a portion of sodium acetate and at least a portion of magnesium sulfate.

$$Na_2SO_4(s \text{ or } aq)+Mg(CH_3COO)_2(s \text{ or } aq) \rightarrow 2NaCH_3COO(aq)+MgSO_4(aq)$$

(2—separation) Separating at least a portion of sodium acetate from at least a portion of magnesium sulfate.

$$2NaCH_3COO(aq)+MgSO_4(aq) \rightarrow 2NaCH_3COO(aq \text{ or } s)(\text{at least partially separate})+MgSO_4(s)(\text{at least partially separate})$$

(3) Decompose at least a portion of magnesium sulfate to form at least a portion of magnesium oxide and at least a portion of sulfur dioxide, or diatomic oxygen, or sulfur trioxide, or any combination thereof.

$$MgSO_4(s) \rightarrow MgO(s)+SO_2(g)+\tfrac{1}{2}O_2(g)$$

$$MgSO_4(s) \rightarrow MgO(s)+SO_3(g)$$

(4) React at least a portion of sulfur dioxide, or diatomic oxygen, or sulfur trioxide, or any combination thereof with at least a portion of water to form at least a portion of sulfuric acid.

For example, including, but not limited to, one or more or any combination of the following:

$$SO_2+\tfrac{1}{2}O_2 \rightarrow SO_3$$

$$H_2SO_4+SO_3 \rightarrow H_2S_2O_7$$

$$H_2S_2O_7+H_2O \rightarrow 2H_2SO_4$$

$$SO_2+\tfrac{1}{2}O_2+H_2O \rightarrow H_2SO_4$$

(5) React at least a portion of magnesium oxide or a derivative of magnesium oxide with at least a portion of acetic acid to form at least a portion of magnesium acetate and water.

For example, including, but not limited to, one or more or any combination of the following:

$$MgO(s)+H_2O(l) \rightarrow Mg(OH)_2(s \text{ or } aq)$$

$$Mg(OH)_2(s \text{ or } aq)+2CH_3COOH(aq \text{ or } g) \rightarrow Mg(CH_3COO)_2(aq)+H_2O(l)$$

Or $$Mg(OH)_2(s \text{ or } aq)+CO_2(g \text{ or } aq) \rightarrow MgCO_3(s)+H_2O (aq \text{ or } l \text{ or } g)$$

$$MgCO_3(s)+2CH_3COOH(aq \text{ or } l \text{ or } g) \rightarrow Mg(CH_3COO)_2(aq \text{ or } s)+H_2O(l)+CO_2(g)$$

(6) React at least a portion of sodium acetate with at least a portion of sulfur dioxide to form at least a portion of sodium sulfite and at least a portion of acetic acid.

$$2NaCH_3COO(aq)+SO_2(g)+H_2O(l) \rightarrow Na_2SO_3(aq)+2CH_3COOH(aq)$$

(7—separation) Separate at least a portion of sodium sulfite from at least a portion of acetic acid.

$$Na_2SO_3(aq)+2CH_3COOH(aq) \rightarrow Na_2SO_3(aq \text{ or } s)(\text{at least partially separate})+2CH_3COOH(aq)(\text{at least partially separate})$$

$$[Na+SO_2](\text{species})(aq)+2CH_3COOH(aq) \rightarrow [Na+SO_2](\text{species})(aq)(\text{at least partially separate})+2CH_3COOH(aq)(\text{at least partially separate})$$

(8) React at least a portion of sodium sulfite with at least a portion of calcium hydroxide or calcium oxide to form at least a portion of sodium hydroxide and at least a portion of calcium sulfite.

$$Na_2SO_3(aq)+Ca(OH)_2(s \text{ or } aq) \rightarrow 2NaOH(aq)+CaSO_3(s)$$

$$CaO(s)+H_2O(l \text{ or } g \text{ or } aq) \rightarrow Ca(OH)_2(s \text{ or } aq)$$

$$CaO(s)+H_2O(l \text{ or } g \text{ or } aq) \rightarrow Ca(OH)_2(s \text{ or } aq)$$

(8—separation) Separating at least a portion of calcium sulfite from at least a portion of sodium hydroxide.

$$2NaOH(aq)+CaSO_3(s) \rightarrow 2NaOH(aq)(\text{at least partially separate})+CaSO_3(s)(\text{at least partially separate})$$

(9) Decomposing at least a portion of calcium sulfite to form at least a portion of calcium oxide and at least a portion of sulfur dioxide:

$$CaSO_3(s) \rightarrow CaO(s)+SO_2(g)$$

FIGURE DESCRIPTIONS

FIG. 31:

FIG. 31 may be similar to FIG. 27, except, for example, at least a portion of a component comprising an alkali may be reacted to form at least a portion of a component comprising an alkali carbonate, or alkali bicarbonate, or alkali sesquicarbonate, or a derivative thereof, or any combination thereof and/or at least a portion of a component comprising an alkaline earth sulfate may be reacted with at least a portion of said component comprising alkali carbonate, or alkali bicarbonate, or alkali sesquicarbonate, or a derivative thereof, or any combination thereof to form at least a portion of a component comprising an alkaline earth carbonate and/or at least a portion of a component comprising an alkali sulfate.

Example Embodiments Comprising Processing Lithium Example Description

Summary: Some embodiments may pertain to systems or methods for processing lithium sulfate or lithium chloride or lithium ore. Some embodiments may enable the regeneration of or generation of sulfuric acid or hydrochloric acid. Some embodiments may enable the regeneration of or generation of sodium hydroxide or sodium carbonate. Some embodiments may enable inherent $CO_2$ capture and/or $CO_2$ conversion.

Example Chemistry:

$$\text{Lithium Ore} + H_2SO_4 \rightarrow Li_2SO_4 + \text{Residual Material} + H_2O \quad (1)$$

Note: Lithium Ore may comprise, for example, Spodumene.

Note: Sulfuric acid, or $H_2SO_4$, may comprise sulfuric acid produced from sodium sulfate.

$$Li_2SO_4 + Na_2CO_3 \rightarrow Li_2CO_3 + Na_2SO_4 \quad (2)$$

$$Na_2SO_4 \rightarrow 2NaOH + SO_4 \text{Derivative} \quad (3)$$

Note: '3.' may comprise a process for converting sodium sulfate into sodium hydroxide and sulfuric acid.

Note: '3.' may comprise a process for conversion sodium sulfate into sodium hydroxide and calcium sulfate.

$$2NaOH + CO_2 \rightarrow Na_2CO_3 + H_2O \quad (4)$$

Note: $CO_2$ may comprise, for example, a gas or liquid or fluid. For example, sodium hydroxide may react with $CO_2$ in gas or liquid streams comprising a low concentration of carbon dioxide, such as, for example, including, but not limited to, one or more or any combination of the following: air, flue gas, or emissions gas, or $CO_2$, or gas comprising $CO_2$, or fluid comprising $CO_2$, or solution comprising $CO_2$, or natural gas, or acid gas, or biogas, or syngas, or gasification gas, or reformer gas.

Example Chemistry:

$$\text{Lithium Ore} + H_2SO_4 \rightarrow Li_2SO_4 + \text{Residual Material} + H_2O \quad (1)$$

Note: Lithium Ore may comprise, for example, Spodumene.

Note: Sulfuric acid, or $H_2SO_4$, may comprise sulfuric acid produced from sodium sulfate.

$$Li_2SO_4 + Na_2CO_3 \rightarrow Li_2CO_3 + Na_2SO_4 \quad (2)$$

(3) React at least a portion of sodium sulfate with at least a portion of a magnesium-anion salt to form, for example, at least a portion of a sodium-anion salt and at least a portion of magnesium sulfate.

For example:

$$Na_2SO_4 + Mg(Anion) \rightarrow 2Na(Anion) + MgSO_4$$

$$Na_2SO_4 + Mg(CH_3COO)_2 \rightarrow 2NaCH_3COO + MgSO_4$$

$$3Na_2SO_4 + Mg_3(C_6H_5O_7)_2 \rightarrow 2Na_3C_6H_5O_7 + 3MgSO_4$$

(4) React at a portion of sodium-anion salt with at least a portion of sulfur dioxide to form at least a portion of sodium sulfite and at least a portion of anion derivative acid.

For example:

$$2Na(Anion) + SO_2 \rightarrow Na_2SO_3 + \text{Anion Derivative Acid}$$

$$2NaCH_3COO + SO_2 \rightarrow Na_2SO_3 + 2CH_3COOH$$

$$2Na_3C_6H_5O_7 + 3SO_2 \rightarrow 3Na_2SO_3 + C_6H_8O_7$$

(5) Separate at least a portion of sodium sulfite from at least a portion of anion derivative acid, such as, for example acetic acid.

(6) React at least a portion of sodium sulfite with at least a portion of calcium hydroxide to form at least a portion of sodium hydroxide and at least a portion of calcium sulfite.

For example:

$$Na_2SO_3 + Ca(OH)_2 \rightarrow 2NaOH + CaSO_3$$

(7) Decompose at least a portion of calcium sulfite to form at least a portion of calcium oxide and at least a portion of sulfur dioxide.

For example:

$$CaSO_3 \rightarrow CaO + SO_2$$

(8) React at least a portion of calcium oxide with at least a portion of water to form at least a portion of calcium hydroxide or milk of lime.

For example:

$$CaO + H_2O \rightarrow Ca(OH)_2$$

$$CaO + H_2O + \text{Water} \rightarrow Ca(OH)_2 \text{ (milk of lime)}$$

(9) Decompose at least a portion of magnesium sulfate to form at least a portion of magnesium oxide and at least a portion of sulfur dioxide, or sulfur trioxide, or diatomic oxygen or any combination thereof.

For example:

$$MgSO_4 \rightarrow MgO + SO_2 + \tfrac{1}{2}O_2$$

(10) React at least a portion of sulfur dioxide with at least a portion of oxygen and at least a portion of water to form at least a portion of sulfuric acid.

$$SO_2 + \tfrac{1}{2}O_2 + H_2O \rightarrow H_2SO_4$$

(11) React at least a portion of magnesium oxide with at least a portion of water, or carbon dioxide, or acid gas, or any combination thereof to form at least a portion of magnesium hydroxide, or magnesium carbonate, or magnesium sulfide, or any combination thereof.

For example:

$$MgO + H_2O \rightarrow Mg(OH)_2$$

$$MgO + H_2O + \text{Water} \rightarrow Mg(OH)_2 \text{ (milk of magnesia)}$$

$$MgO + CO_2 \rightarrow MgCO_3$$

$$Mg(OH)_2 + CO_2 \rightarrow MgCO_3 + H_2O$$

$$MgO + H_2S \rightarrow MgS + H_2O$$

$$Mg(OH)_2 + H_2S \rightarrow MgS + 2H_2O$$

(12) React at least a portion of magnesium oxide, or magnesium carbonate, or magnesium sulfite, or any combination thereof with, for example, at least a portion of an anion-derivative acid, to form, for example, at least a portion of magnesium-anion salt, or captured carbon dioxide, or captured acid gas, or water, or any combination thereof.

For example:

$$MgO + \text{Anion Derivative Acid} \rightarrow Mg(\text{Anion}) + \text{Water}$$

$$MgCO_3 + \text{Anion Derivative Acid} \rightarrow Mg(\text{Anion}) + CO_2$$
(which may comprise captured $CO_2$)

$$MgS + \text{Anion Derivative Acid} \rightarrow Mg(\text{Anion}) + H_2S$$
(may comprise captured $H_2S$)

$$MgO + \rightarrow Mg(CH_3COO)_2 + \text{Water}$$

$$MgCO_3 + 2CH_3COOH \rightarrow Mg(CH_3COO)_2 + CO_2 \text{(which may comprise captured } CO_2\text{)}$$

$MgS+2CH_3COOH \rightarrow Mg(CH_3COO)_2+H_2S$ (may comprise captured $H_2S$)

$$2NaOH+CO_2 \rightarrow Na_2CO_3+H_2O \quad (13)$$

Note: $CO_2$ may comprise, for example, a gas or liquid or fluid. For example, sodium hydroxide may react with $CO_2$ in gas or liquid streams comprising a low concentration of carbon dioxide, such as, for example, including, but not limited to, one or more or any combination of the following: air, flue gas, or emissions gas, or $CO_2$, or gas comprising $CO_2$, or fluid comprising $CO_2$, or solution comprising $CO_2$, or natural gas, or acid gas, or biogas, or syngas, or gasification gas, or reformer gas.

Example Chemistry:

$$Lithium\ Ore+H_2SO_4 \rightarrow Li_2SO_4+Residual\ Material+H_2O \quad (1)$$

Note: Lithium Ore may comprise, for example, Spodumene.

Note: Sulfuric acid, or $H_2SO_4$, may comprise sulfuric acid produced from sodium sulfate.

$$Li_2SO_4+Na_2CO_3 \rightarrow Li_2CO_3+Na_2SO_4 \quad (2)$$

(3) React at least a portion of sodium sulfate with at least a portion of a calcium-anion salt to form, for example, at least a portion of a sodium-anion salt and at least a portion of magnesium sulfate.

For example:

$$Na_2SO_4+Ca(Anion) \rightarrow 2Na(Anion)+CaSO_4$$

$$Na_2SO_4+Ca(CH_3COO)_2 \rightarrow 2NaCH_3COO+CaSO_4$$

$$3Na_2SO_4+Ca_3(C_6H_5O_7)_2 \rightarrow 2Na_3C_6H_5O_7+3CaSO_4$$

(4) React at a portion of sodium-anion salt with at least a portion of sulfur dioxide to form at least a portion of sodium sulfite and at least a portion of anion derivative acid.

For example:

$$2Na(Anion)+SO_2 \rightarrow Na_2SO_3+Anion\ Derivative\ Acid$$

$$2NaCH_3COO+SO_2 \rightarrow Na_2SO_3+2CH_3COOH$$

$$2Na_3C_6H_5O_7+3SO_2 \rightarrow 3Na_2SO_3+C_6H_8O_7$$

(5) Separate at least a portion of sodium sulfite from at least a portion of anion derivative acid, such as, for example acetic acid.

(6) React at least a portion of sodium sulfite with at least a portion of calcium hydroxide to form at least a portion of sodium hydroxide and at least a portion of calcium sulfite.

For example:

$$Na_2SO_3+Ca(OH)_2 \rightarrow 2NaOH+CaSO_3$$

(7) Decompose at least a portion of calcium sulfite to form at least a portion of calcium oxide and at least a portion of sulfur dioxide.

For example:

$$CaSO_3 \rightarrow CaO+SO_2$$

(8) React at least a portion of calcium oxide with at least a portion of water to form at least a portion of calcium hydroxide or milk of lime.

For example:

$$CaO+H_2O \rightarrow Ca(OH)_2$$

$$CaO+H_2O+Water \rightarrow Ca(OH)_2 \text{ (milk of lime)}$$

$$2NaOH+CO_2 \rightarrow Na_2CO_3+H_2O \quad (9)$$

Note: $CO_2$ may comprise, for example, a gas or liquid or fluid. For example, sodium hydroxide may react with $CO_2$ in gas or liquid streams comprising a low concentration of carbon dioxide, such as, for example, including, but not limited to, one or more or any combination of the following: air, flue gas, or emissions gas, or $CO_2$, or gas comprising $CO_2$, or fluid comprising $CO_2$, or solution comprising $CO_2$, or natural gas, or acid gas, or biogas, or syngas, or gasification gas, or reformer gas.

Example Chemistry:

$$Lithium\ Ore+H_2SO_4 \rightarrow Li_2SO_4+Residual\ Material+H_2O \quad (1)$$

Note: Lithium Ore may comprise, for example, Spodumene.

Note: Sulfuric acid, or $H_2SO_4$, may comprise sulfuric acid produced from sodium sulfate.

$$Li_2SO_4+Na_2CO_3 \rightarrow Li_2CO_3+Na_2SO_4 \quad (2)$$

$$Na_2SO_4+H_2O \rightarrow 2NaOH+H_2SO_4 \quad (3)$$

Note: If desired, '(3)' may be conducted using electrochemistry, such as, for example, a membrane cell, or a Diaphragm cell, or an electrodialysis system, or a mercury cell, or an unpartitioned cell, or any combination thereof.

$$2NaOH+CO_2 \rightarrow Na_2CO_3+H_2O \quad (4)$$

Example Chemistry:

$$2LiCl+Na_2CO_3 \rightarrow Li_2CO_3+2NaCl \quad (1)$$

$$2NaCl+H_2SO_4 \rightarrow Na_2SO_4+2HCl \quad (2)$$

$$Na_2SO_4 \rightarrow 2NaOH+SO_4\ Derivative \quad (3)$$

Note: '3.' may comprise a process for converting sodium sulfate into sodium hydroxide and sulfuric acid.

Note: '3.' may comprise a process for conversion sodium sulfate into sodium hydroxide and calcium sulfate.

$$2NaOH+CO_2 \rightarrow Na_2CO_3+H_2O \quad (4)$$

Note: $CO_2$ may comprise, for example, a gas or liquid or fluid. For example, sodium hydroxide may react with $CO_2$ in gas or liquid streams comprising a low concentration of carbon dioxide, such as, for example, including, but not limited to, one or more or any combination of the following: air, flue gas, or emissions gas, or $CO_2$, or gas comprising $CO_2$, or fluid comprising $CO_2$, or solution comprising $CO_2$, or natural gas, or acid gas, or biogas, or syngas, or gasification gas, or reformer gas.

Example Chemistry:

$$2LiCl+Na_2CO_3 \rightarrow Li_2CO_3+2NaCl \quad (1)$$

$$2NaCl+H_2SO_4 \rightarrow Na_2SO_4+2HCl \quad (2)$$

(3) React at least a portion of sodium sulfate with at least a portion of a magnesium-anion salt to form, for example, at least a portion of a sodium-anion salt and at least a portion of magnesium sulfate.

For example:

$$Na_2SO_4+Mg(Anion) \rightarrow 2Na(Anion)+MgSO_4$$

$$Na_2SO_4+Mg(CH_3COO)_2 \rightarrow 2NaCH_3COO+MgSO_4$$

$$3Na_2SO_4+Mg_3(C_6H_5O_7)_2 \rightarrow 2Na_3C_6H_5O_7+3MgSO_4$$

(4) React at a portion of sodium-anion salt with at least a portion of sulfur dioxide to form at least a portion of sodium sulfite and at least a portion of anion derivative acid.

For example:

2Na(Anion)+SO$_2$→Na$_2$SO$_3$+Anion Derivative Acid

2NaCH$_3$COO+SO$_2$→Na$_2$SO$_3$+2CH$_3$COOH

2Na$_3$C$_6$H$_5$O$_7$+3SO$_2$→3Na$_2$SO$_3$+C$_6$H$_8$O$_7$ (5) Separate at least a portion of sodium sulfite from at least a portion of anion derivative acid, such as, for example acetic acid.

(6) React at least a portion of sodium sulfite with at least a portion of calcium hydroxide to form at least a portion of sodium hydroxide and at least a portion of calcium sulfite.

For example:

Na$_2$SO$_3$+Ca(OH)$_2$→2NaOH+CaSO$_3$ (7) Decompose at least a portion of calcium sulfite to form at least a portion of calcium oxide and at least a portion of sulfur dioxide.

For example:

CaSO$_3$→CaO+SO$_2$ (8) React at least a portion of calcium oxide with at least a portion of water to form at least a portion of calcium hydroxide or milk of lime.

For example:

CaO+H$_2$O→Ca(OH)$_2$

CaO+H$_2$O+Water→Ca(OH)$_2$ (milk of lime)

(9) Decompose at least a portion of magnesium sulfate to form at least a portion of magnesium oxide and at least a portion of sulfur dioxide, or sulfur trioxide, or diatomic oxygen or any combination thereof.

For example:

MgSO$_4$→MgO+SO$_2$+½O$_2$

(10) React at least a portion of sulfur dioxide with at least a portion of oxygen and at least a portion of water to form at least a portion of sulfuric acid.

SO$_2$+½O$_2$+H$_2$O→H$_2$SO$_4$

(11) React at least a portion of magnesium oxide with at least a portion of water, or carbon dioxide, or acid gas, or any combination thereof to form at least a portion of magnesium hydroxide, or magnesium carbonate, or magnesium sulfide, or any combination thereof.

For example:

MgO+H$_2$O→Mg(OH)$_2$

MgO+H$_2$O+Water→Mg(OH)$_2$ (milk of magnesia)

MgO+CO$_2$→MgCO$_3$

Mg(OH)$_2$+CO$_2$→MgCO$_3$+H$_2$O

MgO+H$_2$S→MgS+H$_2$O

Mg(OH)$_2$+H$_2$S→MgS+2H$_2$O

(12) React at least a portion of magnesium oxide, or magnesium carbonate, or magnesium sulfite, or any combination thereof with, for example, at least a portion of an anion-derivative acid, to form, for example, at least a portion of magnesium-anion salt, or captured carbon dioxide, or captured acid gas, or water, or any combination thereof.

For example:

MgO+Anion Derivative Acid Mg(Anion)+Water

MgCO$_3$+Anion Derivative Acid→Mg(Anion)+CO$_2$ (which may comprise captured CO$_2$)

MgS+Anion Derivative Acid→Mg(Anion)+H$_2$S (may comprise captured H$_2$S)

MgO+→Mg(CH$_3$COO)$_2$+Water

MgCO$_3$+2CH$_3$COOH→Mg(CH$_3$COO)$_2$+CO$_2$ (which may comprise captured CO$_2$)

MgS+2CH$_3$COOH→Mg(CH$_3$COO)$_2$+H$_2$S (may comprise captured H$_2$S

2NaOH+CO$_2$→Na$_2$CO$_3$+H$_2$O     (13)

Note: CO$_2$ may comprise, for example, a gas or liquid or fluid. For example, sodium hydroxide may react with CO$_2$ in gas or liquid streams comprising a low concentration of carbon dioxide, such as, for example, including, but not limited to, one or more or any combination of the following: air, flue gas, or emissions gas, or CO$_2$, or gas comprising CO$_2$, or fluid comprising CO$_2$, or solution comprising CO$_2$, or natural gas, or acid gas, or biogas, or syngas, or gasification gas, or reformer gas.

Example Chemistry:

2LiCl+Na$_2$CO$_3$→Li$_2$CO$_3$+2NaCl     (1)

2NaCl+H$_2$O→2NaOH+2HCl     (2)

Note: If desired, '(3)' may be conducted using electrochemistry, such as, for example, a membrane cell, or a Diaphragm cell, or an electrodialysis system, or a mercury cell, or an unpartitioned cell, or any combination thereof.

2NaOH+CO$_2$→Na$_2$CO$_3$+H$_2$O     (3)

Note: CO$_2$ may comprise, for example, a gas or liquid or fluid. For example, sodium hydroxide may react with CO$_2$ in gas or liquid streams comprising a low concentration of carbon dioxide, such as, for example, including, but not limited to, one or more or any combination of the following: air, flue gas, or emissions gas, or CO$_2$, or gas comprising CO$_2$, or fluid comprising CO$_2$, or solution comprising CO$_2$, or natural gas, or acid gas, or biogas, or syngas, or gasification gas, or reformer gas.

Example Description of Separation of at Least a Portion of any Impurities

In some embodiments, heavy metals or sulfates may be more effectively/efficiently separated from a solution comprising an alkali monovalent salt, such as a solution comprising sodium acetate, or sodium formate, or sodium chloride, than, for example, from a solution comprising sodium sulfate, because a sodium-monovalent anion salt comprises a monovalent anion (acetate) and a monovalent cation (sodium), unlike sodium sulfate with may comprise a divalent anion (sulfate). For example, in some embodiments, at least a portion of heavy metal salts and/or sulfates may be at least partially separated from a solution comprising sodium acetate, or sodium formate, or sodium chloride in solution using nanofiltration because the sodium acetate, or sodium formate, or sodium chloride (being monovalent) may preferentially permeate a nanofiltration membrane, while heavy metals or sulfates may be preferentially rejected by the nanofiltration membrane. Alternatively, or additionally, in some embodiments, for example, heavy metal salts or sulfates may be at least partially separated from at least a portion of the solution comprising sodium acetate, or sodium formate, or sodium chloride using monovalent selective electrodialysis because the sodium acetate, or sodium formate, or sodium chloride may be monovalent (both monovalent cation and anion), while the heavy metal salts may be multivalent and sulfate may be multivalent.

In some embodiments, for example, a solution comprising sodium acetate, or sodium formate, or sodium chloride, or sodium-monovalent anion salt, or any combination thereof may be treated to remove, for example, at least a portion of residual calcium sulfate, or impurities, or heavy metal impurities, or any combination thereof. For example, in some embodiments, said treatment may comprise, including, but not limited to, one or more or any combination of the following:

- Removing at Least a Portion of Residual Calcium by Chemical Reaction Precipitation: In some embodiments, a solution comprising sodium acetate, or sodium formate, or sodium chloride, or sodium-monovalent anion salt, or any combination thereof may comprise residual dissolved calcium sulfate. In some embodiments, calcium sulfate may possess at least some solubility in a solution, for example, calcium sulfate may have a solubility of about 2.15 g per L of deionized water at approximately 100° F. (38° C.). It may be desirable to chemically change calcium sulfate, or chemical remove at least a portion of calcium sulfate, or any combination thereof to, for example, prevent at least a portion of calcium sulfate scaling, or calcium sulfate membrane fouling, or any combination thereof. In some embodiments, at least a portion of a salt comprising sodium sulfite, or sodium carbonate, or sodium bisulfite, or sodium metabisulfite, or sodium bicarbonate, or sodium fluoride, or potassium fluoride, or sodium sulfide, or sodium oxalate, or sodium citrate, or sodium phosphate, or a salt of an anion with which calcium forms a salt with a lower solubility in the solution than calcium sulfate to induce at least a portion of calcium precipitation, or any combination thereof may be added to the solution comprising sodium acetate, or sodium chloride, or sodium-monovalent anion salt, or any combination thereof to, for example, react with at least a portion of any residual calcium sulfate dissolved in the solution and/or form at least a portion of a solid precipitate comprising calcium, such as, for example, calcium sulfite, or calcium carbonate, or calcium fluoride, or calcium sulfide, or calcium oxalate, or calcium citrate, calcium phosphate, or a calcium salt of an anion with which calcium forms a salt with a lower solubility in the solution than calcium sulfate, or any combination thereof. In some embodiments, at least a portion of the solid precipitate comprising calcium may be separated by, for example, a solid-liquid separation, such as a filter, or filtration, or centrifuge, or a coagulant, or a decanter, or flocculation, or any combination thereof. In some embodiments, at least a portion of the residual calcium sulfate may react to form at least a portion of an at least partially insoluble salt comprising calcium, and/or at least a portion of an at least partially soluble salt comprising sulfate. For example, in some embodiments, at least a portion of the residual calcium sulfate may react to form at least a portion of an at least partially insoluble salt comprising calcium, such as calcium carbonate or calcium sulfite, and/or at least a portion of an at least partially soluble salt comprising sulfate, such as sodium sulfate or potassium sulfate or ammonium sulfate, wherein at least a portion of the at least partially soluble salt may remain in the solution comprising solution comprising sodium acetate, or sodium formate, or sodium chloride, or sodium-monovalent anion salt, or any combination thereof.

- Separation of at Least a Portion of any Impurities, or Heavy Metals, or Sulfate, or Multivalent Ions, or Divalent Ions, or Other Potential Impurities or any Combination Thereof using Nanofiltration: In some embodiments, a solution comprising sodium acetate, or sodium formate, or sodium chloride, or sodium-monovalent anion salt, or any combination thereof may comprise impurities and/or may be transferred into a nanofiltration process, forming, for example, a retentate comprising at least a portion of impurities and/or a permeate comprising at least a portion of a solution comprising sodium acetate, or sodium formate, or sodium chloride, or sodium-monovalent anion salt, or any combination thereof. In some embodiments, at least a portion of the retentate may comprise including, not limited to, one or more or any combination of the following: sodium sulfate, divalent anion salts, or heavy metals, or multivalent anion salts, or calcium sulfate, or magnesium sulfate, or sulfate, or sulfite, or carbonate, or any combination thereof. In some embodiments, the nanofiltration may comprise at least one stage, or multiple stages, or any combination thereof. In some embodiments, the permeate may comprise a sodium monovalent salt and/or be further treated and/or may be transferred to the next step.

- Recovering at Least a Portion of Any Residual Sodium Monovalent Salt or Monovalent Anion Acid or Any Combination Thereof From, For Example, the Nanofiltration Retentate: In some embodiments, at least a portion of monovalent salt, or monovalent anion salt, or any combination thereof may be present in the nanofiltration retentate. In some embodiments, for example, at least a portion of salt present in the nanofiltration retentate may comprise a salt wherein the anion may be a derivative of an acid which may possess a vapor pressure if as a stand-alone acid or may be separable or recoverable. In some embodiments, for example, at least a portion of sodium acetate or sodium formate may be present in the nanofiltration retentate. In some embodiments, it may be desirable to recover, or regenerate, or separate at least a portion of any valuable or useful chemicals which may be present in the nanofiltration retentate. For example, in some embodiments, at least a portion of a chemical comprising an acid or acid gas may be added to the retentate to react to form at least a portion of a desired or recoverable chemical or to free-up a desired or recoverable chemical. For example, in some embodiments, at least a portion of a chemical comprising an acid or acid gas may be added to the retentate to react with at least a portion of a salt comprising an acetate or formate, such as sodium acetate or sodium formate, to form at least a portion of free aqueous acetic acid or formic acid. For example, in some embodiments, at least a portion of a chemical comprising an acid or acid gas, such as an acid or acid gas with an acid strength stronger than formic acid or acetic acid or a carboxylic acid, which may include, but is not limited to, sulfurous acid, or sulfur dioxide, or hydrochloric acid, or hydrogen chloride, or sulfuric acid, or any combination thereof, may be added to the retentate to react with at least a portion of a salt comprising an acetate or formate, such as sodium acetate or sodium formate, to form at least a portion of aqueous acetic acid or formic acid.

In some embodiments, it may be desirable to recover at least a portion of the desired or recoverable chemical, or the freed-up desired or recoverable chemical, from the retentate solution or the treated retentate solution. The solution comprising retentate, or treated retentate, or the solution with at least a portion of freed-up desired or recoverable chemical, or the solution comprising acetic acid or formic acid, or any combination thereof may be referred to as the retentate or treated retentate in the present section. In some embodiments, said recovering may comprise, including, but not limited to, one or more or any combination of the following:

Distillation and/or Crystallization: The solution comprising retentate, or treated retentate may be transferred to a concentrating, or distillation, or crystallization process, which may form a solid comprising impurities, or divalent salts, or heavy metal salts, or any combination thereof and a condensate or distillate or liquid comprising aqueous solution comprising freed-up desired or recoverable chemical, such as, for example, including, but not limited to, one or more or any combination of the following: acetic acid or formic acid, or dissolved acid gas, or any combination thereof. In some embodiments, the condensate or distillate may comprise a dilute acetic acid, or formic acid, or carboxylic acid, or acid gas, or any combination thereof solution.

Reacting the Condensate or Distillate comprising a Recovered Acid with a Base and/or then Concentrating the Solution: A solution comprising condensate or distillate comprising at least a portion of a recovered acid, such as acetic acid, or formic acid, or carboxylic acid, may be reacted with a solid or solution or gas comprising a base to form, for example, a solution or solid or any combination thereof comprising a salt of the recovered acid. For example, in some embodiments, a solution comprising acetic acid may be reacted with a base comprising, including, but not limited to, one or more or any combination of the following: calcium carbonate, or sodium carbonate, or sodium bicarbonate, or sodium hydroxide, or calcium oxide, or calcium hydroxide, or sodium sulfide, or calcium sulfide, or ammonia, or magnesium oxide, or magnesium hydroxide, or magnesium carbonate. For example, in some embodiments, a solution comprising acetic acid may be reacted with a salt comprising calcium carbonate to form a solid, or solution, or any combination thereof comprising calcium acetate. In some embodiments, it may be desirable for the salt reaction product or the salt of the recovered acid to comprise a salt employed or present as a reactant in one or more process steps, such as a calcium-anion salt, or a sodium-anion salt, or a calcium acetate, or a sodium acetate, or a calcium formate, or a sodium formate, or a calcium sulfite, or a sodium sulfite, or any combination thereof, which may facilitate the return or transfer of the chemical to a process or process step.

Concentrating the Solution comprising a Salt formed from Reacting a Base with the Recovered Acid: In some embodiments, the solution comprising a salt formed from reacting a base with a recovered acid may comprise at a relatively dilute concentration solution and/or it may be desirable to concentrate said salt. For example, in some embodiments, said salt may be concentrated using one or more or any combination of concentrating or separating processes described herein or known in the art. For example, in some embodiments, said salt may be concentrated using reverse osmosis or electrodialysis, and/or may be further concentrated and/or crystallized using mechanical vapor compression distillation, or multi-effect distillation, or a crystallizer, or any combination thereof.

Stripping and/or Reaction of the Stripping Gas with a Base: In some embodiments, at least a portion of any desired chemical or free acid present in the solution comprising retentate or treated retentate may be recovered or removed by employing a stripping gas to volatize or vaporize or evaporate into a vapor phase at least a portion of the desired chemical or free acid, then reacting or contacting the stripping gas rich in free acid vapor with a base, which may comprise a solid or liquid or gas or solution or any combination thereof, to form a solution of desired chemical or a salt comprising desired chemical or free acid, and/or the lean stripping gas may be recirculated to remove or recover additional desired chemical or free acid. In some embodiments, a gas permeable membrane or membrane distillation may be employed to facilitate the transfer of desired chemical or free acid vapor from the retentate or treated retentate to a reaction with a base or to a recovery solution. In some embodiments, it may be desirable for the temperatures of the retentate or treated retentate and/or the temperature of the base or a solution comprising a base to be controlled to, for example, ensure the water vapor pressure of the solutions may be similar or about the same to, for example, reduce or minimize mass transfer of water and/or reduce energy consumption.

Transferring a Salt formed from Reacting a Base with the Recovered Acid to One or More or Any Combination of Process Steps: In some embodiments, the salt formed from reacting a base with a recovered acid may be transferred to or added to one or more process steps. For example, in some embodiments, the salt formed from reacting a base with a recovered acid may comprise calcium acetate and/or may comprise at least a portion of the calcium acetate participating in the reaction with sodium sulfate. For example, in some embodiments, the salt formed from reacting a base with a recovered acid may comprise sodium acetate and/or may comprise at least a portion of the sodium acetate participating in a reaction with sulfur dioxide. For example, in some embodiments, the salt formed from reacting a base with a recovered acid may comprise sodium sulfite and/or may comprise at least a portion of the sodium sulfite participating in a reaction with calcium hydroxide. For example, in some embodiments, the salt formed from reacting a base with a recovered acid may comprise sodium acetate and/or may comprise at least a portion of the sodium acetate participating in an electrochemical reaction. For example, in some embodiments, the salt formed from reacting a base with a recovered acid may comprise sodium sulfite and/or may comprise at least a portion of the sodium sulfite participating in an electrochemical reaction.

Notes

Note: In some embodiments, at least a portion of $2CH_3COOH$ may be separated from at least a portion of $Na_2SO_3$ by distillation or crystallization.

Note: In some embodiments, at least a portion of $2CH_3COOH$ may be separated from at least a portion of $Na_2SO_3$. For example, said separation may comprise, including, but not limited to, one or more or any combination of the following: a membrane based process, or nanofiltration, or distillation, or crystallization, or high pressure nanofiltration, or high pressure reverse osmosis, or membrane distillation, or mechanical vapor compression distillation, or MVC distillation, or MVC crystallization, or MED, or MSF, or crystallizer, or falling film crystallizer, or heat recovery distillation, or cryodesalination.

Note: In some embodiments, at least a portion of $CO_2$ generated from a reaction may comprise, including, but not limited to, one or more or any combination of the following: captured $CO_2$, or high quality $CO_2$, or high pressure $CO_2$, or high partial pressure $CO_2$, or high purity $CO_2$, or low temperature $CO_2$, or low water vapor $CO_2$, or low cost to utilize or convert $CO_2$, or $CO_2$ which may be at a sufficient concentration to form sodium bicarbonate or ammonium bicarbonate or potassium bicarbonate, or $CO_2$ at a partial pressure greater than 1 Bar, or $CO_2$ at a partial pressure greater than 2 Bar, or any combination thereof.

Note: In some embodiments, at least a portion of the $CO_2(g)$ produced may be reacted with at least a portion of the NaOH produced, to form, for example, sodium carbonate or sodium bicarbonate. For example, in some lithium-ion battery recycling applications, or lithium processing applications, or any combination thereof, sodium carbonate may be employed. For example, in some lithium-ion battery recycling applications, or lithium processing applications, or any combination thereof, sodium carbonate may be employed to produce lithium carbonate.

Note: In some embodiments, the salt or solution comprising sodium produced or comprising a product from the reaction of sodium sulfate with a salt or solution comprising calcium may be treated or further treated to, for example, at least a portion of residual calcium sulfate, or impurities, or heavy metal impurities, or any combination thereof.

Note: In some embodiments, sodium chloride from, for example, may comprise a byproduct or output. For example, sodium chloride output may comprise a lower concentration of impurities than, for example, a sodium sulfate waste input with heavy metal impurities, and/or, in some embodiments, may be more easily disposed of or used for other applications.

Note: In some embodiments, Sodium or Na, or Potassium or K, or any combination thereof may be provided as an example alkali or alkali-like chemical. Other alkalis, or alkali-like chemicals, may be employed instead of or in addition to sodium or Na, and/or may include, but are not limited to, one or more or any combination of the following: lithium, or sodium, or potassium, or rubidium, or caesium, or ammonia, or ammonium, or ammonia derivatives, or Li, or Na, or K, or Rb, or Cs, or $NH_3$, or $NH_4^+$, or monovalent cations, or monovalent compounds.

Note: In some embodiments, magnesium or calcium or any combination thereof may be provided as an example alkaline-earth or alkaline-earth like chemical. Other alkaline-earths or alkaline-earth like chemicals may be employed instead of or in addition to magnesium or calcium or any combination thereof, and/or may include, but are not limited to, one or more or any combination of the following: beryllium (Be), or magnesium (Mg), or calcium (Ca), or strontium (Sr), or barium (Ba), or radium (Ra), or amines, or divalent amines, or divalent cations.

Note: In some embodiments, carbon dioxide or carbonate may be provided as an example anion or acid which may form practically insoluble or low solubility salts or compounds with some alkaline earths or alkaline earth like cations or alkaline earth like compounds, which may include, but are not limited to, one or more or any combination of the following: beryllium (Be), or magnesium (Mg), or calcium (Ca), or strontium (Sr), or barium (Ba), or radium (Ra), or amines, or divalent amines, or divalent cations. In some embodiments, carbon dioxide or carbonate may be provided as an example anion or acid which may form practically insoluble or low solubility salts or compounds with some alkaline earths or alkaline earth like cations or alkaline earth like compounds, and practically at least partially soluble salts with alkalis, or alkali like cations or chemicals, or any combination thereof. Other anions or acids may be employed instead of or in addition to carbon dioxide or carbonate, which may include, but are not limited to, one or more or any combination of the following: citric acid, or oxalates, or oxalic acid, or citrates, or hydrosulfurous acid, or sulfide, or sulfite, or sulfur dioxide, or sulfurous acid, or phosphoric acid, or phosphate, or fluorine derivatives, or phosphorous derivatives, or sulfur derivatives.

Note: In some embodiments, acetic acid or formic acid may be provided as example acids. In some embodiments, acetic acid or formic acid may be provided as example carboxylic acids. In some embodiments, acetic acid or formic acid or acetate or formate may be provided as example acids or acid anions weaker than sulfurous acid and stronger than hydroxide, or carbonic acid, or any combination thereof. Other acids or acid anions with one or more or any combination of the aforementioned properties may be employed instead of or in addition to acetic acid or formic acid.

Note: In some embodiments, concentrating or separating may comprise, for example, including, but is not limited to, one or more or any combination of the following: reverse osmosis, or electrodialysis, or nanofiltration, or membrane based process, or distillation, or MVC, or MED, or MD, or cryodesalination, or high pressure reverse osmosis, or forward osmosis, or osmotically assisted reverse osmosis, or electrodialysis, or electrodialysis reversal, crystallization, crystallizer, or a separation process, or evaporation, or cryo-desalination, or cryo-separation, or freeze separation, or freeze desalination, or cooling crystallization, or salting-out, or solventing-out, or precipitation, or condensation, or sublimation, or deposition, one or more or any combination of separation systems or methods described herein, or one or more or any combination of separation systems or methods known in the art, or any combination thereof.

Example embodiment comprising least partially producing a chemical comprising an alkali hydroxide from at least a portion of a chemical comprising an alkali sulfate with integrated impurity separation (1) At least partially reacting at least a portion of a material comprising an alkaline earth-weak acid anion with at least a portion of a chemical comprising an acid to form at least a portion of a solution comprising dissolved or aqueous phase alkaline earth-acid anion and a gas or solid or solution or liquid comprising a weak acid derivative:

For example, including, but not limited to, one or more or any combination of the following:

Alkaline Earth–Weak Acid Anion+Anion Acid→Alkaline Earth–Anion+Weak Acid Anion Derivative Alkaline Earth–Weak Acid Anion(s)+Anion Acid(aq or g or l)→Alkaline Earth Anion(aq)+Weak Acid Anion Derivative(g or s or l or aq)

Ca(Weak Acid Anion)+Anion Acid→Ca(Anion)+ Weak Acid Derivative

Ca(Weak Acid Anion)(s)+Anion Acid(g or aq)→Ca(Anion)(aq)+Weak Acid Derivative(g or aq or s)

$CaCO_3+2CH_3COOH \rightarrow Ca(CH_3COO)_2+CO_2$ $CaCO_3(s)+2CH_3COOH(aq) \rightarrow Ca(CH_3COO)_2(aq)+CO_2(g)$ $CaCO_3(s)+2CH_2OO(aq) \rightarrow Ca(CHOO)_2(aq)+CO_2(g)$ (2) At least partially reacting at least a portion of a solution comprising dissolved or aqueous phase alkaline earth—acid anion with at least a portion of a salt or solid or solution comprising an alkali sulfate to form, for example, at least a portion of an alkali—acid anion salt and/or at least a portion of an alkaline earth sulfate.

For example, including, but not limited to, one or more or any combination of the following:

Alkali Sulfate+Alkaline Earth–Anion→Alkali–Anion+Alkaline Earth Sulfate

Alkali Sulfate(s or aq)+Alkaline Earth–Anion(aq)→Alkali–Anion(aq)+Alkaline Earth Sulfate(s)

$Na_2SO_4+Ca(Anion)_2 \rightarrow 2Na(Anion)+CaSO_4$ $Na_2SO_4(s \text{ or } aq)+Ca(Anion)_2(aq) \rightarrow 2Na(Anion)(aq)+CaSO_4(s \text{ or } aq)$ $Na_2SO_4+Ca(CH_3COO)_2 \rightarrow 2NaCH_3COO+CaSO_4$ $Na_2SO_4(s \text{ or } aq)+Ca(CH_3COO)_2(aq) \rightarrow 2NaCH_3COO(aq)+CaSO_4(aq)$ $Na_2SO_4(s \text{ or } aq)+Ca(CH_3COO)_2(aq) \rightarrow 2NaCH_3COO(aq)+CaSO_4(s \text{ or } aq)$ $Na_2SO_4(s \text{ or } aq)+Ca(CH_2OO)_2(aq) \rightarrow 2NaCH_2OO(aq)+CaSO_4(s)$ $Na_2SO_4(s \text{ or } aq)+Ca(CH_3COO)_2(aq) \rightarrow 2NaCH_3COO(aq)+CaSO_4(s \text{ or } aq)$ (2—Separation) At least partially separate at least a portion of an alkaline earth sulfate from, for example, at least a portion of an alkali-anion salt employing, for example, a solid-liquid separation:

For example, including, but not limited to, one or more or any combination of the following:

Alkali–Anion+Alkaline Earth–Sulfate→Alkali–Anion(at least partially separated)+Alkaline Earth–Sulfate(at least partially separated)

Alkali–Anion(aq)+Alkaline Earth–Sulfate(s)→Alkali–Anion(aq)(at least partially separated)+Alkaline Earth–Sulfate(s)(at least partially separated)

$2Na(Anion)+CaSO_4 \rightarrow 2Na(Anion)(\text{at least partially separated})+CaSO4(\text{at least partially separated})$ $2Na(Anion)(aq)+CaSO_4(s) \rightarrow 2Na(Anion)(aq)(\text{at least partially separated})+CaSO_4(s)(\text{at least partially separated})$ $2NaCH_3COO+CaSO_4 \rightarrow 2NaCH_3COO)(\text{at least partially separated})+CaSO_4(\text{at least partially separated})$ $2NaCH_3COO(aq)+CaSO_4(s) \rightarrow 2NaCH_3COO(aq)(\text{at least partially separated})+CaSO_4(s)(\text{at least partially separated})$ $2NaCH_3COO(aq)+CaSO_4(s \text{ or } aq) \rightarrow 2NaCH_3COO(aq)(\text{at least partially separated})+CaSO_4(s \text{ or } aq)(\text{at least partially separated})$ $2NaCH_2OO(aq)+CaSO_4(s) \rightarrow 2NaCH_2OO(aq)(\text{at least partially separated})+CaSO_4(s)(\text{at least partially separated})$ $Na_2SO_4(s \text{ or } aq)+Ca(CH_3COO)_2(aq) \rightarrow 2NaCH_3COO(aq)(\text{at least partially separated})+CaSO_4(s \text{ or } aq)(\text{at least partially separated})$ (2—Reaction or Treatment for Separation) At least partially add or react at least a portion of an alkali carbonate, or hydroxide, or sulfite, or sulfide, or a salt of with an anion which may form a low solubility salt with an alkaline earth, or any combination thereof to or with a solution comprising at least a portion of an alkali-anion salt to react with at least a portion of any residual alkaline-earth to form, for example, at least a portion of a precipitate or solid comprising an alkaline-earth:

For example, including, but not limited to, one or more or any combination of the following:

Alkali–Anion Salt+Alkaline Earth–Sulfate+Alkali–(Anion which forms low solubility in salt with an alkaline earth)→Alkali–Anion Salt+Alkali–Sulfate+Alkaline Earth–(Anion which forms low solubility in salt with an alkaline earth)

Alkali–Anion Salt(aq)+Alkaline Earth–Sulfate(aq)+Alkali–(Anion which forms low solubility in salt with an alkaline earth)(aq)→Alkali–Anion Salt(aq)+Alkali–Sulfate(aq)+Alkaline Earth–(Anion which forms low solubility in salt with an alkaline earth)(s)

$2Na(Anion)+CaSO_4+Na_2CO_3 \rightarrow 2Na(Anion)+Na_2SO_4+CaCO_3$ $2Na(Anion)+CaSO_4+Na_2SO_3 \rightarrow 2Na(Anion)+Na_2SO_4+CaSO_3$ $2Na(Anion)+CaSO_4+2NaHCO_3 \rightarrow 2Na(Anion)+Na_2SO_4+CaCO_3+CO_2$ $2Na(Anion)+CaSO_4+Na_2S \rightarrow 2Na(Anion)+Na_2SO_4+CaS$ $2NaCH_3COO+CaSO_4+Na_2CO_3 \rightarrow 2NaCH_3COO+Na_2SO_4+CaCO_3$ $2NaCH_3COO+CaSO_4+Na_2SO_3 \rightarrow 2NaCH_3COO+Na_2SO_4+CaSO_3$ $2NaCH_3COO+CaSO_4+2NaHCO_3 \rightarrow 2NaCH_3COO+Na_2SO_4+CaCO_3+CO_2$ $2NaCH_3COO+CaSO_4+Na_2S \rightarrow 2NaCH_3COO+Na_2SO_4+CaS$ $2Na(Anion)(aq)+CaSO_4(aq)+Na_2CO_3(s \text{ or } aq) \rightarrow 2Na(Anion)(aq)+Na_2SO_4(aq)+CaCO_3(s)$ $2Na(Anion)(aq)+CaSO_4(aq)+Na_2SO_3(s \text{ or } aq) \rightarrow 2Na(Anion)(aq)+Na_2SO_4(aq)+CaSO_3(s)$ $2Na(Anion)(aq)+CaSO_4(aq)+2NaHCO_3(s \text{ or } aq) \rightarrow 2Na(Anion)(aq)+Na_2SO_4(aq)+CaCO_3(s)+CO_2(g)$ $2Na(Anion)(aq)+CaSO_4(aq)+Na_2S(s \text{ or } aq) \rightarrow 2Na(Anion)(aq)+Na_2SO_4(aq)+CaS(s)$ $2NaCH_3COO(aq)+CaSO_4(aq)+Na_2CO_3(s \text{ or } aq) \rightarrow 2NaCH_3COO(aq)+Na_2SO_4(aq)+CaCO_3(s)$ $2NaCH_3COO(aq)+CaSO_4(aq)+Na_2SO_3(aq) \rightarrow 2NaCH_3COO(aq)+Na_2SO_4(aq)+CaSO_3(s)$ $2NaCH_3COO(aq)+CaSO_4(aq)+2NaHCO_3(s \text{ or } aq) \rightarrow 2NaCH_3COO(aq)+Na_2SO_4(aq)+CaCO_3(s)+CO_2(g)$ $2NaCH_3COO(aq)+CaSO_4(aq)+Na_2S(s \text{ or } aq) \rightarrow 2NaCH_3COO(aq)+Na_2SO_4(aq)+CaS(s)$ Note: In some embodiments, calcium carbonate or calcium sulfite produced and/or separated may be transferred to a process step which may employ calcium carbonate or calcium sulfite.

(2—Separation of Precipitate) At least partially separating at least a portion of any precipitate or solid comprising an alkaline-earth employing, for example, a solid-liquid separation:

For example, including, but not limited to, one or more or any combination of the following:

Alkali–Anion Salt+Alkali Sulfate+[Alkaline-Earth–Low Solubility Anion]→Alkali–Anion Salt+Alkali Sulfate+[Alkaline-Earth–Low Solubility Anion](at least partially separated)

Alkali–Anion Salt(aq)+Alkali Sulfate(aq)+[Alkaline-Earth–Low Solubility Anion](s)→Alkali–Anion Salt(aq)+Alkali Sulfate(aq)+[Alkaline-Earth–Low Solubility Anion](s)(at least partially separated)

$2Na(Anion)(aq)+Na_2SO_4(aq)+CaCO_3(s) \rightarrow 2Na(Anion)(aq)+Na_2SO_4(aq)+CaCO_3(s)$(at least partially separated)

$2Na(Anion)(aq)+Na_2SO_4(aq)+CaSO_3(s) \rightarrow 2Na(Anion)(aq)+Na_2SO_4(aq)+CaSO_3(s)$(at least partially separated)

$2Na(Anion)(aq)+Na_2SO_4(aq)+CaCO_3(s)+CO_2(g) \rightarrow 2Na(Anion)(aq)+Na_2SO_4(aq)+CaSO_3(s)$(at least partially separated)

$2Na(Anion)(aq)+Na_2SO_4(aq)+CaS(s) \rightarrow 2Na(Anion)(aq)+Na_2SO_4(aq)+CaSO_3(s)$(at least partially separated)

$2NaCH_3COO(aq)+Na_2SO_4(aq)+CaCO_3(s) \rightarrow 2NaCH_3COO(aq)+Na_2SO_4(aq)+CaSO_3(s)$(at least partially separated)

$2NaCH_3COO(aq)+Na_2SO_4(aq)+CaSO_3(s) \rightarrow 2NaCH_3COO(aq)+Na_2SO_4(aq)+CaSO_3(s)$(at least partially separated)

$2NaCH_3COO(aq)+Na_2SO_4(aq)+CaCO_3(s)+CO_2(g) \rightarrow 2NaCH_3COO(aq)+Na_2SO_4(aq)+CaSO_3(s)$(at least partially separated)

$2NaCH_3COO(aq)+Na_2SO_4(aq)+CaS(s) \rightarrow 2NaCH_3COO(aq)+Na_2SO_4(aq)+CaSO_3(s)$(at least partially separated)

(2—Separation) At least partially separate at least a portion of divalent salts, or divalent ions, or multivalent ions, or heavy metal salts, or impurities, or any combination thereof from, for example, at least a portion of an alkali-anion salt or alkali-monovalent anion salt employing, for example, nanofiltration:

For example, including, but not limited to, one or more or any combination of the following:

Alkali–Anion Salt+[Heavy Metal Impurities, and/or Divalent Ions and/or Multivalent Ions and/or Other Impurities]→[Separate Permeate comprising Alkali Anion Salt]+[Separate Retentate comprising(Heavy Metal Impurities, and/or Divalent Ions and/or Multivalent Ions and/or Other Impurities) and/or Alkali Sulfate]

2Na(Anion)+[Heavy Metal Impurities, and/or Divalent Ions and/or Multivalent Ions and/or Other Impurities]→[Separate Permeate comprising 2Na(Anion)]+[Separate Retentate comprising (Heavy Metal Impurities, and/or Divalent Ions and/or Multivalent Ions and/or Other Impurities) and/or $Na_2SO_4$]

$2Na(Anion)+Na_2SO_4$+[Heavy Metal Impurities, and/or Divalent Ions and/or Multivalent Ions and/or Other Impurities]→[Separate Permeate comprising 2Na(Anion)]+[Separate Retentate comprising(Heavy Metal Impurities, and/or Divalent Ions and/or Multivalent Ions and/or Other Impurities) and/or $Na_2SO_4$]

$2Na(Anion)(aq)+Na_2SO_4(aq)$+[Heavy Metal Impurities, and/or Divalent Ions and/or Multivalent Ions and/or Other Impurities](aq)→[Separate Permeate comprising 2Na(Anion)](aq)+[Separate Retentate comprising(Heavy Metal Impurities, and/or Divalent Ions and/or Multivalent Ions and/or Other Impurities) and/or $Na_2SO_4$](aq)

$2NaCH_3COO$+[Heavy Metal Impurities, and/or Divalent Ions and/or Multivalent Ions and/or Other Impurities]→[Separate Permeate comprising $2NaCH_3COO$]+[Separate Retentate comprising(Heavy Metal Impurities, and/or Divalent Ions and/or Multivalent Ions and/or Other Impurities) and/or $Na_2SO_4$]

$2NaCH_3COO+Na_2SO_4$+[Heavy Metal Impurities, and/or Divalent Ions and/or Multivalent Ions and/or Other Impurities]→[Separate Permeate comprising $2NaCH_3COO$]+[Separate Retentate comprising(Heavy Metal Impurities, and/or Divalent Ions and/or Multivalent Ions and/or Other Impurities) and/or $Na_2SO_4$]

$2NaCH_3COO(aq)+Na_2SO_4(aq)$+[Heavy Metal Impurities, and/or Divalent Ions and/or Multivalent Ions and/or Other Impurities](aq)→[Separate Permeate comprising $2NaCH_3COO$](aq)+[Separate Retentate comprising(Heavy Metal Impurities, and/or Divalent Ions and/or Multivalent Ions and/or Other Impurities) and/or $Na_2SO_4$](aq)

Note: In some embodiments, a nanofiltration process may form at least a portion of a retentate comprising at least a portion of divalent salts, or divalent ions, or multivalent ions, or heavy metal salts, or impurities, or any combination thereof and/or a permeate comprising a solution comprising alkali-anion salt or alkali-monovalent anion salt.

(2—Treatment of Retentate) At least partially add at least a portion of a chemical comprising an acid to at least a portion of the solution comprising a retentate to, for example, react with at least a portion of any residual alkali-anion salt and/or form, for example, at least a portion of anion acid or anion derivative acid:

For example, including, but not limited to, one or more or any combination of the following:

[Heavy Metal Impurities, and/or Divalent Ions and/or Multivalent Ions and/or Other Impurities]+2Na(Anion)+Acid #2→[Heavy Metal Impurities, and/or Divalent Ions and/or Multivalent Ions and/or Other Impurities]+2Na(Acid #2Anion)+Anion Acid

[Heavy Metal Impurities, and/or Divalent Ions and/or Multivalent Ions and/or Other Impurities]+2Na(Anion)+Stronger Acid→[Heavy Metal Impurities, and/or Divalent Ions and/or Multivalent Ions and/or Other Impurities]+2Na(Stronger Acid Anion)+Anion Acid

[Heavy Metal Impurities, and/or Divalent Ions and/or Multivalent Ions and/or Other Impurities](aq)+2Na(Anion)(aq)+Stronger Acid(aq)→[Heavy Metal Impurities, and/or Divalent Ions and/or Multivalent Ions and/or Other Impurities](aq)+2Na(Stronger Acid Anion)(aq)+Anion Acid(aq or g or l)

[Heavy Metal Impurities, and/or Divalent Ions and/or Multivalent Ions and/or Other Impurities](aq)+2NaCH$_3$COO(aq)+2HCl(aq)→[Heavy Metal Impurities, and/or Divalent Ions and/or Multivalent Ions and/or Other Impurities](aq)+2NaCl(aq)+2CH$_3$COOH(aq or g or l)

[Heavy Metal Impurities, and/or Divalent Ions and/or Multivalent Ions and/or Other Impurities](aq)+2NaCH$_3$COO(aq)+SO$_2$(g or aq)→[Heavy Metal Impurities, and/or Divalent Ions and/or Multivalent Ions and/or Other Impurities](aq)+Na$_2$SO$_3$(aq)+2CH$_3$COOH(aq or g or l)

[Heavy Metal Impurities, and/or Divalent Ions and/or Multivalent Ions and/or Other Impurities](aq)+2NaCH$_3$COO(aq)+H$_2$SO$_4$(g or aq)→[Heavy Metal Impurities, and/or Divalent Ions and/or Multivalent Ions and/or Other Impurities](aq)+Na$_2$SO$_4$(aq)+2CH$_3$COOH(aq or g or l)

(2—Recovery of Useful or Valuable or Desired Chemical from Retentate) At least partially recovering or separating or removing at least a portion of a useful or valuable or desired chemical from the retentate or treated retentate:

For example, including, but not limited to, one or more or any combination of the following:

[Heavy Metal Impurities, and/or Divalent Ions and/or Multivalent Ions and/or Other Impurities]+2Na(Acid #2Anion)+Anion Acid→[Heavy Metal Impurities, and/or Divalent Ions and/or Multivalent Ions and/or Other Impurities and/or 2Na(Acid #2Anion)]+[Anion Acid+Solvent Water]

[Heavy Metal Impurities, and/or Divalent Ions and/or Multivalent Ions and/or Other Impurities](aq)+2Na(Acid #2Anion)(aq)+Anion Acid(aq)→[Heavy Metal Impurities, and/or Divalent Ions and/or Multivalent Ions and/or Other Impurities and/or 2Na(Acid #2Anion)](s)+[Separate Anion Acid+Solvent Water](aq)

[Heavy Metal Impurities, and/or Divalent Ions and/or Multivalent Ions and/or Other Impurities](aq)+2Na(Acid #2Anion)(aq)+Anion Acid(aq)→[Heavy Metal Impurities, and/or Divalent Ions and/or Multivalent Ions and/or Other Impurities and/or 2Na(Acid #2Anion)](s)+[Separate Anion Acid](aq)

[Heavy Metal Impurities, and/or Divalent Ions and/or Multivalent Ions and/or Other Impurities]+2NaCl+2CH$_3$OOH→[Heavy Metal Impurities, and/or Divalent Ions and/or Multivalent Ions and/or Other Impurities and/or 2NaCl]+[2CH$_3$OOH+Solvent Water]

[Heavy Metal Impurities, and/or Divalent Ions and/or Multivalent Ions and/or Other Impurities](aq)+2NaCl(aq)+2CH$_3$OOH(aq)→[Heavy Metal Impurities, and/or Divalent Ions and/or Multivalent Ions and/or Other Impurities and/or 2NaCl](s)+[2CH$_3$OOH+Solvent Water](aq)

[Heavy Metal Impurities, and/or Divalent Ions and/or Multivalent Ions and/or Other Impurities](aq)+2NaCl(aq)+2CH$_3$OOH(aq)→[Heavy Metal Impurities, and/or Divalent Ions and/or Multivalent Ions and/or Other Impurities and/or 2NaCl](s)+2CH$_3$OOH(aq)

Note: In some embodiments, anion acid may be recovered or separated by distillation because, for example, the vapor pressure of some anion acids may enable distillation or vaporization or condensation simultaneous to or with the distillation or vaporization or condensation of solvent water, which may result in a solution, or condensate, or distillate comprising aqueous anion acid. In some embodiments, anion acid, such as acetic acid or formic acid, may be recovered or separated by distillation because, for example, the vapor pressure of some anion acids, such as acetic acid or formic acid, may enable distillation or vaporization or condensation simultaneous to or with the distillation or vaporization or condensation of solvent water, which may result in a solution, or condensate, or distillate comprising aqueous anion acid, such as aqueous acetic acid or formic acid.

(2—Reacting Chemical Recovered from Retentate and/or Concentrating) At least partially reacting at least a portion of the useful or valuable or desired chemical recovered from retentate or treated retentate and/or concentrating:

For example, including, but not limited to, one or more or any combination of the following:

[Anion Acid]+[Alkaline-Earth Base]→Alkaline-Earth–Anion Salt

[Anion Acid](aq)+[Alkaline-Earth Base](s)→Alkaline-Earth–Anion Salt(s or aq)

[Anion Acid](aq)+[Alkaline-Earth Base](s or aq)→Alkaline-Earth–Anion Salt(aq)

Alkaline-Earth–Anion Salt(aq)→Alkaline-Earth–Anion Salt(aq)(concentrated RO or NF retentate)(separate)+Solvent Water(separate)

Alkaline-Earth–Anion Salt(aq)Alkaline-Earth–Anion Salt(aq)(concentrated)(separate)+Solvent Water (distillate or condensate)(separate)

Alkaline-Earth–Anion Salt(aq)→Alkaline-Earth–Anion Salt(s)(separate)+Solvent Water(separate)

[Anion Acid](aq)+[Alkaline-Earth Base]→Alkaline-Earth–Anion Salt

[Anion Acid](aq)+[Alkaline-Earth Base](s)→Alkaline-Earth–Anion Salt(s or aq).

[Anion Acid](aq)+[Alkaline-Earth Base](s or aq)→Alkaline-Earth–Anion Salt(aq)

Alkaline-Earth–Anion Salt(aq)→Alkaline-Earth–Anion Salt(aq)(concentrated RO or NF retentate)(separate)+Solvent Water(separate)

Alkaline-Earth–Anion Salt(aq)→Alkaline-Earth–Anion Salt(aq)(concentrated)(separate)+Solvent Water(distillate or condensate)(separate)

Alkaline-Earth–Anion Salt(aq)→Alkaline-Earth–Anion Salt(s)(separate)+Solvent Water(separate)

[Anion Acid]+[Alkali Base]→Alkali–Anion Salt

[Anion Acid](aq)+[Alkali Base](s)→Alkali–Anion Salt(s or aq)

[Anion Acid](aq)+[Alkali Base](s or aq)→Alkali–Anion Salt(aq)

Alkali–Anion Salt(aq)→Alkali–Anion Salt(aq)(concentrated RO or NF retentate)(separate)+Solvent Water(permeate separate)

Alkali–Anion Salt(aq)→Alkali–Anion Salt(aq)(concentrated)(separate)+Solvent Water(distillate or condensate)(separate)

Alkali–Anion Salt(aq)→Alkali–Anion Salt(s)(separate)+Solvent Water(separate)

$2CH_3COOH+CaCO_3 \rightarrow Ca(CH_3COO)_2+CO_2$ $2CH_3COOH(aq)+CaCO_3(s) \rightarrow Ca(CH_3COO)_2(aq \text{ or } s)+CO_2(g)$ $Ca(CH_3COO)_2$ (aq)→$Ca(CH_3COO)_2$ (aq) (concentrated RO or NF retentate)(separate)+Solvent Water (permeate, separate)

$Ca(CH_3COO)_2(aq) \rightarrow Ca(CH_3COO)_2(aq)$(concentrated)(separate)+Solvent Water(distillate or condensate)(separate)

$Ca(CH_3COO)_2(aq) \rightarrow Ca(CH_3COO)_2(s)$(separate)+Solvent Water(g or l or s) (separate)

$2CH_3COOH+Na_2CO_3 \rightarrow 2NaCH_3COO+CO_2$ $2CH_3COOH(aq)+Na_2CO_3(s) \rightarrow 2NaCH_3COO(aq \text{ or } s)+CO_2(g)$ $2NaCH_3COO(aq)_2NaCH_3COO(aq)$(concentrated RO or NF retentate)(separate)+Solvent Water(permeate,separate)

$2NaCH_3COO(aq) \rightarrow 2NaCH_3COO(aq)$(concentrated)(separate)+Solvent Water(distillate or condensate)(separate)

$2NaCH_3COO(aq) \rightarrow 2NaCH_3COO(s)$(separate)+Solvent Water(g or l or s) (separate)

(3) At least partially reacting at least a portion of a solution or salt comprising an alkali anion salt with at least a portion of a gas comprising sulfur dioxide, to form, for example, at least a portion of a solution or salt comprising an alkali sulfite or bisulfite and/or at least a portion of a solution or acid or vapor comprising an anion acid.

For example, including, but not limited to, one or more or any combination of the following:

[Alkali–Anion]+$SO_2$→Alkali Sulfite+Anion Acid

[Alkali–Anion](aq)+$SO_2$(g or aq)→Alkali Sulfite(aq or s)+Anion Acid(aq or g)

$2NaCH_3COO+SO_2 \rightarrow Na_2SO_3+2CH_3COOH$ $2NaCH_3COO(aq)+SO_2(g \text{ or } aq) \rightarrow Na_2SO_3(aq \text{ or } s)+2CH_3COOH(aq \text{ or } g)$ $2NaCH_3COO(aq)+SO_2(g) \rightarrow Na_2SO_3(aq)+2CH_3COOH(aq)$ (3—Separating) At least partially separating at least a portion of an anion acid from at least a portion of an alkali sulfite or bisulfite:

For example, including, but not limited to, one or more or any combination of the following:

Alkali Sulfite+Anion Acid→Alkali Sulfite(separate)+Anion Acid(separate)

Alkali Sulfite(aq)+Anion Acid(aq)→Alkali Sulfite(s)+Anion Acid(aq)(separate)

$Na_2SO_3+2CH_3COOH \rightarrow Na_2SO_3$(separate)+$2CH_3COOH$(separate)

$Na_2SO_3(aq)+2CH_3COOH(aq) \rightarrow Na_2SO_3(s)$(separate)+$2CH_3COOH(aq)$ (separate)

$Na_2SO_3(aq)+2CH_3COOH(aq) \rightarrow Na_2SO_3(aq)$(retentate)+$2CH_3COOH(aq)$ (permeate)

$Na_2SO_3(aq)+2CH_3COOH(aq) \rightarrow Na_2SO_3(aq)$(concentrate)+$2CH_3COOH(aq)$ (diluate)

$Na_2SO_3(aq)+2CH_3COOH(aq) \rightarrow Na_2SO_3(aq)$(concentrate)+$2CH_3COOH(s)(aq)$+Water Solvent(s)

Note: Separating may comprise, for example, including, but not limited to, one or more or any combination of the following: mechanical vapor compression distillation, or multieffect distillation, or crystallization, or reverse osmosis, or nanofiltration, or a membrane based process, or electrodialysis, or freeze desalination, or a combination of freeze desalination and reverse osmosis, or a separation process described herein, or a separation process known in the art.

Note: In some embodiments, separating Alkali Sulfite+Anion Acid may comprise one or more or any combination of the following:

(7) Freezing a solution comprising aqueous Alkali Sulfite and Anion Acid, such as sodium sulfite and acetic acid, to form, for example, a solid comprising water and anion acid, such as acetic acid, and a liquid or solution comprising aqueous alkali sulfite, such as sodium sulfite, which may comprise a concentrated solution or concentrated brine.

(8) Separating the liquid or solution comprising aqueous alkali sulfite, such as sodium sulfite, from the solid comprising water and anion acid, such as acetic acid.

(9) Melting the solid comprising water and anion acid, such as acetic acid, to form, for example, a solution comprising aqueous anion acid, such as aqueous acetic acid.

(10) Separating at least a portion of any residual alkali sulfite from a solution comprising aqueous anion acid, such as aqueous acetic acid, using, for example, reverse osmosis or nanofiltration or electrodialysis. For example, transfer at least a portion of a solution comprising aqueous anion acid, such as aqueous acetic acid, as a feed solution into a reverse osmosis or nanofiltration process, to form a retentate comprising aqueous alkali sulfite, such as sodium sulfite, and a permeate comprising anion acid, such as acetic acid.

(11) In some embodiments, the retentate comprising aqueous alkali sulfite may comprise residual anion acid, and/or the retentate comprising aqueous alkali sulfite may be transferred to the freezing step, or a step employing aqueous alkali sulfite, or any combination thereof.

(12) In some embodiments, the permeate comprising aqueous anion acid may be transferred to a step employing aqueous anion acid, such as a step reacting aqueous anion acid with a material comprising an alkaline earth.

(4) At least partially reacting at least a portion of a material comprising an alkaline earth oxide with at least a portion of chemical comprising water to form, for example, a material or solution or solid comprising an alkaline earth hydroxide.

For example, including, but not limited to, one or more or any combination of the following:

Alkaline Earth Oxide+Water→Alkaline Earth Hydroxide

Alkaline Earth Oxide(s)+Water(l or g or s)→Alkaline Earth Hydroxide(s or aq)

$CaO+H_2O \rightarrow Ca(OH)_2$ $CaO(s)+H_2O(l \text{ or } g \text{ or } s) \rightarrow Ca(OH)_2(s \text{ or } aq)$ Note: In some embodiments, step '(4)' may be combined with or integrated with step '(5).' For example, in some embodiments, alkali oxide may be directly added to or reacted with a solution comprising aqueous alkali sulfite. For example, in some embodiments, calcium oxide may be directly added to or reacted with a solution comprising aqueous sodium sulfite.

(5) At least partially reacting at least a portion of a material or solution or solid comprising an alkaline earth oxide or alkaline earth hydroxide with at least a portion of a chemical comprising an alkali sulfite, to form, for example, at least a portion of a material or solid comprising alkaline earth sulfite and at least a portion of a chemical or solution comprising an alkali hydroxide.

For example, including, but not limited to, one or more or any combination of the following:

Alkali Sulfite+Alkaline Earth Hydroxide→Alkali Hydroxide+Alkaline Earth Sulfite

Alkali Sulfite+Alkaline Earth Oxide+Water→Alkali Hydroxide+Alkaline Earth Sulfite Alkali Sulfite+Alkaline Earth Oxide+Water(solvent) →Alkali Hydroxide+Alkaline Earth Sulfite Alkali Sulfite(s or aq)+Alkaline Earth Hydroxide(s or aq)→Alkali Hydroxide(aq)+Alkaline Earth Sulfite(s)

Alkali Sulfite(s or aq)+Alkaline Earth Oxide(s)+Water(l or g)→Alkali Hydroxide(aq)+Alkaline Earth Sulfite(s)

$Na_2SO_3+Ca(OH)_2 \rightarrow 2NaOH+CaSO_3$ $Na_2SO_3(s \text{ or } aq)+Ca(OH)_2(s \text{ or } aq) \rightarrow 2NaOH(aq)+CaSO_3(s)$ $Na_2SO_3+CaO+H_2O \rightarrow 2NaOH+CaSO_3$ $Na_2SO_3(s \text{ or } aq)+CaO(s)+H_2O(l \text{ or } g) \rightarrow 2NaOH(aq)+CaSO_3(s)$ (5—Separating) At least partially separating at least a portion of a solution comprising an alkali hydroxide from at least a portion of a solid comprising an alkaline earth sulfite.

For example, including, but not limited to, one or more or any combination of the following:

Alkali Hydroxide+Alkaline Earth Sulfite→Alkali Hydroxide(at least partially separate)+Alkaline Earth Sulfite(at least partially separate)

Alkali Hydroxide(aq)+Alkaline Earth Sulfite(s)→Alkali Hydroxide(aq)(at least partially separate)+Alkaline Earth Sulfite(s)(at least partially separate)

2NaOH+CaSO_3→2NaOH(at least partially separate)+CaSO_3(at least partially separate)

2NaOH(aq)+CaSO_3(s)→2NaOH(aq)(at least partially separate)+CaSO_3(s) at least partially separate)

Note: In some embodiments, a portion of residual alkaline earth hydroxide may be present in the solid comprising alkaline earth sulfite.

(6) At least partially decomposing at least a portion of a material comprising an alkaline earth sulfite to form, for example, a material comprising an alkaline earth oxide and a gas or fluid comprising sulfur dioxide.

For example, including, but not limited to, one or more or any combination of the following:

Alkaline Earth Sulfite→Alkaline Earth Oxide+Sulfur Dioxide

Alkaline Earth Sulfite(s)→Alkaline Earth Oxide(s)+Sulfur Dioxide(g)

$CaSO_3 \rightarrow CaO+SO_2$ $CaSO_3(s) \rightarrow CaO(s)+SO_2(g)$ $CaSO_3+Ca(OH)_2 \rightarrow 2CaO+H_2O+SO_2$ $CaSO_3(s)+Ca(OH)_2(s) \rightarrow 2CaO(s)+H_2O(g \text{ or } l \text{ or } aq)+SO_2(g \text{ or } l \text{ or } aq)$ Note: In some embodiments, at least a portion of the alkaline earth sulfite may be decomposed in a kiln, or calciner, or an indirect kiln, or a thermal decomposition device, or a thermal decomposition system or method, or a heating method, or any combination thereof.

Example Embodiment NaOH Impurity Removal Process Steps Chemistry (Steps Between Step 2 and Step 3)

(Step 2B)—Precipitation of Residual Calcium (from Residual Aqueous CaSO_4) by Addition of Stoichiometric Amount of Sodium Sulfite to form Calcium Sulfite Precipitate and Sodium Sulfate:

$2NaCH3COO(aq)+Na_2SO_3(s \text{ or } aq)+\text{Residual } CaSO_4(aq) \rightarrow 2NaCH_3COO(aq)+Na_2SO_4(aq)+CaSO_3(s)$ (Step 2C)—Nanofiltration to Separate Heavy Metals, Residual Sulfate from Monovalent Sodium Acetate Solution:

$$2NaCH_3COO(aq) + Na_2SO_4(aq) + Impurities(aq) \rightarrow 2NaCH_3COO(aq)(Permeate) + [Na_2SO_4 + Impurities](aq)(Retentate)$$

(Step 2D)—Regenerating Acetic Acid in Retentate from Residual Sodium Acetate by Reacting with an Acid, such as Sulfur Dioxide:

$$[Na_2SO_4 + Impurities + Residual\ 2NaCH_3COO](aq) + SO_2 + H_2O \rightarrow [Na_2SO_4 + Impurities + Na_2SO_3](aq) + CH_3COOH(aq)$$

(Step 2E)—Recovering Residual Acetic Acid+Water from Impurities by Crystallization:

$$[Na_2SO_4 + Impurities + Na_2SO_3](aq) + CH_3COOH(aq) \rightarrow [Na_2SO_4 + Impurities + Na_2SO_3](s)(separate) + [CH_3COOH + Solvent\ Water](aq)(separate)$$

Step 2B: Solid-Liquid Mixer and Solid-Liquid Separator

Add a stoichiometric amount of sodium sulfite to the sodium acetate solution to react with the residual aqueous calcium sulfate, forming a solid calcium sulfite precipitate and a stoichiometric amount of aqueous sodium sulfate.

Purpose: A small concentration of calcium sulfate (aq) ('residual calcium sulfate') is present in the sodium acetate solution because of the limited solubility of calcium sulfate (~0.2 g per 100 g DI water). It is desirable to remove this 'residual calcium sulfate' to prevent calcium sulfate scaling or NF membrane fouling in subsequent steps.

Step 2C: Nanofiltration

Transfer/pump the sodium acetate solution from Step 2B into a nanofiltration (NF) process as a feed solution, forming a permeate comprising sodium acetate (aq) and a retentate comprising heavy metal impurities and sodium sulfate.

Purpose: Heavy metal impurities originating in the sodium sulfate waste feedstock and residual sodium sulfate ('impurities') may be present the aqueous sodium acetate solution. It is desirable to separate these impurities from the sodium acetate solution. Nanofiltration can separate these impurities from sodium acetate because the impurities may be divalent (sulfate) or multivalent (heavy metal ions), and sodium acetate is monovalent (both cation and anion).

Step 2D: Liquid-Liquid Mixer

Add an acid stronger than acetic acid, such as sulfur dioxide ($SO_2$) or hydrochloric acid (HCl), to the retentate to react with residual sodium acetate to form sodium sulfite or sodium chloride and free aqueous acetic acid.

Purpose: Nanofiltration will separate almost all the sodium acetate (permeate) from the impurities (retentate), however a small proportional amount of sodium acetate ('residual sodium acetate') may be present in the retentate. It may be desirable to recover the acetic acid from the residual sodium acetate, which can be conducted by adding a stoichiometric amount of stronger acid to the solution to displace the acetic acid in a single displacement reaction.

(Step 2E)—Recovering Residual Acetic Acid+Water from Impurities by Crystallization:

Separate the residual acetic acid+water from the impurities by mechanical vapor recompression distillation/crystallization or multieffect distillation/crystallization, forming a separated solution comprising aqueous acetic acid (distillate or condensate) and a separate solid comprising crystallized impurities.

Purpose: Acetic acid has a similar vapor pressure and boiling point to water. The impurities comprise salts which do not have a vapor pressure or boiling point under the same conditions. The combined acetic acid and solvent water can be separated from the impurities by distillation, such as mechanical vapor recompression distillation/crystallization or multieffect distillation/crystallization. The solid impurities may be disposed. The aqueous acetic acid solution can be employed as a portion of the acetic acid employed in 'Step 1.'

Example Embodiments: Producing Alkali Hydroxides from Alkali Bicarbonates or Alkali Carbonates or any Combination Thereof A process comprising one or more or any combination of the following:

(1) React at least a portion of a salt or solid comprising alkaline earth carbonate with at least a portion of a solution or liquid comprising an acid to form, for example, a salt or solution comprising alkaline earth-anion and a gas comprising carbon dioxide.

For example, one or more or any combination of the following:

$$CaCO_3 + Acid \rightarrow Ca(Acid\ Anion) + CO_2$$

$$CaCO_3(s) + Acid(l\ or\ g\ or\ aq) \rightarrow Ca(Acid\ Anion)(aq) + CO_2(g)$$

$$CaCO_3 + Carboxylic\ Acid \rightarrow Ca(Carboxylate) + CO_2$$

$$CaCO_3(s) + Carboxylic\ Acid(l\ or\ g\ or\ aq) \rightarrow Ca(Carboxylate)(aq) + CO_2(g)$$

$$CaCO_3 + CH_3COOH \rightarrow Ca(CH_3COO)_2 + CO_2$$

$$CaCO_3(s) + CH_3COOH(aq) \rightarrow Ca(CH_3COO)_2(aq) + CO_2(g)$$

$$CaCO_3 + CH_2OO \rightarrow Ca(CHOO)_2 + CO_2$$

$$CaCO_3(s) + CH_2OO(aq) \rightarrow Ca(CHOO)_2(aq) + CO_2(g)$$

$$MgCO_3 + Acid \rightarrow Mg(Acid\ Anion) + CO_2$$

$$MgCO_3(s) + Acid(l\ or\ g\ or\ aq) \rightarrow Mg(Acid\ Anion)(aq) + CO_2(g)$$

$$MgCO_3 + Carboxylic\ Acid \rightarrow Mg(Carboxylate) + CO_2$$

$$MgCO_3(s) + Carboxylic\ Acid(l\ or\ g\ or\ aq) \rightarrow Mg(Carboxylate)(aq) + CO_2(g)$$

$$MgCO_3 + CH_3COOH \rightarrow Mg(CH_3COO)_2 + CO_2$$

$$MgCO_3(s) + CH_3COOH(aq) \rightarrow Mg(CH_3COO)_2(aq) + CO_2(g)$$

$$MgCO_3 + CH_2OO \rightarrow Mg(CHOO)_2 + CO_2$$

$$MgCO_3(s) + CH_2OO(aq) \rightarrow Mg(CHOO)_2(aq) + CO_2(g)$$

$$MgCO_3 + SO_2 \rightarrow MgSO_3 + CO_2$$

$$MgCO_3(s) + SO_2(g\ or\ aq\ or\ l) \rightarrow MgSO_3(aq\ or\ s) + CO_2(g)$$

(2) React at least a portion of a salt or solution comprising alkaline earth-anion with at least a portion of a salt or solution comprising an alkali bicarbonate, or alkali carbonate, or alkali carbon dioxide derivative, or any combination thereof, to form, for example, a salt or solid comprising an alkaline earth carbonate and a salt or solution comprising an alkali-anion.

For example, one or more or any combination of the following:

$$2NaHCO_3+Ca(Acid\ Anion) \rightarrow Na(Acid\ Anion)+CaCO_3+H_2O+CO_2$$

$$2NaHCO_3(aq\ or\ s)+Ca(Acid\ Anion)(aq) \rightarrow Na(Acid\ Anion)(aq)+CaCO_3(s)+H_2O(l)+CO_2(g)$$

$$2NaHCO_3+Ca(Carboxylate) \rightarrow Na(Carboxylate)+CaCO_3+H_2O+CO_2$$

$$2NaHCO_3(aq\ or\ s)+Ca(Carboxylate)(aq) \rightarrow Na(Carboxylate)(aq)+CaCO_3(s)+H_2O(l)+CO_2(g)$$

$$2NaHCO_3+Ca(CH_3COO)_2 \rightarrow 2Na(CH_3COO)+CaCO_3+H_2O+CO_2$$

$$2NaHCO_3(aq\ or\ s)+Ca(CH_3COO)_2(aq) \rightarrow 2Na(CH_3COO)(aq)+CaCO_3(s)+H_2O(l)+CO_2(g)$$

$$2NaHCO_3+Ca(CHOO)_2 \rightarrow 2Na(CHOO)+CaCO_3+H_2O+CO_2$$

$$2NaHCO_3(aq\ or\ s)+Ca(CHOO)_2(aq) \rightarrow 2Na(CHOO)(aq)+CaCO_3(s)+H_2O(l)+CO_2(g)$$

$$Na_2CO_3+Ca(Acid\ Anion) \rightarrow Na(Acid\ Anion)+CaCO_3$$

$$Na_2CO_3(aq\ or\ s)+Ca(Acid\ Anion)(aq) \rightarrow Na(Acid\ Anion)(aq)+CaCO_3(s)$$

$$Na_2CO_3+Ca(Carboxylate) \rightarrow Na(Carboxylate)+CaCO_3$$

$$Na_2CO_3(aq\ or\ s)+Ca(Carboxylate)(aq) \rightarrow Na(Carboxylate)(aq)+CaCO_3(s)$$

$$Na_2CO_3+Ca(CH_3COO)_2 \rightarrow 2Na(CH_3COO)+CaCO_3$$

$$Na_2CO_3(aq\ or\ s)+Ca(CH_3COO)_2(aq) \rightarrow 2Na(CH_3COO)(aq)+CaCO_3(s)$$

$$Na_2CO_3+Ca(CHOO)_2 \rightarrow 2Na(CHOO)+CaCO_3$$

$$Na_2CO_3(aq\ or\ s)+Ca(CHOO)_2(aq) \rightarrow 2Na(CHOO)(aq)+CaCO_3(s)$$

$$2NaHCO_3+Mg(Acid\ Anion) \rightarrow Na(Acid\ Anion)+MgCO_3+H_2O+CO_2$$

$$2NaHCO_3(aq\ or\ s)+Mg(Acid\ Anion)(aq) \rightarrow Na(Acid\ Anion)(aq)+MgCO_3(s)+H_2O(l)+CO_2(g)$$

$$2NaHCO_3+Mg(Carboxylate) \rightarrow Na(Carboxylate)+MgCO_3+H_2O+CO_2$$

$$2NaHCO_3(aq\ or\ s)+Mg(Carboxylate)(aq) \rightarrow Na(Carboxylate)(aq)+MgCO_3(s)+H_2O(l)+CO_2(g)$$

$$2NaHCO_3+Mg(CH_3COO)_2 \rightarrow 2Na(CH_3COO)+MgCO_3+H_2O+CO_2$$

$$2NaHCO_3(aq\ or\ s)+Mg(CH_3COO)_2(aq) \rightarrow 2Na(CH_3COO)(aq)+MgCO_3(s)+H_2O(l)+CO_2(g)$$

$$2NaHCO_3+Mg(CHOO)_2 \rightarrow 2Na(CHOO)+MgCO_3+H_2O+CO_2$$

$$2NaHCO_3(aq\ or\ s)+Mg(CHOO)_2(aq) \rightarrow 2Na(CHOO)(aq)+MgCO_3(s)+H_2O(l)+CO_2(g)$$

$$2NaHCO_3+MgSO_3 \rightarrow Na_2SO_3+MgCO_3+H_2O+CO_2$$

$$2NaHCO_3(aq\ or\ s)+MgSO_3(aq) \rightarrow Na_2SO_3(aq)+MgCO_3(s)+H_2O(l)+CO_2(g)$$

$$2NaHCO_3+MgSO_3 \rightarrow Na_2SO_3+Mg(HCO_3)_2$$

$$2NaHCO_3(aq\ or\ s)+MgSO_3(aq) \rightarrow Na_2SO_3(aq)+Mg(HCO_3)_2(aq)$$

$$Mg(HCO_3)_2(aq) \rightarrow MgCO_3(s)+H_2O(l)+CO_2(g)$$

$$Na_2CO_3+Mg(Acid\ Anion) \rightarrow Na(Acid\ Anion)+MgCO_3$$

$$Na_2CO_3(aq\ or\ s)+Mg(Acid\ Anion)(aq) \rightarrow Na(Acid\ Anion)(aq)+MgCO_3(s)$$

$$Na_2CO_3+Mg(Carboxylate) \rightarrow Na(Carboxylate)+MgCO_3$$

$$Na_2CO_3(aq\ or\ s)+Mg(Carboxylate)(aq) \rightarrow Na(Carboxylate)(aq)+MgCO_3(s)$$

$$Na_2CO_3+Mg(CH_3COO)_2 \rightarrow 2Na(CH_3COO)+MgCO_3$$

$$Na_2CO_3(aq\ or\ s)+Mg(CH_3COO)_2(aq) \rightarrow 2Na(CH_3COO)(aq)+MgCO_3(s)$$

$$Na_2CO_3+Mg(CHOO)_2 \rightarrow 2Na(CHOO)+MgCO_3$$

$$Na_2CO_3(aq\ or\ s)+Mg(CHOO)_2(aq) \rightarrow 2Na(CHOO)(aq)+MgCO_3(s)$$

Note: In some embodiments, at least a portion of the component comprising alkaline earth carbonate formed may be at least partially employed in the reaction of an alkaline earth carbonate with an acid anion, such as a carboxylic acid anion.

Note: In some embodiments, a component comprising an alkali carbonate, or bicarbonate, or sesquicarbonate, or other carbon dioxide species, or a derivative thereof, or any combination thereof may comprise a mixture with a portion of a component comprising an alkali sulfate. In some embodiments, it may be desirable to react the component comprising an alkali with the component comprising an alkaline earth in a manner which may result in an at least partially separated component comprising an alkaline earth carbonate and/or an at least partially separated component comprising an alkaline earth sulfate. For example, in some embodiments, it may be desirable to employ at least a portion of a component comprising alkaline earth carbonate formed in a reaction as, for example, at least a portion of the alkaline earth weak acid, such as alkaline earth carbonate, employed in the reaction with a component comprising an acid anion. For example, in some embodiments, a component comprising a mixture of components comprising alkali sulfate and/or alkali-carbon dioxide species salts with a portion of alkaline earth acid anion in proportion, such as stoichiometric proportion, to at least a portion of the carbon dioxide species to facilitate or enable the precipitation of at least a portion of a component comprising alkaline earth carbonate. For example, in some embodiments, a component comprising a mixture of components comprising alkali sulfate and/or alkali-carbon dioxide species salts with a portion of alkaline earth acid anion in proportion, such as stoichiometric proportion, to at least a portion of the carbon dioxide species to facilitate or enable the precipitation of at least a portion of a component comprising alkaline earth carbonate, and/or separate at least a portion of the alkaline earth carbonate using a solid-liquid separation, then, for example, reacting at least a portion of alkaline earth acid anion with the residual or remaining alkali sulfate to form, for example, at least a portion of alkaline earth sulfate. In some embodiments, an acid anion may comprise a carboxylic acid, which may include, but is not limited to, one or more or any combination of the following examples: acetic acid or formic acid.

For example:

Alkali Sulfate+Alkali Carbonate+Alkaline Earth Acid Anion→Alkali Acid Anion+Alkaline Earth Carbonate+Alkaline Earth Sulfate Alkali Sulfate+Alkali Carbonate+Alkaline Earth Acid Anion→Alkali Acid Anion+Alkaline Earth Carbonate+Alkali Sulfate Alkali Sulfate+Alkali Carbonate+Alkaline Earth Acid Anion→Alkali Acid Anion+Alkaline Earth Sulfate+Alkali Carbonate Alkali Acid Anion+Alkali Sulfate+Alkaline Earth Acid Anion→Alkali Acid Anion+Alkaline Earth Sulfate Alkali Acid Anion+Alkali Carbonate+Alkaline Earth Acid Anion→Alkali Acid Anion+Alkaline Earth Carbonate Alkali Sulfate+Alkali Bicarbonate+Alkaline Earth Acid Anion→Alkali Acid Anion+Alkaline Earth Carbonate+Alkaline Earth Sulfate+$CO_2$ Alkali Sulfate+Alkali Bicarbonate+Alkaline Earth Acid Anion→Alkali Acid Anion+Alkaline Earth Carbonate+Alkali Sulfate+$CO_2$ Alkali Sulfate+Alkali Bicarbonate+Alkaline Earth Acid Anion→Alkali Acid Anion+Alkaline Earth Sulfate+Alkali Bicarbonate Alkali Acid Anion+Alkali Sulfate+Alkaline Earth Acid Anion→Alkali Acid Anion+Alkaline Earth Sulfate Alkali Acid Anion+Alkali Bicarbonate+Alkaline Earth Acid Anion→Alkali Acid Anion+Alkaline Earth Carbonate+$CO_2$ (2—Separation) Separate at least a portion of a salt or solid comprising an alkaline earth carbonate, or alkaline earth sulfate, or any combination thereof from, for example, at least a portion of a salt or solution comprising an alkali-anion using, for example, a solid-liquid separation.

(3) React at least a portion of a salt or solution comprising an alkali-anion with at least a portion of a fluid or solution comprising sulfur dioxide or sulfurous acid to form, for example, a salt or solution comprising an alkali sulfite and a solution or gas or solid comprising an acid.

For example, one or more or any combination of the following:

2Na(Acid Anion)+$SO_2$+$H_2O$→$Na_2SO_3$+Acid

2Na(Acid Anion)(aq)+$SO_2$(g or aq or l)+$H_2O$→$Na_2SO_3$(aq or s)+Acid(aq or g)

2Na(Acid Anion)+$2SO_2$+$2H_2O$→$2NaHSO_3$+Acid

2Na(Acid Anion)(aq)+$2SO_2$(g or aq or l)+$2H_2O$(l or g)→$2NaHSO_3$(aq or s)+Acid(aq or g)

2Na(Carboxylate)+$SO_2$+$H_2O$→$Na_2SO_3$+Carboxylic Acid

2Na(Carboxylate)(aq)+$SO_2$(g or aq or l)+$H_2O$→$Na_2SO_3$(aq or s)+Carboxylic Acid(aq or g)

2Na($CH_3COO$)+$SO_2$+$H_2O$→$Na_2SO_3$+$CH_3COOH$

2Na($CH_3COO$)(aq)+$SO_2$(g or aq or l)+$H_2O$(l or g)→$Na_2SO_3$(aq or s)+$CH_3COOH$(aq or g)

2Na(CHOO)+$SO_2$+$H_2O$→$Na_2SO_3$+$CH_2OO$

2Na(CHOO)(aq)+$SO_2$(g or aq or l)+$H_2O$(l or g)→$Na_2SO_3$(aq or s)+$CH_2OO$(aq or g)

(4—Separation) Separate at least a portion of a salt or solid or solution comprising an alkali sulfite from at least a portion of a solution or gas or solid comprising an acid, using, for example, including, but not limited to, one or more or any combination of the following: a crystallization, or distillation, or MVC, or MVR, or MED, or electrodialysis, or a membrane based process, or any combination thereof.

(5) React at least a portion of a salt or solid or solution comprising an alkali sulfite with at least a portion of a solid or salt or solution comprising an alkaline earth hydroxide to form, for example, at least a portion of an alkali hydroxide and/or at least a portion of an alkaline earth sulfite.

For example, one or more or any combination of the following:

$Na_2SO_3$+$Ca(OH)_2$→$2NaOH$+$CaSO_3$ $Na_2SO_3$(aq or s)+$Ca(OH)_2$(s or aq)→$2NaOH$(aq)+$CaSO_3$(s)

$CaO$+$H_2O$→$Ca(OH)_2$ $CaO$(s)+$H_2O$(l or g)→$Ca(OH)_2$(s or aq)

(5—Separation) Separate at least a portion of a solid comprising an alkaline earth sulfite from at least a portion of a solution comprising an alkali hydroxide using, for example, a solid-liquid separation.

(6) Decompose at least a portion of a solid comprising an alkaline earth sulfite to form, for example, at least a portion of an alkaline earth oxide and at least a portion of sulfur dioxide, using, for example, a kiln or calciner.

For example, one or more or any combination of the following:

$CaSO_3$→$CaO$+$SO_2$ $CaSO_3$(s)→$CaO$(s)+$SO_2$(g)

Note: In some embodiments, at least a portion of the calcium carbonate or magnesium carbonate produced in step '(2)' may be transferred or employed as at least a portion of the calcium carbonate or magnesium carbonate in step '(1).'

| EXAMPLE ADVANTAGES OF SOME EMBODIMENTS COMPARED TO ALTERNATIVE PROCESS INVOLVING CAUSTICIZATION OF A $Na_2CO_3$ to 2 NaOH USING $Ca(OH)_2$ | | |
|---|---|---|
| SOME EXAMPLE EMBODIMENTS | Parameter | $Na_2CO_3$ to 2 NaOH with $Ca(OH)_2$ |
| 113.27 kJ per mole NaOH produced | Thermodynamic Energy Consumption | 156.77 kJ per mole NaOH produced |
| 1 | Number of Calcining or Kiln Steps | 2 |
| No | Requires Thermal Calcining 2 $NaHCO_3$ to $Na_2CO_3$? | Yes |
| Inherently may produce 1 mole of high quality, high pressure, high purity, low water vapor, low temperature captured $CO_2$ per 1 mole NaOH produced | Quality of Inherent $CO_2$ Produced | Inherently may produce 1 mole of low quality, low pressure, low purity, high water vapor, high temperature uncaptured $CO_2$ emissions per 1 mole NaOH produced |

Notes

Note: In some embodiments, Sodium or Na, or Potassium or K, or any combination thereof may be provided as an example alkali or alkali-like chemical. Other alkalis, or alkali-like chemicals, may be employed instead of or in addition to sodium or Na, and/or may include, but are not limited to, one or more or any combination of the following: lithium, or sodium, or potassium, or rubidium, or caesium, or ammonia, or ammonium, or ammonia derivatives, or Li, or Na, or K, or Rb, or Cs, or $NH_3$, or $NH_4^+$, or monovalent cations, or monovalent compounds.

Note: In some embodiments, magnesium or calcium or any combination thereof may be provided as an example alkaline-earth or alkaline-earth like chemical. Other alkaline-earths or alkaline-earth like chemicals may be employed instead of or in addition to magnesium or calcium or any combination thereof, and/or may include, but are not limited to, one or more or any combination of the following: beryllium (Be), or magnesium (Mg), or calcium (Ca), or strontium (Sr), or barium (Ba), or radium (Ra), or amines, or divalent amines, or divalent cations.

Note: In some embodiments, carbon dioxide or carbonate may be provided as an example anion or acid which may form practically insoluble or low solubility salts or compounds with some alkaline earths or alkaline earth like cations or alkaline earth like compounds, which may include, but are not limited to, one or more or any combination of the following: beryllium (Be), or magnesium (Mg), or calcium (Ca), or strontium (Sr), or barium (Ba), or radium (Ra), or amines, or divalent amines, or divalent cations. In some embodiments, carbon dioxide or carbonate may be provided as an example anion or acid which may form practically insoluble or low solubility salts or compounds with some alkaline earths or alkaline earth like cations or alkaline earth like compounds, and practically at least partially soluble salts with alkalis, or alkali like cations or chemicals, or any combination thereof. Other anions or acids may be employed instead of or in addition to carbon dioxide or carbonate, which may include, but are not limited to, one or more or any combination of the following: citric acid, or oxalates, or oxalic acid, or citrates, or hydrosulfurous acid, or sulfide, or sulfite, or sulfur dioxide, or sulfurous acid, or phosphoric acid, or phosphate, or fluorine derivatives, or phosphorous derivatives, or sulfur derivatives.

Note: In some embodiments, acetic acid or formic acid may be provided as example acids. In some embodiments, acetic acid or formic acid may be provided as example carboxylic acids. In some embodiments, acetic acid or formic acid or acetate or formate may be provided as example acids or acid anions weaker than sulfurous acid and stronger than hydroxide, or carbonic acid, or any combination thereof. Other acids or acid anions with one or more or any combination of the aforementioned properties may be employed instead of or in addition to acetic acid or formic acid.

Example Embodiments

A process comprising:

Reacting a component comprising an alkali carbonate, or bicarbonate, or sesquicarbonate, or other carbon dioxide species, or a derivative thereof, or any combination thereof with at least a portion of a component comprising an alkaline earth acid anion to form at least a portion of a component comprising an alkaline earth carbonate and/or at least a portion of a component comprising an alkali acid anion;

Reacting the component comprising an alkali acid anion with at least a portion of a component comprising sulfur dioxide to form at least a portion of a component comprising an alkali-sulfur dioxide species and/or at least a portion of a component comprising an acid or acid anion derivative;

Separating at least a portion of the component comprising an acid or acid anion derivative from at least a portion of a component comprising an alkali-sulfur dioxide species;

Reacting at least a portion of the component comprising an alkali-sulfur dioxide species with a component comprising an alkaline earth oxide, or hydroxide, or a derivative thereof, or any combination thereof to form at least a portion of a component comprising an alkaline earth sulfite and/or at least a portion of a component comprising an alkali hydroxide.

The process of example embodiment_wherein the component comprising an alkali carbonate, or bicarbonate, or sesquicarbonate, or other carbon dioxide species, or a derivative thereof, or any combination thereof may comprise a mixture with a portion of an alkali sulfate.

The process of example embodiment_wherein the component comprising an alkali carbonate, or bicarbonate, or sesquicarbonate, or other carbon dioxide species, or a derivative thereof, or any combination thereof may further comprise a sulfate, or an alkali sulfate, or an alkaline earth sulfate, or any combination thereof.

The process of example embodiment_wherein the component comprising an alkaline earth carbonate may be reacted with the component comprising an acid anion or an acid anion derivative to form at least a portion of a component comprising an alkaline acid anion and/or at least a portion of a component comprising carbon dioxide, or captured carbon dioxide, or a derivative thereof, or any combination thereof.

Note: In some embodiments, an advantage may be the ability to produce alkali hydroxide from mixtures comprising components comprising alkali-carbon dioxide species, or alkali sulfate species, or impurities, or any combination thereof.

Note: In some embodiments, an advantage may be the ability to produce alkali hydroxide from alkali bicarbonate or alkali sesquicarbonate in a manner which may avoid or may prevent the need for calcining or thermal decomposing of alkali bicarbonate or alkali sesquicarbonate to alkali carbonate.

FIGURE DESCRIPTIONS

FIG. 37: Process for producing alkali hydroxide from alkali bicarbonate or alkali sesquicarbonate using alkaline earth and/or sulfur dioxide intermediates.

FIG. 38: Process for producing alkali hydroxide from alkali carbonate using alkaline earth and/or sulfur dioxide intermediates.

Example Embodiment Producing Sodium Hydroxide, Calcium Carbonate, and Sulfuric Acid from Calcium Sulfate, Sodium Bicarbonate or Sodium Carbonate, and Water, which may include, but is not limited to, one or more or any combination of the following:

(1) React at least a portion of calcium sulfate with at least a portion of sodium carbonate or sodium bicarbonate to form at least a portion of calcium sulfite and at least a portion of sodium sulfate.

For example, including, but not limited to, one or more or any combination of the following:

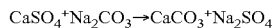
$CaSO_4 + Na_2CO_3 \rightarrow CaCO_3 + Na_2SO_4$

$CaSO_4 + 2NaHCO_3 \rightarrow CaCO_3 + Na_2SO_4 + CO_2 + H_2O$

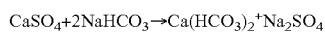
$CaSO_4 + 2NaHCO_3 \rightarrow Ca(HCO_3)_2 + Na_2SO_4$

$Ca(HCO_3)_2 \rightarrow CaCO_3 + CO_2 + H_2O$

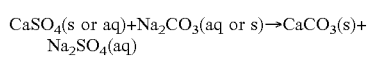
$CaSO_4(s \text{ or } aq) + Na_2CO_3(aq \text{ or } s) \rightarrow CaCO_3(s) + Na_2SO_4(aq)$

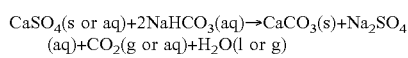
$CaSO_4(s \text{ or } aq) + 2NaHCO_3(aq) \rightarrow CaCO_3(s) + Na_2SO_4(aq) + CO_2(g \text{ or } aq) + H_2O(l \text{ or } g)$

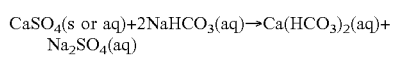
$CaSO_4(s \text{ or } aq) + 2NaHCO_3(aq) \rightarrow Ca(HCO_3)_2(aq) + Na_2SO_4(aq)$

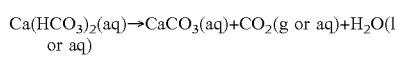
$Ca(HCO_3)_2(aq) \rightarrow CaCO_3(aq) + CO_2(g \text{ or } aq) + H_2O(l \text{ or } aq)$ (2) Decomposing at least a portion of calcium sulfite to form at least a portion of calcium oxide and at least a portion of sulfur dioxide.

For example, including, but not limited to, one or more or any combination of the following:

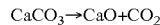
$CaCO_3 \rightarrow CaO + CO_2$

$CaCO_3(s) \rightarrow CaO(s) + CO_2(g)$

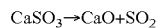
$CaSO_3 \rightarrow CaO + SO_2$ (3) React at least a portion of sodium sulfate with at least a portion of magnesium acetate to form at least a portion of sodium acetate and at least a portion of magnesium sulfate.

For example, including, but not limited to, one or more or any combination of the following:

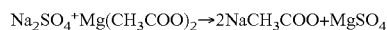
$Na_2SO_4 + Mg(CH_3COO)_2 \rightarrow 2NaCH_3COO + MgSO_4$

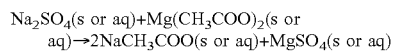
$Na_2SO_4(s \text{ or } aq) + Mg(CH_3COO)_2(s \text{ or } aq) \rightarrow 2NaCH_3COO(s \text{ or } aq) + MgSO_4(s \text{ or } aq)$

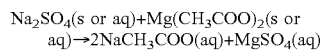
$Na_2SO_4(s \text{ or } aq) + Mg(CH_3COO)_2(s \text{ or } aq) \rightarrow 2NaCH_3COO(aq) + MgSO_4(aq)$ (3—separation) Separating at least a portion of sodium acetate from at least a portion of magnesium sulfate.

For example, including, but not limited to, one or more or any combination of the following:

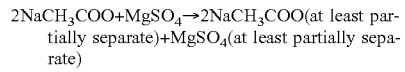
$2NaCH_3COO + MgSO_4 \rightarrow 2NaCH_3COO$(at least partially separate)$+MgSO_4$(at least partially separate)

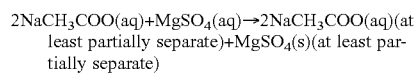
$2NaCH_3COO(aq) + MgSO_4(aq) \rightarrow 2NaCH_3COO(aq)$(at least partially separate)$+MgSO_4(s)$(at least partially separate)

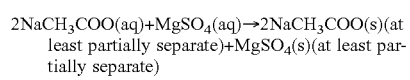
$2NaCH_3COO(aq) + MgSO_4(aq) \rightarrow 2NaCH_3COO(s)$(at least partially separate)$+MgSO_4(s)$(at least partially separate)

(4) Decompose at least a portion of magnesium sulfate to form at least a portion of magnesium oxide and at least a portion of sulfur dioxide, or diatomic oxygen, or sulfur trioxide, or any combination thereof.

For example, including, but not limited to, one or more or any combination of the following:

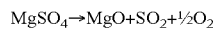
$MgSO_4 \rightarrow MgO + SO_2 + \frac{1}{2}O_2$

$MgSO_4 \rightarrow MgO + SO_3$

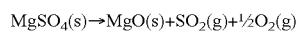
$MgSO_4(s) \rightarrow MgO(s) + SO_2(g) + \frac{1}{2}O_2(g)$

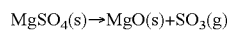
$MgSO_4(s) \rightarrow MgO(s) + SO_3(g)$ (5) React at least a portion of sulfur dioxide, or diatomic oxygen, or sulfur trioxide, or any combination thereof with at least a portion of water to form at least a portion of sulfuric acid.

For example, including, but not limited to, one or more or any combination of the following:

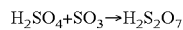
$H_2SO_4 + SO_3 \rightarrow H_2S_2O_7$

$H_2S_2O_7 + H_2O \rightarrow 2H_2SO_4$

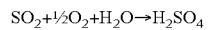
$SO_2 + \frac{1}{2}O_2 + H_2O \rightarrow H_2SO_4$

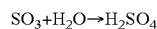
$SO_3 + H_2O \rightarrow H_2SO_4$

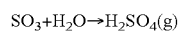
$SO_3 + H_2O \rightarrow H_2SO_4(g)$

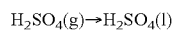
$H_2SO_4(g) \rightarrow H_2SO_4(l)$ $SO_2(g\ or\ aq\ or\ l) + \frac{1}{2}O_2(g) + H_2O(g\ or\ l) \rightarrow H_2SO_4(l\ or\ g\ or\ aq)$ $SO_3(g\ or\ aq\ or\ l) + H_2O(g\ or\ l) \rightarrow H_2SO_4(l\ or\ g\ or\ aq)$ Note: Heat may be recovered from one or more or any combination of reactions to form or produce sulfuric acid.

(6) React at least a portion of magnesium oxide or a derivative of magnesium oxide with at least a portion of acetic acid to form at least a portion of magnesium acetate and water.

For example, including, but not limited to, one or more or any combination of the following:

$MgO + 2CH_3COOH \rightarrow Mg(CH_3COO)_2 + H_2O$ $Mg(OH)_2 + 2CH_3COOH \rightarrow Mg(CH_3COO)_2 + H_2O$ $MgO + CO_2 \rightarrow MgCO_3$ $MgO + H_2O \rightarrow Mg(OH)_2$ $Mg(OH)_2 + CO_2 \rightarrow MgCO_3 + H_2O$ $Mg(OH)_2 + \text{Carbonate or Bicarbonate Salt} \rightarrow MgCO_3$ $MgCO_3 + 2CH_3COOH \rightarrow Mg(CH_3COO)_2 + H_2O + CO_2$ $MgO(s) + 2CH_3COOH(g\ or\ l\ or\ aq) \rightarrow Mg(CH_3COO)_2(s\ or\ aq) + H_2O(aq\ or\ g)$ $Mg(OH)_2(s\ or\ aq) + 2CH_3COOH(aq\ or\ l\ or\ g\ or\ s) \rightarrow Mg(CH_3COO)_2(aq\ or\ s) + H_2O(aq\ or\ l\ or\ g)$ $MgO(s) + CO_2(g\ or\ aq) \rightarrow MgCO_3(s)$ $MgO(s) + H_2O(g\ or\ l\ or\ aq) \rightarrow Mg(OH)_2(s\ or\ aq)$ $Mg(OH)_2(s\ or\ aq) + CO_2(g\ or\ aq) \rightarrow MgCO_3(s) + H_2O(aq\ or\ l\ or\ g)$ $Mg(OH)_2(s\ or\ aq) + \text{Carbonate or Bicarbonate Salt}(s\ or\ aq) \rightarrow MgCO_3(s)$ $MgCO_3(s) + 2CH_3COOH(aq\ or\ l\ or\ g) \rightarrow Mg(CH_3COO)_2(aq\ or\ s) + H_2O(l\ or\ aq\ or\ g) + CO_2(g\ or\ aq)$ Note: Heat may be recovered from one or more or any combination of reactions which may be employed to form or produce magnesium acetate.

Note: Heat may be recovered from one or more or any combination of reactions to form or produce magnesium hydroxide.

Note: Magnesium oxide or magnesium hydroxide may be employed to capture $CO_2$ and/or at least a portion of $CO_2$ may be desorbed by reacting at least a portion magnesium carbonate with at least a portion of acetic acid to form magnesium acetate and captured carbon dioxide.

(7) React at least a portion of sodium acetate with at least a portion of sulfur dioxide to form at least a portion of sodium sulfite or sodium bisulfite and at least a portion of acetic acid.

For example, including, but not limited to, one or more or any combination of the following:

$2NaCH_3COO + SO_2 + H_2O \rightarrow Na_2SO_3 + 2CH_3COOH$ $Na_2SO_3 + 2CH_3COOH + SO_2 + H_2O \rightarrow 2NaHSO_3 + 2CH_3COOH$ $2NaCH_3COO(aq\ or\ s) + SO_2(g\ or\ aq) + H_2O(l\ or\ g) \rightarrow Na_2SO_3(aq\ or\ s) + 2CH_3COOH(aq\ or\ g)$ $2NaCH_3COO(aq) + SO_2(g) + H_2O(l) \rightarrow Na_2SO_3(aq) + 2CH_3COOH(aq)$ $Na_2SO_3(aq\ or\ s) + 2CH_3COOH(aq\ or\ g\ or\ l) + SO_2(g\ or\ l\ or\ aq) + H_2O(l\ or\ g\ or\ aq) \rightarrow 2NaHSO_3(aq) + 2CH_3COOH(aq\ or\ g)$ $Na_2SO_3(aq) + 2CH_3COOH(aq) + SO_2(g) + H_2O(l\ or\ aq\ or\ g) \rightarrow 2NaHSO_3(aq) + 2CH_3COOH(aq)$ (7—separation) Separate at least a portion of sodium sulfite or sodium bisulfite or sodium metabisulfite from at least a portion of acetic acid.

For example, including, but not limited to, one or more or any combination of the following:

$Na_2SO_3 + 2CH_3COOH \rightarrow Na_2SO_3(\text{at least partially separate}) + 2CH_3COOH(\text{at least partially separate})$ $Na_2SO_3(aq) + 2CH_3COOH(aq) \rightarrow Na_2SO_3(s)(\text{at least partially separate}) + 2CH_3COOH(aq)(\text{at least partially separate})$ $2NaHSO_3 + 2CH_3COOH \rightarrow 2NaHSO_3(\text{at least partially separate}) + 2CH_3COOH(\text{at least partially separate})$ $2NaHSO_3 + 2CH_3COOH \rightarrow Na_2S_2O_5(\text{at least partially separate}) + 2CH_3COOH(\text{at least partially separate}) + H_2O$ $2NaHSO_3(aq) + 2CH_3COOH(aq) \rightarrow Na_2S_2O_5(s)(\text{at least partially separate}) + 2CH_3COOH(aq)(\text{at least partially separate})$ $Na_2S_2O_5 \rightarrow Na_2SO_3 + SO_2$ $Na_2S_2O_5(s) \rightarrow Na_2SO_3(s) + SO_2(g)$ (8) React at least a portion of sodium sulfite with at least a portion of calcium hydroxide or calcium oxide to form at least a portion of sodium hydroxide and at least a portion of calcium sulfite.

For example, including, but not limited to, one or more or any combination of the following:

$Na_2SO_3 + Ca(OH)_2 \rightarrow 2NaOH + CaSO_3$ $CaO + H_2O \rightarrow Ca(OH)_2$ $Na_2SO_3(s\ or\ aq) + Ca(OH)_2(s\ or\ aq) \rightarrow 2NaOH(aq) + CaSO_3(s)$ $Na_2SO_3(aq) + Ca(OH)_2(s\ or\ aq) \rightarrow 2NaOH(aq) + CaSO_3(s)$ $CaO(s) + H_2O(l\ or\ g\ or\ aq) \rightarrow Ca(OH)_2(s\ or\ aq)$ (8—separation) Separating at least a portion of calcium sulfite from at least a portion of sodium hydroxide.

For example, including, but not limited to, one or more or any combination of the following:

$2NaOH + CaSO_3 \rightarrow 2NaOH(\text{at least partially separate}) + CaSO_3(\text{at least partially separate})$ $2NaOH(aq) + CaSO_3(s) \rightarrow 2NaOH(aq)(\text{at least partially separate}) + CaSO_3(s)(\text{at least partially separate})$ (9) Decomposing at least a portion of calcium sulfite to form at least a portion of calcium oxide and at least a portion of sulfur dioxide.

For example, including, but not limited to, one or more or any combination of the following:

$$CaSO_3 \rightarrow CaO + SO_2$$

$$CaSO_3(s) \rightarrow CaO(s) + SO_2(g)$$

Note: In some embodiments, acetic acid and acetate may be provides as an example. In some embodiments, acetic acid and acetate may be provides as an example carboxylic acid, or an example anion or acid with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof. One or more or any combination of carboxylic acids, or other anions or acids with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof may be employed instead of, or in addition to, acetic acid, for example, herein.

Note: In some embodiments, at least a portion of sodium carbonate, or sodium bicarbonate, or any combination thereof may comprise an input. In some embodiments, for example, at least a portion of sodium bicarbonate, or sodium carbonate, or any combination thereof may comprise or may be sourced from an ore, such as Trona.

BACKGROUND

Separating dolomite or magnesium or magnesium carbonate from ores comprising calcium phosphate may be of great importance. Dolomite can contaminate ores and prevent phosphate or phosphoric acid or phosphor derivatives from being economically recovered from phosphate ores. Currently, challenges with separating dolomite have reduced the potential economic phosphate reserves, which may restrict the potential future supply of phosphate fertilizers, which may jeopardize potential future food production and food security. Phosphorous is of great importance to modern society, functioning as an essential fertilizer and nutrient. It is of great importance to increase the availability, potential reserves, and accessibility of phosphorous for human health and the global economy.

SUMMARY

Some embodiments may pertain to systems or methods for removing dolomite or magnesium carbonate from ores or minerals comprising phosphorous, or phosphate, or calcium phosphates, or any combination thereof. Some embodiments may pertain to recovering or generating magnesium, or magnesium oxide, or magnesium hydroxide.
Example Chemistry
Example Chemistry:
React a component comprising calcium phosphate which may comprise dolomite with a component comprising sulfur dioxide, or water, sulfurous acid, or a derivative thereof, or any combination thereof. In some embodiments, sulfurous acid may be stronger than phosphoric acid, which may result in at least a portion of a component comprising phosphoric acid being displaced into solution while forming at least a portion of a component comprising calcium sulfite, which may comprise a solid or solutions, and/or a component comprising magnesium sulfite, which may comprise a solid or solution. In some embodiments, a component comprising calcium sulfite and/or a component comprising magnesium sulfite may be at least partially separated from a solution.
Example Chemistry:
React calcium phosphate ore comprising dolomite with acetic acid, which may result in the dolomite reacting to form soluble magnesium acetate or calcium acetate. The dissolved/leached magnesium acetate or calcium acetate may be reacted with sodium sulfate to form sodium acetate and calcium sulfate or magnesium sulfate. Magnesium sulfate may be decomposed to form sulfuric acid and magnesium oxide. Sodium sulfite may be converted into sodium hydroxide, or sodium carbonate, or sodium bicarbonate.
Example Chemistry:
React calcium phosphate ore comprising dolomite with acetic acid, which may result in the dolomite reacting to form soluble magnesium acetate or calcium acetate. The dissolved/leached magnesium acetate or calcium acetate may be reacted with sulfur dioxide to form magnesium sulfite precipitate. Magnesium sulfite precipitate may be decomposed to form sulfur dioxide and magnesium oxide.
Example Production or Source of Alkali Chloride
In some embodiments, an alkali chloride may be sourced from, or supplied from, or originate from, or produced from, or any combination thereof, for example, including, but not limited to, one or more or any combination of the following:
  Ore or mineral comprising sodium chloride or potassium chloride
  Brine comprising sodium chloride or potassium chloride
  Byproduct or waste comprising sodium chloride or potassium chloride
  Sea Salt
  Potash
Example Production or Source of Alkali Sulfate
In some embodiments, an alkali sulfate may be sourced from, or supplied from, or originate from, or produced from, or any combination thereof, for example, including, but not limited to, one or more or any combination of the following:
  Ore or mineral comprising sodium sulfate
  Brine comprising sodium sulfate
  Byproduct or waste comprising sodium sulfate
  Reacting at least a portion of sodium chloride or potassium chloride with at least a portion of sulfuric acid to form, for example, at least a portion of sodium sulfate or potassium sulfate.
  Reacting at least a portion of sodium fluoride or potassium fluoride with at least a portion of sulfuric acid to form, for example, at least a portion of sodium sulfate or potassium sulfate.
  Reacting at least a portion of potassium or sodium sulfite, or carbonate, or bicarbonate, or bisulfite, or metabisulfite, or sesquicarbonate, or sulfide, or citrate, or fluoride, or any combination thereof with at least a portion of calcium sulfate to form at least a portion of potassium or sodium sulfate.
Example Production or Source of Alkaline Earth Sulfate
In some embodiments, an alkaline-earth sulfate may be sourced from, or supplied from, or originate from, or produced from, or any combination thereof, for example, including, but not limited to, one or more or any combination of the following:
  Ore or mineral comprising calcium sulfate
  Byproduct or waste comprising calcium sulfate, such as phosphogypsum
  Reacting at least a portion of calcium fluoride or magnesium fluoride with at least a portion of sulfuric acid to form at least a portion of calcium sulfate or magnesium sulfate and/or at least a portion of hydrofluoric acid or hydrogen fluoride. In some processes, calcium fluoride may comprise a byproduct or waste product. In some embodiments, it may be desirable to regenerate or convert or transform at least a portion of the calcium fluoride into hydrofluoric acid, calcium oxide, or calcium hydroxide, or any combination thereof. For example, in some applications, such as potassium hydroxide recovery or regeneration in HF alkylation units or alkylation units which use HF, calcium hydroxide may be employed to react with potassium fluoride to produce potassium hydroxide and calcium fluoride, wherein the potassium hydroxide may be used or reused or recycled in the process, and/or it may be desirable to generate or produce at least a portion of calcium oxide, or calcium hydroxide, or hydrofluoric acid, or hydrogen fluoride, or any combination thereof from at least a portion of calcium fluoride to, for example, employ in the process, or to reuse, or recycle, or enable a circular economy in the process, or any combination thereof.

For example, including, but not limited to, one or more or any combination of the following:

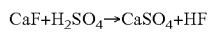
$CaF+H_2SO_4 \rightarrow CaSO_4+HF$

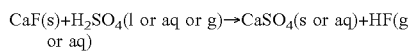
$CaF(s)+H_2SO_4(l \text{ or aq or g}) \rightarrow CaSO_4(s \text{ or aq})+HF(g \text{ or aq})$

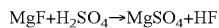
$MgF+H_2SO_4 \rightarrow MgSO_4+HF$

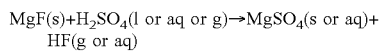
$MgF(s)+H_2SO_4(l \text{ or aq or g}) \rightarrow MgSO_4(s \text{ or aq})+HF(g \text{ or aq})$

DESCRIPTION

Some embodiments may comprise reacting at least a portion of calcium fluoride or magnesium fluoride with at least a portion of sulfuric acid to form at least a portion of calcium sulfate or magnesium sulfate and/or at least a portion of hydrofluoric acid or hydrogen fluoride. In some processes, calcium fluoride may comprise a byproduct or waste product. In some embodiments, it may be desirable to regenerate or convert or transform at least a portion of the calcium fluoride into hydrofluoric acid, calcium oxide, or calcium hydroxide, or any combination thereof. For example, in some applications, such as potassium hydroxide recovery or regeneration in HF alkylation units or alkylation units which use HF, calcium hydroxide may be employed to react with potassium fluoride to produce potassium hydroxide and calcium fluoride, wherein the potassium hydroxide may be used or reused or recycled in the process, and/or it may be desirable to generate or produce at least a portion of calcium oxide, or calcium hydroxide, or hydrofluoric acid, or hydrogen fluoride, or any combination thereof from at least a portion of calcium fluoride to, for example, employ in the process, or to reuse, or recycle, or enable a circular economy in the process, or any combination thereof.

For example, including, but not limited to, one or more or any combination of the following:

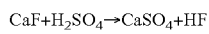
$CaF+H_2SO_4 \rightarrow CaSO_4+HF$

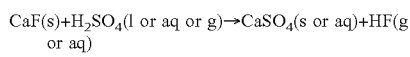
$CaF(s)+H_2SO_4(l \text{ or aq or g}) \rightarrow CaSO_4(s \text{ or aq})+HF(g \text{ or aq})$

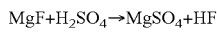
$MgF+H_2SO_4 \rightarrow MgSO_4+HF$

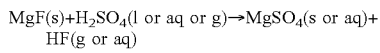
$MgF(s)+H_2SO_4(l \text{ or aq or g}) \rightarrow MgSO_4(s \text{ or aq})+HF(g \text{ or aq})$ Notes Note: In some embodiments, at least a portion of $2CH_3COOH$ may be separated from at least a portion of $Na_2SO_3$ by distillation or crystallization.

Note: In some embodiments, acetic acid and acetate may be provides as an example. In some embodiments, acetic acid and acetate may be provides as an example carboxylic acid, or an example anion or acid with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof. One or more or any combination of carboxylic acids, or other anions or acids with an acid strength greater than at least a portion of hydroxide, or carbonate, or carbon dioxide, or carbonic acid, or any combination thereof, and/or less than the acid strength of at least a portion of sulfur dioxide or sulfurous acid, or any combination thereof may be employed instead of, or in addition to, acetic acid, for example, herein.

Note: In some embodiments, at least a portion of $2CH_3COOH$ may be separated from at least a portion of $Na_2SO_3$. For example, said separation may comprise, including, but not limited to, one or more or any combination of the following: a membrane based process, or nanofiltration, or distillation, or crystallization, or high pressure nanofiltration, or high pressure reverse osmosis, or membrane distillation, or mechanical vapor compression distillation, or MVC distillation, or MVC crystallization, or MED, or MSF, or crystallizer, or falling film crystallizer, or heat recovery distillation, or cryodesalination.

Note: In some embodiments, it may be desirable to (1) dissolve at least a portion of a salt comprising alkali anion to form, for example, a solution comprising alkali anion; then, for example, (2) transfer said solution comprising alkali anion to a membrane separation process, such as nanofiltration, to form a permeate comprising a solution comprising alkali anion salt and a retentate comprising at least a portion of any residual alkaline-earth sulfate; then for example, (3) transfer at least a portion of the retentate to a distillation and/or crystallization process to separate at least a portion of the salt comprising an alkaline earth sulfate from at least a portion of the salt comprising alkali anion.

Note: In some embodiments, it may be desirable to (1) dissolve at least a portion of a salt comprising sodium acetate to form, for example, a solution comprising sodium acetate; then, for example, (2) transfer said solution comprising sodium acetate to a membrane separation process, such as nanofiltration, to form a permeate comprising a solution comprising sodium acetate salt and a retentate comprising at least a portion of any residual magnesium sulfate; then for example, (3) transfer at least a portion of the retentate to a distillation and/or crystallization process to separate at least a portion of the salt comprising an magnesium sulfate from at least a portion of the salt comprising sodium acetate.

Note: In some embodiments, at least partially separating, for example, Alkali Sulfite+Anion Acid into at least a portion of at least partially separated Alkali Sulfite and at least partially separated Anion Acid may comprise one or more or any combination of the following:

(1) Freezing a solution comprising aqueous Alkali Sulfite and Anion Acid, such as sodium sulfite and acetic acid, to form, for example, a solid comprising water and anion acid, such as acetic acid, and a liquid or solution comprising aqueous alkali sulfite, such as sodium sulfite, which may comprise a concentrated solution or concentrated brine.

(2) Separating the liquid or solution comprising aqueous alkali sulfite, such as sodium sulfite, from the solid comprising water and anion acid, such as acetic acid.

(3) Melting the solid comprising water and anion acid, such as acetic acid, to form, for example, a solution comprising aqueous anion acid, such as aqueous acetic acid.

(4) Separating at least a portion of any residual alkali sulfite from a solution comprising aqueous anion acid, such as aqueous acetic acid, using, for example, reverse osmosis or nanofiltration or electrodialysis. For example, transfer at least a portion of a solution comprising aqueous anion acid, such as aqueous acetic acid, as a feed solution into a reverse osmosis or nanofiltration process, to form a retentate comprising aqueous alkali sulfite, such as sodium sulfite, and a permeate comprising anion acid, such as acetic acid.

(5) In some embodiments, the retentate comprising aqueous alkali sulfite may comprise residual anion acid, and/or the retentate comprising aqueous alkali sulfite may be transferred to the freezing step, or a step employing aqueous alkali sulfite, or any combination thereof.

(6) In some embodiments, the permeate comprising aqueous anion acid may be transferred to a step employing aqueous anion acid, such as a step reacting aqueous anion acid with a material comprising an alkaline earth.

Note: In some embodiments, at least a portion of $CO_2$ generated from a reaction may comprise, including, but not limited to, one or more or any combination of the following: captured $CO_2$, or high quality $CO_2$, or high pressure $CO_2$, or high partial pressure $CO_2$, or high purity $CO_2$, or low temperature $CO_2$, or low water vapor $CO_2$, or low cost to utilize or convert $CO_2$, or $CO_2$ which may be at a sufficient concentration to form sodium bicarbonate or ammonium bicarbonate or potassium bicarbonate, or $CO_2$ at a partial pressure greater than 1 Bar, or $CO_2$ at a partial pressure greater than 2 Bar, or any combination thereof.

Note: In some embodiments, at least a portion of the $CO_2(g)$ produced may be reacted with at least a portion of the NaOH produced, to form, for example, sodium carbonate or sodium bicarbonate. For example, in some lithium-ion battery recycling applications, or lithium processing applications, or any combination thereof, sodium carbonate may be employed. For example, in some lithium-ion battery recycling applications, or lithium processing applications, or any combination thereof, sodium carbonate may be employed to produce lithium carbonate.

Note: In some embodiments, at least partially reacting at least a portion of a material comprising an alkaline earth oxide with at least a portion of chemical comprising water to form, for example, a material or solution or solid comprising an alkaline earth hydroxide.

For example, including, but not limited to, one or more or any combination of the following:

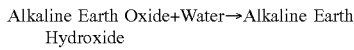
Alkaline Earth Oxide+Water→Alkaline Earth Hydroxide

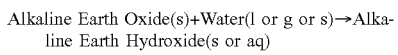
Alkaline Earth Oxide(s)+Water(l or g or s)→Alkaline Earth Hydroxide(s or aq)

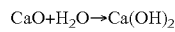
$CaO+H_2O \rightarrow Ca(OH)_2$

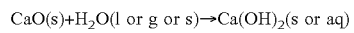
$CaO(s)+H_2O(l\ or\ g\ or\ s) \rightarrow Ca(OH)_2(s\ or\ aq)$

Note: In some embodiments, the salt or solution comprising sodium produced or comprising a product from the reaction of sodium sulfate with a salt or solution comprising calcium may be treated or further treated to, for example, at least a portion of residual calcium sulfate, or impurities, or heavy metal impurities, or any combination thereof.

Note: In some embodiments, sodium chloride from, for example, may comprise a byproduct or output. For example, sodium chloride output may comprise a lower concentration of impurities than, for example, a sodium sulfate waste input with heavy metal impurities, and/or, in some embodiments, may be more easily disposed of or used for other applications.

Note: In some embodiments, Sodium or Na, or Potassium or K, or any combination thereof may be provided as an example alkali or alkali-like chemical or alkali-like cation. Other alkalis, or alkali-like chemicals, may be employed instead of or in addition to sodium or Na, and/or may include, but are not limited to, one or more or any combination of the following: lithium, or sodium, or potassium, or rubidium, or caesium, or ammonia, or ammonium, or ammonia derivatives, or Li, or Na, or K, or Rb, or Cs, or $NH_3$, or $NH_4^+$, or monovalent cations, or monovalent compounds.

Note: In some embodiments, magnesium or calcium or any combination thereof may be provided as an example alkaline-earth or alkaline-earth like chemical. Other alkaline-earths or alkaline-earth like chemicals may be employed instead of or in addition to magnesium or calcium or any combination thereof, and/or may include, but are not limited to, one or more or any combination of the following: beryllium (Be), or magnesium (Mg), or calcium (Ca), or strontium (Sr), or barium (Ba), or radium (Ra), or amines, or divalent amines, or divalent cations.

Note: In some embodiments, carbon dioxide or carbonate may be provided as an example anion or acid which may form practically insoluble or low solubility salts or compounds with some alkaline earths or alkaline earth like cations or alkaline earth like compounds, which may include, but are not limited to, one or more or any combination of the following: beryllium (Be), or magnesium (Mg), or calcium (Ca), or strontium (Sr), or barium (Ba), or radium (Ra), or amines, or divalent amines, or divalent cations. In some embodiments, carbon dioxide or carbonate may be provided as an example anion or acid which may form practically insoluble or low solubility salts or compounds with some alkaline earths or alkaline earth like cations or alkaline earth like compounds, and practically at least partially soluble salts with alkalis, or alkali like cations or chemicals, or any combination thereof. Other anions or acids may be employed instead of or in addition to carbon dioxide or carbonate, which may include, but are not limited to, one or more or any combination of the following: citric acid, or oxalates, or oxalic acid, or citrates, or hydrosulfurous acid, or sulfide, or sulfite, or sulfur dioxide, or sulfurous acid, or phosphoric acid, or phosphate, or fluorine derivatives, or phosphorous derivatives, or sulfur derivatives.

Note: In some embodiments, acetic acid or formic acid may be provided as example acids. In some embodiments, acetic acid or formic acid may be provided as example carboxylic acids. In some embodiments, acetic acid or formic acid or acetate or formate may be provided as example acids or acid anions weaker than sulfurous acid and stronger than hydroxide, or carbonic acid, or any combination thereof. Other acids or acid anions with one or more or any combination of the aforementioned properties may be employed instead of or in addition to acetic acid or formic acid.

Note: In some embodiments, concentrating or separating may comprise, for example, including, but is not limited to, one or more or any combination of the following: reverse osmosis, or electrodialysis, or nanofiltration, or membrane based process, or distillation, or MVC, or MED, or MD, or cryodesalination, or high pressure reverse osmosis, or forward osmosis, or osmotically assisted reverse osmosis, or electrodialysis, or electrodialysis reversal, crystallization, crystallizer, or a separation process, or evaporation, or cryo-desalination, or cryo-separation, or freeze separation, or freeze desalination, or cooling crystallization, or salting-out, or solventing-out, or precipitation, or condensation, or sublimation, or deposition, one or more or any combination of separation systems or methods described herein, or one or more or any combination of separation systems or methods known in the art, or any combination thereof.

Note: In some embodiments, sodium carbonate, or sodium bicarbonate, or sodium sesquicarbonate, or any combination thereof may be decomposed to form at least a portion of carbon dioxide and/or at least a portion of sodium carbonate.

Note: In some embodiments, at least a portion of a salt comprising sodium carbonate, or sodium bicarbonate, or sodium sesquicarbonate, or any combination thereof may be reacted with at least a portion of a salt comprising calcium oxide or calcium hydroxide to form at least a portion of a salt comprising sodium hydroxide and/or at least a portion of a salt comprising calcium carbonate. In some embodiments, at least a portion of any formed salt comprising calcium carbonate may be utilized within the process or recirculated. In some embodiments, at least a portion of any formed salt comprising calcium carbonate may be decomposed or reacted in a manner to produce, for example, a salt comprising calcium oxide, or calcium hydroxide, or carbon dioxide, or captured carbon dioxide, or calcium carbonate, or calcium sulfite, or calcium carboxylate, or calcium sulfate, or any combination thereof. In some embodiments, at least a portion of any formed salt comprising sodium hydroxide may comprise a valuable product, or may comprise an intermediate, or may be purified, or may be further purified, or may be concentrated, or may be further concentrated, or may be crystallized, or any combination thereof.

Note: In some embodiments, a solution comprising sodium sulfite may comprise sodium bisulfite, or sodium sulfite, or sodium sesquisulfite, or sodium metabisulfite, or free sulfur dioxide, or sodium acetate, or sodium sulfate, or sulfate, or calcium, or any combination thereof. In some embodiments, the molar ratio of sodium:sulfur may be greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5.

Note: Sodium may be provided as an example alkali. Other alkalis or alkali-like cations may be employed instead of, or in addition to, for example, sodium. For example, other alkalis or alkali-like cations, which may also be referred to as 'alkali', may include, but may be not limited to, one or more or any combination of the following: lithium (Li), or sodium (Na), or potassium (K), or rubidium (Rb), or cesium (Cs), or ammonia, or ammonium, or amine, or ammonia-derivative, or nitrogenous cation, or any derivative thereof, or any combination thereof.

Note: Calcium may be provided as an example alkaline-earth. Other alkaline-earths or alkaline-earth-like cations may be employed instead of, or in addition to, for example, calcium. For example, other alkaline-earths or alkaline-earth-like cations may include, but may be not limited to, one or more or any combination of the following: beryllium (Be), magnesium (Mg), calcium (Ca), strontium (Sr), barium (Ba), and radium (Ra), or amine, or ammonia-derivative, or nitrogenous cation.

Note: Acetic acid or acetate may be provided as an example carboxylic acid, or acid, or acid stronger than carbonic acid and weaker than sulfurous acid, or any combination thereof. Other carboxylic acids, or acids, or acids stronger than carbonic acid and weaker than sulfurous acid, or any combination thereof may be employed instead of, or in addition to, for example, acetic acid. For example, other carboxylic acids, or acids, or acids stronger than carbonic acid and weaker than sulfurous acid, or any combination thereof may include, but may be not limited to, one or more or any combination of the following: formic acid, or acetic acid, or propanoic acid, or volatile acid, or non-volatile acid, or citric acid, or malic acid, or oxalic acid, or Lactic acid, or glycolic acid, or glyoxylic acid, or C1 acids, or C2 acids, or C3 acids, or C4 acids, or C5 acids, or C6 acids, or C7 acids, or C8 acids, or C9 acids, or C10 acids, or acids known in the art.

Note: Carbonate or bicarbonate or carbonic acid may be provided as an example of a weak acid, or an example of an acid weaker than some carboxylic acids, or any combination thereof. Other weak acids, or acids weaker than most carboxylic acids, or any combination thereof may be employed instead of, or in addition to, carbonate or bicarbonate or carbonic acid. Other weak acids, or acids weaker than some carboxylic acids, or anions weaker than some carboxylic acid cations, or any combination thereof may include, but may be not limited to, one or more or any combination of the following: silicates, or silicon derivatives, or iron derivatives, or transition metal derivatives, or metal derivative anions, or ferrites, or ferrates, or aluminates, or silicates, or oxide anions, or sulfides, or hydrogen sulfide, or nitrites.

Note: In some embodiments, 'sodium sulfite' or $Na_2SO_3$, may be provided as an example component comprising alkali+sulfur dioxide species. Other components comprising alkali+sulfur dioxide species may be employed or used instead of, or in addition to, or example, 'sodium sulfite' or $Na_2SO_3$. Other components comprising alkali+sulfur dioxide species may be employed or used instead of, or in addition to, or example, 'sodium sulfite' or $Na_2SO_3$, for example, where 'sodium sulfite' or $Na_2SO_3$ may be described. For example, other components comprising alkali+sulfur dioxide species may include, but are not limited to, one or more or any combination of the following: sulfite, or bisulfite, or metabisulfite, or sesquisulfite, or sodium, or potassium, or lithium, or alkali, or sulfur derivative, or sulfur oxide, or sulfide, or sulfurous acid, or aqueous sulfur dioxide, or liquid sulfur dioxide, or sulfur dioxide, or other sulfur dioxide species, or sodium sulfite, or sodium bisulfite, or sodium metabisulfite, or sodium sesquisulfide, or sodium hydroxide, or a mixture comprising sodium sulfite and sodium hydroxide, or a mixture comprising sodium+ sulfur dioxide+carboxylic acid species, or a mixture comprising sodium+sulfur dioxide+acid anion species, or a derivative thereof, or any combination thereof.

The term "high" as used, herein may include the following representative limits:

High Purity: High purity of a component may be defined as a volume percent or weight percent concentration greater than or equal to one or more or any combination of the following: 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

High Purity of Carbon Dioxide: High purity of carbon dioxide may be defined as a volume percent or weight percent concentration greater than or equal to one or more or any combination of the following: 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

High Concentration: High concentration of a component may be defined as a volume percent or weight percent concentration greater than or equal to one or more or any combination of the following: 0.001%, or 0.01%, or 0.1%, or 1%, or 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

High Concentration of Carbon Dioxide: High concentration of a carbon dioxide may be defined as a volume percent or weight percent concentration greater than or equal to one or more or any combination of the following: 0.001%, or 0.01%, or 0.1%, or 1%, or 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

High Partial Pressure: High partial pressure of a component may be defined as a partial pressure greater than or equal to one or more or any combination of the following: 0.01 Bar, or 0.05 Bar, or 0.1 Bar, or 0.25 Bar, or 0.5 Bar, or 0.75 Bar, or 1 Bar, or 2 Bar, or 3 Bar, or 4 Bar, or 5 Bar, or 6 Bar, or 7 Bar, or 8 Bar, or 9 Bar, or 10 Bar, or 15 Bar, or 20 Bar, or 30 Bar, or 40 Bar, or 50 Bar, or 60 Bar, or 70 Bar, or 80 Bar, or 90 Bar, or 100 Bar, or 110 Bar, or 120 Bar, or 130 Bar, or 140 Bar, or 150 Bar, or 175 Bar, or 200 Bar, or 225 Bar, or 250 Bar, or 275 Bar, or 300 Bar, or 325 Bar, or 350 Bar, or 375 Bar, or 400 Bar, or 425 Bar, or 450 Bar, or 475 Bar, or 500 Bar, or 600 Bar, or 700 Bar, or 800 Bar, or 900 Bar, or 1,000 Bar, or 1,250 Bar, or 1,500 Bar, or 1,750 Bar, or 2,000 Bar, or 2,500 Bar, or 3,000 Bar, or 3,500 Bar, or 4,000 Bar, or 4,500 Bar, or 5,000 Bar, or 7,500 Bar, or 10,000 Bar.

High Partial Pressure of Carbon Dioxide: High partial pressure of a component may be defined as a partial pressure greater than or equal to one or more or any combination of the following: 0.001 Bar, or 0.01 Bar, or 0.05 Bar, or 0.1 Bar, or 0.25 Bar, or 0.5 Bar, or 0.75 Bar, or 1 Bar, or 2 Bar, or 3 Bar, or 4 Bar, or 5 Bar, or 6 Bar, or 7 Bar, or 8 Bar, or 9 Bar, or 10 Bar, or 15 Bar, or 20 Bar, or 30 Bar, or 40 Bar, or 50 Bar, or 60 Bar, or 70 Bar, or 80 Bar, or 90 Bar, or 100 Bar, or 110 Bar, or 120 Bar, or 130 Bar, or 140 Bar, or 150 Bar, or 175 Bar, or 200 Bar, or 225 Bar, or 250 Bar, or 275 Bar, or 300 Bar, or 325 Bar, or 350 Bar, or 375 Bar, or 400 Bar, or 425 Bar, or 450 Bar, or 475 Bar, or 500 Bar, or 600 Bar, or 700 Bar, or 800 Bar, or 900 Bar, or 1,000 Bar, or 1,250 Bar, or 1,500 Bar, or 1,750 Bar, or 2,000 Bar, or 2,500 Bar, or 3,000 Bar, or 3,500 Bar, or 4,000 Bar, or 4,500 Bar, or 5,000 Bar, or 7,500 Bar, or 10,000 Bar.

Note: Carbon dioxide may be provided as an example weak acid derivative, or acid gas, or any combination thereof. Other weak acid derivatives, or acid gases, or any combination thereof may be employed instead of, or in addition to, carbon dioxide where carbon dioxide is described, and/or may include, but are not limited to, one or more or any combination of the following: hydrogen sulfide, or carbon dioxide, or carbonic acid, or hydrosulfurous acid, or mercaptan, or nitrogen dioxide, or sulfur dioxide, or silicon dioxide, or iron oxide, or metal oxide, or transition metal oxide, or aluminum oxide, or a weak acid derivative described herein, or a weak acid derivative described in the art, or an acid gas described herein, or an acid gas described in the art, or a derivative thereof, or any combination thereof.

Embodiments

1. A process comprising:
    reacting a component comprising calcium carbonate, or calcium sulfide, or calcium hydroxide, or calcium oxide, or calcium weak acid, or any combination thereof with a component comprising a carboxylic acid to form a component comprising a calcium carboxylate and a component comprising carbon dioxide, or hydrogen sulfide, or water, or any combination thereof;
    reacting the component comprising the calcium carboxylate with a component comprising an alkali sulfate to form a component comprising an alkali carboxylate and a component comprising calcium sulfate;
    reacting the component comprising calcium sulfate with a component comprising a magnesium sulfite, or bisulfite, or any combination thereof to form a component comprising calcium sulfite and a component comprising magnesium sulfate;
    decomposing at least a portion of the component comprising calcium sulfite to form a component comprising calcium oxide and a component comprising sulfur dioxide; and
    decomposing at least a portion of the component comprising magnesium sulfate to form a component comprising magnesium oxide and a component comprising sulfur dioxide, or sulfur trioxide, or oxygen, or sulfuric acid, or any combination thereof.
2. The process of embodiment 1 which further comprises reacting the decomposed component comprising calcium oxide with a carboxylic acid.
3. The process of embodiment 1 which further comprises reacting the decomposed component comprising calcium oxide with a component comprising carbon dioxide, or water, or any combination thereof to form a component comprising calcium carbonate.
4. The process of embodiment 3 wherein said carbon dioxide comprises dilute carbon dioxide from air, or flue gas, or emissions gas, or biogas, or natural gas, or a gas mixture, or any combination thereof.
5. The process of embodiment 1 wherein the formed component comprising carbon dioxide, or hydrogen sulfide, or water, any combination thereof comprises carbon dioxide and wherein the carbon dioxide is high purity carbon dioxide, or high partial pressure carbon dioxide, or high concentration carbon dioxide, or captured carbon dioxide, or carbon dioxide with a partial pressure greater than 1 bar, or any combination thereof.
6. The process of embodiment 1 wherein the calcium weak acid comprises limestone.
7. The process of embodiment 1 wherein the calcium weak acid comprises a mined material.
8. The process of embodiment 1 which further comprises producing a calcium weak acid.
9. The process of embodiment 1 which further comprises reacting at least a portion of the decomposed component comprising sulfur dioxide, or sulfur trioxide, or oxygen, or any combination thereof to form a component comprising sulfuric acid.
10. The process of embodiment 9 which further comprises reacting at least a portion of the component comprising sulfuric acid with a component comprising an alkali chloride to form an alkali sulfate and a component comprising hydrogen chloride, or chlorine, or hydrochloric acid, or a derivative thereof, or any combination thereof.
11. A process comprising:
reacting a component comprising an alkaline earth weak acid with a component comprising an acid to form a component comprising an alkaline earth acid anion and a component comprising a weak acid derivative;
reacting at least a portion of the component comprising the alkaline earth acid anion with a component comprising an alkali sulfate to form a component comprising alkaline earth sulfate and a component comprising an alkali acid anion; and
decomposing at least a portion of the component comprising alkaline earth sulfate to form a component comprising alkaline earth oxide, or alkaline earth hydroxide, or alkaline earth carbonate, or alkaline earth sulfide, or a derivative thereof, or any combination thereof, and a component comprising sulfur dioxide, or oxygen, or sulfur trioxide, or a derivative thereof, or any combination thereof.
12. The process of embodiment 11 wherein the alkaline earth weak acid comprises magnesium hydroxide, or magnesium carbonate, or magnesium oxide, or magnesium sulfide, or magnesium bicarbonate, or a derivative thereof, or any combination thereof.
13. The process of embodiment 11 wherein the weak acid derivative comprises water, or carbon dioxide, or hydrogen sulfide, or a derivative thereof, or any combination thereof.
14. The process of embodiment 11 wherein the alkaline earth acid anion comprises a carboxylate.
15. The process of embodiment 11 wherein the acid comprises acetic acid.
16. The process of embodiment 11 which further comprises separating at least a portion of the component comprising the alkali acid anion from the component comprising the alkaline earth sulfate using nanofiltration, or reverse osmosis, or electrodialysis, or crystallization, or temperature, or heating, or cooling, or precipitation, or any combination thereof.
17. The process of embodiment 11 which further comprises separating at least a portion of the component comprising the alkaline earth sulfate from the component comprising the alkali acid anion using nanofiltration, or reverse osmosis, or electrodialysis, or crystallization, or temperature, or heating, or cooling, or precipitation, or any combination thereof.
18. The process of embodiment 11 which further comprises reacting at least a portion of the component comprising alkaline earth oxide, or alkaline earth hydroxide, or any combination thereof with a component comprising carbon dioxide to form a component comprising an alkaline earth carbonate, or alkaline earth bicarbonate, or any combination thereof.
19. The process of embodiment 11 wherein the weak acid derivative comprises carbon dioxide, or captured carbon dioxide, or high purity carbon dioxide, or a derivative thereof, or any combination thereof.
20. The process of embodiment 11 which further comprises forming at least a portion of the component comprising alkali sulfate from a component comprising an alkali chloride.
21. The process of embodiment 11 which further comprises reacting at least a portion of the decomposed component comprising sulfur dioxide, or sulfur trioxide, or oxygen, or any combination thereof under conditions to form a component comprising sulfuric acid.
22. The process of embodiment 11 which further comprises reacting an alkali chloride with sulfuric acid to form at least a portion of the component comprising alkali sulfate.
23. The process of embodiment 11 which further comprises reacting an alkali chloride with sulfuric acid to form at least a portion of the component comprising alkali sulfate and a component comprising hydrogen chloride, or hydrochloric acid, or chlorine, or a derivative thereof, or any combination thereof.
24. A process comprising:
reacting a component comprising a magnesium weak acid with a component comprising a carboxylic acid to form a component comprising magnesium carboxylate and a component comprising a weak acid derivative;
reacting a component comprising a magnesium carboxylate with a component comprising an alkali sulfate to form a component comprising magnesium sulfate and a component comprising an alkali carboxylate; and
decomposing at least a portion of the component comprising magnesium sulfate to form a component comprising magnesium oxide, or magnesium hydroxide, or magnesium carbonate, or magnesium sulfide, or a derivative thereof, or any combination thereof, and a component comprising sulfur dioxide, or oxygen, or sulfur trioxide, or a derivative thereof, or any combination thereof.

The invention claimed is:
1. A process comprising:
reacting a component comprising calcium carbonate, or calcium sulfide, or calcium hydroxide, or calcium oxide, or calcium weak acid, or any combination thereof with a component comprising a carboxylic acid to form a component comprising a calcium carboxylate and a component comprising carbon dioxide, or hydrogen sulfide, or water, or any combination thereof;
reacting the component comprising the calcium carboxylate with a component comprising an alkali sulfate to form a component comprising an alkali carboxylate and a component comprising calcium sulfate;
reacting the component comprising calcium sulfate with a component comprising a magnesium sulfite, or bisulfite, or any combination thereof to form a compo- nent comprising calcium sulfite and a component comprising magnesium sulfate;

decomposing at least a portion of the component comprising calcium sulfite to form a component comprising calcium oxide and a component comprising sulfur dioxide; and decomposing at least a portion of the component comprising magnesium sulfate to form a component comprising magnesium oxide and a component comprising sulfur dioxide, or sulfur trioxide, or oxygen, or sulfuric acid, or any combination thereof.

2. The process of claim 1 which further comprises reacting the decomposed component comprising calcium oxide with a carboxylic acid.

3. The process of claim 1 which further comprises reacting the decomposed component comprising calcium oxide with a component comprising carbon dioxide, or water, or any combination thereof to form a component comprising calcium carbonate.

4. The process of claim 3 wherein said carbon dioxide comprises dilute carbon dioxide from air, or flue gas, or emissions gas, or biogas, or natural gas, or a gas mixture, or any combination thereof.

5. The process of claim 1 wherein the formed component comprising carbon dioxide, or hydrogen sulfide, or water, or any combination thereof comprises carbon dioxide and wherein the carbon dioxide is high purity carbon dioxide, or high partial pressure carbon dioxide, or high concentration carbon dioxide, or captured carbon dioxide, or carbon dioxide with a partial pressure greater than 1 bar, or any combination thereof.

6. The process of claim 1 wherein the calcium weak acid comprises limestone.

7. The process of claim 1 wherein the calcium weak acid comprises a mined material.

8. The process of claim 1 which further comprises producing a calcium weak acid.

9. The process of claim 1 which further comprises reacting at least a portion of the decomposed component comprising sulfur dioxide, or sulfur trioxide, or oxygen, or any combination thereof to form a component comprising sulfuric acid.

10. The process of claim 9 which further comprises reacting at least a portion of the component comprising sulfuric acid with a component comprising an alkali chloride to form an alkali sulfate and a component comprising hydrogen chloride, or chlorine, or hydrochloric acid, or a derivative thereof, or any combination thereof.

* * * * *